United States Patent
Fu et al.

(10) Patent No.: US 12,402,082 B2
(45) Date of Patent: *Aug. 26, 2025

(54) METHOD AND DEVICE FOR UPLINK POWER CONTROL

(71) Applicant: Samsung Electronics Co., Ltd., Suwon-si (KR)

(72) Inventors: Jingxing Fu, Beijing (CN); Chen Qian, Beijing (CN); Yingjie Zhang, Beijing (CN); Bin Yu, Beijing (CN); Qi Xiong, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,386

(22) Filed: Jun. 7, 2024

(65) Prior Publication Data

US 2024/0334342 A1  Oct. 3, 2024

Related U.S. Application Data

(63) Continuation of application No. 17/988,348, filed on Nov. 16, 2022, now Pat. No. 12,010,629, which is a
(Continued)

(30) Foreign Application Priority Data

Apr. 17, 2017 (CN) .......................... 201710250358.3
May 17, 2017 (CN) .......................... 201710348787.4
(Continued)

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0092* (2013.01); *H04W 52/36* (2013.01); *H04W 72/23* (2023.01); *H04W 80/08* (2013.01)

(58) Field of Classification Search
None
See application file for complete search history.

(56) References Cited

U.S. PATENT DOCUMENTS

| | | | |
|---|---|---|---|
| 8,688,163 | B2 | 4/2014 | Chen et al. |
| 8,965,442 | B2 | 2/2015 | Chen et al. |
| | | (Continued) | |

FOREIGN PATENT DOCUMENTS

| | | |
|---|---|---|
| CN | 101720122 A | 6/2010 |
| CN | 102118868 A | 7/2011 |
| | (Continued) | |

OTHER PUBLICATIONS

US 11,533,747 B2, 12/2022, Park et al. (withdrawn)
(Continued)

*Primary Examiner* — Xavier S Wong
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for uplink power control, which is applied to a User Equipment (UE), and the method includes: determining a timing between a power control command and a Physical Uplink
(Continued)

Control Channel (PUCCH), which adopts the power control command to control power. The present disclosure also provides a corresponding device.

10 Claims, 95 Drawing Sheets

Related U.S. Application Data continuation of application No. 17/140,591, filed on Jan. 4, 2021, now Pat. No. 11,864,122, which is a continuation of application No. 16/605,707, filed as application No. PCT/KR2018/004461 on Apr. 17, 2018, now Pat. No. 10,887,842.

(30) Foreign Application Priority Data

| | | |
|---|---|---|
| Jun. 29, 2017 | (CN) | 201710516144.6 |
| Jul. 3, 2017 | (CN) | 201710532281.9 |
| Jul. 31, 2017 | (CN) | 201710640300.X |
| Aug. 18, 2017 | (CN) | 201710713211.3 |
| Aug. 31, 2017 | (CN) | 201710773402.9 |
| Nov. 16, 2017 | (CN) | 201711140695.3 |
| Jan. 12, 2018 | (CN) | 201810031000.6 |

(51) Int. Cl.
*H04W 52/36* (2009.01)
*H04W 72/23* (2023.01)
*H04W 80/08* (2009.01)

(56) References Cited

U.S. PATENT DOCUMENTS

| | | | |
|---|---|---|---|
| 9,307,504 | B2 | 4/2016 | Shin et al. |
| 9,629,016 | B2 | 4/2017 | Xin et al. |
| 9,673,945 | B2 | 6/2017 | Geirhofer et al. |
| 10,499,347 | B2 | 12/2019 | Pietraski et al. |
| 10,700,837 | B2 | 6/2020 | Abdoli et al. |
| 10,887,842 | B2 * | 1/2021 | Fu .................. H04W 52/36 |
| 11,375,518 | B2 | 6/2022 | Lin et al. |
| 11,864,122 | B2 * | 1/2024 | Fu .................. H04W 52/325 |
| 12,010,629 | B2 * | 6/2024 | Fu .................. H04W 72/23 |
| 2010/0067496 | A1 * | 3/2010 | Choi .................. H04W 52/54 370/336 |
| 2011/0103350 | A1 | 5/2011 | Lindoff |
| 2011/0117952 | A1 | 5/2011 | Burstrom et al. |
| 2011/0268058 | A1 | 11/2011 | Hammarwall et al. |
| 2012/0051313 | A1 | 3/2012 | Seo et al. |
| 2012/0176996 | A1 | 7/2012 | Kim et al. |
| 2012/0236767 | A1 | 9/2012 | Zhu et al. |
| 2012/0250631 | A1 | 10/2012 | Hakola et al. |
| 2013/0039286 | A1 | 2/2013 | Larsson et al. |
| 2013/0051259 | A1 | 2/2013 | Kim et al. |
| 2013/0077571 | A1 | 3/2013 | Papasakellariou et al. |
| 2013/0148614 | A1 | 6/2013 | Noh et al. |
| 2013/0272257 | A1 | 10/2013 | Takaoka et al. |
| 2014/0023028 | A1 | 1/2014 | Zhang et al. |
| 2014/0071864 | A1 * | 3/2014 | Seo .................. H04W 4/06 370/294 |
| 2014/0177572 | A1 | 6/2014 | Papasakellariou et al. |
| 2014/0219232 | A1 | 8/2014 | Takeda et al. |
| 2014/0307652 | A1 | 10/2014 | Zhang et al. |
| 2014/0321406 | A1 | 10/2014 | Marinier et al. |
| 2015/0036618 | A1 | 2/2015 | Xu et al. |
| 2015/0049625 | A1 | 2/2015 | Kim et al. |
| 2015/0141070 | A1 | 5/2015 | Goto |
| 2015/0181589 | A1 | 6/2015 | Luo et al. |
| 2015/0271758 | A1 | 9/2015 | Park |
| 2015/0280883 | A1 | 10/2015 | Seo et al. |
| 2015/0358914 | A1 | 12/2015 | Song et al. |
| 2015/0358917 | A1 | 12/2015 | Gao et al. |
| 2016/0066282 | A1 | 3/2016 | Ouchi et al. |
| 2016/0135147 | A1 * | 5/2016 | Ouchi .................. H04W 52/32 370/329 |
| 2016/0165547 | A1 | 6/2016 | Ouchi et al. |
| 2016/0182213 | A1 | 6/2016 | Golitschek Edler Von Elbwart et al. |
| 2016/0316403 | A1 | 10/2016 | Li et al. |
| 2017/0064640 | A1 | 3/2017 | Yang et al. |
| 2017/0078062 | A1 | 3/2017 | Park et al. |
| 2017/0273109 | A1 | 9/2017 | Babaei et al. |
| 2019/0089573 | A1 | 3/2019 | Larsson et al. |
| 2019/0132851 | A1 | 5/2019 | Davydov et al. |
| 2019/0200332 | A1 | 6/2019 | Hwang et al. |
| 2019/0215110 | A1 * | 7/2019 | Yang .................. H04W 76/27 |
| 2019/0364558 | A1 | 11/2019 | Kim et al. |
| 2019/0364605 | A1 | 11/2019 | Loehr et al. |
| 2020/0274750 | A1 | 8/2020 | Yl et al. |
| 2020/0359340 | A1 | 11/2020 | Feuersaenger et al. |
| 2021/0282090 | A1 | 9/2021 | Zhang et al. |

FOREIGN PATENT DOCUMENTS

| | | |
|---|---|---|
| CN | 102291350 A | 12/2011 |
| CN | 102301769 A | 12/2011 |
| CN | 102377537 A | 3/2012 |
| CN | 102598777 A | 7/2012 |
| CN | 102724745 A | 10/2012 |
| CN | 102917421 A | 2/2013 |
| CN | 103220703 A | 7/2013 |
| CN | 103348621 A | 10/2013 |
| CN | 103427940 A | 12/2013 |
| CN | 103582043 A | 2/2014 |
| CN | 103686781 A | 3/2014 |
| CN | 103733694 A | 4/2014 |
| CN | 103765941 A | 4/2014 |
| CN | 103929803 A | 7/2014 |
| CN | 104619000 A | 5/2015 |
| CN | 106549889 A | 3/2017 |
| CN | 106559878 A | 4/2017 |
| KR | 10-2012-0121299 A | 11/2012 |
| KR | 10-2014-0057631 A | 5/2014 |
| KR | 10-2015-0089002 A | 8/2015 |
| WO | 2011/160473 A1 | 12/2011 |
| WO | 12/020990 A2 | 2/2012 |
| WO | 2015/017373 A1 | 2/2015 |
| WO | 2015/094816 A1 | 6/2015 |
| WO | 2015/165052 A1 | 11/2015 |
| WO | 2016/112721 A1 | 7/2016 |

OTHER PUBLICATIONS

European Office Action dated Sep. 17, 2024, issued in European Patent Application No. 22209784.2.
Korean Notice of Allowance dated Oct. 28, 2020 issued in Korean Application No. 10-2019-7030309.
Extended European Search Report dated Feb. 28, 2020, issued in an a counterpart European Application No. 18787590.1-1231 7 3596984.
Korean Office Action dated May 11, 2020, issued in a counterpart Korean Application No. 10-2019-7030309.
3rd Generation Partnership Project; Technical Specification Group Radio Access Network; Evolved Universal Terrestrial Radio Access {E-UTRA); Multiplexing and channel coding {Release 14), 3GPP TS 36,212 V14.2.0, Mar. 23, 2017.
Zite, Issues on UL TPC transmission in LTE-Advanced, R1-104674, 3GPP TSG RAN WG1 #62, Jun. 17, 2010, Madrid, Spain.
CATT, UGI and data multiplexing, R1-1702100, 3GPP TSG RAN WG1 Meeting #88, Feb. 7, 2017, Athens, Greecie.
Huawei et al., CSI-RS design for CSI acquisition, R1-1704236, 3GPP TSG RAN WG1 Meeting #88bis, Mar. 25, 2017, Spokane, USA.
Korean Office Action dated Jul. 30, 2021, issued in Korean Application No. 10-2021-7002805.
Chinese Office Action dated Jul. 21, 2021, issued in Chinese Application No. 201810031000.6.
Chinese Office Action dated Sep. 2, 2021, issued in Chinese Application No. 201710640300.X.

(56) References Cited

OTHER PUBLICATIONS

Chinese Office Action dated Sep. 8, 2021, issued in Chinese Application No. 201710516144.6.
LG Electronics, UCI piggyback onto PUSCH in LTE-Advanced for CM preserving transmission, R1-094469, 3GPP TSG RAN WG1 #59, Jeju, Korea, Nov. 2, 2009.
Alcatel-Lucent et al., Correction to PUSCH/PUCCH transmit power after PRACH power ramping, R1-132037, 3GPP TSG-RAN WG1 Meeting #73, Fukuoka, USA, May 11, 2013.
Chinese Office Action dated May 5, 2022, issued in Chinese Patent Application No. 201710516144.6.
Chinese Office Action dated May 20, 2022, issued in Chinese Patent Application No. 202110679193.8.
CATT, NR Measurements and Mobility based on SS-block Management in Idle and Connected state, R1-1710036, 3GPP TSG RAN WG1 NRAd-Hoc#2, Qingdao, P.R. China, Jun. 16, 2017.
NTT Docomo, Inc., Discussion and evaluation on NR RRM measurement based on SS block, R1-1708444, 3GPP TSG RAN WG1 Meeting #89, Hangzhou, P.R. China, May 6, 2017.
Chinese Office Action dated Mar. 22, 2022, issued in Chinese Patent Application No. 201710640300.X.
Extended European Search Report dated Oct. 21, 2022, issued in European Patent Application No. 22185734.5.
HTC, A CSI-RS configuration for channel Estimation and interference measurement, R1-120699, 3GPP TSG-RAN WG1 #68 R1-120699, Dresden, Germany, Feb. 1, 2012.
Chinese Office Action dated Nov. 16, 2022, issued in Chinese Patent Application No. 201710516144.6.
Chinese Office Action dated Dec. 7, 2022, issued in Chinese Patent Application No. 201710640300.X.
U.S. Advisory Action dated Dec. 15, 2022, issued in U.S. Appl. No. 17/140,591.
U.S. Non-Final Office Action dated Jan. 20, 2023, issued in U.S. Appl. No. 17/140,591.
U.S. Final Office Action dated Mar. 24, 2023, issued in U.S. Appl. No. 17/140,591.
Huawei et al., Resource allocation and indication for data channel, RI-1705069, 3GPP TSG RAN WGI Meeting #88bis, Spokane, USA, Apr. 2, 2017.
NTT Docomo Inc., Resource allocation for DL/UL data, R1-1705746, 3GPP TSG RAN WG1 Meeting #88bis, Spokane, USA, Apr. 2, 2017.
ASUSTeK, Two-step resource allocation for data channel in NR, R1-1705833, 3GPP TSG RAN WG1 Meeting #88bis, Spokane, USA, Apr. 2, 2017.
Extended European Search Report dated Mar. 21, 2023, issued in European Patent Application No. 22209784.2.
European Office Action dated Jul. 17, 2022, issued in European Patent Application No. 22 185 734.5.
Chinese Notice of Allowance dated Jul. 10, 2023, issued in Chinese Patent Application No. 201710640300.X.
U.S. Notice of Allowance dated Jun. 16, 2023, issued in U.S. Appl. No. 17/140,591.
Interdigital, Inc., Remaining details of BWP, R1-1714117, 3GPP TSG RAN WG1 Meeting #90, Prague, Czech Republic, Aug. 11, 2017.
Interdigital, Inc., Coreset Monitoring Under Dynamic Change of BWP, R1-1710872, 3GPP TSG RAN WG1 NR Ad-Hoc #2, Qingdao, China, Jun. 16, 2017.
Interdigital, Inc., Bandwidth Adaptation via BWP Selection in NR, R1-1710878, 3GPP TSG RAN WG1 Nr Ad-Hoc #2, Qingdao, China, Jun. 16, 2017.
Ericsson, On partial bands and CSI acquisition, R1-1714287, 3GPP TSG-RAN WG1 #90, Prague, Czech Republic, Aug. 12, 2017.
Samsung, Wider Bandwidth Operations, R1-1713654, 3GPP TSG RAN WG1 NR Meeting# 90, Prague, Czech Republic, Aug. 11, 2017.
Huawei et al., Overview of wider bandwidth operations, R1-1709972, 3GPP TSG RAN WG1 NR Ad Hoc Meeting, Qingdao, China, Jun. 30, 2017.
Mediatek Inc., RRM Measurement for Bandwidth Part Operation, R2-1708001, 3GPP TSG-RAN WG2 Meeting #99, Berlin, Germany, Aug. 11, 2017.
Chinese Reexamination Notification dated Sep. 25, 2023, issued in Chinese Patent Application No. 201710516144.6.
Chinese Office Action dated dated Feb. 14, 2023, Issued in Chinese Patent Application No. 201711140695.3.
Chinese Office Action dated dated Feb. 16, 2023, issued in Chinese Patent Application No. 201710773402.9.
Chinese Decision of Rejection dated Jan. 10, 2024, issued in Chinese Patent Application No. 201711140695.3.
U.S. Notice of Allowance dated Nov. 14, 2023, issued in U.S. Appl. No. 17/140,591.
Chinese Notification of Reexamination dated Mar. 25, 2025, issued in Chinese Patent Application No. 201711140695.3.
Chinese Notification of Reexamination dated Jun. 26, 2025, issued in Chinese Patent Application No. 201711140695.3.

\* cited by examiner

METHOD AND DEVICE FOR UPLINK POWER CONTROL

CROSS-REFERENCE TO RELATED APPLICATION(S)

This application is a continuation application of prior application Ser. No. 17/988,348, filed on Nov. 16, 2022, which will be issued as U.S. Pat. No. 12,010,629 on Jun. 11, 2024, which a continuation application of prior application Ser. No. 17/140,591, filed on Jan. 4, 2021, which has issued as U.S. Pat. No. 11,864,122 on Jan. 2, 2024, which is a continuation application of prior application Ser. No. 16/605,707, filed on Oct. 16, 2019, which has issued as U.S. Pat. No. 10,887,842 on Jan. 5, 2021, which is a U.S. National Stage application under 35 U.S.C. § 371 of an International application number PCT/KR2018/004461, filed on Apr. 17, 2018, which is based on and claims priority under 35 U.S.C. § 119 (a) of a Chinese patent application number 201710250358.3, filed on Apr. 17, 2017, in the China National Intellectual Property Administration, of a Chinese patent application number 201710348787.4, filed on May 17, 2017, in the China National Intellectual Property Administration, of a Chinese patent application number 201710516144.6, filed on Jun. 29, 2017, in the China National Intellectual Property Administration, of a Chinese patent application number 201710532281.9, filed on Jul. 3, 2017, in the China National Intellectual Property Administration, of a Chinese patent application number 201710640300.X, filed on Jul. 31, 2017, in the China National Intellectual Property Administration, of a Chinese patent application number 201710713211.3, filed on Aug. 18, 2017, in the China National Intellectual Property Administration, of a Chinese patent application number 201710773402.9, filed on Aug. 31, 2017, in the China National Intellectual Property Administration, of a Chinese patent application number 201711140695.3, filed on Nov. 16, 2017, in the China National Intellectual Property Administration, and of a Chinese patent application number 201810031000.6, filed on Jan. 12, 2018, in the China National Intellectual Property Administration, the disclosure of each of which is incorporated by reference herein in its entirety.

TECHNICAL FIELD

The present disclosure relates to wireless communication technologies, and more particularly, to a method and a device for uplink power control, to a method and a user equipment (UE) for transmitting uplink control information (UCI), to a method and a UE of bandwidth part (BWP) switching, to a method and apparatus for measuring cell, a method and apparatus for handover, to a method and a device for reporting Channel State Information (CSI).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "wired/wireless communication and network infrastructure" "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Long Term Evolution (LTE) technologies support two duplex modes, that is, Frequency Division Duplex (FDD) and Time Division Duplex (TDD). FIG. 1 is a schematic diagram illustrating a frame structure of a TDD system in the LTE. Length of each wireless frame is 10 ms. A wireless frame is equally divided into two half frames, length of which is 5 ms. Each half frame includes 8 time slots of 0.5 ms, and 3 special fields of 1 ms. The three special fields are respectively a Downlink pilot time slot (DwPTS), a Guard period (GP) and an Uplink pilot time slot (UpPTS). Each subframe consists of two consecutive time slots.

Transmission in the TDD system includes a transmission from a Base Station (BS) to a User Equipment (UE) (which is referred to as downlink), and a transmission from a UE to a BS (which is referred to as uplink). On the basis of the frame structure shown in FIG. 1, 10 subframes are shared by uplink and downlink every 10 ms. Each subframe is configured for the uplink or downlink. A subframe configured for the uplink is referred to as an uplink subframe. A subframe configured for the downlink is referred to as a downlink subframe. The TDD system supports 7 kinds of uplink and downlink configurations. As shown in Table 1, D represents a downlink subframe, U represents an uplink subframe, and S represents foregoing special subframe including three special fields.

TABLE 1

| configuration number | conversion point cycle | subframe index |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Hybrid Automatic Repeat request-Acknowledgement (HARQ-ACK) information of a Physical Downlink Shared Channel (PDSCH) may be transmitted in a Physical Uplink Shared Channel (PUSCH) or a Physical Uplink Control Channel (PUCCH). For a timing from PDSCH to PUCCH, assuming that a UE feeds back HARQ-ACK information in a PUCCH of an uplink subframe n, the PUCCH indicates a PDSCH within a downlink subframe (n−k), or HARQ-ACK released by Semi-Persistent Scheduling (SPS). Here, k∈K the value of K is defined in Table 2. K is a set of M elements $\{k_0, k_1, \ldots k_{M-1}\}$, and is relevant with a subframe number and uplink-downlink TDD configuration, which is referred to as a downlink association set. The element k is referred to as a downlink association element. In the following contents, a downlink subframe corresponding to the downlink association set is referred to as Bundling Window for short. That is, for all the elements k in K, a set {n−k, k∈K} consists of n−k. In a PUCCH subframe, one PUCCH resource is allocated for each PDSCH of a downlink subframe, so as to feed back HARQ-ACK information. For the FDD, M is equal to 1, and k is equal to 4.

TABLE 2

| Configuration number | subframe n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

On the basis of existing LTE specifications, transmission power of a PUCCH channel in subframe i of a serving cell c is determined based on the following formula.

$$P_{PUCCH}(i) = \min \left\{ \begin{array}{l} P_{CMAX,c}(i) \\ P_{0\_PUCCH} + PL_C + h(n_{CQI}, n_{HARQ}, n_{SR}) + \\ \Delta_{F\_PUCCH}(F) + \Delta_{TxD}(F') + g(i) \end{array} \right\} [dBm]$$

Definition of each parameter in the formula may refer to chapter 5.1.2.1 of version 10.9.0 in specification 36.213 of 3rd Generation Partnership Project (3GPP), which is described as follows.

$P_{CMAX,c}(i)$ is the maximum transmission power, which is configured for the serving cell c of the UE;

$\Delta_{F\_PUCCH}(F)$ is a power offset for a reference format (reference format in the LTE is PUCCH format 1a);

$\Delta_{TxD}(F')$ is a parameter related with PUCCH format, and whether to adopt a transmit diversity;

$PL_C$ is a link loss;

$P_{O\_PUCCH}$ is a power offset value configured by high-layer signaling;

g(i) is an accumulated value of a closed-loop power control;

$h(n_{CQI}, n_{HARQ}, n_{SR})$ is a power offset, which is related with PUCCH format and the number of bits of Uplink Control Information (UCI) needing to be fed back. $n_{CQI}$ is the number of bits of Channel State Information (CSI) needing to be fed back in subframe i. $n_{SR}$ is the number of bits of a Scheduling Request (SR) needing to be fed back in subframe i, value of which is 0 or 1. $n_{HARQ}$ is the number of bits of valid HARQ-ACK in subframe i, which are fed back actually. For example, regarding PUCCH format 3, when needing to feed back the $$CSI, h(n_{CQI}, n_{HARQ}, n_{SR}) = \frac{n_{HARQ} + n_{SR} + n_{CQI} - 1}{3}.$$

g(i) is calculated based on formula $$g(i) = g(i-1) + \sum_{m=0}^{M-1} \delta_{PUCCH}(i - k_m).$$

In the foregoing formula, i is current subframe.
For FDD, M=1, and $k_0$=4.
For the TDD, M and $k_m$ are obtained by using Table 2. For example, for uplink-downlink TDD configuration 1, regarding uplink subframe 2, M is equal to 2, $k_0$ is equal to 6, $k_1$ is equal to 7. That is, the PUCCH is transmitted in subframe 2. The PDSCH generating HARQ-ACK is transmitted in subframe (2−6+10=6) and subframe (2−7+10=5). Power control command of subframes 5 and 6 of previous radio frame is applied to the PUCCH transmission of subframe 2 of current radio frame, as shown in FIG. 2.

$\delta_{PUCCH}$ is a power adjustment value, which is obtained based on a transmission power control (TPC) command. The TPC command includes a TPC command in Downlink Control Information (DCI) (e.g., DCI format 1A) of PDCCH, which schedules PDSCH, and a TPC command of DCI (e.g., DCI format 3/3A) shared by multiple UEs, which is also referred to as UE-group DCI. A corresponding between the TPC command and the power adjustment value is shown in Table 3 and Table 4.

TABLE 3

| value of TPC command field of DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 4

| Value of TPC command field of DCI format 3A | $\delta_{PUCCH}$ [dB] |
|---|---|
| 0 | −1 |
| 1 | 1 |

Uplink control information (UCI) in long term evolution (LTE) system comprises channel state information (CSI), hybrid automatic retransmission request-acknowledgement (HARQ-ACK) and scheduling request (SR). UCI can be transmitted in a physical uplink control channel (PUCCH) or a physical uplink shared channel (PUSCH). When UCI is transmitted on a PUCCH in LTE system, slot-level frequency hopping is used to increase frequency diversity. For example, a PUCCH transmitted in one slot within one subframe and a PUCCH transmitted in another slot within the same subframe are symmetrically distributed about a center frequency point of an allocated uplink bandwidth in frequency-domain, as shown in FIG. 14.

Cyclic prefix-orthogonal frequency division multiplexing (CP-OFDM) technology and single carrier-frequency division multiplexing (SC-FDM) technology are introduced in the new radio (NR) air interface of 5th Generation (5G) Mobile Communication, which means that different waveforms may be used for transmitting PUCCH and PUSCH. When different waveforms are used for transmitting UCI by a user equipment (UE), good frequency diversity gain cannot be obtained if an inappropriate transmission mode is adopted since different waveforms have different peak-to-average power ratios (PAPRs). Therefore, performance of data transmission may be affected and performance of UCI transmission cannot be guaranteed.

In view of this, it is desirable to provide a method and UE for transmitting UCI which can solve the above-described technical problems.

In new radio (NR) air interface systems, a user equipment (UE) may receive downlink control signaling and data within a certain bandwidth of a wide frequency-domain spectrum since UE has limited frequency-domain processing capabilities and the system bandwidth is relatively wide. In order to improve the frequency-domain diversity performances of UEs, a UE may work in different limited frequency band in different time periods, as shown in FIG. 26. A limited frequency band is referred to as a bandwidth part (BWP). A UE may determine the switching of an active BWP by receiving dynamic signaling, e.g., receiving downlink (DL) downlink control information (DCI) or uplink (UL) DCI which specifies the switching of an active BWP. For paired spectrum (e.g., in Frequency Division Multiplexing (FDD)), DL DCI can indicate the switching of a downlink active BWP, and UL DCI can indicate the switching of an uplink active BWP. For unpaired spectrum (e.g., in Time Division Multiplexing (TDD)), DL DCI or UL DCI can indicate the switching of a BWP pair which includes a DL active BWP and an UL active BWP. For example, DL BWP-1 and UL BWP-1 are configured as BWP pair-1, DL BWP-2 and UL BWP-2 are configured as BWP pair-2, and either DL DCI or UL DCI can indicate the switching of the active BWP pair. For example, DL DCI may indicate the active BWP pair switches from BWP pair-1 to BWP pair-2, i.e., the DL active BWP switches from DL BWP-1 to DL BWP-2, and the UL active BWP switches from UL BWP-1 to UL BWP-2.

A UE can receive a Physical Downlink Control Channel (PDCCH) and a Physical Downlink Shared Channel (PDSCH) only on the DL active BWP; and can transmit a Physical Uplink Control Channel (PUCCH) and a Physical Uplink Shared Channel (PUSCH) only on the UL active BWP. At present, the timing of the switching of an active BWP at a UE after reception of a DCI indicating the switching of the active BWP is still undetermined.

In view of the above, there is the need of a method and a UE that can solve the above problem in BWP switching.

The rapid development of information industry, particularly the increasing demand from the mobile Internet and the Internet of Things (IoT), brings about unprecedented challenges in the future mobile communications technology. According to the ITU-R M.[IMT. BEYOND 2020. TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth-generation mobile communications technology (5G).

Currently, in ITU-R M.[IMT.VISION] from ITU, the framework and overall objectives of the future 5G have been discussed, where the demands outlook, application scenarios and various important performance indexes of 5G have been described in detail. In terms of new demands in 5G, the ITU-R M.[IMT. FUTURE TECHNOLOGY TRENDS] from ITU provides information related to the 5G technology trends, which is intended to address prominent issues such as significant improvement on system throughput, consistency of the user experience, scalability to support IoT, time delay, energy efficiency, cost, network flexibility, support for emerging services and flexible spectrum utilization, etc.

Measurement and handover for cell are important steps in a radio communication system. When a user equipment (UE) using the network service moves from one cell to another cell, or due to adjustment of the load of radio transmission service, activation operation and maintenance, equipment failure, etc., in order to ensure the continuity of the communication and the quality of service, the system will transfer the communication link between the UE and the original cell to a new cell. This process is called handover. In order to complete this handover process, the UE needs to measure the original cell and the new cell and report the measurement result, and the system performs the final handover based on the measurement result. As shown in FIG. 48, a measurement and handover process for cell in an existing LTE/LTE-A radio communication system are shown. The following steps are included in the measurement and handover process:

Step 1: a base station informs measurement configuration information including an object to be measured by the UE, a neighboring cell list, a report way, a measurement indicator and an event parameter to the UE by the measConfig cell carried in a Radio Resource Control (RRC) Connection Reconfiguration message.

Step 2: the UE performs a measurement configuration on a RRC protocol side of the UE according to a measurement control issued by the base station, and transmits an RRC Connection Reconfiguration Complete message to the base station to confirm that the measurement configuration is completed.

Step 3: the UE measures the cell based on the measurement configuration information received in step 1 and common cell-specific reference signals of the serving cell, and measures the neighboring cells optionally based on the measurement configuration information received in step 1 and cell-specific reference signals of the neighboring cells, and reports the measurement result to the base station.

Step 4: the base station makes a decision of UE to hand over based on the measurement result received in step 3 and radio resource management information.

Step 5: the base station determines a suitable target cell and performs the final handover, if the handover is decided in step 4.

In the existing method for measuring cell and handover, the measurement on the current serving cell and the neighboring cells are all based on the cell-specific reference signal, which is common to all the UEs in the same cell. In the future 5G radio communication system, the cell-specific reference signals common to UEs will no longer be supported.

Therefore, the measurement and handover method based on the cell-specific reference signal used in the LTE/LTE-A system can no longer be applied to the requirements of the future 5G radio communication system, and a new measurement and handover method needs to be designed for the 5G radio communication system to take place of the role of cell-specific reference signal in LTE/LTE-A system.

To enable a Base Station (BS) to learn downlink channel quality, a User Equipment (UE) transmits a CSI report to the BS. The CSI report includes a periodic CSI report and an aperiodic CSI report. The periodic CSI report is transmitted, according to a period configured by high-layer signaling and a time offset. The aperiodic CSI report is driven by CSI request information, which is carried by Downlink Control Information (DCI) for scheduling a Physical Uplink Shared Channel (PUSCH) by the BS. On the basis of an indication in the CSI request information, the UE transmits the aperiodic CSI report to the BS of a serving cell. Here, the CSI may include a Channel Quality Indicator (CQI), a Precoding Matrix Indicator (PMI), a Rank Indicator (RI), and so on.

DISCLOSURE OF INVENTION

Technical Problem

In a New Radio (NR), bandwidth of a serving cell may be large. However, a UE's capabilities may only support a part of the whole bandwidth of the serving cell, instead of supporting the whole bandwidth of the serving cell. Thus, the UE may be configured with multiple Bandwidth Parts (BWPs). And, at the same time, there is only one active BWP, and the remaining BWPs are inactive BWPs. Besides, there may be a different active BWP at a different time moment. That is, the active BWP may be changed at a different time moment, as shown in FIG. 1. Under this circumstances, how to report CSI is a problem to be studied.

Solution to Problem

The present disclosure provides a method and a device for uplink power control, such that power control of PUCCH is more effective.

The present disclosure provides a method for uplink power control, which is applied to a UE, including:
  determining a timing between a power control command and a Physical Uplink Control Channel (PUCCH), which adopts the power control command to control power;
  on the basis of the determined timing, adjusting transmission power of the corresponding PUCCH according to the power control command.

Preferably, the power control command comprises a UE-group power control command, one piece of Downlink Control Information (DCI) transmits at least one power control command, and each power control command is for one UE;
  wherein the method further comprises:
  receiving, by the UE, explicit signaling or implicit signaling from a Base Station (BS), or determining, by using a preset method, the timing between the UE-group power control command and the PUCCH, which adopts the UE-group power control command to control power.

Preferably, receiving the explicit signaling from the BS includes:
  transmitting the UE-group power control command in time slot n−k;
  transmitting the PUCCH in time slot n, wherein the PUCCH adopts the UE-group power control command to adjust power;
  obtaining, by the UE, a value k from the explicit signaling received from the BS, wherein k is an integer greater than or equal to 0, k of a different UE in the same group is the same or different; or, transmitting the UE-group power control command in time slot n−k;
  transmitting the PUCCH in time slot n, wherein the PUCCH adopts the UE-group power control command to adjust power;
  obtaining, by the UE, a value k through a combination of the explicit signaling and physical layer signaling, or though the physical layer signaling, wherein k is an integer greater than or equal to 0.

Preferably, obtaining the value k through the physical layer signaling includes at least one of:
  mode 1:
  a TPC timing set of a different UE transmitting the power control command within the same UE-group DCI being the same; wherein in addition to the power control command of each UE, the DCI of the UE-group power control command further comprises TPC timing indication,
  determining, by the UE, a value of the TPC timing set as a time interval ki, according to the TPC timing indication, wherein ki is between the UE-group power control command of the UE and the PUCCH, which adopts the UE-group power control command to adjust power, and the time interval value indicated by the TPC timing indication is applied to all the UEs of the UE-group;

mode 2:
a TPC timing set of a different UE transmitting the power control command within the same UE-group DCI being different; wherein in addition to the power control command of each UE, the DCI of the UE-group power control command further comprises the TPC timing indication;
determining, by the UE, a value of a corresponding TPC timing set as a time interval ki, according to the TPC timing indication, wherein ki is between the UE-group power control command of the UE and the PUCCH, which adopts the UE-group power control command to adjust power, and the time interval value indicated by the TPC timing indication is applied to all the UEs of the UE-group;
mode 3:
a TPC timing set of a different UE transmitting the power control command within the same UE-group DCI being the same, or different; wherein in addition to the power control command of each UE, the DCI of the UE-group power control command further comprises one TPC timing indication corresponding to each UE,
determining, by each UE, a value of the corresponding TPC timing set as a time interval ki, according to the TPC timing indication, wherein ki is between the UE-group power control command of the UE and the PUCCH, which adopts the UE-group power control command to adjust power.

Preferably, the method further includes:
transmitting at least two PUCCHs in one time slot, according to time division multiplexing;
wherein the timing between the power control command and the PUCCH, which adopts the power control command to control power, includes:
a timing between the DCI transmitting the TPC and a PUCCH transmission, which adopts the TPC to control power, wherein the TPC comprises a TPC of UE-group common DCI.

Preferably, on the basis of the determined timing, adjusting transmission power of the corresponding PUCCH according to the power control command, includes:
determining the TPC corresponding to each PUCCH, according to the timing, wherein the timing is between the DCI transmitting the TPC and the PUCCH transmission, which adopts the TPC to control power; and,
calculating an accumulated value of a closed-loop power control of each PUCCH, by using the determined TPC.

Preferably, calculating the accumulated value of the closed-loop power control of each PUCCH includes at least one of:
a first method: calculating the accumulated value g_n(i) of closed-loop power control of each PUCCH respectively, according to $$g\_n(i) = g(i-1) + \sum_{\substack{m=0 \\ m \ne m_i}}^{M-1} \delta_{PUCCH}(i - k_m),$$

wherein n is number of the PUCCH, and g(i−1) is an accumulated value of the closed-loop power control of the last PUCCH within time slot i−1; $\delta_{PUCCH}$ is a power adjustment value, which is obtained based on the TPC command; M is the total number of TPC commands pointing to time slot i; $m_i$ refers to that, the TPC command of time slot i−$m_i$ does not meet delay processing requirements, and the TPC command of time slot i−$m_i$ cannot be applied to calculate g_n(i);
a second method: calculating the accumulated value g(i) of closed-loop power control of at least two PUCCHs, according to $$g(i) = g(i-1) + \sum_{\substack{m=0 \\ m \ne m_i}}^{M-1} \delta_{PUCCH}(i - k_m);$$

wherein $\delta_{PUCCH}$ is a power adjustment value, which is obtained based on the TPC command; M is the total number of TPC commands pointing to time slot i; $m_i$ refers to that, the TPC command of time slot i−$m_i$ does not meet the delay processing requirements, and the TPC command of time slot i−$m_i$ cannot be applied to calculate g(i).

Preferably, on the basis of the determined timing, adjusting the transmission power of the corresponding PUCCH, according to the power control command, includes:
for each PUCCH, on the basis of the TPC timing, controlling power of the PUCCH, by using a first TPC command of the corresponding DCI and a second TPC command of previous DCI, wherein the first TPC command and the second TPC command are not used for calculating the accumulated value of previous closed-loop power control.

Preferably, when DCI-1 transmitting a TPC command TPC-1 is transmitted in time slot n−k−1, DCI-2 transmitting a TPC command TPC-2 is transmitted in time slot n−k, while PUCCH-1 adopting TPC-1 to control power is transmitted in time slot n+p, PUCCH-2 adopting TPC-2 to control power is transmitted in time slot n, controlling the power of the PUCCH includes at least one of:
a first method: calculating the accumulated value of closed-loop power control of PUCCH-2 transmitted in time slot n, by using power adjustment values $\delta_{PUCCH}(1)$ and $\delta_{PUCCH}(2)$, which are obtained by using TPC-1 and TPC-2;
a second method: calculating the accumulated value of closed-loop power control of PUCCH-1 by using TPC-1; and calculating the accumulated value of closed-loop power control of PUCCH-2 by using TPC-2.

The present disclosure also provides a device for uplink power control, including a timing determining module and a power control module, wherein
the timing determining module is configured to determine a timing between a power control command and a PUCCH, which adopts the power control command to control power; and,
the power control module is configured to adjust transmission power of the corresponding PUCCH, according to the determined timing and the power control command.

By adopting the method and device for uplink power control of the present disclosure, when determining that a time slot length for transmitting PUCCH and a time slot length for transmitting power control command are different, a more effective power control method is provided, such that the power control of PUCCH is more effective. In addition, by using the present disclosure, when there is no determined HARQ timing of PDSCH, the present disclosure provides a method for determining a timing between a UE-group power control command and PUCCH, which is transmitted by using the power control command.

An object of the present disclosure is to overcome shortcomings of the prior art and provides a method and a user equipment for transmitting uplink control information (UCI) which have desirable transmission performance and efficiency.

In order to achieve the object, the present disclosure provides a method for transmitting uplink control information (UCI), which comprises the steps of:
- determining a transmission waveform for a physical uplink shared channel (PUSCH); and
- transmitting UCI and data based on the determined transmission waveform for the PUSCH.

Preferably, the transmission waveform for the PUSCH comprises cyclic prefix-orthogonal frequency division multiplexing (CP-OFDM) or single carrier-frequency division multiplexing (SC-FDM).

Preferably, the step of determining the transmission waveform for the PUSCH comprises a step of: determining the transmission waveform for the PUSCH according to a predefined rule or a dynamic indication.

Preferably, the step of determining the transmission waveform for the PUSCH comprises a step of: determining the transmission waveform for the PUSCH to be CP-OFDM if downlink control information (DCI) scheduling the PUSCH supports spatial multiplexing, or determining the transmission waveform for the PUSCH according to a dynamic indication if the DCI scheduling the PUSCH does not support spatial multiplexing.

Preferably, the dynamic indication comprises an indication from received system information, configuration information from a higher-layer signaling or an indication from a received physical layer signaling.

Preferably, the step of transmitting UCI and data based on the determined transmission waveform for the PUSCH comprises a step of:
- transmitting UCI on a physical uplink control channel (PUCCH) and data on the PUSCH simultaneously, transmitting UCI and data on each of the PUCCH and the PUSCH simultaneously or transmitting UCI and data only on the PUSCH if the PUCCH and the PUSCH can be transmitted simultaneously, or transmitting UCI and data only on the PUSCH if the PUCCH and the PUSCH cannot be transmitted simultaneously, in the case that the determined transmission waveform for the PUSCH is CP-OFDM; and/or
- transmitting UCI on a PUCCH and data on the PUSCH simultaneously, transmitting a hybrid automatic retransmission request-acknowledgement (HARQ-ACK) and/or a scheduling request (SR) in UCI on the PUCCH and transmitting data and channel state information (CSI) in UCI on the PUSCH simultaneously, transmitting UCI and data only on the PUSCH, or transmitting UCI and data only on the PUCCH if the PUCCH and the PUSCH can be transmitted simultaneously, or transmitting UCI and data only on the PUSCH or transmitting UCI and data only on the PUCCH if the PUCCH and the PUSCH cannot be transmitted simultaneously, in the case that the determined transmission waveform for the PUSCH is SC-FDM.

Preferably, the step of transmitting UCI on the PUCCH and data on the PUSCH simultaneously if the PUCCH and the PUSCH can be transmitted simultaneously in the case that the determined transmission waveform for the PUSCH is CP-OFDM comprises:
- transmitting data on a PUSCH in a subframe and transmitting UCI on one or more PUCCHs in the subframe if the PUCCH and the PUSCH can be transmitted simultaneously in the case that the determined transmission waveform for the PUSCH is CP-OFDM, wherein one or more of HARQ-ACK, CSI and SR in UCI is transmitted on one PUCCH.

Preferably, one or more of HARQ-ACK, CSI and SR in UCI being transmitted on one PUCCH comprises: transmitting information formed by jointly or individually encoding two or all three of HARQ-ACK, CSI and SR in UCI on one PUCCH.

Preferably, the step of transmitting UCI and data on each of the PUCCH and the PUSCH simultaneously if the PUCCH and the PUSCH can be transmitted simultaneously in the case that the determined transmission waveform for the PUSCH is CP-OFDM comprises:
- transmitting UCI and data on each of the PUSCH and a PUCCH exclusively used by the UE in a subframe if the PUCCH and the PUSCH can be transmitted simultaneously in the case that the determined transmission waveform for the PUSCH is CP-OFDM.

In order to achieve above object, the present disclosure further provides a user equipment (UE) for transmitting uplink control information (UCI) which comprises:
- a waveform determining module configured to determine a transmission waveform for a physical uplink shared channel (PUSCH); and
- a data transmitting module configured to transmit UCI and data based on the determined transmission waveform for the PUSCH.

In order to achieve the object, the present disclosure further provides a method for transmitting uplink control information (UCI). The method comprises the steps of:
- determining whether a physical uplink control channel (PUCCH) and a physical uplink shared channel (PUSCH) are included in a frequency band capacity; and
- transmitting UCI and data according to a result of the step of determining.

Preferably, the step of transmitting UCI and data according to the result of the step of determining comprises:
- transmitting UCI and data on the PUSCH included in the frequency band capacity, or transmitting UCI on the PUCCH included in the frequency band capacity and data on the PUSCH included in the frequency band capacity, when it is determined that a PUCCH and a PUSCH are included in the frequency band capacity; and/or
- transmitting UCI and data on the PUSCH included in the frequency band capacity, or transmitting UCI on the PUCCH included in the frequency band capacity without transmitting data, when it is determined that no PUCCH or no PUSCH is included in the frequency band capacity.

Preferably, the step of transmitting UCI and data according to the result of the step of determining comprises:
- transmitting UCI and data on the PUSCH included in the frequency band capacity, transmitting UCI on the PUCCH included in the frequency band capacity and data on the PUSCH included in the frequency band capacity, or transmitting UCI only on the PUCCH included in the frequency band capacity, when it is determined that a PUCCH and a PUSCH are included in the frequency band capacity;
- transmitting UCI on the PUSCH included in the frequency band capacity, and transmitting UCI on the PUCCH included in the frequency band capacity without transmitting data when it is determined that no PUCCH or no PUSCH is included in the frequency band capacity; and/or adding resource for transmitting the PUCCH into the frequency band capacity, transmitting UCI on the added resource for transmitting the PUCCH and data on the PUSCH included in the frequency band capacity, when it is determined that a PUSCH is included in frequency band capacity and no PUCCH is included therein.

Preferably, when a UE has a plurality of PUCCHs and it is determined that some of the plurality of PUCCHs and a PUSCH are included in the frequency band capacity, the step of transmitting UCI and data according to the result of the step of determining comprises a step of:

transmitting UCI required to be transmitted on the plurality of PUCCHs on the PUCCHs included in the frequency band capacity;

transmitting UCI corresponding to the PUCCHs included in the frequency band capacity on these PUCCHs;

transmitting UCI corresponding to the PUCCHs included in the frequency band capacity on these PUCCHs, and transmitting UCI corresponding to the PUCCH outside the frequency band capacity on the PUSCH included in the frequency band capacity; or transmitting UCI required to be transmitted on the plurality of PUCCHs on the PUSCH included in the frequency band capacity.

Preferably, following the step of determining whether a PUCCH and a PUSCH are included in the frequency band capacity, the method further comprises steps of:

determining a transmission waveform for the PUSCH included in the frequency band capacity; and transmitting UCI and data based on the determined transmission waveform for the PUSCH.

In order to achieve the above object, the present disclosure further provides a user equipment (UE) for transmitting uplink control information (UCI), characterized in that the UE comprises:

a determination module configured to determine whether a physical uplink control channel (PUCCH) and a physical uplink shared channel (PUSCH) are included in a frequency band capacity; and a transmission module configured to transmit UCI and data according to a result obtained from the determination module.

As compared to the prior art, the present disclosure has advantageous technical effects as follows. The UCI and data to be transmitted on a PUCCH and a PUSCH may be deployed according to the transmission waveform for the PUSCH, therefore a higher frequency diversity gain may be obtained in the case that there are selectable transmission waveforms for the PUCCH and the PUSCH. In this way, signal distortion and spectral spread interference due to different peak to average power ratios (PAPRs) of the waveforms may be significantly reduced, and the overall transmission performance for UCI and system may be dramatically improved.

The objective of the present invention is: overcoming a deficiency of a conventional mechanism, and providing a method and a UE of implementing quick active BWP switching with reduced resource collision and reduced impact of an adjustment time interval taken by changing the active BWP at a UE on normal UE data reception and transmission.

In order to achieve the above objective, the present invention provides a method of BWP switching, including:

A. receiving DL DCI in time unit n, wherein active BWP indication information in the DCI indicates a switching of an active BWP;

B. determining the active BWP switches in a time unit n+k according to the received active BWP indication information; and C. starting to receive a PDCCH and/or a PDSCH on a switched DL active BWP from the time unit n+k, and/or starting to transmit a PUCCH and/or a PUSCH on a switched UL active BWP from the time unit n+k.

Preferably, for paired spectrum, the receiving DCI in time unit n in step A includes: receiving DL DCI in time unit n, the DL DCI indicates a switching of a DL active BWP;

the step C includes: starting to receive the PDCCH and/or the PDSCH on the switched DL active BWP from the time unit n+k.

Preferably, the step B includes: determining the time unit in which the DL active BWP switches according to at least one of:

if the DL DCI schedules a PDSCH, active BWP indication information in the DL DCI indicates a switching of the DL active BWP, and the PDSCH is within the same time unit with the DL DCI, the UE starts to receive the PDSCH on the switched DL active BWP from the time unit, and starts to receive the PDCCH on the switched DL active BWP from the first DL time unit subsequent to the time unit in which the PDSCH is received;

if the DL DCI schedules a PDSCH, the active BWP indication information in the DL DCI indicates a switching of the DL active BWP, and the PDSCH and the DL DCI are in different time units, the UE starts to receive the PDSCH on the switched DL active BWP from the time unit of the PDSCH, and starts to receive the PDCCH on the switched DL active BWP from the first DL time unit subsequent to the time unit of the PDSCH;

if the DL DCI schedules a PDSCH, the active BWP indication information in the DL DCI indicates a switching of the DL active BWP, and the PDSCH and the DL DCI are in different time units, the UE starts to receive the PDSCH on the switched DL active BWP from the time unit of the PDSCH, and starts to receive the PDCCH on the switched DL active BWP from the time unit of the PDSCH;

if the DL DCI schedules a PDSCH, the active BWP indication information in the DL DCI indicates a switching of the DL active BWP, and the PDSCH and the DL DCI are in different time units or in the same time unit, the UE starts to receive the PDSCH on the switched DL active BWP from the k'th time unit subsequent to the time unit of the DL DCI, and starts to receive the PDCCH on the switched DL active BWP from the time unit of the PDSCH; wherein, k is a non-negative integer, is pre-defined in a protocol or configured by higher layer signaling;

if the DL DCI schedules a PDSCH, the active BWP indication information in the DL DCI indicates a switching of the DL active BWP, the UE receives the PDSCH on a current BWP, and starts to receive the PDCCH on the switched BWP from the k'th time unit subsequent to the time unit of the DL DCI; wherein, k is a non-negative integer, is pre-defined in a protocol or configured by higher layer signaling.

Preferably, when a PDCCH schedules PDSCH transmission in at least two time units, the PDSCH scheduled by the DL DCI is: the first PDSCH of the PDSCHs scheduled in the at least two time units by the PDCCH.

Preferably, for paired spectrum, receiving DCI in time unit n in step A includes: receiving UL DCI in the time unit n, the UL DCI indicates a switching of an UL active BWP;
the step C includes: starting to transmit a PUSCH and/or a PUCCH on the UL active BWP from a time unit n+k.

Preferably, the step B includes: determining the time unit in which the UL active BWP switches according to:
if the UL DCI schedules a PUSCH and active BWP indication information in the UL DCI indicates a switching of a UL active BWP, the UE starts to transmit a PUSCH and a PUCCH to a switched UL active BWP from a time unit where the scheduled PUSCH is transmitted.

Preferably, for unpaired spectrum, receiving DCI in the time unit n in step A includes: receiving DL DCI in the time unit n, the DL DCI indicates a switching of an UL-DL active BWP pair;
the step C includes: starting to receive the PDCCH and/or the PDSCH on the switched DL active BWP from a time unit n+k1, and starting to transmit the PUCCH and/or the PUSCH to a switched UL active BWP from a time unit n+k2; wherein k1 and k2 are identical to or different from each other.

Preferably, the step B includes: determining the time unit in which the DL active BWP switches according to at least one of:
if the DL DCI schedules a PDSCH, the active BWP indication information in the DL DCI indicates a switching of the UL-DL active BWP pair, and the PDSCH is within the same time unit with the DL DCI, the UE starts to receive the PDSCH on a switched DL active BWP from the time unit of the DL DCI, and starts to receive the PDCCH on the switched DL active BWP from the first DL time unit subsequent to the time unit in which the PDSCH is received;
if the DL DCI schedules a PDSCH, and the active BWP indication information in the DL DCI indicates a switching of the UL-DL active BWP pair, and the PDSCH and the DL DCI are in different time units, the UE starts to receive the PDSCH on a switched DL active BWP from the time unit of the PDSCH, and starts to receive the PDCCH on the switched DL active BWP from the first DL time unit subsequent to the time unit of the PDSCH;
if the DL DCI schedules a PDSCH, the active BWP indication information in the DL DCI indicates a switching of the UL-DL active BWP pair, and the PDSCH and the DL DCI are in different time units, the UE starts to receive the PDSCH on a switched DL active BWP from the time unit of the PDSCH;
if the DL DCI schedules a PDSCH, the active BWP indication information in the DL DCI indicates a switching of the UL-DL active BWP pair, and the PDSCH and the DL DCI are in different time units or in the same time unit, the UE starts to receive the PDCCH on a switched DL active BWP from the k'th time unit subsequent to the time unit of the DL DCI, and starts to receive the PDSCH on the switched DL active BWP from the time unit of the PDSCH; wherein, k is a non-negative integer, is pre-defined in a protocol or configured by higher layer signaling;
if the DL DCI schedules a PDSCH and the active BWP indication information in the DL DCI indicates a switching of the DL-UL active BWP pair, the UE receives the PDSCH on a current active BWP, and starts to receive the PDCCH on the switched active BWP from the k'th time unit subsequent to the time unit of the DL DCI; wherein, k is a non-negative integer, is pre-defined in a protocol or configured by higher layer signaling.

Preferably, when k1 equals k2, the step B further includes: starting to transmit, by the UE, a PUCCH and/or a PUSCH on a switched UL active BWP from a time unit of the first UL transmission subsequent to the time unit in which the UE starts to receive the PDCCH or the PDSCH in the switched DL active BWP; the first UL transmission is PUCCH transmission or PUSCH transmission.

Preferably, the step B further includes: the k2 of the time unit n+k2 is the same with a time unit for transmitting HARQ-ACK corresponding to the DL DCI or the same with a time unit for transmitting HARQ-ACK corresponding to the PDSCH scheduled by the DL DCI; or the k2 is pre-defined in a protocol, or configured by higher layer signaling, or indicated respectively in physical layer signaling; or the value of k2 is determined according to a schedule time relation of UL PUSCH.

Preferably, for unpaired spectrum, receiving DCI in the time unit n in step A includes: receiving UL DCI in the time unit n, the UL DCI indicates a switching of a BWP pair including an UL active BWP and a DL active BWP;
the step C includes: starting to receive the PDCCH and/or the PDSCH on a switched DL active BWP from a time unit n+k1, and starting to transmit the PUCCH and/or the PUSCH on a switched UL active BWP from a time unit n+k2; wherein k1 and k2 are identical to or different from each other.

Preferably, when k1 equals k2, the step B includes: if the UL DCI schedules a PUSCH transmitted in time unit m, the value of k1 and k2 is m, or the value of k is pre-defined in a protocol, or configured by higher layer signaling, or indicated in physical layer signaling.

Preferably, the step B includes: determining the k1 to be a value pre-defined in a protocol, or configured by higher layer signaling; k2 is determined according to: if the UL DCI schedules a PUSCH transmitted in time unit m, the value of k2 is m, or is pre-defined in a protocol, or configured by higher layer signaling, or indicated in physical layer signaling.

Preferably, for unpaired spectrum in time slot aggregation, the time unit in which the active BWP switches is determined according to at least one of:
the DL active BWP starts to switch in the first time slot of at least two time slots of a PDSCH scheduled by a time slot aggregated PDCCH;
the DL active BWP starts to switch in the first time slot of at least two time slots using the same pre-coding scheme;
the UL active BWP starts to switch in the first time slot of at least two time slots of a PUSCH scheduled by a time slot aggregated PDCCH;
the UL active BWP starts to switch in the first time slot of at least two time slots using the same pre-coding scheme.

Preferably, the method may also include:
when a first DCI in time unit n indicates an active BWP switches from BWP-1 to BWP-2 starting from time unit n+L, a PDSCH or a PUSCH is scheduled in time unit n+L, a second DCI in time unit n+k indicates the active BWP switches from BWP-1 to BWP-3 starting from time unit n+M, and a PDSCH or a PUSCH is scheduled in time unit n+M, k<L, M<L, determining the DL active BWP switches from BWP-1 to BWP-3 from time unit n+M, and starting to receive, by the UE, the PDSCH and/or the PDCCH on BWP-3 from time unit n+M, or starting to transmit the PUSCH and/or the PUCCH on BWP-3 from time unit n+M.

The present invention also provides a UE, including:
a receiving module, configured to receive DCI in time unit n, wherein active BWP indication information in the DCI indicates a switching of an active BWP;
a determining module, configured to determine the active BWP switches in a time unit n+k according to the received active BWP indication information; and
a receiving module, configured to start to receive a PDCCH and/or a PDSCH on a DL active BWP from the time unit n+k, and/or a transmitting module, configured to start to transmit a PUCCH and/or a PUSCH on an UL active BWP from the time unit n+k.

The present invention also provides a UE, including: a transceiver and a processor;
the transceiver is configured to receive DCI in time unit n, wherein active BWP indication information in the DCI indicates a switching of an active BWP;
the processor is configured to determine the active BWP switches in a time unit n+k according to the received active BWP indication information;
the transceiver is further configured to start to receive a PDCCH and/or PDSCH on a DL active BWP from the time unit n+k, and/or start to transmit a PUCCH and/or a PUSCH on an UL active BWP from the time unit n+k.

According to the above technical mechanisms, the present application provides a method and a UE which implement quick active BWP switching by receiving an indication indicating a switching of an active BWP and switching the active BWP at a proper time point. Further, the technical mechanism can reduce resource collisions and reduce the impact of the time interval for changing the active BWP at a UE on normal data reception and transmission.

The object of the present invention is to solve at least one of the above technical disadvantages, in particular the problem that it cannot be applied to the requirements of future 5G radio communication system.

The present invention provides a method for measuring cell, which is applied to a UE, including the following steps:
measuring a cell to which a UE belongs and neighboring cells in a cell list according to at least one of initial measurement configuration information, UE-specific Channel State Information-Reference Signal (CSI-RS) resource(s) and a Synchronize Signal (SS) Block to obtain a measurement result;
transmitting the measurement result to a base station, so that the base station determines whether to hand over the cell to which the UE currently belongs according to the measurement result.

Preferably, the UE-specific CSI-RS resource(s) includes common UE-specific CSI-RS resource(s), and the step of measuring the cell to which the UE belongs and the neighboring cells in the cell list respectively according to the initial measurement configuration information and the UE-specific CSI-RS resource(s) to obtain the measurement result, including:
measuring the cell to which the UE belongs and the neighboring cells in the cell list respectively according to the initial measurement configuration information and the common UE-specific CSI-RS resource(s) to obtain the measurement result.

Preferably, UE-specific CSI-RS resource(s) includes a specific UE-specific CSI-RS resource(s), and the step of measuring the cell to which the UE belongs and the neighboring cells in the cell list respectively according to the initial measurement configuration information and the UE-specific CSI-RS resource(s) to obtain the measurement result, comprising:
measuring the cell to which the UE belongs and the neighboring cells in the cell list respectively according to the initial measurement configuration information and the specific UE-specific CSI-RS resource(s) to obtain the measurement result.

Preferably, the UE-specific CSI-RS resource(s) further includes pre-configured UE-specific CSI-RS resource(s), and the step of measuring the cell to which the UE belongs according to the initial measurement configuration information and the UE-specific CSI-RS resource(s) to obtain the measurement result, further including:
measuring the cell to which the UE belongs according to the initial measurement configuration information and the pre-configured UE-specific CSI-RS resource(s).

Preferably, the method further includes:
receiving the initial measurement configuration information transmitted by the base station;
performing an initial measurement configuration according to the initial measurement configuration information, and returning an initial measurement configuration complete message to the base station;
receiving the UE-specific CSI-RS resource(s) transmitted by the base station.

Preferably, the method further includes:
receiving the initial measurement configuration information and UE-specific CSI-RS resource(s) transmitted by the base station;
performing the initial measurement configuration according to the initial measurement configuration information, and returning the initial measurement configuration complete message to the base station.

Preferably, the configuration way of the common UE-specific CSI-RS resource(s) includes any one of the followings:
the common UE-specific CSI-RS resource(s) is discrete in both the frequency domain and time domain, and the different time resources correspond to the same frequency resource;
the common UE-specific CSI-RS resource(s) is discrete in both the frequency domain and time domain, and the different time resources correspond to the different frequency resources;
the common UE-specific CSI-RS resource(s) is discrete in the time domain and is continuous in the frequency domain, and the different time resources correspond to the same frequency resource;
the common UE-specific CSI-RS resource(s) is discrete in the time domain and is continuous in the frequency domain, and the different time resources correspond to the different frequency resources;
the common UE-specific CSI-RS resource(s) is continuous in the time domain and is discrete in the frequency domain, and the different time resources correspond to the same frequency resource;
the common UE-specific CSI-RS resource(s) is continuous in the time domain and is discrete in the frequency domain, and the different time resources correspond to the different frequency resources;
the common UE-specific CSI-RS resource(s) is continuous in both the frequency domain and time domain, and the different time resources correspond to the same frequency resource;

the common UE-specific CSI-RS resource(s) is continuous in both the frequency domain and time domain, and the different time resources correspond to the different frequency resources.

Preferably, the UE-specific CSI-RS resource(s) includes pre-configured UE-specific CSI-RS resource(s), and the step of measuring the cell to which the UE belongs and the neighboring cells in the cell list respectively according to the initial measurement configuration information and the UE-specific CSI-RS resource(s) to obtain the measurement result, including:

measuring the cell to which the UE belongs according to the initial measurement configuration information and pre-configured UE-specific CSI-RS resource(s) to obtain the measurement result; and measuring each neighboring cell in the cell list according to the initial measurement configuration information and the SS Block of each neighboring cell to obtain the measurement result.

Preferably, the step of measuring the cell to which the UE belongs and the neighboring cells in the cell list respectively according to the initial measurement configuration information and the SS Block to obtain the measurement result, including:

measuring the cell to which the UE belongs according to the initial measurement configuration information and the SS Block of the cell to which the UE belongs to obtain the measurement result;

measuring each neighboring cell in the cell list according to the initial measurement configuration information and the SS Block of each neighboring cell to obtain the measurement result.

Preferably, the configuration way of the specific UE-specific CSI-RS resource(s) includes any one of the followings:

the specific UE-specific CSI-RS resource(s) and the common UE-specific CSI-RS resource(s) are discrete in both the time domain and the frequency domain, and are distinguished by a time division multiplexing (TDM) scheme;

the specific UE-specific CSI-RS resource(s) and the common UE-specific CSI-RS resource(s) are discrete in both the time domain and the frequency domain, and are distinguished by a frequency division multiplexing (FDM) scheme;

the specific UE-specific CSI-RS resource(s) and the common UE-specific CSI-RS resource(s) are discrete in both time domain and frequency domain, and are distinguished by the FDM scheme and TDM scheme simultaneously;

the specific UE-specific CSI-RS resource(s) and the common UE-specific CSI-RS resource(s) are discrete in the time domain and are continuous in the frequency domain, and are distinguished by the TDM scheme simultaneously;

the specific UE-specific CSI-RS resource(s) and the common UE-specific CSI-RS resource(s) are discrete in the time domain and are continuous in the frequency domain, and are distinguished by the FDM scheme;

the specific UE-specific CSI-RS resource(s) and the common UE-specific CSI-RS resource(s) are discrete in the time domain and are continuous in the frequency domain, and are distinguished by the FDM scheme and the TDM scheme simultaneously;

the specific UE-specific CSI-RS resource(s) and the common UE-specific CSI-RS resource(s) are continuous in the time domain and are discrete in the frequency domain, and are distinguished by the TDM scheme simultaneously;

the specific UE-specific CSI-RS resource(s) and the common UE-specific CSI-RS resource(s) are continuous in the time domain and are discrete in the frequency domain, and are distinguished by the FDM scheme;

the specific UE-specific CSI-RS resource(s) and the common UE-specific CSI-RS resource(s) are continuous in the time domain and are discrete in the frequency domain, and are distinguished by the FDM scheme and the TDM scheme simultaneously;

the specific UE-specific CSI-RS resource(s) and the common UE-specific CSI-RS resource(s) are continuous both in the time domain and the frequency domain, and are distinguished by the TDM scheme simultaneously;

the specific UE-specific CSI-RS resource(s) and the common UE-specific CSI-RS resource(s) are continuous both in the time domain and the frequency domain, and are distinguished by the FDM scheme simultaneously;

the specific UE-specific CSI-RS resource(s) and the common UE-specific CSI-RS resource(s) are continuous both in the time domain and the frequency domain, and are distinguished by the FDM scheme and TDM scheme simultaneously.

Preferably, the method further includes:

receiving any one of the following information to determine that the number of the UE-specific CSI-RS resource(s) is one;

an time-domain index and an frequency-domain index of an specific time-frequency resource;

the corresponding index of a Physical Resource Block (PRB) or Resource Element (RE) that is sorted in a time index priority or a frequency index priority way;

predefining the timing, and configuring the PRB index or the RE or bitmap information of the frequency resource simultaneously.

Preferably, the method further includes:

receiving any one of the following information to determine that the number of the UE-specific CSI-RS resource(s) is at least two;

the number of time-frequency resources in the time-frequency resource group for measurement, and the configuration information of each time-frequency resource for measurement;

pre-configured time-domain index and/or frequency-domain index.

The present invention also provides a method for handover, which is applied to a base station, including the following steps:

transmitting initial measurement configuration information and UE-specific Channel State Information-Reference Signal (CSI-RS) resource(s) to a UE;

receiving a measurement result returned by the UE;

determining whether to hand over a cell to which the UE currently belongs according to the measurement result;

transmitting an instruction for handover carries a target neighboring cell, if it is determined to hand over, so that the UE hands over from the cell to which the UE belongs to the target neighboring cell according to the instruction for handover.

The present invention further provides an apparatus for measuring cell, including:

a processing unit, configured to measure a cell to which the UE belongs and neighboring cells in a cell list according to at least one of the initial measurement configuration information, UE-specific Channel State Information-Reference Signal (CSI-RS) resources(s) and a Synchronize Signal (SS) Block of the UE state to obtain a measurement result;

a transmitting unit, configured to transmit the measurement result to a base station.

The present invention further provides an apparatus for handover, including:

a transmitting unit, configured to transmit initial measurement configuration information and UE-specific Channel State Information-Reference Signal (CSI-RS) resource(s) to a UE;

a receiving unit, configured to receive a measurement result returned by the UE;

a processing unit, configured to determine whether to hand over a cell to which the UE belongs currently according to the measurement result; and when it is determined to hand over, transmit an instruction for handover carries a target neighboring cell.

By the present invention, the efficiency and performance of the measurement and handover process for cell are improved.

Additional aspects and advantages of the invention will be set forth in part in the description which follows, and in part will be obvious from the description below, or can be learned by practice of the invention.

The present disclosure provides a method for reporting CSI, thereby ensuring a normal transmission of a CSI report in a transmission system of a NR.

The present disclosure provides a method for reporting Channel State Information (CSI), including:

selecting, by a User Equipment (UE), at least one Bandwidth Part (BWP) from a configured BWP;

calculating, by the UE, a CSI report, based on the selected BWP; and, transmitting, by the UE, the CSI report to a Base Station (BS).

Preferably, the CSI report is an aperiodic CSI report, and the aperiodic CSI report at a time only includes one aperiodic CSI report, which is calculated based on channels and interference situation of one BWP.

Preferably, selecting by the UE the at least one BWP from the configured BWP includes:

selecting, by the UE, an active BWP from the configured BWP; wherein the active BWP is in a time slot, where Downlink Control Information (DCI) transmitting and driving the aperiodic CSI report is located, and the active BWP is in a serving cell, which requests the aperiodic CSI report, or, selecting, by the UE, one BWP with the best Channel Quality Indicator (CQI) from the configured BWP.

Preferably, the CSI report is an aperiodic CSI report, and the aperiodic CSI report at a time includes at least two aperiodic CSI reports, which are calculated based on channels and interference situations of at least two BWPs.

Preferably, selecting by the UE the at least one BWP from the configured BWP includes at least one of:

selecting, by the UE, an active BWP from the configured BWP, and selecting at least one BWP with the best CQI from the configured BWP, wherein the active BWP is in a time slot, where DCI transmitting and driving the aperiodic CSI report is located, and the active BWP is in a serving cell, which requests the aperiodic CSI report;

selecting, by the UE, at least two BWPs from the configured BWP, according to a configuration of high-layer signaling and an indication of physical-layer signaling; or, selecting, by the UE, at least two BWPs with the best CQI from the configured BWP.

Preferably, the CSI report is a periodic CSI report, one set of periodic CSI reports is configured to be reported, the periodic CSI report at a time includes a periodic CSI report, which is calculated based on channels and interference situations within an active BWP; and, wherein selecting by the UE the at least one BWP from the configured BWP includes: selecting, by the UE, the active BWP from the configured BWP.

Preferably, the CSI report is a periodic CSI report, at least two sets of periodic CSI reports are configured to be reported, one set of periodic CSI reports is calculated, based on channels and interference situations within an active BWP of the configured BWP, the remaining periodic CSI reports are calculated, based on channels and interference situations within at least one inactive BWP of the configured BWP, or based on channels and interference situations within all the BWPs.

Preferably, the method further includes:

determining, by the UE, a Channel State Information-Reference Signal (CSI-RS) resource, on which the aperiodic CSI report is based, and receiving a corresponding CSI-RS.

Preferably, receiving by the UE the corresponding CSI-RS includes at least one of:

when receiving an aperiodic CSI-RS drive, in a different downlink time slot, respectively receiving, by the UE, CSI-RS within all the BWPs configured by the UE, or, respectively receiving CSI-RS within some designated BWPs among all the BWPs configured by the UE;

receiving, by the UE, the CSI-RS resource of the periodic CSI report; or, firstly receiving, by the UE, a CSI-RS within a BWP, which is most adjacent to the aperiodic CSI report, according to a set sequence of BWP number.

Preferably, the method further includes:

determining, by the UE, the CSI-RS resource, on which one set of periodic CSI reports is based, and receiving the corresponding CSI-RS.

Preferably, receiving by the UE the corresponding CSI-RS includes:

on the basis of a configuration about one set of periodic CSI reports, receiving the CSI-RS in a time slot corresponding to the active BWP of the configured BWP.

Preferably, the method further includes:

determining, by the UE, the CSI-RS resource, on which at least two sets of periodic CSI reports are based, and receiving the corresponding CSI-RS.

Preferably, receiving by the UE the corresponding CSI-RS includes:

on the basis of configurations about the two sets of periodic CSI reports, receiving one set of CSI-RS in a time slot corresponding to the active BWP of the configured BWP, and receiving the remaining CSI-RS in a time slot corresponding to the active BWP, or the inactive BWP of the configured BWP.

The present disclosure also provides a device for reporting CSI, including a BWP selecting module, a CSI calculating module and a CSI reporting module, wherein the BWP selecting module is configured to select at least one BWP from at least one BWP configured by the device;

the CSI calculating module is configured to calculate a CSI report, based on the selected BWP; and, the CSI reporting module is configured to transmit the CSI report to a Base Station (BS).

On the basis of foregoing technical solutions, it can be seen that, in the present disclosure, the UE selects at least one BWP from at least one configured BWP, so as to calculate CSI. And, the UE determines a method for calculating the CSI, based on a type of the selected BWP, calculates the CSI, and transmits the CSI report to the BS, thereby ensuring a normal transmission of the CSI report in the transmission system of the NR.

Advantageous Effects of Invention

The present disclosure provides a method and a device for uplink power control, such that power control of PUCCH is more effective. By adopting the method and device for uplink power control of the present disclosure, when determining that a time slot length for transmitting PUCCH and a time slot length for transmitting power control command are different, a more effective power control method is provided, such that the power control of PUCCH is more effective. In addition, by using the present disclosure, when there is no determined HARQ timing of PDSCH, the present disclosure provides a method for determining a timing between a UE-group power control command and PUCCH, which is transmitted by using the power control command.

Figure 52:
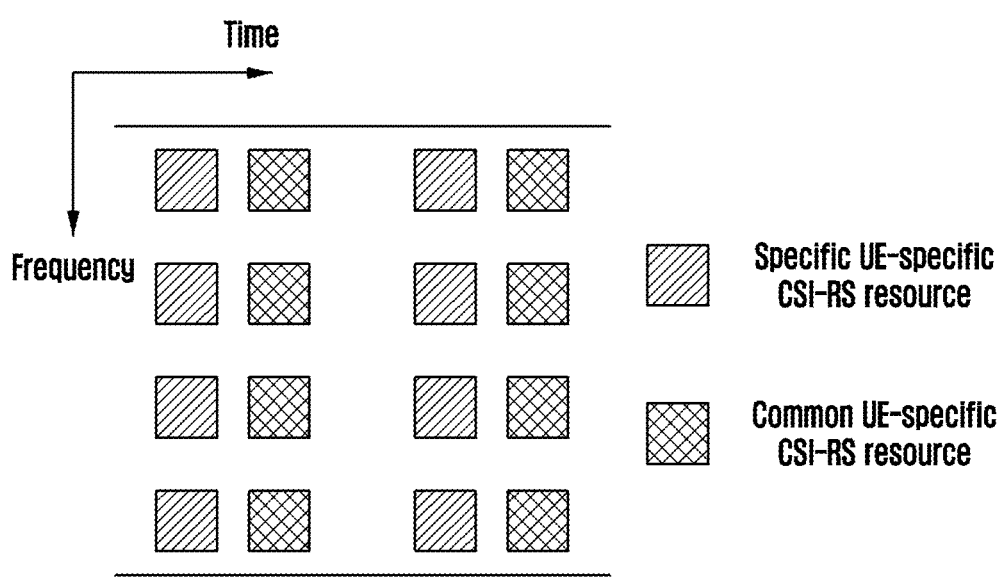
FIG. 52 is a schematic diagram 1*a* of a configuration of specific UE-specific CSI-RS resources provided by the present invention.

Explanation of the drawings: the meanings of the diagrams in FIGS. 52-68 are the same as those shown on the right of FIG. 52.

Figure 78:
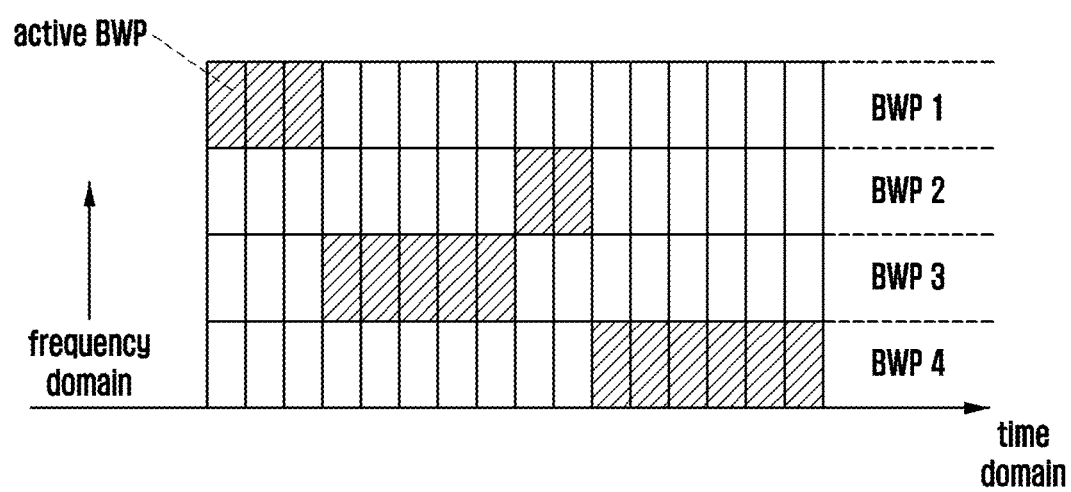

FIG. 78 is a schematic diagram illustrating a structure of a BWP of an existing serving cell.

Figure 79:
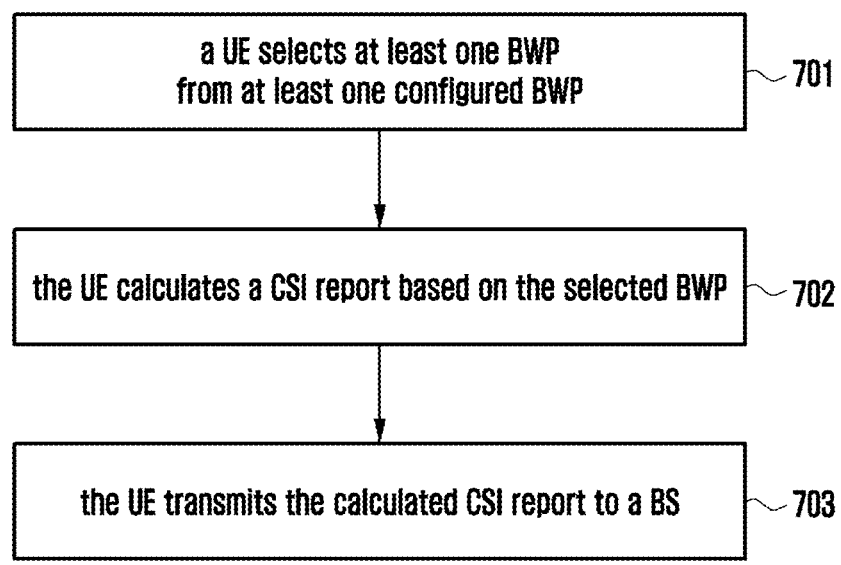

FIG. 79 is a basic flow chart illustrating a method for reporting CSI, in accordance with an embodiment of the present disclosure.

Figure 80:
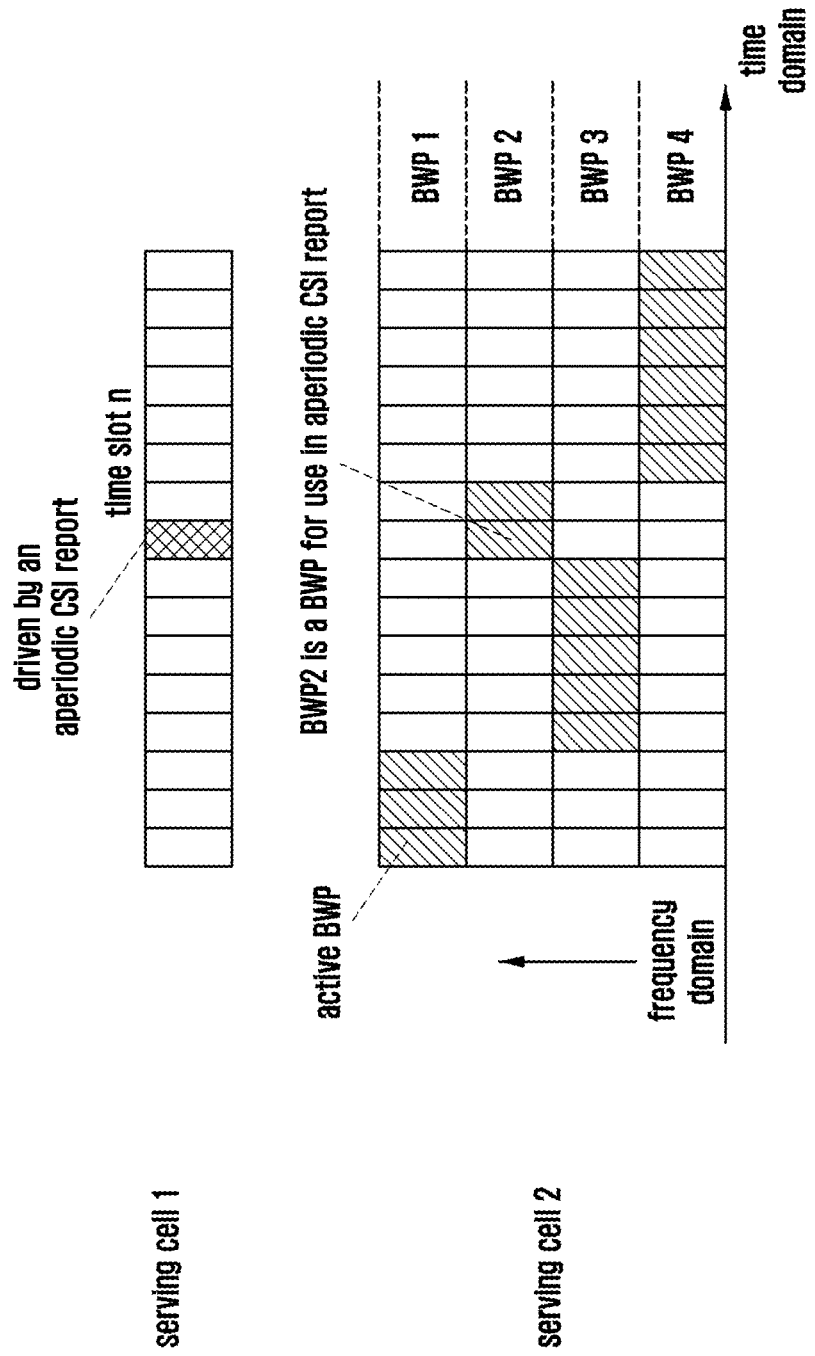

FIG. 80 is a schematic diagram illustrating how to calculate an aperiodic CSI report, based on an active BWP, in accordance with a first embodiment of the present disclosure.

Figure 81:
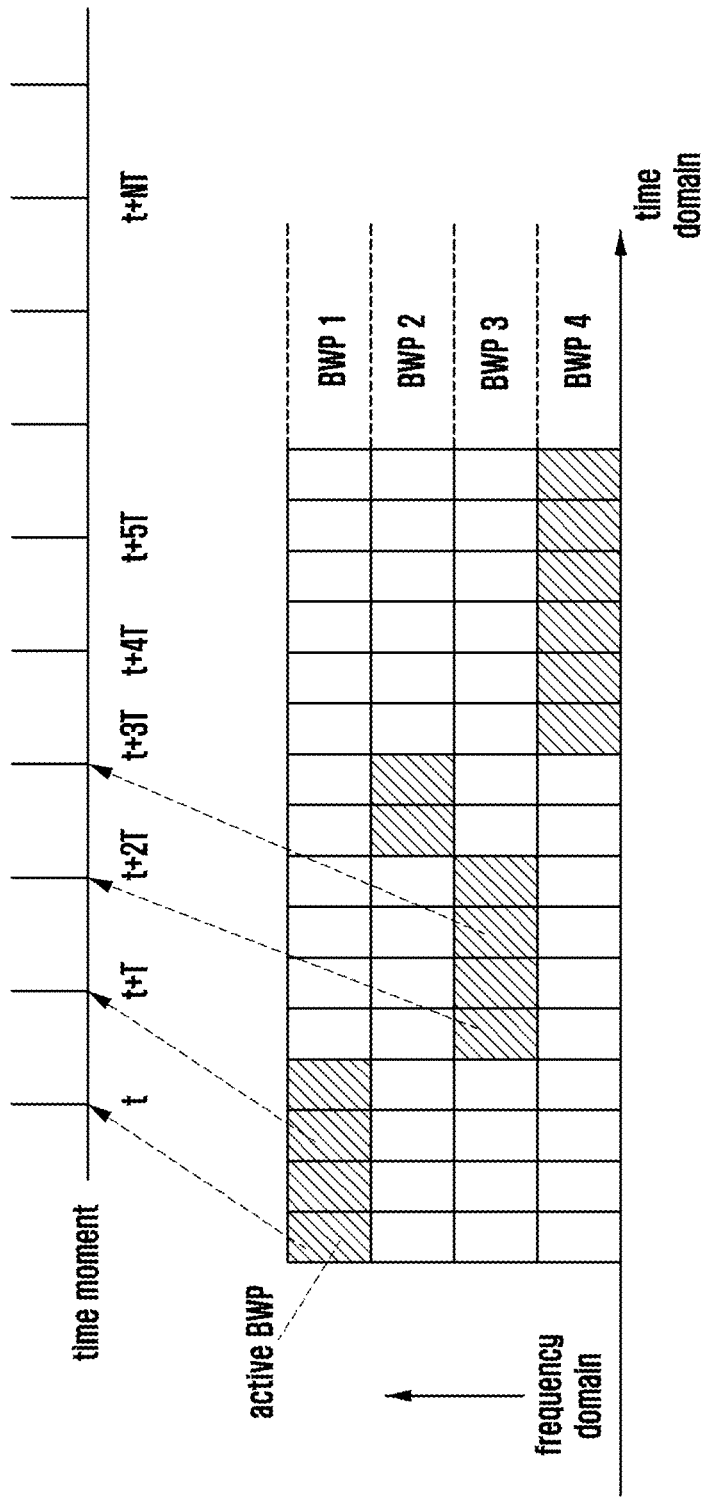

FIG. 81 is a schematic diagram illustrating a different active BWP at a different time moment, in accordance with an embodiment of the present disclosure.

Figure 82:
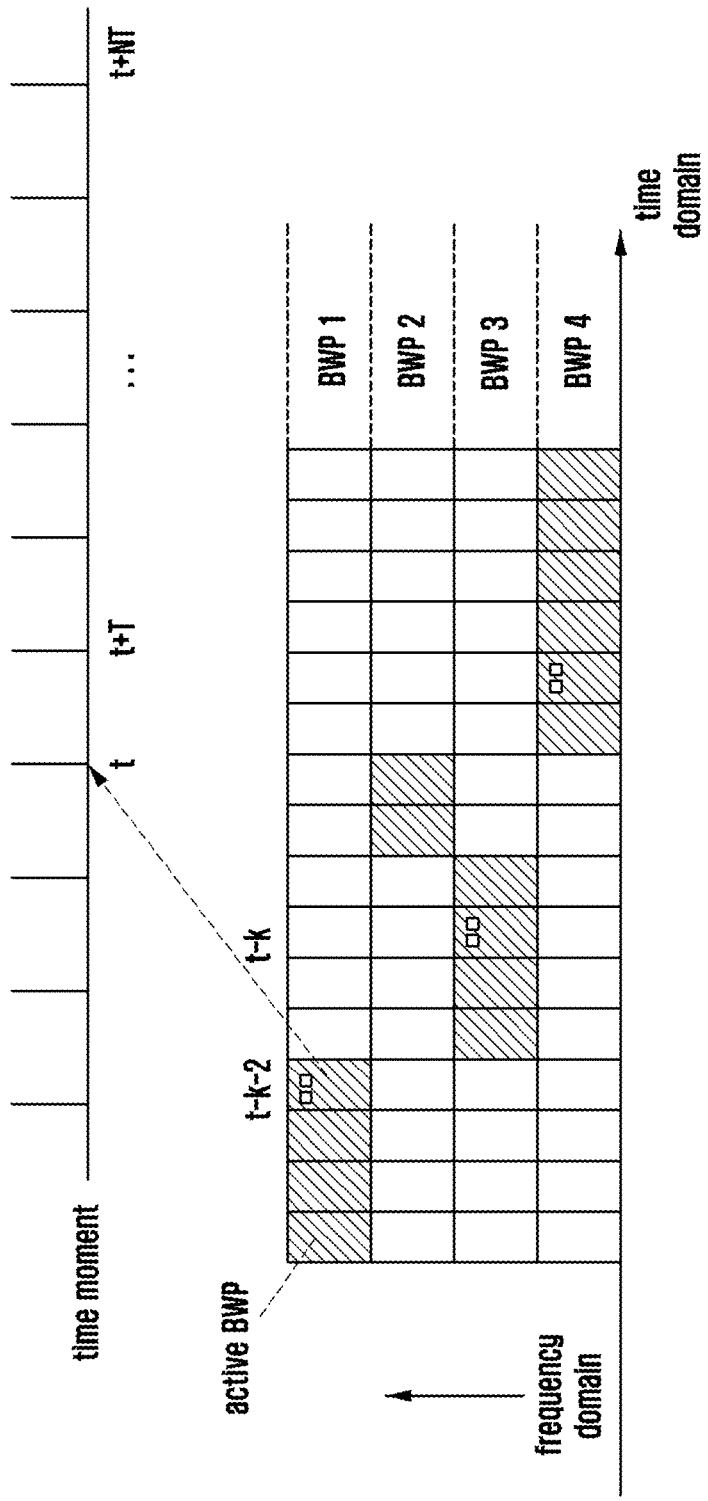

FIG. 82 is a schematic diagram illustrating how to calculate a periodic CSI report, based on an active BWP, in accordance with a second embodiment of the present disclosure.

Figure 83:
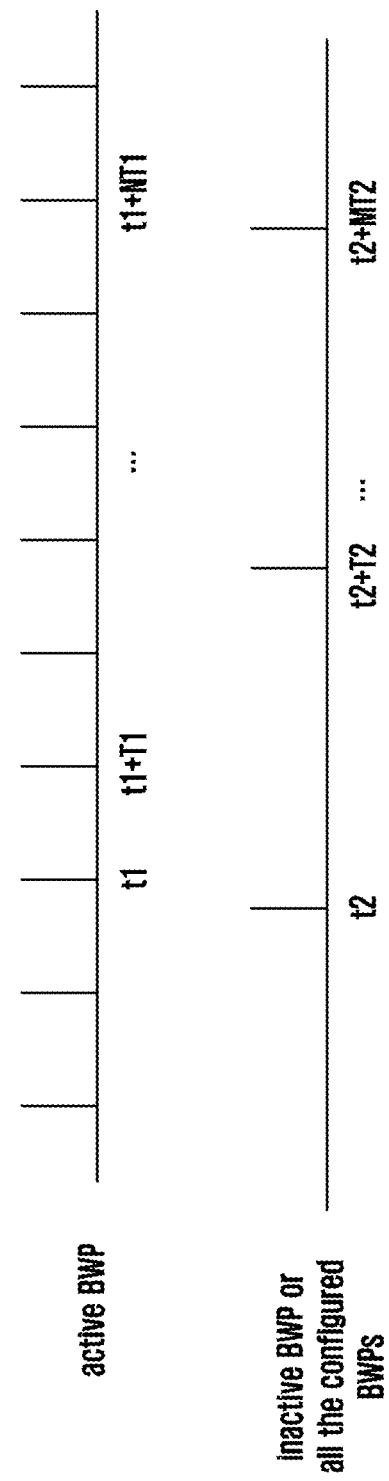

FIG. 83 is a schematic diagram illustrating BWPs, on which two periodic CSI reports are respectively based, in accordance with the second embodiment of the present disclosure.

Figure 84:
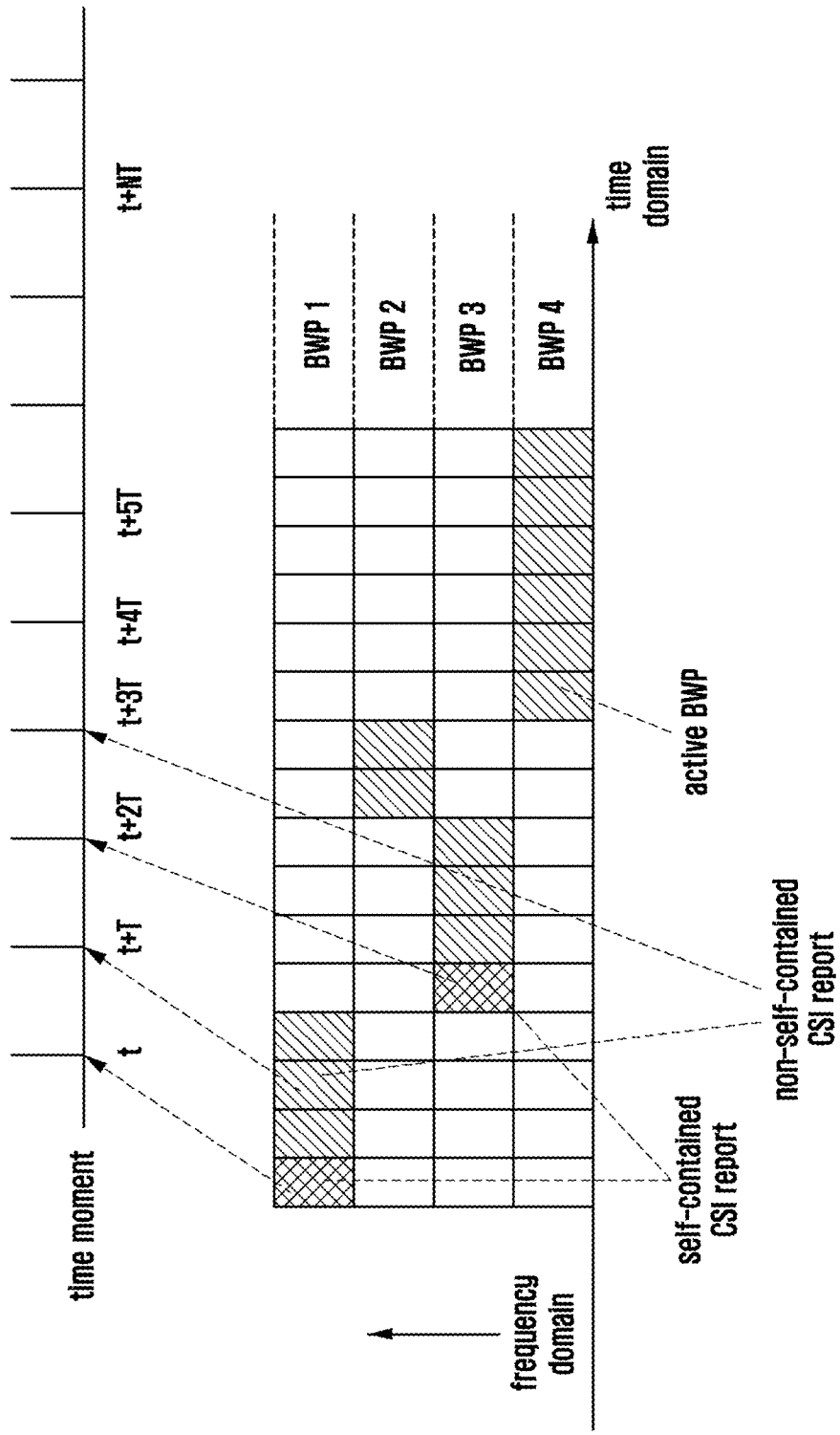

FIG. 84 is a schematic diagram illustrating time moments for reporting a self-contained CSI report and a non-self-contained CSI report, in accordance with the second embodiment of the present disclosure.

Figure 85:
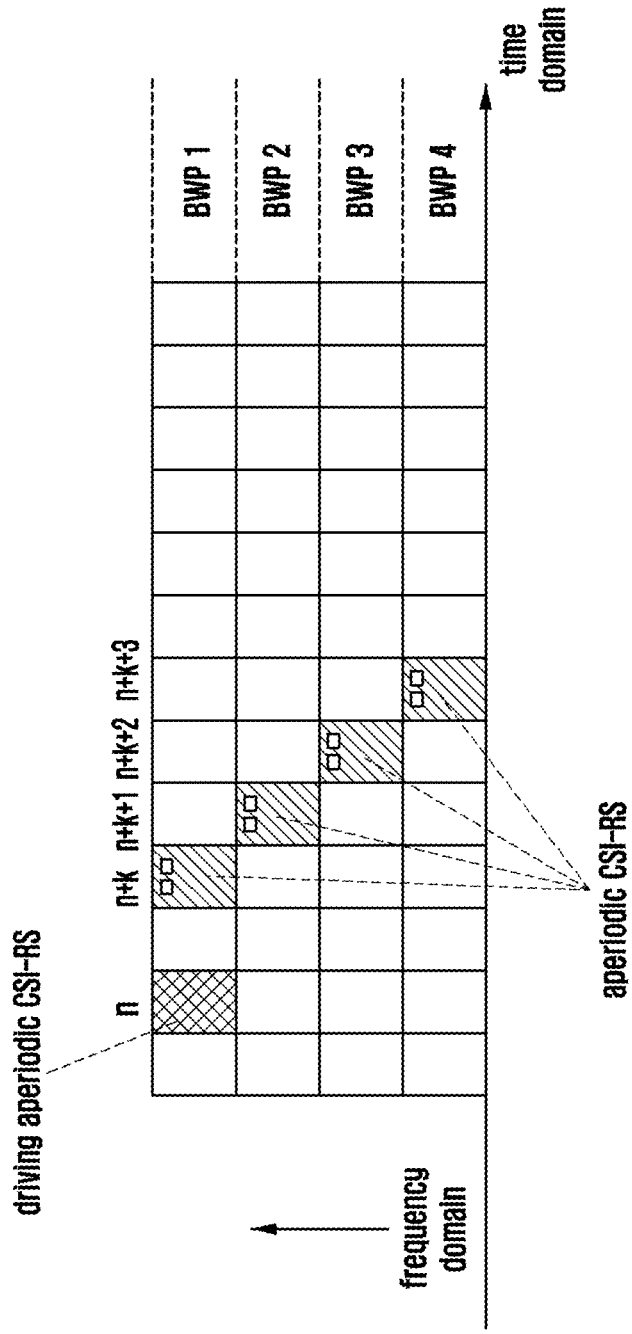

FIG. 85 is a schematic diagram illustrating how to receive CSI-RS by a UE on all the BWPs at different time moments, in accordance with a third embodiment of the present disclosure.

Figure 86:
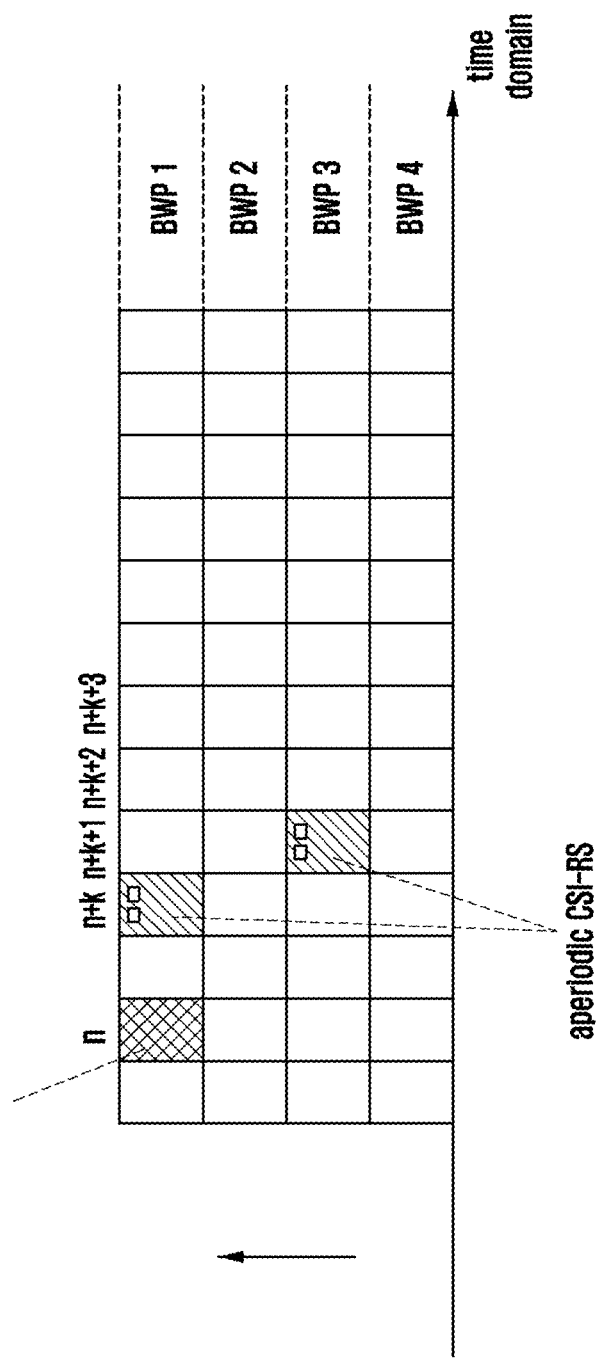

FIG. 86 is a schematic diagram illustrating how to receive CSI-RS by a UE on some BWPs at different time moments, in accordance with the third embodiment of the present disclosure.

Figure 87:
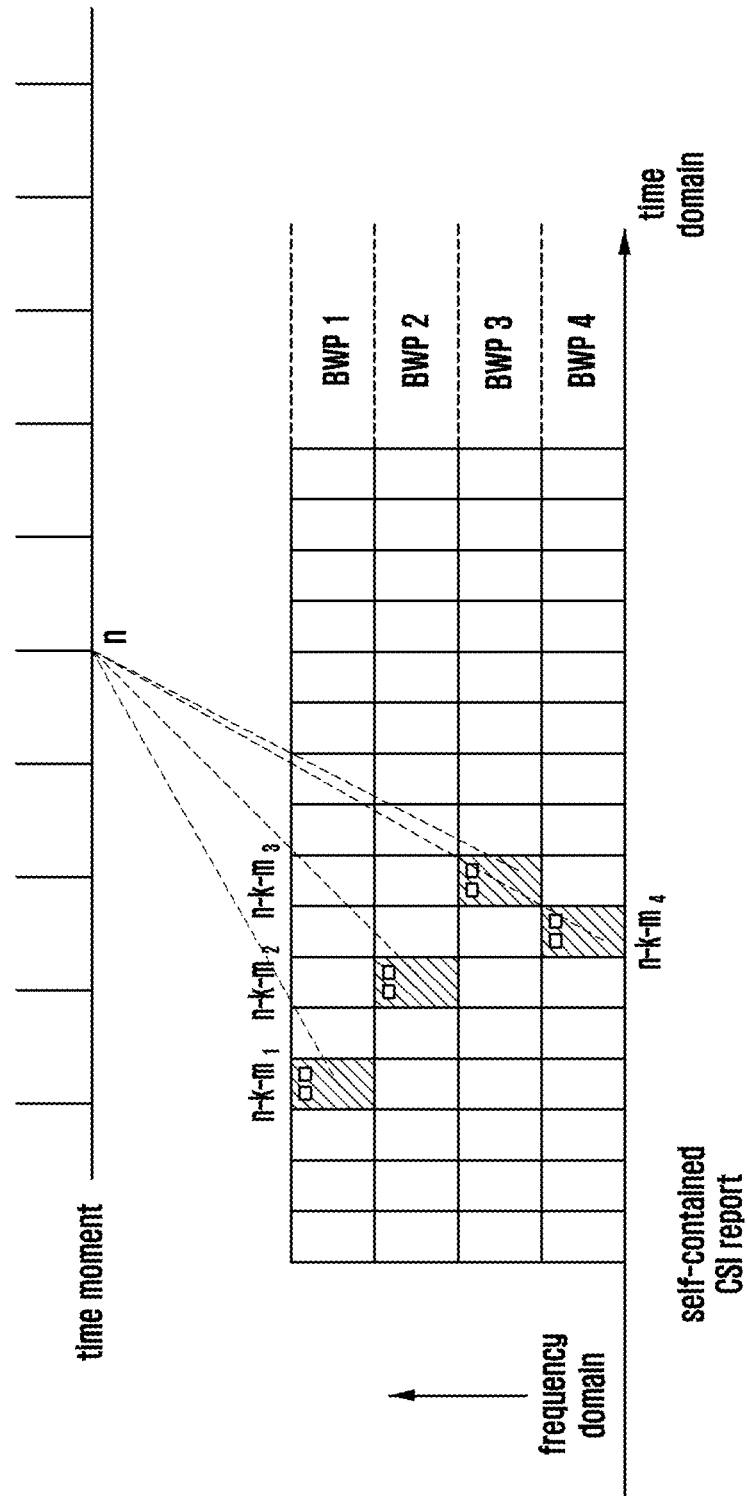

FIG. 87 is a schematic diagram illustrating a time slot, where CSI-RS resource of each BWP is located, in accordance with the third embodiment of the present disclosure.

Figure 88:
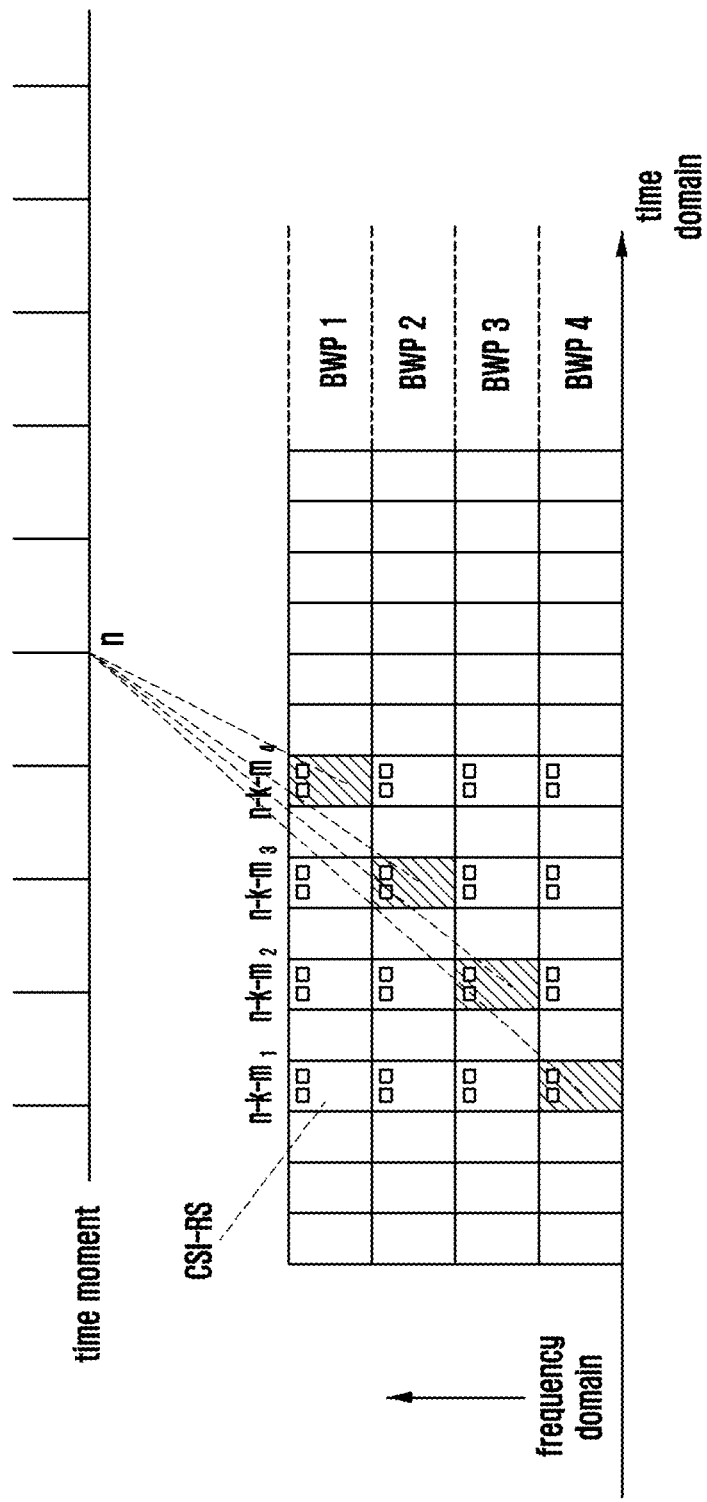

FIG. 88 is a schematic diagram illustrating how to firstly receive CSI-RS within a BWP by a UE, based on a descending order of BWP number, where the BWP is closest to an interval of an aperiodic CSI report, in accordance with the third embodiment of the present disclosure.

Figure 89:
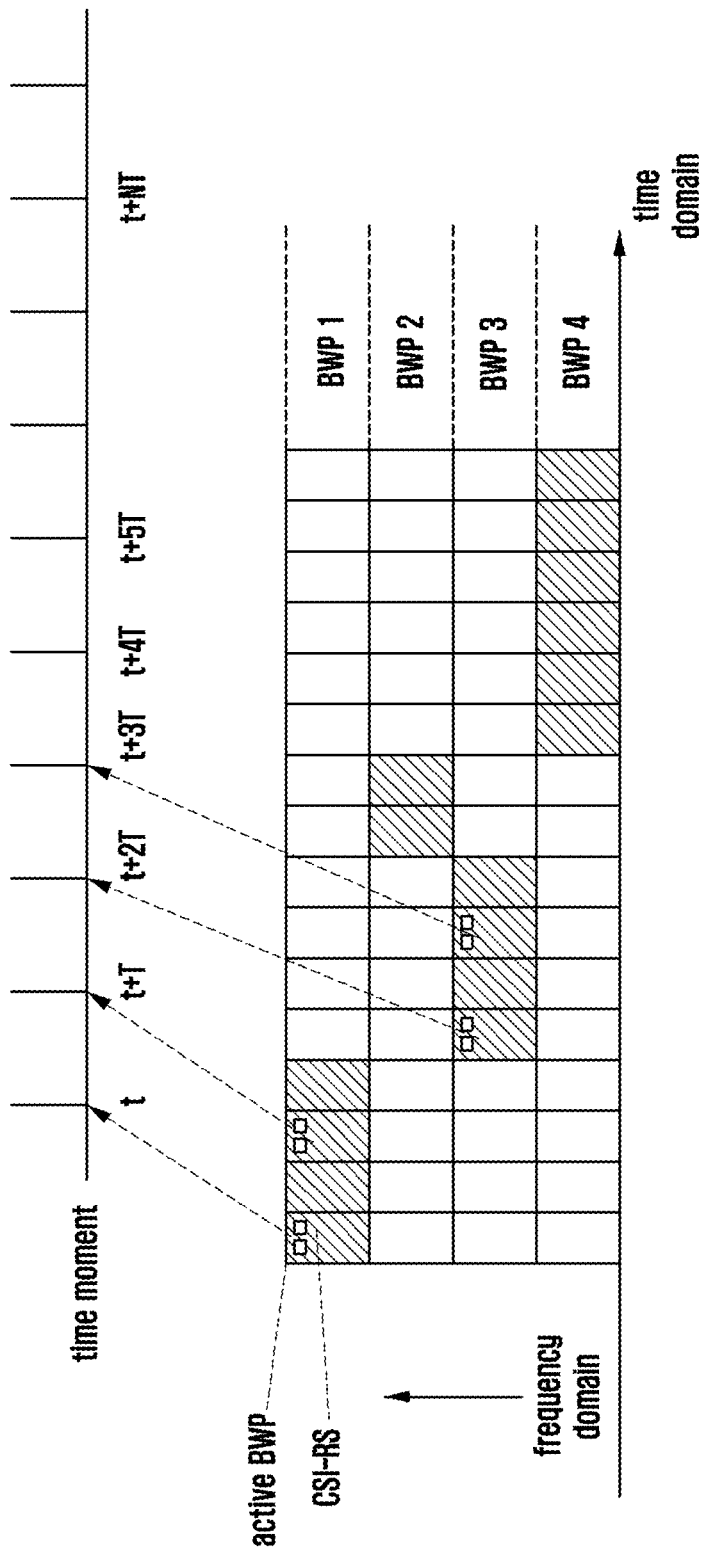

FIG. 89 is a schematic diagram illustrating how to transmit CSI-RS on one BWP at the same time moment, in accordance with a fourth embodiment of the present disclosure.

Figure 90:
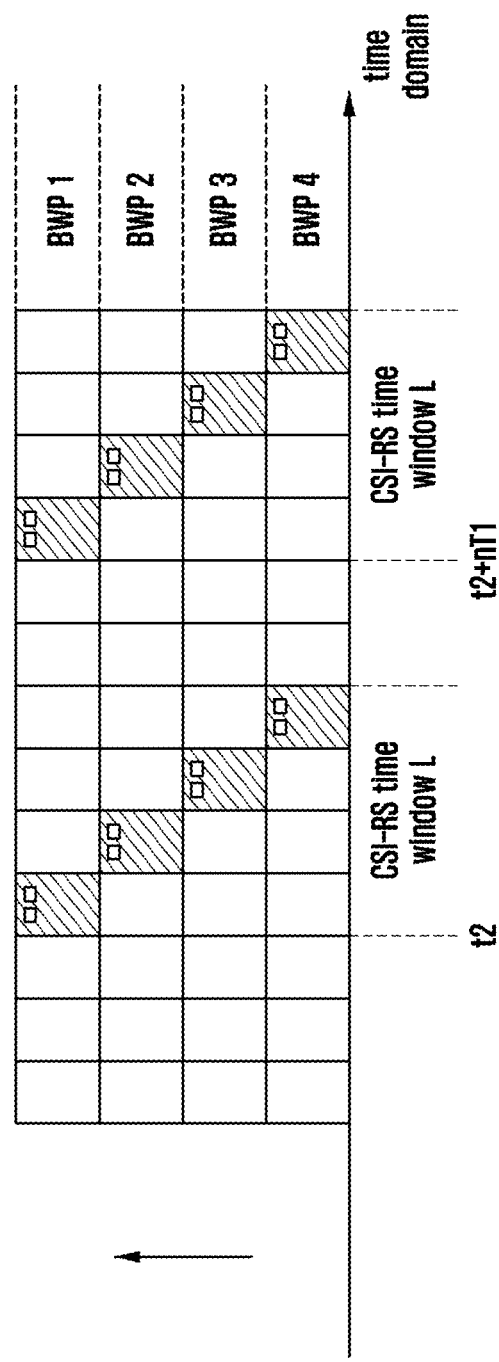

FIG. 90 is a schematic diagram illustrating how to transmit CSI-RS on multiple BWPs within one time window, based on time-division multiplexing, in accordance with the fourth embodiment of the present disclosure.

Figure 91:
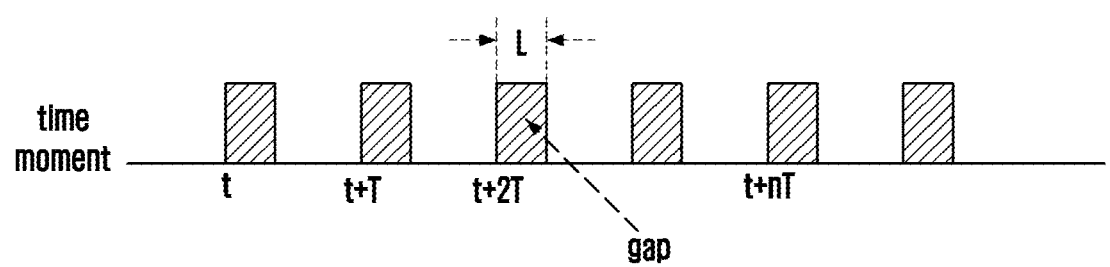

FIG. 91 is a schematic diagram illustrating a configured periodic gap, in accordance with a fifth embodiment of the present disclosure.

Figure 92:
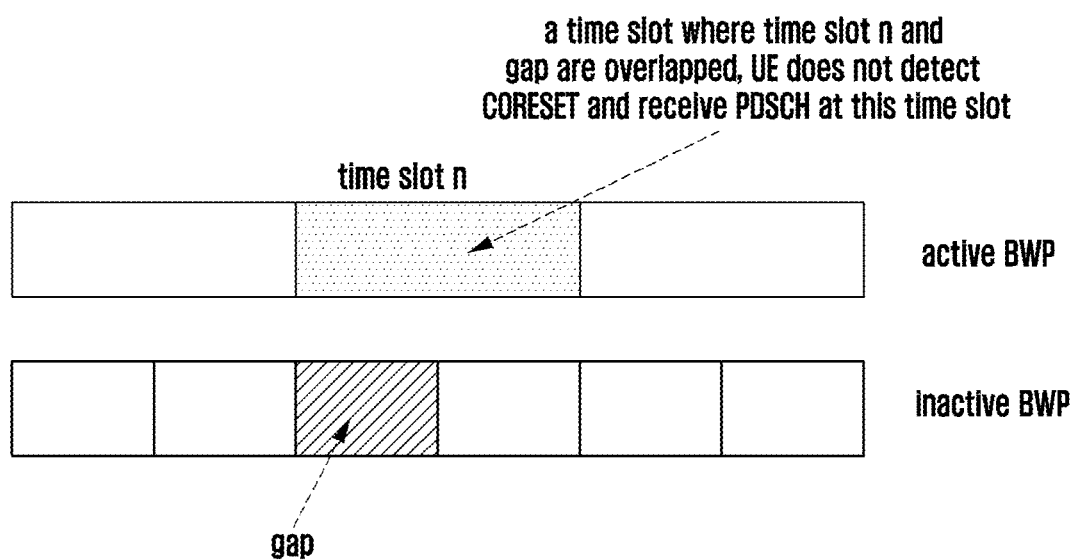

FIG. 92 is a schematic diagram illustrating a time slot for a UE to detect CORESET and receive PDSCH, in accordance with a first method of the fifth embodiment of the present disclosure.

Figure 93:
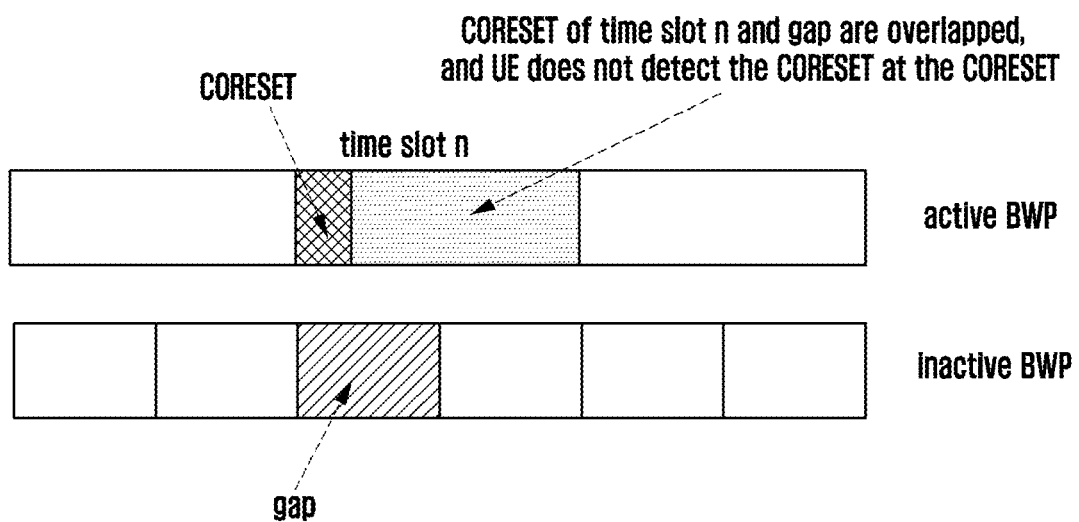

FIG. 93 is a schematic diagram illustrating that a UE does not detect CORESET at a CORESET, when the CORESET of time slot n and gap are overlapped, in accordance with a second method of the fifth embodiment of the present disclosure.

Figure 94:
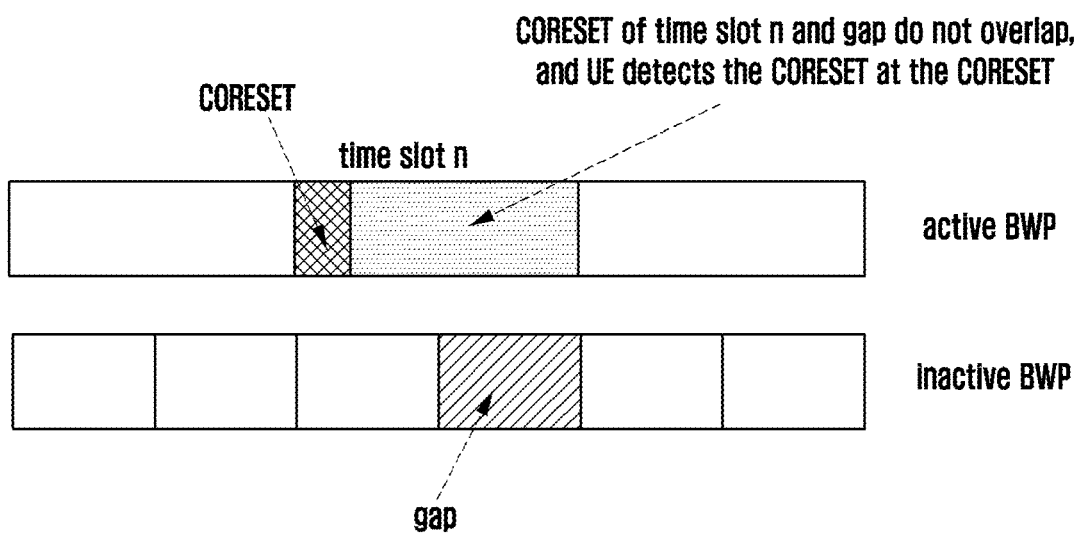

FIG. 94 is a schematic diagram illustrating how to detect CORESET by a UE at a CORESET, when the CORESET of time slot n and gap are not overlapped, in accordance with the second method of the fifth embodiment of the present disclosure.

Figure 95:
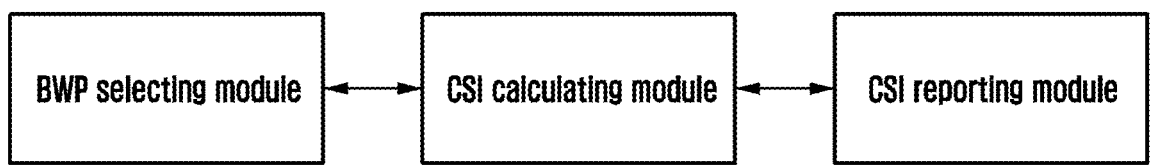

FIG. 95 is a schematic diagram illustrating a basic structure of a device for reporting CSI, in accordance with a preferred embodiment of the present disclosure.

MODE FOR THE INVENTION

To make objectives, technical solutions and advantages of the present disclosure more clear, detailed descriptions about the present disclosure are further provided in the following, accompanying with attached figures and embodiments.

Figure 1:
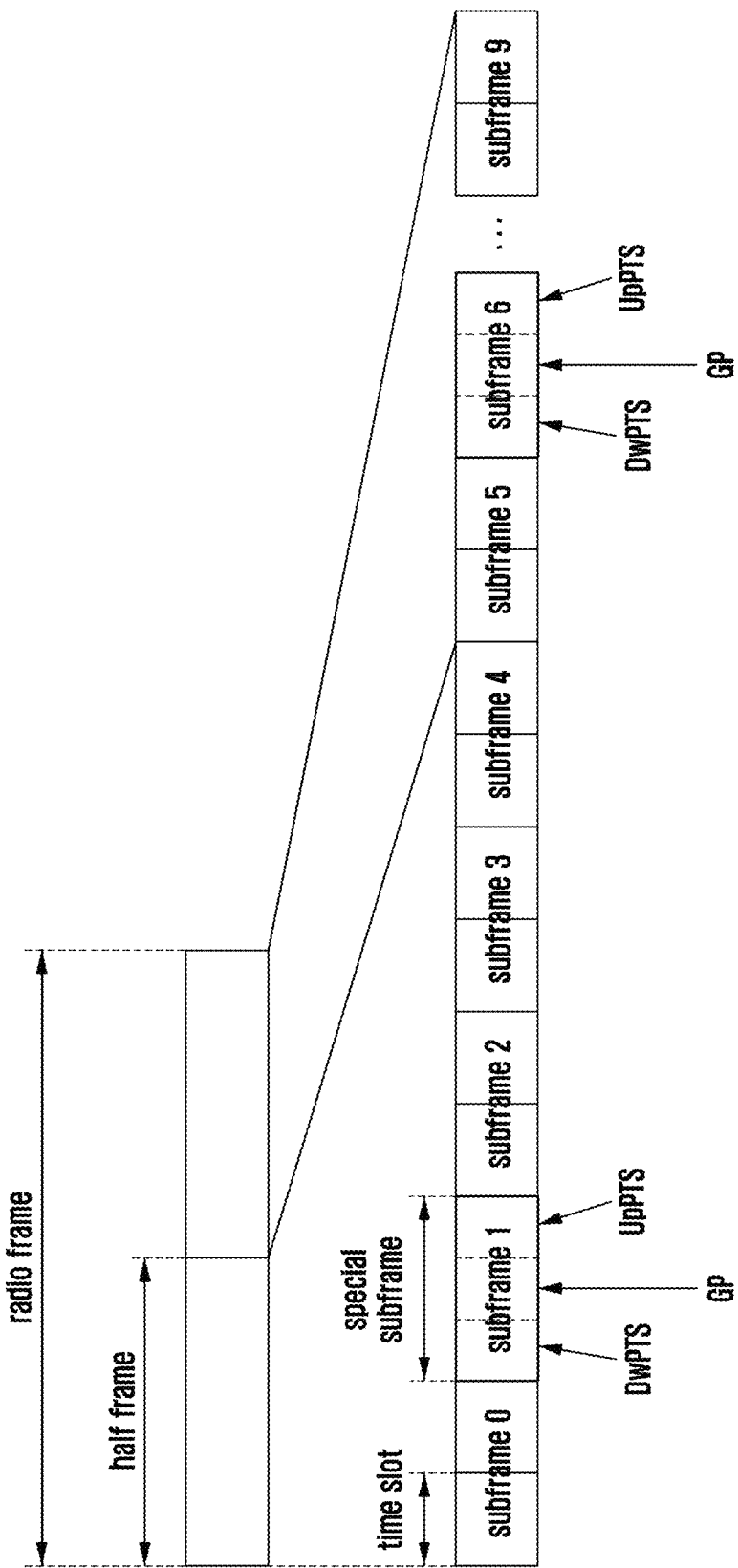
FIG. 1 is a schematic diagram illustrating a frame structure of a TDD system in the LTE.
Figure 2:
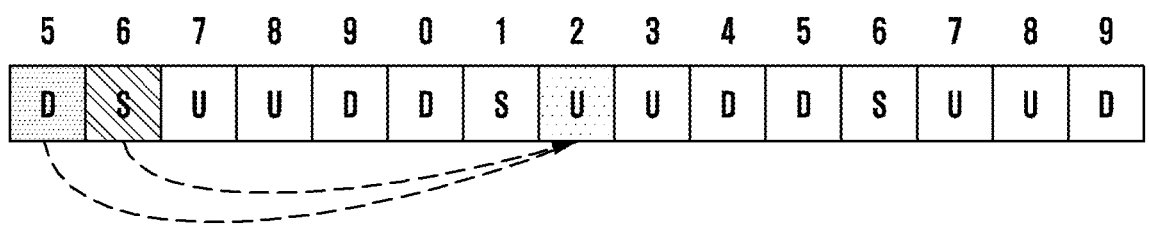
FIG. 2 is a schematic diagram illustrating an example of a HARQ-ACK timing of the LTE.
Figure 3:
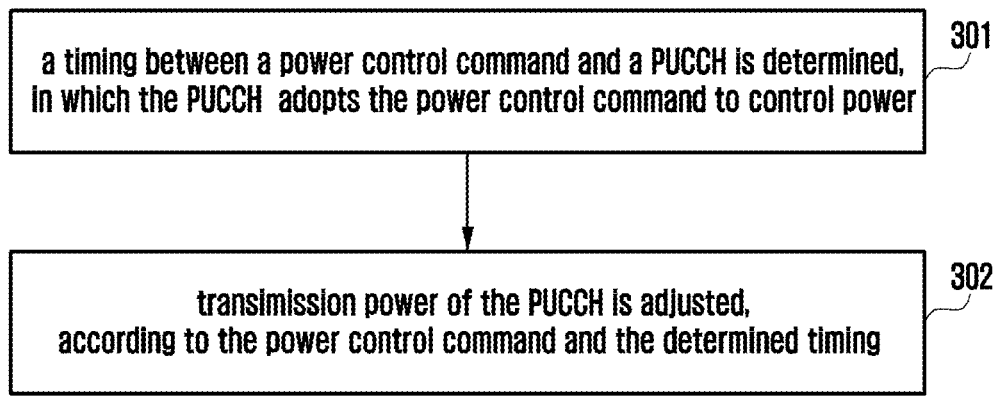
FIG. 3 is a schematic diagram illustrating a basic flow to determine a power-control timing, in accordance with an embodiment of the present disclosure.

To implement the objectives of the present disclosure, the present disclosure provides a method for uplink power control, as shown in FIG. 2, the method includes the following blocks.

In block 301, a timing between a power control command and a PUCCH is determined, in which the PUCCH adopts the power control command.

In block 302, on the basis of the determined timing between the power control command and the PUCCH, transmission power of the PUCCH is adjusted, according to the power control command.

At this time, a timing between a PDSCH scheduled by DCI and a PUCCH is dynamically indicated by information in the DCI, in which HARQ-ACK generated by transmitting the PDSCH belongs to the PUCCH.

Detailed descriptions of the technical solutions in the present disclosure are further provided in the following, accompanying with several preferred embodiments.

A First Embodiment

The embodiment describes a timing between a UE-group power control command and an uplink PUCCH transmission, which adopts the UE-group power control command to control power. The power control command here refers to a public power control command (e.g., a power control command of DCI format 3/3A transmission in the LTE) of a UE-group. One DCI may provide power control command for PUCCH of multiple UEs. Here, the PUCCH may be used for transmitting HARQ-ACK, CSI and UCI of SR.

At this time, a timing between the PDSCH and HARQ-ACK generated by the PDSCH is jointly determined by high-layer signaling configuration, and DCI indication of PDCCH scheduling the PDSCH. For example, a BS configures 4 values for a UE through high-layer signaling, which are respectively {k0, k1, k2, k3}. There are 2 bits in the DCI, which are used for indicating that the timing between PDSCH and HARQ-ACK generated by the PDSCH is an index of an element of the set {k0, k1, k2, k3}. The PDSCH is transmitted in time slot n–ki. The HARQ-ACK is transmitted in time slot n, as shown in Table 5. For a different UE, an independent timing set is respectively configured by independent high-layer signaling. At this time, a TPC command included by DCI of PDCCH scheduling PDSCH is also determined, according to the timing. For example, the PDSCH is transmitted in time slot n–ki. The HARQ-ACK generated by PDSCH is transmitted in time slot n, and then, the TPC command of PDCCH scheduling PDSCH transmitted in time slot n–ki is applied to power control of PUCCH, which transmits HARQ-ACK in time slot n. This is a power control method, which is implemented according to TPC of DCI in the PDCCH scheduling PDSCH. The power control command is for one UE.

TABLE 5

| Indication value of HARQ-ACK timing | a time interval ki between PDSCH transmission and HARQ-ACK transmission |
|---|---|
| 00 | k0 configured by high-layer signaling |
| 01 | k1 configured by high-layer signaling |
| 10 | k2 configured by high-layer signaling |
| 11 | k3 configured by high-layer signaling |

There is another method for transmitting the power control command. One DCI transmits at least one power control command. Each power control command is for one UE, which is referred to as a UE-group power control command. The DCI is for at least one UE. At this time, since the timing between PDSCH and HARQ-ACK generated by PDSCH is dynamically indicated by DCI of PDCCH scheduling PDSCH, it is not the determined timing any more. At this time, the timing between DCI transmitting UE-group power control command the PUCCH does not exist, in which the PUCCH adopts the UE-group power control command to adjust power. Thus, it is necessary to determine a timing, so as to adopt the UE-group power control command to adjust the PUCCH power according to the timing.

In such a case, how a UE determines a timing between a UE-group power control command and a PUCCH, which adopts the UE-group power control command to adjust power, is described in the following. A UE may determine the timing between a UE-group public power control command and a PUCCH transmission, which adopts these power control commands, through explicit signaling (explicit signaling includes system information, high-layer signaling, media access layer signaling, or physical layer signaling, and so on), implicit signaling and a protocol preset method. That is, the UE-group public power control command is transmitted in time slot n−k. The PUCCH applying the power control command is transmitted in time slot n. Determine the timing is equivalent to determine value k. Several methods for determining the timing between the UE-group public power control command and the PUCCH, which adopts these power control commands to adjust power, are described in detail as follows.

Figure 4:
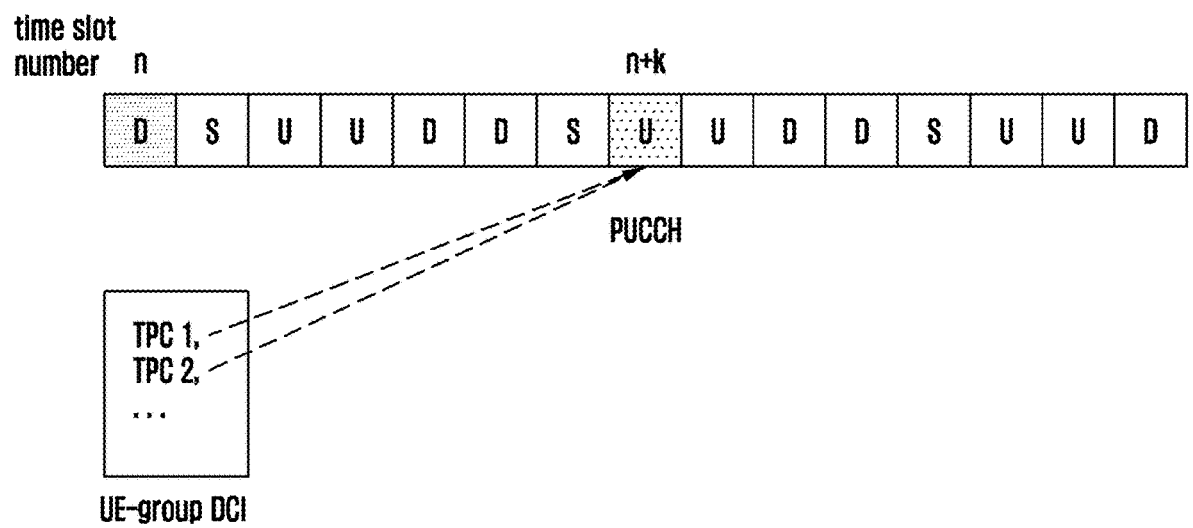
FIG. 4 is a schematic diagram illustrating a timing between a power control command and power, which is adjusted by using the power control command, when value k of a different UE in the same group is the same, in accordance with a first embodiment of the present disclosure.
Figure 5:
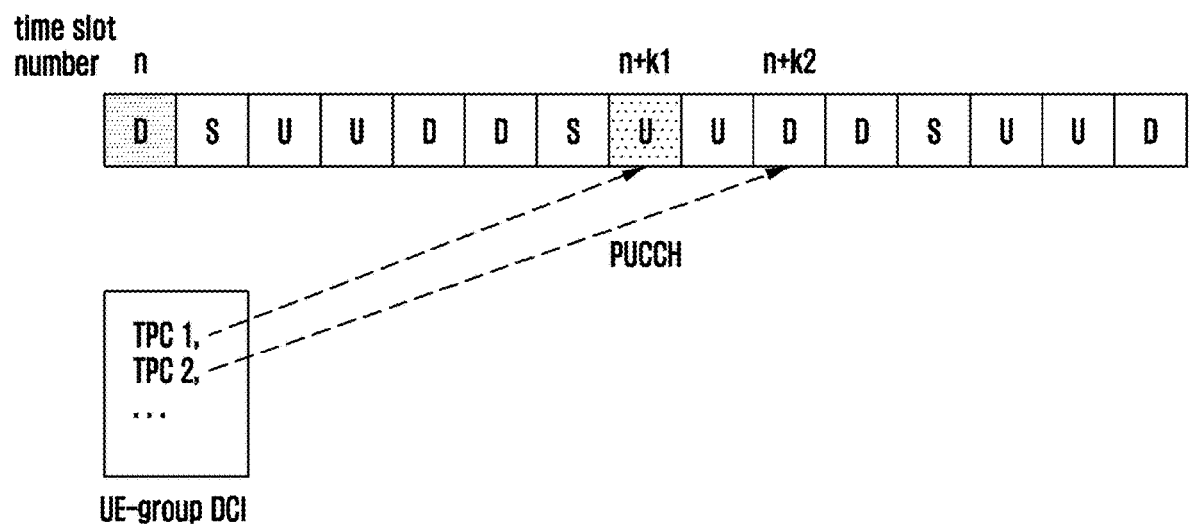
FIG. 5 is a schematic diagram illustrating a timing between a power control command and power, which is adjusted by using the power control command, when value k of a different UE in the same group is different, in accordance with the first embodiment of the present disclosure.
Figure 6:
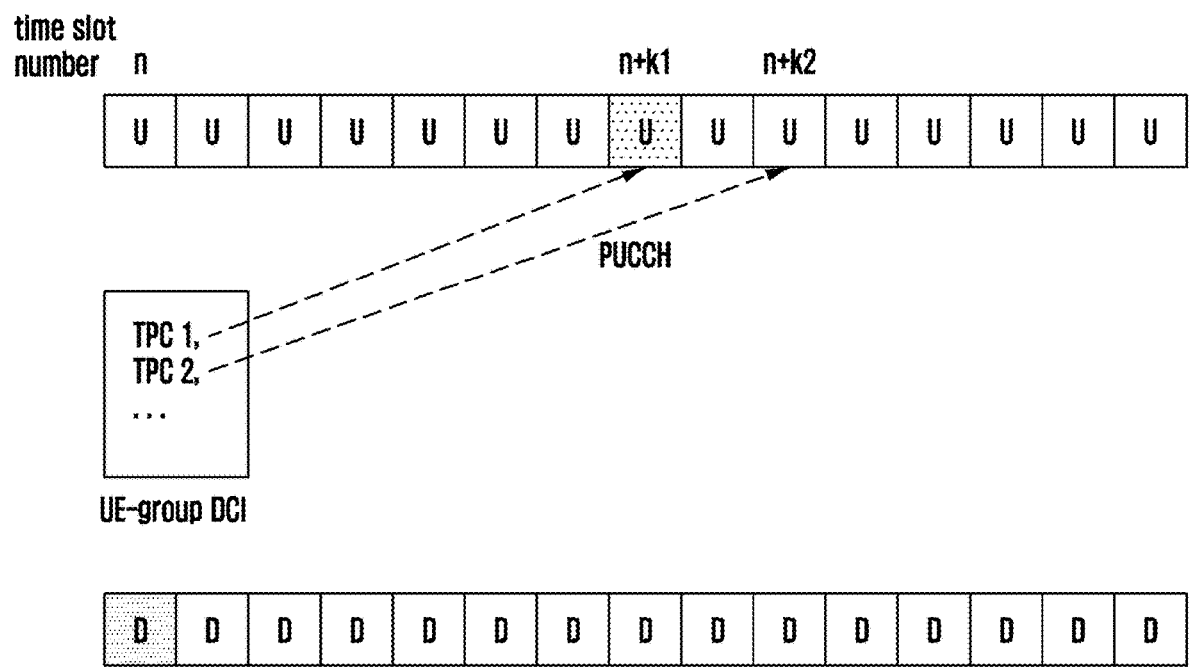
FIG. 6 is a schematic diagram illustrating a timing between a power control command and power, which is adjusted by using the power control command, when value k of a different UE in the same group is different in the case of FDD, in accordance with the first embodiment of the present disclosure.

A First Method:

A UE obtains a timing between a UE-group power control command and a PUCCH transmission, which adopts these power control commands, by receiving explicit signaling (e.g., system information, high-layer signaling) from a BS. That is, the UE-group power control command is transmitted in time slot n−k. The PUCCH is transmitted in time slot n, in which the PUCCH adopts these power control commands to adjust power. The UE obtains value k, by receiving the explicit signaling (e.g., system information, high-layer signaling) from the BS, and k is an integer greater than or equal to 0. When value k is configured by high-layer signaling, value k may be configured by public high-layer signaling, or UE-specific high-layer signaling. For a different UE in a group, value k may be the same, which leads to a convenient transmission in TDD, as shown in FIG. 4; otherwise, when value k is different for a different UE, it is inconvenient. For example, assume that the UE-group DCI including power control command is transmitted in time slot n, value k of UE1 is k1, time slot n+k1 of UE1 is an uplink time slot, which may transmit PUCCH. Value k of UE2 is k2, while time slot n+k2 of UE2 is a downlink time slot, which cannot transmit PUCCH. As shown in FIG. 5, in such a case, it is inconvenient. For a different UE in the same group, value k may also be different, such that power may be adjusted flexibly for different requirements of various UEs in the FDD, e.g., the UE-group DCI including power control command is transmitted in time slot n. Value k of UE1 is k1. The power control command of UE1 may be applied to power adjustment of PUCCH, which is transmitted in time slot n+k1. Value k of UE2 is k2, while the power control command of UE2 may be applied to power adjustment of PUCCH, which is transmitted in time slot n+k2, as shown in FIG. 6.

Alternatively, value k is determined by protocol preset. And value k of a different UE is the same.

The method is easy to be implemented, and needed signaling overhead is smaller. However, the method cannot flexibly adjust the timing.

A Second Method:

There is a timing between a transmission of a UE-group power control command and a PUCCH transmission, which adopts these power control commands to adjust power. That is, the UE-group power control command is transmitted in time slot n−k. The PUCCH is transmitted in time slot n, in which the PUCCH adopts these power control commands to adjust power. A UE obtains value k, through a combination of explicit signaling and physical layer signaling, or through the physical layer signaling, and k is an integer greater than or equal to 0. The timing is referred to as a TPC timing. For example, a UE obtains a timing set through explicit signaling (e.g., system information, high-layer signaling). For example, the timing set is {k0, k1, k2, k3}, which is referred to as a TPC timing set. And then, a specific time interval value in the set is indicated by physical layer signaling. A corresponding between an indication value of a UE-group TPC timing and a time interval ki is shown in Table 6, and ki refers to a time interval between the UE-group power control command and a PUCCH, which adopts the UE-group power control command to adjust power. This method may dynamically adjust the timing between the UE-group power control command and PUCCH transmission, which adopts these power control commands to adjust power, thereby adjusting power more timely.

TABLE 6

| Indication value of UE-group TPC timing | time interval ki between UE-group power control command and PUCCH adopting the UE-group power control command to adjust power |
|---|---|
| 00 | k0 |
| 01 | k1 |
| 10 | k2 |
| 11 | k3 |

Several methods for determining the timing set, and indicating a specific time interval in the timing set through physical layer signaling are described in the following.

Figure 7:
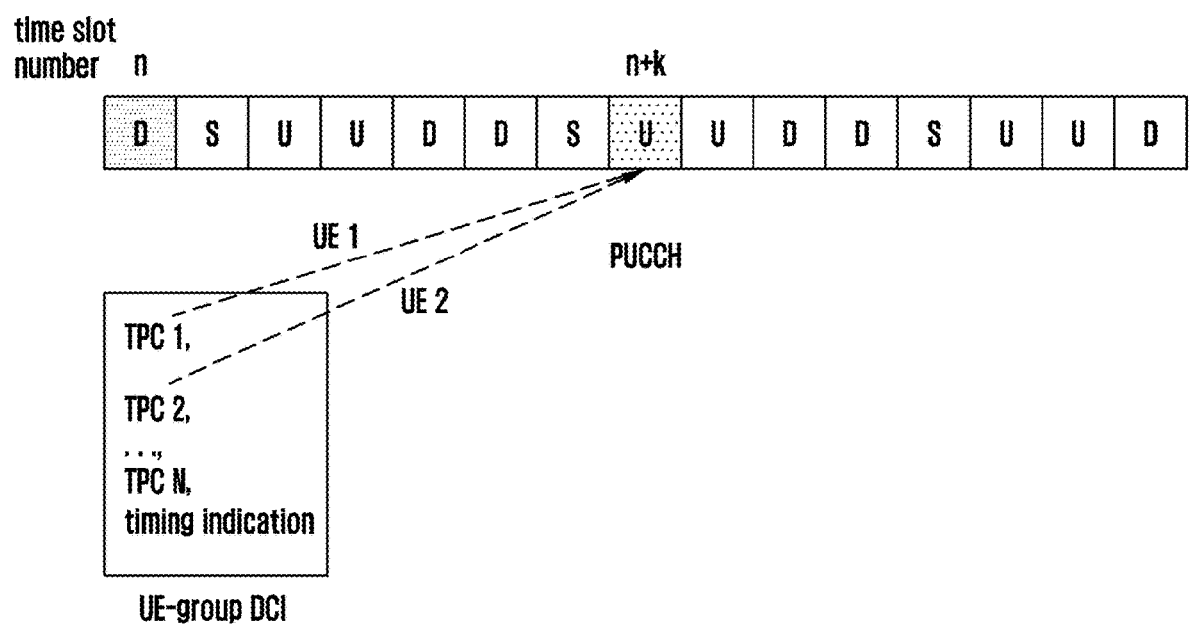
FIG. 7 is a schematic diagram illustrating a first mode, where a timing set is determined and a specific time interval value in the timing set is indicated by physical layer signaling, in accordance with the first embodiment of the present disclosure.

A First Mode:

A timing set of a UE transmitting power control command within the same UE-group DCI is the same. A UE obtains a timing set through explicit signaling (e.g., system information, high-layer signaling), e.g., the timing set is {k0, k1, k2, k3}. Within the DCI transmitting the UE-group power control command, in addition to transmitting the power control command of each UE, the DCI also transmits TPC timing indication of a specific UE-group, which is used for taking a value of the timing set as a time interval ki. The time interval ki is between the UE-group power control command of the UE and a PUCCH, which adopts the UE-group power control command to adjust power. The time interval value indicated by the timing indication is applied to all the UEs of the UE-group, that is, it indicates the time interval ki between the UE-group power control command of all the UEs in the group and the PUCCH, which adopts the UE-group power control command to adjust power, as shown in FIG. 7. For example, information of the transmitted DCI of the UE-group is {TPC1, TPC2, . . . , TPCn, . . . , TPCN, TPC timing indication of UE-group}. N represents N power control commands, which are included by the DCI of the UE-group power control command. An indication field of UE-group TPC timing includes L bits (e.g., L is 2). A corresponding between an indication value of a UE-group TPC timing and a time interval ki is shown in Table 6, and ki refers to a time interval between the UE-group power control command and a PUCCH, which adopts the UE-group power control command to adjust power.

Figure 8:
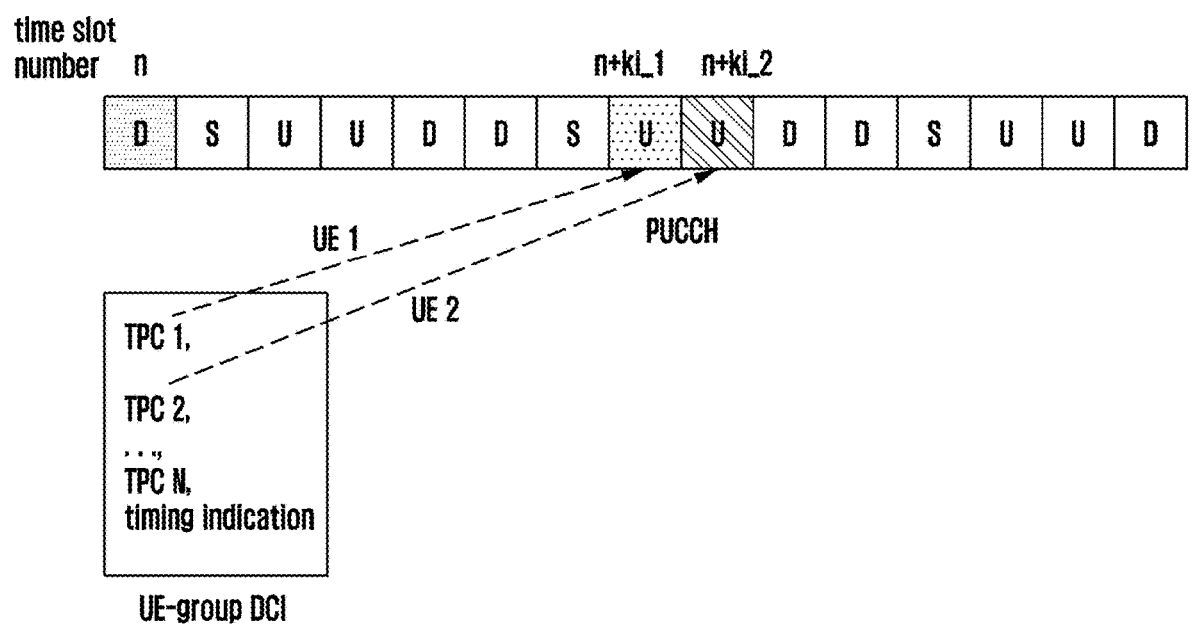
FIG. 8 is a schematic diagram illustrating a second mode, where a timing set is determined and a specific time interval value of the timing set is indicated by physical layer signaling, in accordance with the first embodiment of the present disclosure.

A Second Mode:

Within the same UE-group DCI, a TPC timing set of a different UE transmitting a power control command is different. For example, a UE obtains a TPC timing set of the UE through explicit signaling (e.g., high-layer signaling). Alternatively, within the UE-group DCI, a TPC timing set of a UE transmitting a power control command is the same as a HARQ timing set of the UE. For example, a TPC timing set of UE1 is {k0_1, k1_1, k2_1, k3_1}. A TPC timing set of UE2 is {k0_2, k1_2, k2_2, k3_3}. In the DCI transmitting the UE-group power control command, in addition to transmitting the power control command of each UE, TPC timing indication of a specific UE-group is also transmitted. For all the UEs in the UE-group, an indication value of TPC timing of a UE-group is the same. However, since timing set of a different UE is different, a time interval ki between the UE-group power control command of each UE and PUCCH may also be different, in which the PUCCH adopts the UE-group power control command to adjust power. A time interval value of a different UE is applied to a different UE. That is, a time interval ki is indicated, in which ki is between the UE-group power control command of each UE within a group and a PUCCH, which adopts the UE-group power control command to adjust power. As shown in FIG. 8, for example, information of the transmitted DCI is {TPC1, TPC2, . . . , TPCn, . . . , TPCN, TPC timing indication of UE-group}. N denotes that the DCI of the UE-group power control command includes N power control commands. An indication field of UE-group TPC timing includes 2 bits. A corresponding between an indication value of UE-group TPC timing and a time interval ki is shown in Table 7. The time interval ki is between a UE-group power control command and a PUCCH, which adopts the UE-group power control command to adjust power. For example, an indication value of UE-group TPC timing is 01. For UE1, a time interval between a UE-group power control command and a PUCCH is k1_1, in which the PUCCH adopts the UE-group power control command to adjust power. For UE2, a time interval between a UE-group power control command and a PUCCH is k1_2, in which the PUCCH adopts the UE-group power control command to adjust power.

TABLE 7

| an indication value of UE-group TPC timing | time interval ki of UE1 | time interval ki of UE2 | . . . | time interval ki of UEN |
| --- | --- | --- | --- | --- |
| 00 | k0_1 | k0_2 | | k0_N |
| 01 | k1_1 | k1_2 | | k1_N |
| 10 | k2_1 | k2_2 | | k2_N |
| 11 | k3_1 | k3_2 | | k3_N |

By adopting the method, a time interval between a UE-group power control command and applying the UE-group power control command may be dynamically adjusted. The method is easy to implement, and needed signaling overheads are smaller.

Figure 9:
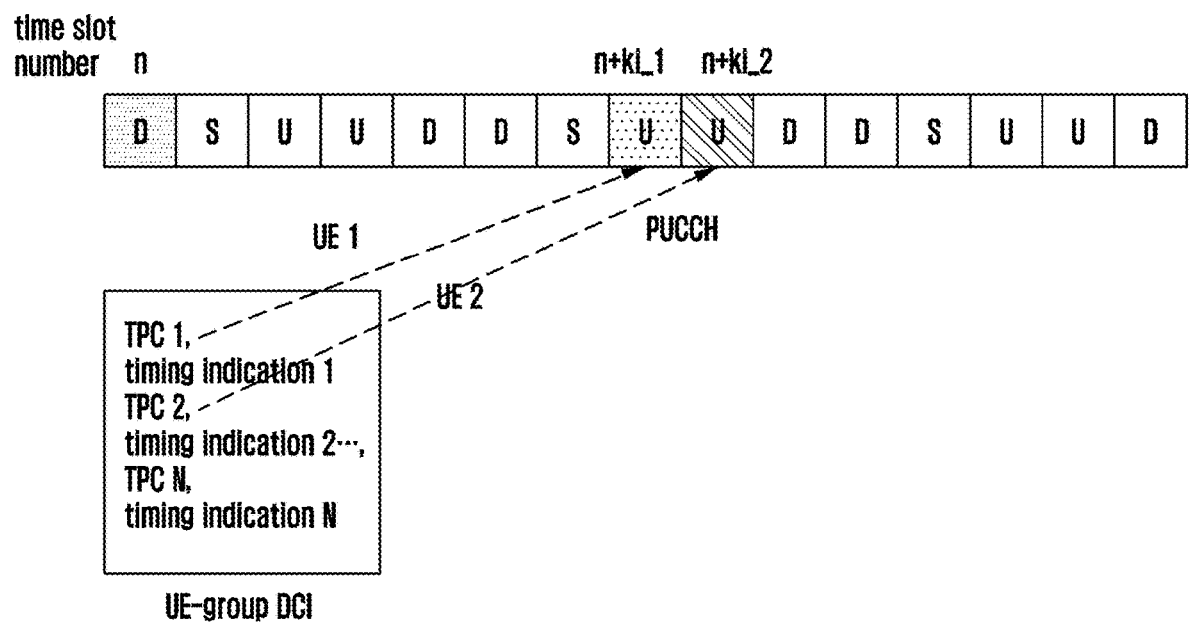
FIG. 9 is a schematic diagram illustrating a third mode, where a timing set is determined and a specific time interval value of the timing set is indicated by physical layer signaling, in accordance with the first embodiment of the present disclosure.

A Third Mode:

A TPC timing set of a UE transmitting a power control command within the same UE-group DCI is different, or the same. For example, a UE obtains a TPC timing set of the UE through explicit signaling (e.g., system information, or high-layer signaling). Alternatively, a TPC timing set of a UE transmitting a power control command within UE-group DCI is the same as a HARQ timing set of the UE. For example, a TPC timing set of UE1 is {k0_1, k1_1, k2_1, k3_1}. A TPC timing set of UE2 is {k0_2, k1_2, k2_2, k3_3}. In the DCI transmitting the UE-group power control command, in addition to transmitting the power control command of each UE, TPC timing indication of a specific UE-group is respectively transmitted corresponding to each UE. The TPC timing indication of a different UE is applied to a different UE. That is, a time interval ki is indicated, and ki is between a UE-group power control command of the UE and a PUCCH, which adopts the UE-group power control command to adjust power. As shown in FIG. 9, for example, information of the transmitted DCI is {TPC1, TPC timing indication 1 of UE-group, TPC2, TPC timing indication 2 of UE-group, . . . , TPCN, TPC timing indication N of UE-group}. N denotes that the DCI of the UE-group power control command includes N power control commands. An indication field of TPC timing of each UE-group includes 2 bits. A corresponding between an indication value of UE-group TPC timing and a time interval ki is shown in Table 8. The time interval ki is between a UE-group power control command and a PUCCH, which adopts the UE-group power control command to adjust power.

TABLE 8

| an indication value of UE-group TPC timing of UE1 | time interval ki of UE1 |
| --- | --- |
| 00 | k0_1 |
| 01 | k1_1 |
| 10 | k2_1 |
| 11 | k3_1 |

By adopting the method, a time interval between a UE-group power control command and a PUCCH, which adopts the UE-group power control command to adjust power, may be dynamically adjusted. Besides, for a different UE, a TPC timing is respectively determined, and the needed signaling overheads are greater.

A Third Method:

A UE obtains a timing between a UE-group power control command and a PUCCH, which adopts these power control commands to adjust power, by receiving implicit signaling from a BS. That is, the UE-group power control command is transmitted in time slot n−k. The PUCCH, which adopts these power control commands to adjust power, is transmitted in time slot n. The UE obtains value k from the implicit signaling, which is received from the BS, and k is an integer greater than or equal to 0.

For example, assume that a UE has already configured a HARQ timing set, and then, each UE selects a determined element from the HARQ timing set of the UE, and takes the determined element as a time interval value k between the UE-group power control command of the UE and a PUCCH transmission, which adopts these power control commands to adjust power. For example, the time interval value k between the UE-group power control command of the UE and the PUCCH transmission, which adopts these power control commands to adjust power, is the minimum value (or, the maximum value; or, the minimum value, and time slot n is an uplink time slot; or the maximum value, and time slot n is an uplink time slot) of the HARQ timing set. For example, the HARQ timing set of the UE is {1, 2, 3, 4}. The minimum value of the HARQ timing set is 1. And then, the time interval between the UE-group power control command of the UE and the PUCCH transmission is 1, in which the PUCCH transmission adopts these power control commands to adjust power. Alternatively, for example, the time interval k is the first value in the HARQ timing set, and k is between the UE-group power control command of the UE and the PUCCH transmission, which adopts these power control commands to adjust power. For example, the HARQ timing set of the UE is {1, 2, 3, 4}, and the first value of the HARQ timing relationship is 1. Subsequently, the time interval between the UE-group power control command of the UE and the PUCCH transmission is 1, in which the PUCCH transmission adopts these power control commands to adjust power.

Additional physical-layer signaling overheads are not needed by the method. However, the timing cannot be adjusted flexibly.

The method for determining the time interval between the UE-group power control command and the PUCCH transmission, which adopts these power control commands to adjust power, may be applied to determine a time interval, which is between a UE-group power control command and a PUSCH transmission. The PUSCH transmission adopts these power control commands to adjust power. The differences are as follows. The UE-group power control command for PUCCH is replaced with the UE-group power control command for PUSCH. And, the PUCCH is replaced with PUSCH. Besides, the HARQ timing set configured by the UE is replaced with a time interval set, in which the time interval is between UL DCI configured by the UE and PUSCH scheduled by the DCI.

A Fourth Method:

A UE obtains a timing by using a default HARQ timing. The timing is between a UE-group power control command and a PUCCH transmission, which adopts these power control commands to adjust power. Here, the default HARQ timing refers to a timing, which is between a PDSCH scheduled by a PDCCH of public search space and a HARQ transmission of the PDSCH. The default HARQ timing may be preset by protocol, or indicated by system information. That is, the PDSCH scheduled by PDCCH of public search space is transmitted in time slot n−k. HARQ transmission of the PDSCH is in time slot n. Subsequently, the UE receives the UE-group power control command in time slot n−k. The UE applies the UE-group power control command to time slot n.

A Second Embodiment

Figure 10:
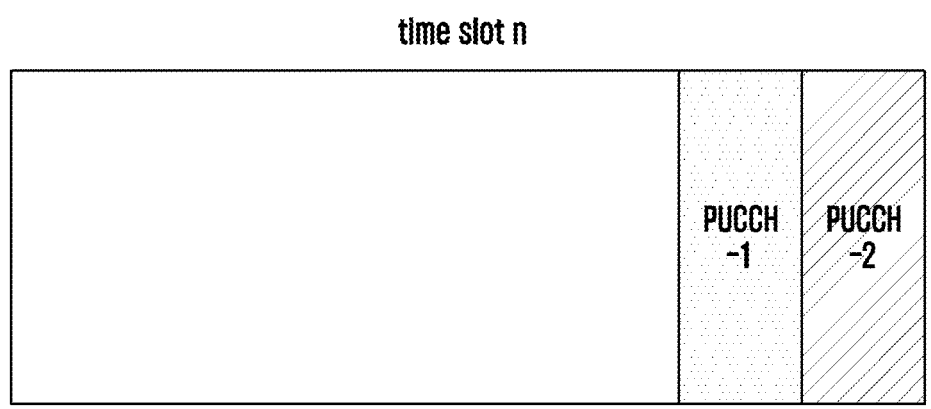
FIG. 10 is a schematic diagram illustrating a method for transmitting at least two PUCCHs in one time slot, according to time division duplexing, in accordance with a second embodiment of the present disclosure.

In a New Radio (NR) communication system, multiple PUCCH transmissions of one time slot are introduced. For example, there are two PUCCH transmissions in time slot n, according to time division multiplexing. The first PUCCH is denoted as PUCCH-1, and the second PUCCH is denoted as PUCCH-2, as shown in FIG. 10. At this time, in a timing between DCI transmitting TPC and an uplink UCI transmission, a time slot is taken as a unit, in which the uplink UCI transmission adopts the TPC to control power. For example, the DCI including TPC is transmitted in time slot n. The uplink UCI is transmitted in time slot n+k, in which the uplink UCI adopts the TPC to control power. The TPC here includes TPC of DCI scheduling PDSCH, and TPC in common DCI of UE-group. At this time, there are the following methods to control power of multiple PUCCHs in one time slot.

A First Method:

When there are at least two PUCCHs transmitted within one time slot according to time division multiplexing, an accumulated value g(i) of closed-loop power control is respectively calculated for each PUCCH. For example, there are two PUCCHs transmitted within time slot i, according to time division multiplexing. The first PUCCH is denoted as PUCCH-1. The second PUCCH is denoted as PUCCH-2. For PUCCH-1, an accumulated value of closed-loop power control is denoted as g_1(i). For PUCCH-2, an accumulated value of closed-loop power control is denoted as g_2(i). $\delta_{PUCCH}$ is a power adjustment value, which is obtained based on a TPC command. g_1(i) and g_2(i) may be respectively calculated, based on formulas $$g\_1(i) = g(i-1) + \sum_{\substack{m=0 \\ m \neq m_i}}^{M-1} \delta_{PUCCH}(i-k_m),$$

and $$g\_2(i) = g(i-1) + \sum_{\substack{m=0 \\ m \neq m_i}}^{M-1} \delta_{PUCCH}(i-k_m).$$

And, $m_i$ refers to that, the TPC command of time slot $i-m_i$ does not meet the delay processing requirements.

Specifically, when there are multiple PUCCHs transmitted in time slot i−1, g(i−1) is equal to an accumulated value of closed-loop power control of the last PUCCH within time slot i−1. For example, there are two PUCCH transmissions within time slot i−1, according to time division multiplexing. The first PUCCH is denoted as PUCCH-1. The second PUCCH is denoted as PUCCH-2. For PUCCH-1, an accumulated value of closed-loop power control is denoted as g_1(i−1). For PUCCH-2, an accumulated value of closed-loop power control is denoted as g_2(i−1). And then, g(i−1) is equal to g_2(i−1).

$$g\_1(i) = g(i-1) + \sum_{\substack{m=0 \\ m \neq m_i}}^{M-1} \delta_{PUCCH}(i-k_m).$$

The M here refers to the total number of power control commands pointing to time slot i. For example, M is equal to 3. Power control commands TPC-0, TPC-1 and TPC-2 are respectively received at time slots i−k0, i−k1 and i−k2. On the basis of the power control commands TPC-0, TPC-1 and TPC-2, $\delta_{PUCCH}$(i−k1) and $\delta_{PUCCH}$(i−k2) are respectively calculated. However, $m_i$ refers to that, the TPC command at time slot i−m$_i$ cannot meet the requirements of delay processing. At this time, the TPC command of time slot i−m$_i$ cannot be applied to calculate g_1(i).

Figure 11:
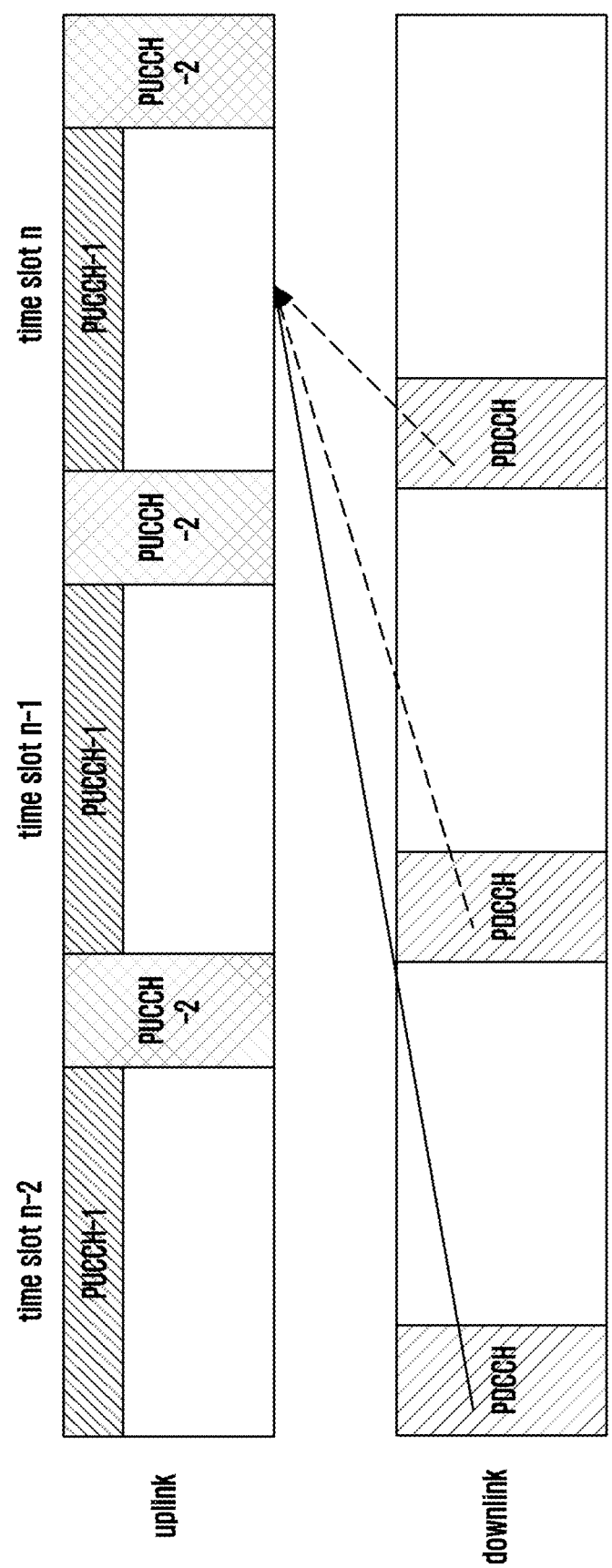
FIG. 11 is a schematic diagram illustrating a method for calculating an accumulated value of closed-loop power control of two PUCCHs within the same time slot, in accordance with the second embodiment of the present disclosure.

For example, as shown in FIG. 11, a long PUCCH is denoted as PUCCH-1. A short PUCCH is denoted as PUCCH-2, which are transmitted in time slot n. The power control commands TPC-0, TPC-1 and TPC-2 are respectively received at time slots n, n−1 and n−2. For the long PUCCH-1, the power control commands TPC-1 and TPC-2 at time slots n−1 and n−2 meet the delay requirements. Power adjustment values $\delta_{PUCCH}$(n−1) and $\delta_{PUCCH}$(n−2) may be obtained, based on TPC-1 and TPC-2. Before receiving the power control command TPC-0 at time slot n, a UE has already transmitted the long PUCCH-1. Thus, the power adjustment value $\delta_{PUCCH}$(n) cannot be used for calculating accumulated value g_1(n) of closed-loop power control of PUCCH-1, in which $\delta_{PUCCH}$(n) is obtained based on power control command TPC-O of time slot n. Thus, g_1(n)=g(n−1)+$\delta_{PUCCH}$(n−1)+$\delta_{PUCCH}$(n−2) For the short PUCCH-2, the power control commands TPC-0, TPC-1 and TPC-2 of time slots n, n−1 and n−2 meet the delay requirements. And Power adjustment values $\delta_{PUCCH}$(n), $\delta_{PUCCH}$(n−1) and $\delta_{PUCCH}$(n−2) may be obtained, based on TPC-0, TPC-1 and TPC-2. And then, an accumulated value of closed-loop power control may be calculated by using these power adjustment values. Therefore, g_2(n)=g(n−1)+$\delta_{PUCCH}$(n−1)+$\delta_{PUCCH}$(n−2). However, g(n) is equal to g_2(n), in which g(n) is used for calculating an accumulated value of closed-loop power control at time slot n+1. Foregoing TPC command may be a TPC command in DCI of PDCCH scheduling PDSCH, and may be a TPC command in common DCI of UE-group.

A Second Method:

When there are at least two PUCCHs transmitted within one time slot, according to time division multiplexing, for each PUCCH, an accumulated value g(i) of closed-loop power control is uniformly calculated. For example, there are two PUCCH transmissions within time slot i, according to time division multiplexing. The first PUCCH is denoted as PUCCH-1. The second PUCCH is denoted as PUCCH-2. For PUCCH-1 and PUCCH-2, the respective accumulated value of closed-loop power control is the same, which is denoted as g(i). $\delta_{PUCCH}$ is a power adjustment value, which is obtained based on a TPC command, and g(i) may be calculated, based on formula $$g(i) = g(i-1) + \sum_{m=0}^{M-1} \delta_{PUCCH}(i - k_m).$$

Specifically, $$g(i) = g(i-1) + \sum_{\substack{m=0 \\ m \neq m_i}}^{M-1} \delta_{PUCCH}(i - k_m).$$

Here, M is the total number of power control commands pointing to time slot i. For example, M is equal to 3. Power control commands TPC-0, TPC-1 and TPC-2 are respectively received at time slots i−k0, i−k1 and i−k2. On the basis of power control commands TPC-0, TPC-1 and TPC-2, $\delta_{PUCCH}$(i−k0) $\delta_{PUCCH}$(i−k1) and $\delta_{PUCCH}$(i−k2) are respectively calculated. However, m$_i$ refers to as follows. A TPC command at time slot i−m$_i$ does not meet the delay processing requirements of at least one PUCCH power control. The TPC command of time slot i−m$_i$ cannot be applied to calculate g(i). For example, as shown in FIG. 11, a long PUCCH is denoted as PUCCH-1. A short PUCCH is denoted as PUCCH-2, which are transmitted in time slot n. The power control commands TPC-0, TPC-1 and TPC-2 are respectively received at time slots n, n−1 and n−2. For the long PUCCH-1, the power control commands TPC-1 and TPC-2 at time slots n−1 and n−2 meet the delay requirements. However, before receiving the power control command TPC-0 at time slot n, a UE has already started to transmit the long PUCCH-1. Thus, the power adjustment value $\delta_{PUCCH}$(n) cannot meet the delay requirements of power control of PUCCH-1, and $\delta_{PUCCH}$(n) is obtained based on the power control command TPC-0 at time slot n. For the short PUCCH-2, the power control commands TPC-0, TPC-1 and TPC-2 at time slots n, n−1 and n−2 meet the delay requirements of power control of PUCCH-2. That is, only the power control commands TPC-1 and TPC-2 at time slots n−1 and n−2 simultaneously meet the delay requirements of power control of PUCCH-1 and PUCCH-2. However, the power control command TPC-0 at time slot n does not meet the delay requirements of power control of PUCCH-1. Thus, the power adjustment values $\delta_{PUCCH}$(n−1) and $\delta_{PUCCH}$(n−2) are used for calculating the accumulated value of closed-loop power control, g(n)=g(n−1)+$\delta_{PUCCH}$(n−1)+$\delta_{PUCCH}$(n−2). $\delta_{PUCCH}$(n−1) and $\delta_{PUCCH}$(n−2) are obtained by using TPC-1 and TPC-2.

A Third Embodiment

Figure 12:
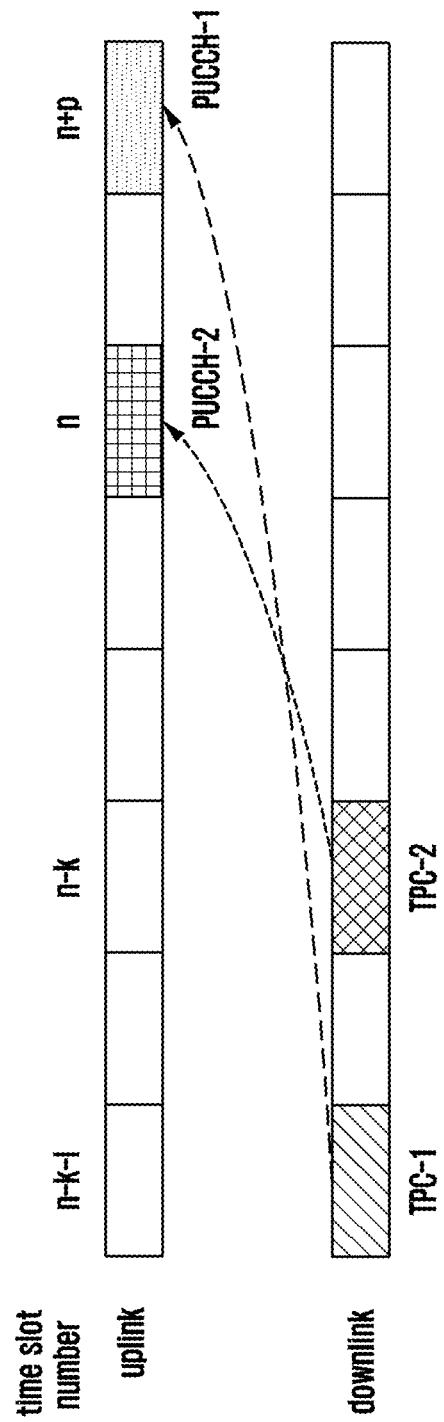
FIG. 12 is a schematic diagram illustrating an application scene, in accordance with a third embodiment of the present disclosure.

In a NR communication system, the following scene may occur. A first DCI transmitting a first TPC command is prior to a second DCI transmitting a second TPC command, while a first PUCCH transmission applying the first TPC command to control power is after a second PUCCH transmission applying the second TPC command to control power. For example, DCI-1 transmitting the TPC command TPC-1 is transmitted at time slot n−k−1. DCI-2 transmitting the TPC command TPC-2 is transmitted at time slot n−k. PUCCH-1 is transmitted at time slot n+p, and PUCCH-1 adopts TPC-1 to control power. PUCCH-2 is transmitted at time slot n, and PUCCH-2 adopts TPC-2 to control power, as shown in FIG. 12. At this time, there are the following methods to control power of PUCCH.

A First Method:

For the power control of PUCCH transmitted in time slot n, the power control of PUCCH is performed, by using a TPC command (it is required that the TPC was not used for calculation of accumulated value of previous closed-loop power control, on the basis of the TPC timing, the TPC command of DCI transmitted in time slot n−k$_m$ is applied to power control of PUCCH transmitted in time slot n) of DCI transmitted in time slot n−k$_m$ and a TPC command (it is required that the TPC was not used for calculation of accumulated value of previous closed-loop power control, on the basis of the TPC timing, the TPC command of DCI transmitted before time slot n−k$_m$ is applied to power control of PUCCH transmitted in time slot n+p, p is a positive integer greater than or equal to 1) of DCI transmitted before time slot n−k$_m$.

Specifically, as shown in FIG. 12, DCI-1 transmitting the TPC command TPC-1 is transmitted in time slot n−k−1, and DCI-2 transmitting the TPC command TPC-2 is transmitted in time slot n−k. On the basis of the TPC timing, PUCCH-1 is transmitted in time slot n+p, and PUCCH-1 adopts TPC-1 to control power. PUCCH-2 is transmitted in time slot n, and PUCCH-2 adopts TPC-2 to control power. At this time, an accumulated value of closed-loop power control of PUCCH-2 transmitted in time slot n is calculated, by using power adjustment values $\delta_{PUCCH}(1)$ and $\delta_{PUCCH}(2)$ that is, $g(n)=g(n-1)+\delta_{PUCCH}(1)+\delta_{PUCCH}(2)$. $\delta_{PUCCH}(1)$ and $\delta_{PUCCH}(2)$ are obtained, by using TPC-1 and TPC-2. Since TPC-2 is a TPC command of DCI transmitted in time slot $n-k_m$. TPC-2 is a TPC used for power control of PUCCH transmitted in time slot n (the TPC was not used for calculation of accumulated value of previous closed-loop power control), while TPC-1 is a TPC command of DCI transmitted before time slot $n-k_m$. Besides, on the basis of the TPC timing, the TPC command of DCI transmitted before time slot $n-k_m$ is a TPC (the TPC was not used for calculation of accumulated value of previous closed-loop power control), which is used for power control of PUCCH transmitted after time slot n. Thus, on the basis of the previous method, an accumulated value of closed-loop power control of time slot n is calculated, by using power adjustment values $\delta_{PUCCH}(1)$ and $\delta_{PUCCH}(2)$. $\delta_{PUCCH}(1)$ and $\delta_{PUCCH}(2)$ are obtained, by using TPC-1 and TPC-2. The accumulated value of closed-loop power control of PUCCH-1 transmitted in time slot n+p is calculated, by using the formula $g(n+p)=g(n+p-1)$. That is, the power adjustment value $\delta_{PUCCH}(1)$ is not used, and $\delta_{PUCCH}(1)$ is obtained by using TPC-1. Since TPC-1 is a TPC command of DCI transmitted before time slot $n-k_m$. and is a TPC used for power control of PUCCH-1 transmitted in time slot n+p, however, TPC-1 was used for calculation of accumulated value of previous closed-loop power control of PUCCH-2, TPC-1 is not used for calculation of accumulated value of closed-loop power control of PUCCH-1.

Thus, calculations of a BS for transmitting power control command are performed according to time sequence. That is, TPC-2 is calculated, based on TPC-1. Thus, PUCCH-2 adopts TPC-1 and TPC-2 to control power.

The foregoing TPC timing refers to a timing, which is between DCI transmitting a TPC command and a PUCCH adopting the TPC to control power. For example, regarding DCI including a TPC command transmitted in time slot n−k, regarding a PUCCH adopting the TPC command to control power, and the PUCCH is transmitted in time slot n, a time corresponding between the PUCCH and the DCI is referred to as the TPC timing.

A Second Method:

For power control of a PUCCH transmitted in time slot n, and DCI transmitted in time slot $n-k_m$. on the basis of a TPC timing, a TPC command of DCI transmitted in time slot $n-k_m$ is a TPC, which is used for power control of PUCCH transmitted in time slot n. An accumulated value of closed-loop power control of the PUCCH is calculated, by using the TPC of DCI transmitted in time slot $n-k_m$. Specifically, as shown in FIG. 12, DCI-1 transmitting a TPC command TPC-1 is transmitted in time slot n−k−1, and DCI-2 transmitting a TPC command TPC-2 is transmitted in time slot n−k. On the basis of the TPC timing, PUCCH-1 is transmitted in time slot n+p, and PUCCH-1 adopts TPC-1 to control power. PUCCH-2 is transmitted in time slot n, and PUCCH-2 adopts TPC-2 to control power. The PUCCH-1 adopts TPC-1 to calculate an accumulated value of closed-loop power control, in which TPC-1 is transmitted by DCI-1 in time slot n−k−1. The PUCCH-2 adopts TPC-2 to calculate the accumulated value of closed-loop power control, in which TPC-2 is transmitted by DCI-2 in time slot n−k.

A Fourth Embodiment

In a NR communication system, multiple PUCCH transmissions within one time slot are introduced. For example, there are two PUCCH transmissions within a time slot n, according to time division multiplexing. The first PUCCH is denoted with PUCCH-1. The second PUCCH is denoted with PUCCH-2. At this time, a time slot is taken as a unit in a timing. The timing is between DCI transmitting TPC and an uplink UCI transmission, which adopts the TPC to control power. For example, the DCI carrying TPC is transmitted in time slot n. The uplink UCI is transmitted in time slot n+k, and the uplink UCI adopts the TPC to control power.

For the TPC in the UE-group common DCI, when the UE-group common DCI carrying TPC is transmitted in time slot n, the TPC is applied in time slot n+k to control power. Besides, when there are multiple PUCCH transmissions in time slot n+k, the TPC command is applied to power control of the first PUCCH in time slot n+k. For example, there are two PUCCH transmissions in time slot n+k. The first PUCCH is denoted with PUCCH-1. The second PUCCH is denoted with PUCCH-2. As shown in FIG. 10, the TPC command is applied to the power control of PUCCH-1.

For the TPC command in DL DCI scheduling PDSCH, the TPC command is applied to power control of PUCCH of HARQ-ACK, in which the HARQ-ACK is generated from the transmitted PDSCH. For example, when DCI transmitted in time slot n includes TPC, in which the DCI schedules the PDSCH, the HARQ-ACK generated from transmitted PDSCH is transmitted by PUCCH in time slot n+k, the TPC included by DCI scheduling PDSCH is applied to power control of PUCCH of HARQ-ACK, in which the HARQ-ACK is generated from transmitted PDSCH. For example, there are two PUCCH transmissions in time slot n+k, according to time division multiplexing, the first PUCCH is denoted with PUCCH-1. The second PUCCH is denoted with PUCCH-2. As shown in FIG. 10, the HARQ-ACK generated from the PDSCH is transmitted in PUCCH-2. The TPC command is applied to power control of PUCCH-2.

Figure 13:
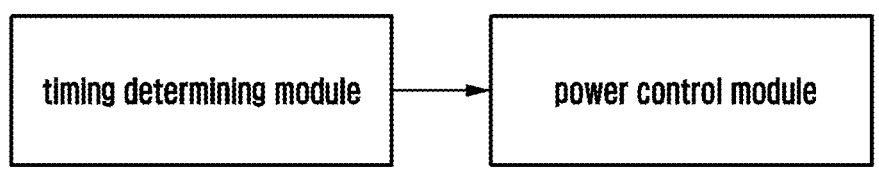
FIG. 13 is a schematic diagram illustrating a structure of a device for uplink power control, in accordance with a preferred embodiment of the present disclosure.
Figure 14:
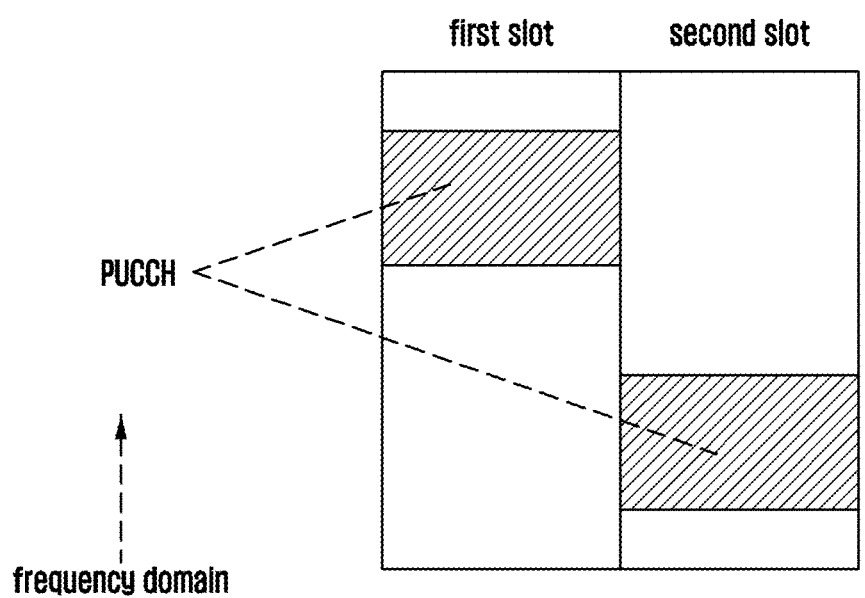
FIG. 14 schematically illustrates frequency hopping of a PUCCH of LTE within a subframe.

Corresponding to the foregoing method, the present disclosure also provides a device for uplink power control. A preferred structure of the device is shown in FIG. 13, including a timing determining module and a power control module.

The timing determining module is configured to determine a timing, which is between a power control command and a PUCCH adopting the power control command to control power.

On the basis of the determined timing, the power control module is configured to adjust transmission power of the PUCCH, according to the power control command.

The foregoing is only preferred embodiments of the present disclosure, which is not for use in limiting the present disclosure. Any modifications, equivalent substitutions and improvements made within the spirit and principle of the present disclosure, should be covered by the protection scope of the present disclosure.

In order to facilitate better understanding of the technical solutions of the present disclosure by those skilled in the art, the technical solutions of the disclosure will be described clearly and completely hereinafter in conjunction with the drawings accompanying the disclosed embodiments.

Some processes described in the description, claims and the drawings of the present disclosure may comprise a plurality of operations that are described in a certain order. However, it should be understood that these operations may be executed in an order rather than the order in which they are described herein or executed in parallel. The reference numbers indicating the operations, such as 601 and 602, are merely used for distinguishing different operations, and the reference numbers themselves do not represent any execution order. In addition, these processes may comprise more or less operations, and these operations may be executed sequentially or in parallel. It is to be noted that the word such as "first" and "second" are used for distinguishing different messages, devices, modules or the like, which neither indicate any sequences nor define different types.

Technical solutions of the disclosed embodiments will be explained clearly and completely hereinafter in conjunction with the accompanying drawings in the disclosed embodiments. Obviously, the embodiments described herein are only some of rather than all of the disclosed embodiments of the present disclosure. Any other embodiments obtained by those skilled in the art based on the disclosed embodiments without any creative work will fall into the protection scope of the present disclosure.

Figure 15:
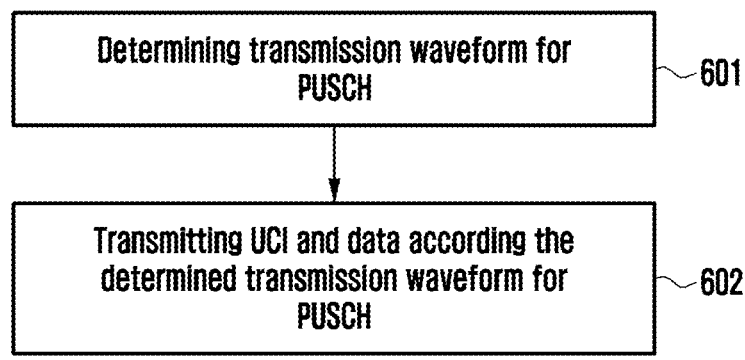
FIG. 15 is a flowchart illustrating a method for transmitting UCI according to the present disclosure.

Reference is now made to FIG. 15 which illustrates a method for transmitting uplink control information (UCI) according to the present disclosure. The method comprises the steps of:

Step 601: determining a transmission waveform for a PUSCH, and

Step 602: transmitting UCI and data based on the determined transmission waveform for the PUSCH.

In the present disclosure, two waveforms, which are CP-OFDM and SC-FDM, may be used as waveforms for uplink transmission. In other words, both CP-OFDM and SC-FDM may be used as transmission waveforms for a PUCCH or a PUSCH.

Examples are provided hereinafter to illustrate how to determine, by a UE, a transmission waveform for a PUCCH and that for a PUSCH. Same or similar content among respective examples will not be repeated in detail herein.

Example 1

In this example, there is no correlation between a transmission waveform for a PUCCH determined by a UE and a transmission waveform for a PUSCH determined by the UE.

Specifically, the UE may receive dynamic indication information transmitted from a base station, and then determine respective waveforms to be used to transmit the PUCCH and the PUSCH according to the dynamic indication information. The dynamic indication information may be, for example, an indication from system information (that is, information containing a master information blocks (MIB) and a system information block (SIB)), configuration information from higher-layer signaling or an indication from physical layer signaling. The base station may use individual dynamic indication information that is independent from each other to indicate which waveforms shall be used by the UE to transmit the PUCCH and the PUSCH respectively. Meanwhile, the UE may also determine respective waveforms to be used to transmit the PUCCH and the PUSCH according to a predefined rule such as an agreement in a protocol.

For example, the base station may use one bit in the system information or in the physical layer signaling to indicate that a CP-OFDM waveform or an SC-FDM waveform shall be used for the PUCCH. For example, the CP-OFDM waveform will be used for the PUCCH when the value of the bit is 0, and the SC-FDM waveform will be used for the PUCCH when the value of the bit is 1.

Optionally, the UE may use the SC-FDM waveform to transmit the PUCCH according to a predefined rule after initial access. Alternatively, the UE may use the SC-FDM waveform to transmit the PUCCH according to a predefined rule until the transmission waveform for the PUCCH is configured by the higher-layer signaling.

Example 2

In this example, the UE determines a same transmission waveform for both of the PUCCH and the PUSCH. That is, the UE may use either CP-OFDM or SC-FDM for both of the PUCCH and the PUSCH.

Specifically, a UE may receive dynamic indication information transmitted by a base station, and then determine a waveform to be used to transmit the PUCCH and the PUSCH according to dynamic indication information. The dynamic indication information may be, for example, an indication from system information, configuration information from higher-layer signaling or an indication from physical layer signaling. The base station may use same dynamic indication information to indicate which waveform shall be used by the UE to transmit the PUCCH and the PUSCH.

For example, the base station may use one bit in the system information to indicate that the CP-OFDM waveform or the SC-FDM waveform shall be used for both of the PUCCH and the PUSCH. For example, the CP-OFDM waveform will be used for both of the PUCCH and the PUSCH when the value of the bit is 0, and the SC-FDM waveform will be used for both of the PUCCH and the PUSCH when the value of the bit is 1. Similarly, the base station may also use higher-layer signaling to configure the waveform used for frequency-division multiplexed PUCCH and PUSCH to be CP-OFDM or SC-FDM.

Example 3

In this example, there is no correlation between a transmission waveform for a PUCCH determined by a UE and that for a PUSCH determined by the UE. The UE determines the transmission waveform for the PUCCH according to type of the PUCCH.

Type of a PUCCH is introduced now. A PUCCH may be classified as a first type of PUCCH or a second type of PUCCH according to different classification criteria. For example, a PUCCH may be classified according to whether it is exclusively used by a single UE or shared by a plurality of UEs. In such a circumstance, the first type of PUCCH may be referred to as shared PUCCH (for example, PUCCH format 3 and PUCCH format 5 in the LTE system), which means that one physical resource block (PRB) is shared by a plurality of UEs and the plurality of UEs can transmit their respective PUCCHs on the shared physical resource block. The second type of PUCCH may be referred to as exclusive PUCCH (for example, PUCCH format 4 in the LTE system), which means that one PRB is exclusively used by one UE and only the one UE can transmit a PUCCH on the one physical resource block.

In addition, a PUCCH may be classified according to whether the length thereof is larger than a certain value. In such a circumstance, the first type of PUCCH may be referred to as a long PUCCH, the number of OFDM symbols occupied by which is larger than N (for example, N is equal to 2). The second type of PUCCH may be referred to as a short PUCCH, the number of OFDM symbols occupied by which is less than or equal to N.

The UE may determine the type of a PUCCH, and then determine the transmission waveform for the PUCCH according to the type thereof. For example, the transmission waveform for the first type of PUCCH may be determined according to a predefined rule, while the transmission waveform for the second PUCCH may be determined according to dynamic indication information from a base station. For example, the UE may determine that the SC-FDM waveform is used to transmit the first type of PUCCH, and the base station may use one bit in the system information or in the physical layer signaling to indicate that the CP-OFDM waveform or the SC-FDM waveform is used to transmit the second type of PUCCH. For example, the CP-OFDM waveform is used for the second type of PUCCH when the value of the one bit value is 0, and the SC-FDM waveform is used for the second type of PUCCH when the value of the one bit is 1. Meanwhile, the transmission waveform for the PUSCH may be independently determined by receiving dynamic indication information from the base station.

Example 4

Example 4 is different from example 3 only in that the UE determines waveforms for transmitting a first type of PUCCH and a second type of PUCCH respectively by receiving dynamic indication information transmitted from the base station. The base station uses individual dynamic indication information that is independent from each other to respectively indicate which waveform will be used by UE to transmit the first PUCCH and which waveform will be used by UE to transmit the second PUCCH.

Example 5

Example 5 is different from example 3 only in that the UE determines the waveforms that are used to transmit a first PUCCH and a second PUCCH respectively according to a predefined rule.

Example 6

In this example, there is no correlation between a transmission waveform for a PUCCH determined by a UE and a transmission waveform for a PUSCH determined by the UE. The UE determines the transmission waveform for the PUCCH according to the type of the PUCCH.

In this example, a PUCCH is classified as a first type of PUCCH or a second type of PUCCH according to the number of PRBs occupied by the PUCCH. The number of PRBs occupied by the first type of PUCCH is less than or equal to M (for example, M is 2), and the number of PRBs occupied by the second type of PUCCH is larger than M. The transmission waveform for the PUCCH may be determined according to the number of PRBs that it occupies.

For example, the UE determines the transmission waveform (for example, SC-FDM) for the first type of PUCCH according to a predefined rule, and determines the transmission waveform for the second type of PUCCH according to dynamic indication information from the base station. Alternatively, the UE may independently determine the transmission waveform for the first type of PUCCH and that for the second type of PUCCH respectively according to first dynamic indication information from the base station. The transmission waveform for the PUSCH may be independently determined by receiving second dynamic indication information from the base station.

Example 7

In this example, there is no correlation between a transmission waveform for a PUCCH determined by a UE and a transmission waveform for a PUSCH determined by the UE. The UE determines the transmission waveform for the PUCCH according to the type of the PUCCH.

A PUCCH may be classified as a first type of PUCCH or a second type of PUCCH according to the manner in which it occupies physical resource. The physical resource occupied by the first type of PUCCH is continuous PRBs, which means that the occupied physical resource is centralized. The physical resource occupied by the second type of PUCCH is discontinuous PRBs, which means that the occupied physical resource is discrete.

The UE determines the transmission waveform (for example, SC-FDM) for the first type of PUCCH and the transmission waveform (for example, CP-OFDM) for the second type of PUCCH according to a predefined rule. The transmission waveform for the PUSCH may be independently determined by receiving dynamic indication information from the base station.

Example 8

In this example, there is no correlation between a transmission waveform for a PUCCH determined by a UE and a transmission waveform for a PUSCH determined by the UE. In all cases, the UE uses the SC-FDM waveform to transmit the PUCCH invariably (that is, as prescribed by a predefined rule), while the transmission waveform for a PUCSCH is independently determined by receiving dynamic indication information from a base station.

Example 9

In this example, there is no correlation between a transmission waveform for a PUCCH determined by a UE and a transmission waveform for a PUSCH determined by the UE. The UE determines a transmission waveform for a PUSCH according to type of the PUSCH.

A PUSCH may be classified as a first type of PUSCH or a second type of PUSCH according to whether downlink control information (DCI) used for scheduling the PUSCH by the base station supports spatial multiplexing or not. The DCI corresponding to the first type of PUSCH supports spatial multiplexing, and the DCI corresponding to the second type of PUSCH does not support spatial multiplexing.

The UE determines the transmission waveform for the first type of PUSCH to be CP-OFDM and determines the transmission waveform for the second type of PUSCH according to dynamic indication information from the base station. If the dynamic indication information from the base station is physical layer signaling, one bit therein may be used to specifically indicate the transmission waveform for the second type of PUSCH. The dynamic indication information may also be combined with other information in the DCI to indicate the transmission waveform for the second type of PUSCH. For example, it may be combined with information indicating resource allocation scheme to indicate the transmission waveform for the second type of PUSCH.

Example 10

Special situations will be described in this example.
If a UE determines that CP-OFDM waveform is used for a PUSCH, the PUSCH will not use frequency hopping within a slot. Specifically, because CP-OFDM allows transmission resource for the PUSCH to be distributed discretely in frequency domain, sufficient frequency-domain diversity gain can be obtained and it is not necessary to use frequency hopping to obtain additional frequency-domain diversity gain.

If the UE determines that SC-FDM waveform is used for a PUSCH, the PUSCH can use frequency hopping within a slot. Specifically, because transmission resource for the PUSCH is substantially continuous in frequency-domain, sufficient frequency-domain diversity gain cannot be obtained and it may be necessary to use frequency hopping within a slot to obtain additional frequency-domain diversity gain.

As described hereinbefore, step 102 comprises transmitting UCI and data based on the determined transmission waveform for the PUSCH.

Examples are provided hereinafter to illustrate how the UE transmits UCI and data according to the transmission waveforms for PUCCH and PUSCH determined by the UE. Same or similar content among respective examples will not be repeated in detail herein.

Because a PUCCH may be classified as a long PUCCH or a short PUCCH and a PUSCH may also be classified as a long PUSCH or a short PUSCH, it may be configured by a higher-layer signaling whether a UE can transmit a PUCCH and a PUSCH simultaneously. A UE may configure whether different types of PUCCHs and different types of PUSCHs can be transmitted simultaneously by receiving at least one independent higher-layer signaling. Different types of PUCCHs comprise the long PUCCH and the short PUCCH, and different types of PUSCHs comprise the long PUSCH and the short PUSCH. For example, the UE may determine whether the long PUCCH and the long PUSCH can be transmitted simultaneously by receiving a higher-layer signaling 1, and the UE may determine whether the short PUCCH and the short PUSCH can be transmitted simultaneously by receiving a higher-layer signaling 2. Alternatively, the UE may determines whether the long PUCCH and the long PUSCH can be transmitted simultaneously, whether the long PUCCH and the short PUSCH can be transmitted simultaneously and whether the short PUCCH and the long PUSCH can be transmitted simultaneously by receiving a higher-layer signaling 1, and the UE may determine whether the short PUCCH and the short PUSCH can be transmitted simultaneously by receiving a higher-layer signaling 2. By independently configuring whether different types of PUCCHs and different types of PUSCHs can be transmitted simultaneously, different requirements on power by different types of PUCCHs and different types of PUSCH as well as different requirements on the performance of different types of PUCCH and different types of PUSCH may be met.

Example 1

A process of transmitting UCI and data by a UE in the case that the UE determines that the CP-OFDM waveform will be used to transmit the PUSCH and the UE can transmit PUCCH and PUSCH simultaneously (i.e., within a same slot), is described in this example. In this example, the UE can transmit the PUCCH and the PUSCH simultaneously in one or more serving cells.

The UE transmits UCI on the PUCCH and transmits data on the PUSCH. Specifically, the UE transmits a plurality of PUCCHs simultaneously in one subframe and each PUCCH transmits HARQ-ACK, CSI or SR corresponding thereto. That is, HARQ-ACK, CSI and SR are each transmitted on its corresponding PUCCH respectively. For example, when the UE needs to transmit HARQ-ACK and CSI in a subframe n, the UE transmit HARQ-ACK on a PUCCH for HARQ-ACK and transmit CSI on a PUCCH for CSI.

Because a problem of PAR increasing due to simultaneous transmission on a plurality of channels may be solved by using OFDM as transmission waveform, as much transmission resource as possible is used in this example by using CP-OFDM waveform to transmit both the PUCCH and the PUSCH so as to improve transmission performance. Power control of the PUCCH and that of the PUSCH are computed respectively, and the transmission power for the PUCCH and that of the PUSCH may be different. If the total power required for simultaneously transmitting one or more PUCCHs and a PUSCH is larger than a maximum power allowed by the UE, the UE will reduce the power for the PUCCH(s) and the PUSCH according to their respective priorities in power allocation in an order from lower priority to higher priority or stops transmission, until the sum of the adjusted transmission power is less than or equal to the maximum power allowed by the UE.

Example 2

A process of transmitting UCI and data by a UE in the case that the UE determines that the CP-OFDM waveform will be used to transmit the PUSCH and the UE can transmit PUCCH and PUSCH simultaneously (i.e., within a same slot), is described in this example. In this example, the UE can transmit the PUCCH and the PUSCH simultaneously in one or more serving cells.

Figure 16:
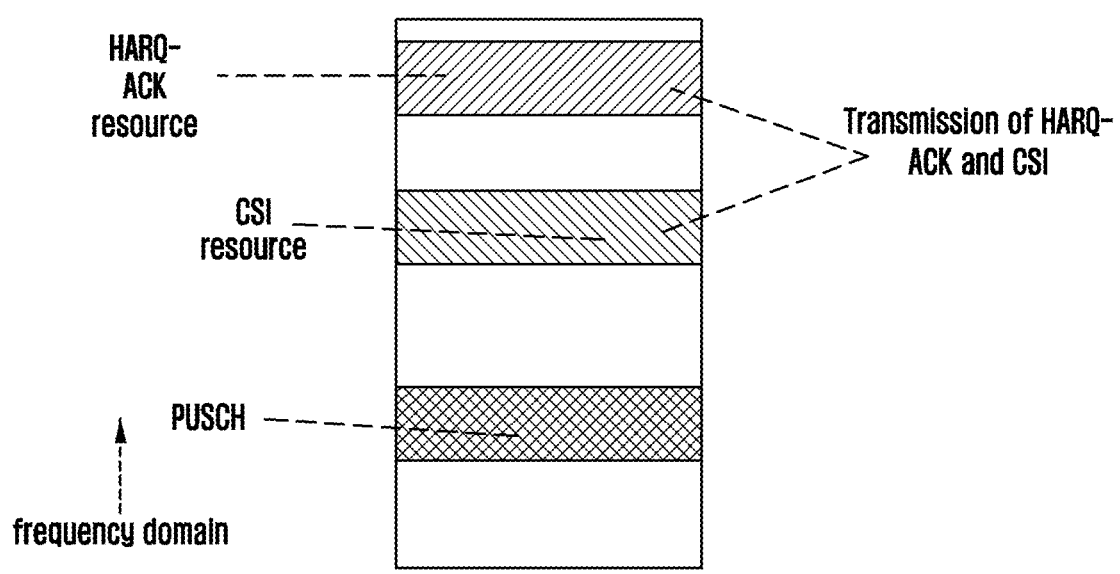
FIG. 16 schematically illustrates how UE transmits UCI according to a waveform of a PUSCH according to the present disclosure.

The UE transmits UCI on the PUCCH and transmits data on the PUSCH. Specifically, the UE simultaneously transmits a plurality of PUCCHs in one subframe, which may comprise respective PUCCHs for HARQ-ACK, CSI and SR. When the UE transmits UCI, two or three selected from HARQ-ACK, CSI and SR are jointly encoded into content to be transmitted, which will be transmitted on one PUCCH. Alternatively, the content to be transmitted may be taken as a whole and distributed on a plurality of PUCCHs so as to be transmitted. For example, when the UE need to transmit HARQ-ACK and CSI in a subframe n, it may encode HARQ-ACK and CSI jointly into content to be transmitted and distribute the whole content to be transmitted on the PUCCH for HARQ-ACK and on the PUCCH for CSI so as to be transmitted simultaneously, as can be seen in FIG. 16.

Alternatively, when transmitting UCI, the UE may select and individually encode two or three from HARQ-ACK, CSI and SR respectively. The individually encoded ones may be taken as a whole, and transmitted on one PUCCH or distributed and transmitted on a plurality of PUCCHs. For example, when the UE needs to transmit HARQ-ACK and CSI in a subframe n, it individually encodes HARQ-ACK and CSI respectively, take the individually encoded HARQ-ACK and CSI as a whole and distribute the same on the PUCCH for HARQ-ACK and on the PUCCH for CSI so as to transmit the same simultaneously. In this situation, the PUCCH resource allocated to HARQ-ACK and CSI respectively is computed according to a number of bits occupied by HARQ-ACK and a number of bits occupied by CSI as well as their respective resource allocation factors. The power control of the PUCCH and the PUSCH is computed respectively, and the transmission power for the PUCCH and that for the PUSCH may be different.

The format of the PUCCH resource for HARQ-ACK may be determined according to the number of bits occupied by HARQ-ACK, and the UE may compute a number of bits occupied by PUCCH by receiving indication from a higher-layer signaling or a physical layer signaling. The format of the PUCCH resource for CSI may be determined according to the number of bits occupied by CSI.

Example 3

A process of transmitting UCI and data by a UE in the case that the UE determines that the CP-OFDM waveform will be used to transmit the PUSCH and the UE can transmit PUCCH and PUSCH simultaneously (i.e., within a same slot), is described in this example. In this example, the UE can transmit the PUCCH and the PUSCH simultaneously in one or more serving cells.

The UE transmits UCI on the PUCCH and transmits data on the PUSCH. Specifically, the UE simultaneously transmits a plurality of PUCCHs in one subframe, which may comprise respective PUCCHs for HARQ-ACK, CSI and SR. Specifically, the UE transmits UCI according to whether the PUCCH is an exclusive PUCCH or a shared PUCCH. If a plurality of PUCCHs are exclusive PUCCHs, the UE can select and jointly encoded two or three from HARQ-ACK, CSI and SR into content to be transmitted. The content to be transmitted will be transmitted on one PUCCH, or taken as a whole and distributed on a plurality of PUCCHs so as to be transmitted. Similarly, if a plurality of PUCCHs are exclusive PUCCHs, the UE can select two or three from HARQ-ACK, CSI and SR and individually encode the selected ones respectively. The individually encoded ones may be taken as a whole and transmitted on one PUCCH or distributed and transmitted on a plurality of PUCCHs simultaneously. If the PUCCH is a shared PUCCH, the UE selects one from HARQ-ACK, CSI and SR to be transmitted thereon.

For example, when the UE needs to transmit HARQ-ACK and CSI in a subframe n, it may jointly encode them into content to be transmitted. The content to be transmitted may be taken as a whole and distributed on two exclusive PUCCHs so as to be transmitted simultaneously. For another example, when the UE needs to transmit HARQ-ACK and CSI in a subframe n, it may individually encode HARQ-ACK and CSI respectively. The individually encoded HARQ-ACK and CSI may be taken as a whole and distributed on two exclusive PUCCHs so as to be transmitted simultaneously. In this situation, the PUCCH resource allocated to HARQ-ACK and CSI respectively may be computed according to a number of bits occupied by HARQ-ACK and a number of bits occupied by CSI and their respective resource allocation factors. The power control for the PUCCH and the PUSCH may be computed respectively, and the transmission power for the PUCCH and that for the PUSCH may be different.

The format of the PUCCH resource for the HARQ-ACK may be determined according to the number of bits occupied by HARQ-ACK, and the UE may compute a number of bits occupied by the PUCCH by receiving indication from a higher-layer signaling or a physical layer signaling. The format of the PUCCH resource for CSI may be determined according to the number of bits occupied by CSI.

Example 4

A process of transmitting UCI and data by a UE in the case that the UE determines that the CP-OFDM waveform will be used to transmit the PUSCH and the UE can transmit PUCCH and PUSCH simultaneously (i.e., within a same slot), is described in this example. In this example, the UE can transmit the PUCCH and the PUSCH simultaneously in one or more serving cells.

A UE can transmit UCI and data on either a PUCCH or a PUSCH. The UE simultaneously transmits a plurality of PUCCHs in one subframe, which may comprise respective PUCCHs for HARQ-ACK, for CSI and for SR. Specifically, the UE transmits UCI according to type of a PUCCH, i.e., whether the PUCCH is an exclusive PUCCH or a shared PUCCH. If the PUCCH is an exclusive PUCCH, UCI and data may be transmitted on the PUCCH. If the PUCCH is a shared PUCCH, only UCI may be transmitted on the PUCCH and no data may be transmitted thereon.

When both UCI and data are transmitted on each of the PUCCH and the PUSCH, the density of the demodulation reference signal (DMRS) adopted by the PUCCH and that of the DMRS adopted by the PUSCH are same. The UE takes the PUCCH resource and the PUSCH resource as a whole (i.e., as total resource), and allocates the total resource to UCI and data to be transmitted according to the number of bits occupied by UCI to be transmitted and the number of bits occupied by data to be transmitted as well as the respective resource allocation factors of UCI and data.

Example 5

A process of transmitting UCI and data by a UE in the case that the UE determines that the CP-OFDM waveform will be used to transmit the PUSCH and the UE can transmit PUCCH and PUSCH simultaneously (i.e., within a same slot), is described in this example. In this example, the UE can transmit the PUCCH and the PUSCH simultaneously in one or more serving cells.

A UE may transmit UCI and data either on a PUCCH or on a PUSCH. The UE simultaneously transmits a plurality of PUCCHs in one subframe, which may comprise respective PUCCHs for HARQ-ACK, for CSI and for SR. Specifically, if there are a plurality of available PUCCHs for the UE, of which some are exclusive PUCCHs and others are shared PUCCHs, the UE transmits UCI and data on the exclusive PUCCHs, transmits UCI on the shared PUCCHs and transmits UCI and data on the PUSCH.

For example, the UE may take UCI and data to be transmitted as a whole and distributes them on the PUSCH and one or more exclusive PUCCHs so as to be transmitted. If there is no available exclusive PUCCH resource for the UE, the UE uses the PUSCH to transmit UCI and data.

Specifically, if the UE has two PUCCHs used for CSI and HARQ-ACK respectively, and the PUSCH is available. The PUCCH for CSI is an exclusive PUCCH, and the PUCCH for HARQ-ACK is a shared PUCCH. When the UE needs to transmit CSI, HARQ-ACK and data, it uses the PUCCH for HARQ-ACK to transmit the HARQ-ACK, takes CSI and data as a whole and distributed them on the PUSCH and the PUCCH for CSI so as to be transmitted.

When UCI and data are transmitted on each of the PUCCH and on the PUSCH, the density of DMRS adopted by the PUCCH and that of DMRS adopted by the PUSCH are same. The UE takes the PUCCH resource and the PUSCH resource as a whole (i.e., as total resource), and allocates the total resource to UCI and data to be transmitted according to the number of bits occupied by UCI to be transmitted and the number of bits occupied by data to be transmitted as well as the respective resource allocation factors of UCI and data. For example, in the case that the density of DMRS adopted by the PUSCH and that of DMRS adopted by the PUCCH for CSI are same as described in above example, the UE takes the PUSCH resource and the PUCCH resource for CSI as total resource, and allocates the total resource to UCI and data according to the number of bits occupied by UCI and the number of bits occupied by data as well as the respective resource allocation factors of the UCI and data.

Example 6

When a UE uses a CP-OFDM waveform to transmit a PUSCH, the UE may determine whether a PUCCH and a PUSCH can be transmitted simultaneously by receiving a higher-layer signaling or it may be directly determined by a predefined rule that the PUCCH and the PUSCH can be transmitted simultaneously by the UE. Cases that UE can simultaneously transmit the PUCCH and the PUSCH have been provided in examples 1-5. In this example, a process in which the UE transmits UCI and data in the case that the UE cannot transmit the PUCCH and the PUSCH simultaneously (i.e., within a same slot), will be described.

If the UE can only transmit PUSCH, it transmits UCI and data on the PUSCH. If the UE can only transmit PUCCH, it transmits UCI on the PUCCH and stops transmitting data.

Example 7

A process in which the UE transmits UCI and data in the case that the UE determines that a SC-FDM waveform is used for transmitting PUSCH, will be described in this example.

If it is determined that the UE can transmit a PUCCH and a PUSCH simultaneously (i.e., within a slot) according to configuration information from a higher-layer signaling, the UE simultaneously transmits UCI on the PUCCH and data on the PUSCH respectively. For example, if there is no UCI to be transmitted and only data is to be transmitted, the UE transmits data on the PUSCH; if the UE needs to simultaneously transmit CSI and PUSCH data, it transmits CSI on the PUCCH and transmits data on the PUSCH; and if the UE needs to simultaneously transmit HARQ-ACK/SR and data, it transmits HARQ-ACK/SR on the PUCCH and transmits data on the PUSCH. It is to be noted that there are exceptions: if the UE needs to simultaneously transmit CSI, HARQ-ACK and data, simultaneously transmit CSI, SR and data, or simultaneously transmit CSI, HARQ-ACK, SR and data, it transmits HARQ-ACK and/or SR on the PUCCH and transmits CSI and data on the PUSCH.

When it is determined that the UE cannot transmit a PUCCH and a PUSCH simultaneously (i.e., within a slot) according to configuration information from a higher-layer signaling, the UE transmits UCI and data only on the PUSCH, or transmits UCI and data only on the PUCCH.

The format of the PUCCH for transmitting UCI may be determined according to the total number of bits occupied by UCI to be transmitted.

Example 8

This example is different from example 6 only in that: a UE need not to determine whether a PUCCH and a PUSCH can be simultaneously transmitted by receiving an additional signaling, and instead, it is prescribed by a predefined rule that the UE transmits UCI and data on the PUSCH if PUSCH resource is available in a current subframe and transmits UCI and data on the PUCCH if PUSCH resource is not available in the current subframe.

In the present example, the format of the PUCCH for transmitting UCI may be determined according to the total number of bits occupied by UCI to be transmitted.

Processes described above are based on a fact that the bandwidth capacity of a UE is equal to system bandwidth or configured by a base station.

Another process for transmitting UCI and data by a UE will be introduced through following examples. In this process, the UE determines whether the resource for transmitting UCI is within its frequency band capacity, and then transmits UCI and data according to the result of the determination. Furthermore, processes based on the fact that the bandwidth capacity of the UE is equal to system bandwidth or configured by the base station, can be performed when the UE determines that the resource for transmitting UCI is within its frequency band capacity.

Example 1

A base station configures frequency-domain resource locations of a PUCCH and a PUSCH according to a higher-layer signaling. The frequency-domain location comprises two parts, of which one is the location of a sub-band and another is the location of a PRB within the sub-band. The base station configures a plurality of sub-bands for the UE, and each sub-band comprises some PUCCH resource and some PUSCH resource.

Figure 17:
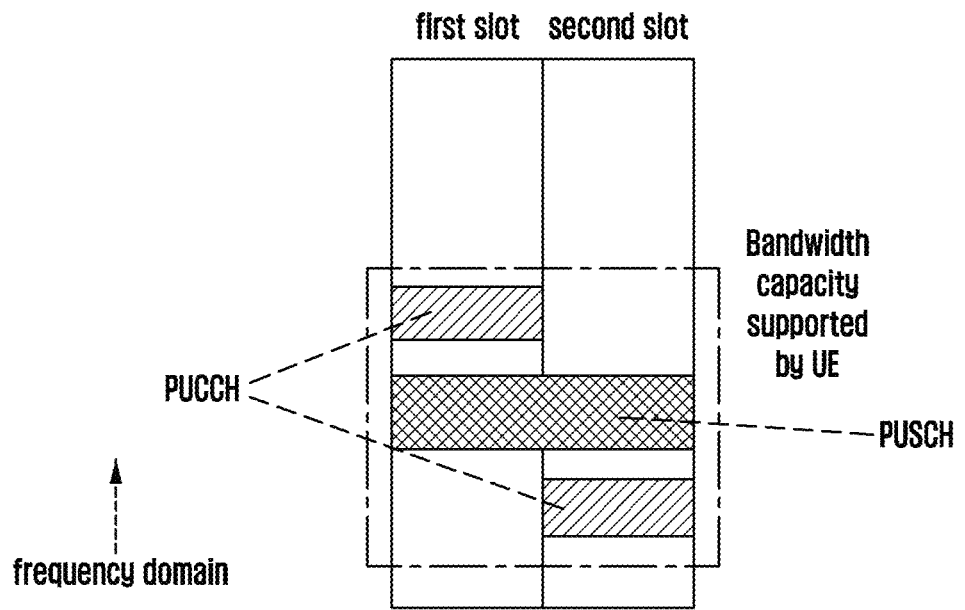
FIG. 17 schematically illustrates how UE transmits UCI according to a bandwidth capacity according to a first example of the present disclosure.

As shown in FIG. 17, when the PUSCH resource for transmitting data and the PUCCH resource for transmitting UCI are within the frequency band capacity of the UE, the UE transmits UCI and data on the PUSCH, or transmits UCI on the PUCCH and data on the PUSCH, which may depend on prescription in a protocol or configuration by a higher-layer signaling.

Figure 18:
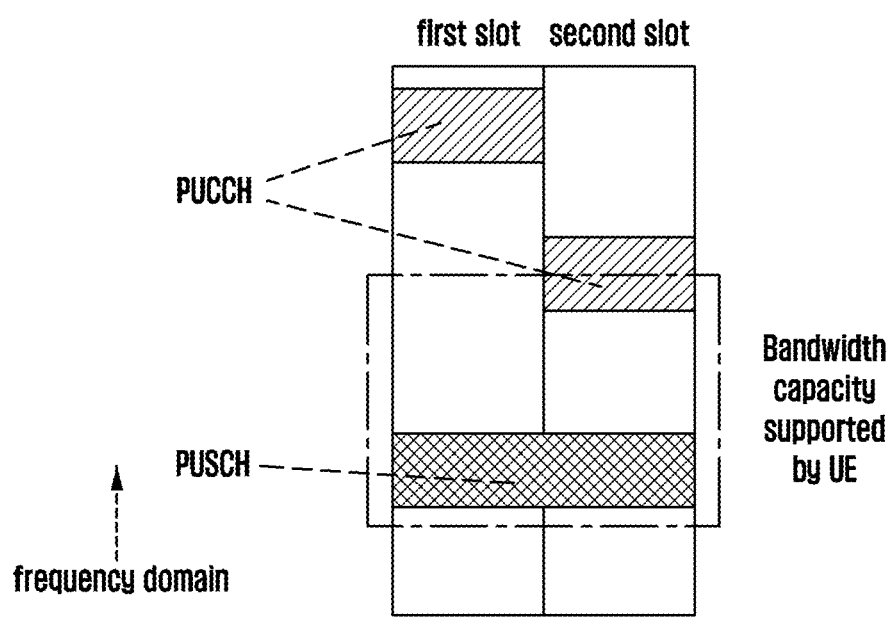
FIG. 18 schematically illustrates how UE transmits UCI according to a bandwidth capacity according to a second example of the present disclosure.

As shown in FIG. 18, when the PUSCH resource for transmitting data and some of the PUCCH resource for transmitting UCI are outside the frequency band capacity of the UE (it is to be noted that if a single piece of resource is not completely within the frequency band capacity of the UE, a determination of being outside the frequency band capacity of the UE may be made), the UE transmits UCI and data on the PUSCH, or transmits UCI and stops transmitting data on the some of the PUCCH resource.

Example 2

A base station configures frequency-domain resource locations of a PUCCH and a PUSCH according to a higher-layer signaling. The frequency-domain location comprises two parts, of which one is the location of a sub-band and another is the location of a PRB within the sub-band. The base station configures a plurality of sub-bands for the UE, and each sub-band comprises some PUCCH resource and some PUSCH resource.

Figure 19:
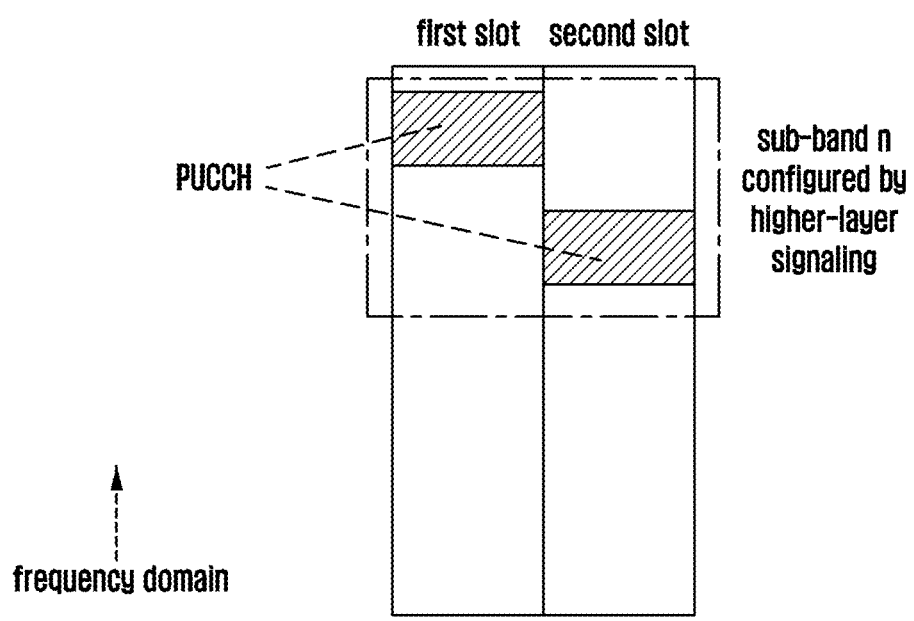
FIG. 19 schematically illustrates how UE transmits UCI according to a bandwidth capacity according to a third example of the present disclosure.

As shown in FIG. 19, when the PUSCH resource for transmitting UCI is within the frequency band capacity of the UE and the UE does not transmit data, the UE uses the PUCCH to transmit UCI.

When the PUSCH resource for transmitting data and the PUCCH resource for transmitting UCI are within the frequency band capacity of the UE and the UE needs to simultaneously transmit data and UCI, the UE transmits UCI and data on the PUSCH, or transmits UCI on the PUCCH and data on the PUSCH, which may depend on prescription in a protocol or configuration by a higher-layer signaling.

Figure 20:
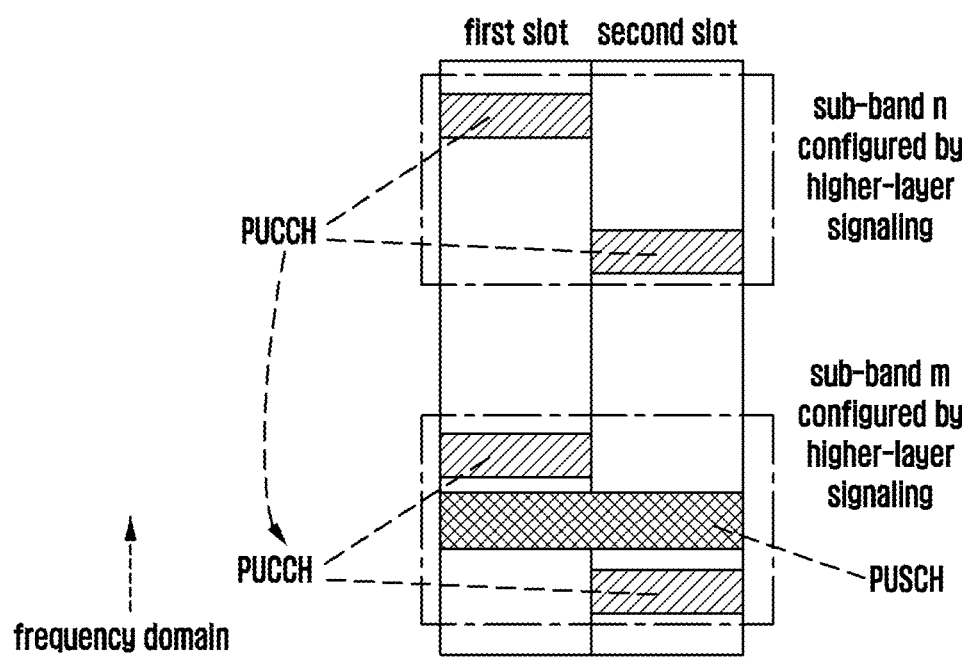
FIG. 20 schematically illustrates how UE transmits UCI according to a bandwidth capacity according to a fourth example of the present disclosure.

As shown in FIG. 20, when the PUSCH resource for transmitting data and the PUCCH resource for transmitting UCI are outside the frequency band capacity of the UE and the UE needs to simultaneously transmit data and UCI, the UE transfers UCI from the PUCCH for transmitting UCI onto a PUCCH within the frequency band capacity of the UE. In this case, the UE transmit data on the PUSCH. For example, a sub-band n and a sub-band m are configured by a higher-layer signaling. When the sub-band m is within the frequency band capacity of the UE, the resource for transmitting UCI is in the sub-band n and the PUSCH is in the sub-band m, the UE transfers UCI onto the PUCCH in the sub-band m to transmit it and transmit data on the PUSCH in the sub-band m, or the UE transfers UCI onto the PUSCH in the sub-band m to transmit it without transmitting any data. The PUCCH in the sub-band n and the PUCCH in the sub-band m are identical in relative location, that is, they are identical in location relative to the sub-band where they locate.

Example 3

A base station uses physical layer signaling dynamic indication (for example, HARQ-ACK resource) or higher-layer signaling configuration (for example, periodic CSI resource) to indicate respective frequency-domain resource locations of a PUCCH and a PUSCH. The frequency-domain location comprises two parts, of which one is the location of a sub-band and another is the location of a PRB within the sub-band. The base station configures a plurality of sub-bands for the UE, and each sub-band comprises some PUCCH resource and some PUSCH resource.

When the PUCCH resource for transmitting UCI is within the frequency band capacity of the UE and no data is to be transmitted by the UE, the UE uses the PUCCH to transmit UCI.

Figure 21:
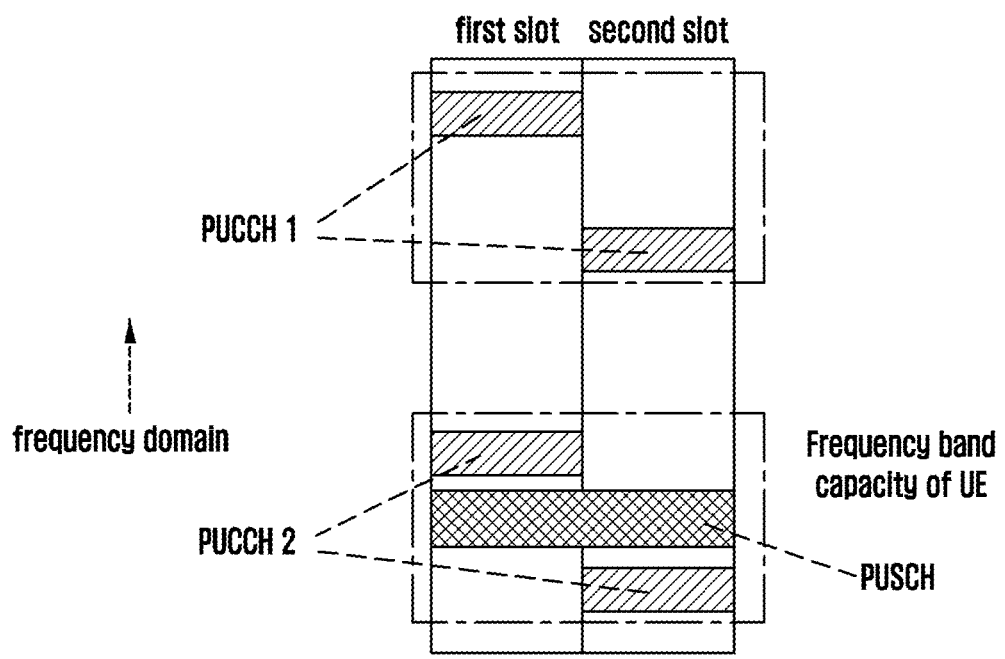
FIG. 21 schematically illustrates how UE transmits UCI according to a bandwidth capacity according to a fifth example of the present disclosure.

As shown in FIG. 21, in the case that the UE needs to simultaneously transmitting data and UCI, when some PUSCHs for transmitting data and some PUCCHs for transmitting UCI are outside the frequency band capacity of the UE and some PUSCHs for transmitting data and some PUCCHs for transmitting UCI are within the frequency band capacity of the UE, the UE transmits UCI on the PUCCH within its frequency band capacity and transmits data on the PUSCH within its frequency band capacity. As can be seen in FIG. 21, PUCCH1 is a PUCCH for transmitting UCI1, PUCCH2 is a PUCCH for transmitting UCI2 and PUCCH2 and PUSCH are included in the frequency band capacity of the UE. The UE transmits UCI on PUCCH2 and transmits data on the PUSCH. Specifically, the following situations may exist: 1. the UE transmits UCI1 on PUCCH1 and does not transmit UCI2; 2. the UE transmits UCI1 on PUCCH1 and transmits UCI2 on the PUSCH; 3. the UE transmits both UCI1 and the UCI2 on PUCCH1 and; 4. the UE only transmits UCI1 and UCI2 on the PUSCH.

Example 4

A UE obtains a plurality of bandwidth parts (BPs) by receiving a signaling (for example, a higher-layer signaling). The plurality of BPs may be divided into one or more BP groups, and there may be only one BP or a plurality of BPs in each BP group. All the BPs within each of the BP groups are within the frequency band capacity of the UE, which means that the UE can simultaneously transmit a channel and a signal on all the frequency resource within any one of the BP groups, and the UE can determine PUCCH resource configuration within each of the BP groups by receiving a signaling (for example, a high-level signaling). The PUCCH resource configuration may be identical across all the BP groups, that is, the PRB location of the PUCCH resource may be identical across all the BP groups. Alternatively, the PUCCH resource configuration within individual BP groups may be determined independently. In this way, when the UE determines to transmit a channel and a signal in one BP group at a certain moment by receiving a signaling (for example, a high-level signaling, a physical layer signaling or a media access (MAC) layer signaling), the UE can transmit UCI by using the PUCCH resource within the BP group and transmit data by using the PUSCH resource within the BP group. The BP herein refers to frequency resource consisting of one or more PRBs that are consecutive in frequency domain. In the present Example, the PUCCH resource used for transmitting UCI and the PUSCH resources used for transmitting data by the UE are always within the frequency band capacity of the UE.

It is to be noted that the UE can determine whether the PUCCH and the PUSCH can be transmitted simultaneously by receiving a higher-layer signaling when the slot lengths of the cells configured for the UE are identical. When the UE receives a higher-layer signaling configuration that the PUCCH and the PUSCH can be transmitted simultaneously, the UE can transmit all or part of UCI on the PUCCH, and transmit only data or transmit data and part of UCI on the PUSCH. When the UE receives a higher-layer signaling configuration that the PUCCH and the PUSCH cannot be transmitted simultaneously, the UE transmits data and UCI on the PUSCH and does not transmit PUCCH if there is a PUSCH transmission, and transmits UCI on the PUCCH if there is no PUSCH transmission.

The following description relates to a method for transmitting UCI by the UE in the case that a plurality of cells are configured for the UE and the slot lengths of at least two of the plurality of cells are different.

Figure 22:
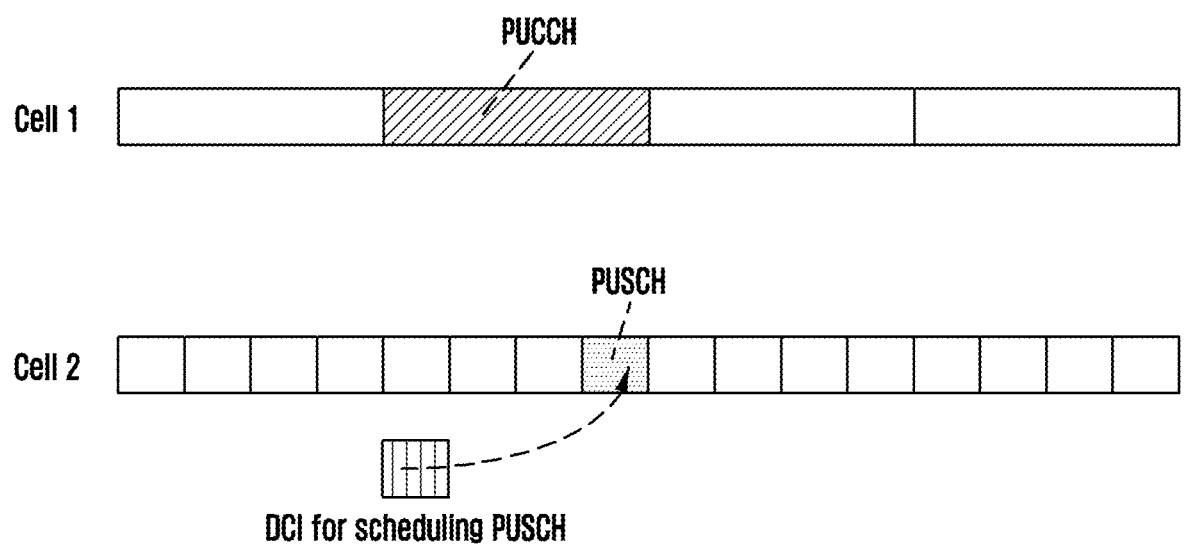
FIG. 22 schematically illustrates how UE transmits UCI according to a slot length according to a first example of the present disclosure.

In a case that the PUCCH is transmitted in a cell with a long slot (for simplicity, referred to as a long-slot cell hereinafter) and the PUSCH is transmitted in a cell with a short slot (for simplicity, referred to as a short-slot cell hereinafter), it is not known whether there is PUSCH transmission in the short-slot cell when the UE starts the PUCCH transmission in the long-slot cell, and it is known that there is PUSCH transmission in the short-slot cell during an overlapped time period with the PUCCH transmission process, as can be seen in FIG. 22. In this case, the following exemplary ways are provided for determining how the UCI is transmitted on the PUCCH and PUSCH.

Figure 23:
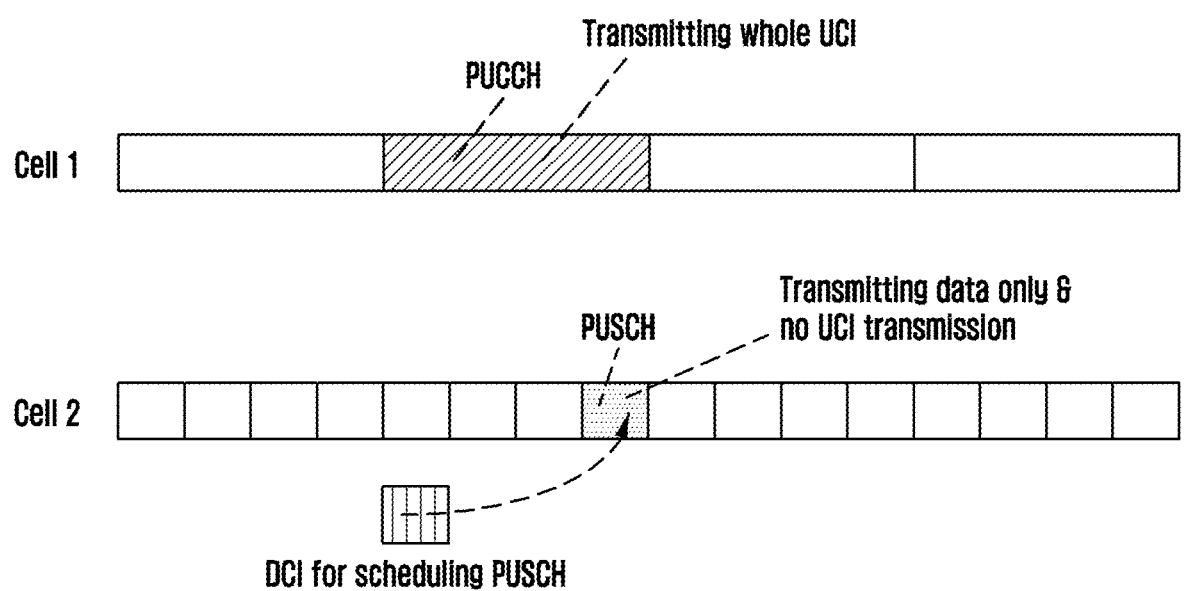
FIG. 23 schematically illustrates how UE transmits UCI according to a slot length according to a second example of the present disclosure.

Exemplary Way 1:

When a UE receives a higher-layer signaling configuration that a PUCCH and PUSCH can be transmitted simultaneously, the PUCCH is transmitted in a long slot and the PUSCH is transmitted in a short slot during a same period, and then all UCI is transmitted on the PUCCH rather than on the PUSCH and only data is transmitted by the UE on the PUSCH. In this way, the UE may be prevented from transmitting a part of UCI (for example, HARQ-ACK) on the PUCCH and transmitting another part of UCI (for example, CSI) on the PUSCH. However, in practice, there may be no PUSCH transmission in a short-slot cell, leading to that CSI cannot be transmitted, which will affect the feedback of CSI. By using the way described above in which all UCI is transmitted on the PUCCH in the long-slot cell when the UE does not know whether there is PUSCH transmission or not in the short-slot cell, cases in which UCI is not transmitted may be avoided. As can be seen in FIG. 23, the UE transmits all the UCI only on the PUCCH in the long-slot cell 1 rather than on the PUSCH in the short-slot cell 2, and transmits data on the PUSCH in the short-slot cell 2.

Figure 24:
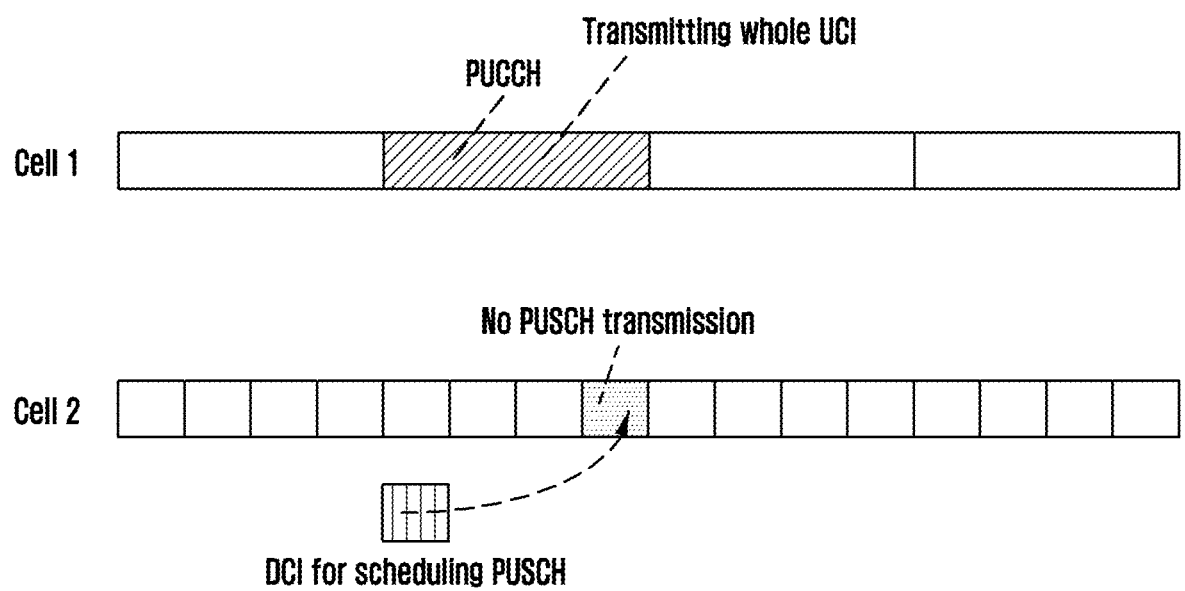
FIG. 24 schematically illustrates how UE transmits UCI according to a slot length according to a third example of the present disclosure.

When the UE receives a higher-layer signaling configuration that the PUCCH and the PUSCH cannot be transmitted simultaneously, the PUCCH is transmitted in a long slot and the PUSCH is transmitted in a short slot during a same period, and then all UCI is transmitted on the PUCCH rather than on the PUSCH. In this way, the UE may be prevented from transmitting UCI on the PUSCH rather than on the PUCCH. However, in practice, there may be no PUSCH transmission in a short-slot cell, leading to that CSI cannot be transmitted, which will affect the feedback of CSI. By using the way described above in which all UCI is transmitted on the PUCCH in the long-slot cell when the UE does not know whether there is PUSCH transmission or not in the short-slot cell, cases in which UCI is not transmitted may be avoided. In this case, if data is transmitted on the PUSCH in the short-slot cell, the configuration that the PUCCH and PUSCH cannot be transmitted simultaneously will be violated. Therefore, the PUSCH will not be transmitted even if a PDCCH for scheduling the PUSCH is received. As can be seen in FIG. 24, the UE only transmits all UCI on a PUCCH in a long-slot cell 1 but does not transmit data on a PUSCH in a short-slot cell 2 in accordance with the configuration that the PUCCH and PUSCH cannot be transmitted simultaneously. Alternatively, in this case, if the PDCCH for scheduling the PUSCH is received, the PUSCH will be transmitted, as can be seen in FIG. 23. Because if a base station does not want the UE to transmit the PUSCH, the base station may not transmit the PDCCH for scheduling the PUSCH and thus may make fuller use of the PUSCH resource to transmit uplink data according to the way described hereinbefore. For example, the UE transmits all the UCI on the PUCCH in the long-slot cell 1, and transmits data on the PUSCH in the short-slot serving cell 2.

Figure 25:
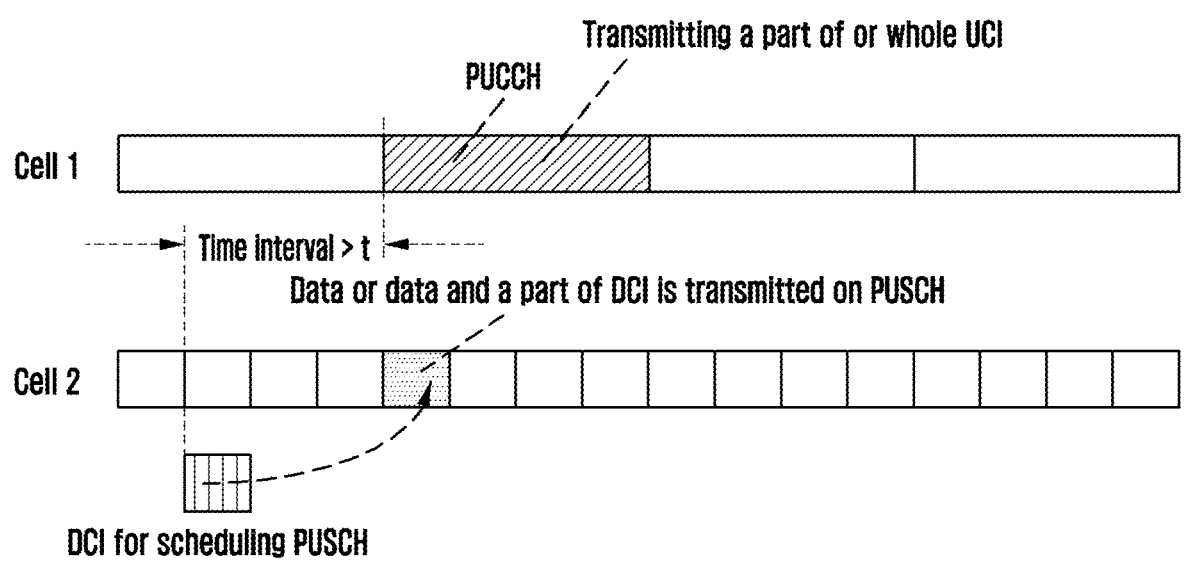
FIG. 25 schematically illustrates how UE transmits UCI according to a slot length according to a fourth example of the present disclosure.
Figure 26:
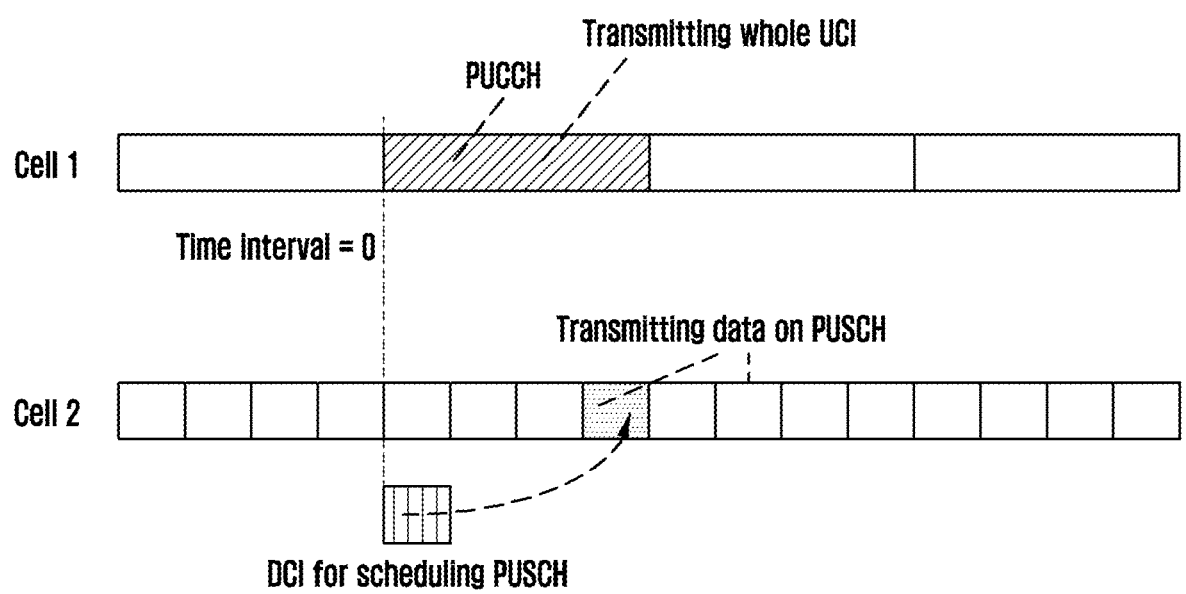
FIG. 26 schematically illustrates how UE transmits UCI according to a slot length according to a fifth example of the present disclosure.

Exemplary Way 2:

When the UE receives a higher-layer signaling configuration that the PUCCH and the PUSCH can be transmitted simultaneously, the PUCCH is transmitted in a long slot and the PUSCH is transmitted in a short slot during a same period. If a PDCCH for scheduling the PUSCH in a short slot is transmitted t ms ahead of a long PUCCH (that is, the UE has known that it will transmit the PUSCH in the short slot when starting to transmit the long PUCCH), the UE can transmit all or a part of UCI on the PUCCH, and transmit only data or transmit data and a part of UCI on the PUSCH, as can be seen in FIG. 25. If a PDCCH for scheduling a PUSCH in a short slot is transmitted t ms after a long PUCCH (that is, the UE does not know that it will transmit the PUSCH in the short slot when starting to transmit the long PUCCH), the UE can transmit all the UCI on the PUCCH, and transmit only data on the PUSCH, as can be seen in FIG. 26. The value of the "t" may be configured by a high-layer signaling or preset in a protocol, for example, t=20 ms.

Figure 27:
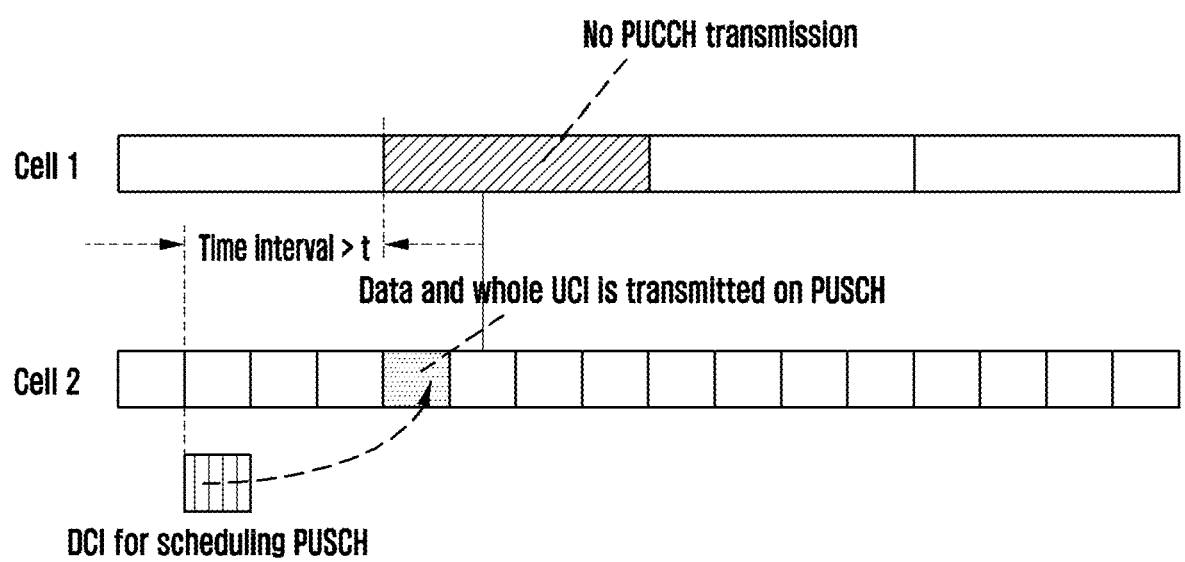
FIG. 27 schematically illustrates how UE transmits UCI according to a slot length according to a sixth example of the present disclosure.
Figure 28:
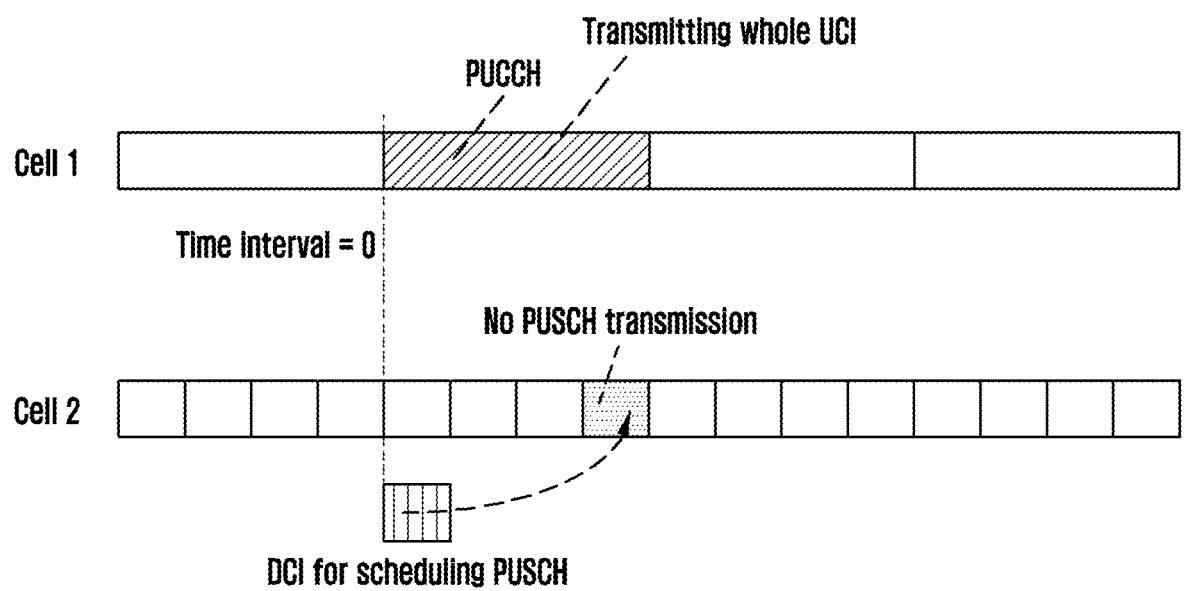
FIG. 28 schematically illustrates how UE transmits UCI according to a slot length according to a seventh example of the present disclosure.

When the UE receives a higher-layer signaling configuration that the PUCCH and the PUSCH cannot be transmitted simultaneously, the PUCCH is transmitted in a long slot and the PUSCH is transmitted in a short slot during a same period. If a PDCCH for scheduling the PUSCH in a short slot is transmitted t ms ahead of a long PUCCH (that is, the UE knows that it will transmit the PUSCH in the short slot when starting to transmit the long PUCCH), the UE transmits all the UCI and data on the PUSCH and does not transmit the PUCCH, as can be seen in FIG. 27. In this way, the UE does not transmit the PUCCH and PUSCH simultaneously, and all UCI can be transmitted. If a PDCCH for scheduling a PUSCH in a short slot is transmitted t ms after a long PUCCH (that is, the UE does not know that it will transmit the PUSCH in the short slot when starting to transmit the long PUCCH), the UE can transmit all the UCI on the PUCCH and does not transmit the PUSCH, as can be seen in FIG. 28. Alternatively, the UE transmit the whole UCI on the PUCCH, and transmit only data on the PUSCH, as can be seen in FIG. 26. The value of the "t" may be configured by a high-layer signaling or preset in a protocol, for example, t=20 ms.

Figure 29:
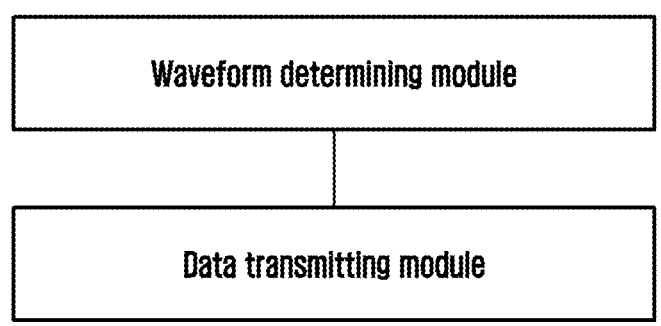
FIG. 29 is a block diagram illustrating a UE for transmitting UCI according to the present disclosure.
Figure 30:
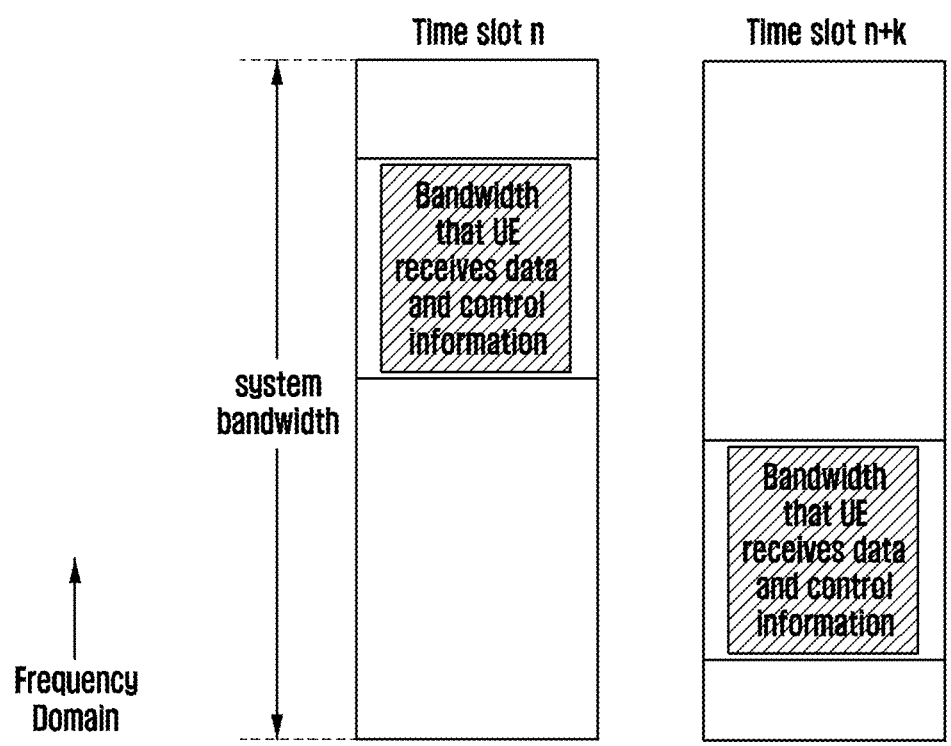
FIG. 30 is a schematic diagram illustrating a limited frequency band on which a UE operates according to the background of the present invention.

Reference is now made to FIG. 29 in which a UE for transmitting UCI according to the present disclosure is illustrate. The UE comprises a waveform determining module configured to determine a transmission waveform for a PUSCH; and a data transmitting module configured to transmit UCI and data according to the determined transmission waveform for the PUSCH.

The operation of the waveform determining module and that of the data transmitting module correspond respectively to steps 601 and 602 of the method for transmitting UCI according to the present disclosure, and will not be repeated in detail herein.

It can be seen from the above detailed description of the present disclosure, the present disclosure has at least the following advantageous technical effects as compared to the prior art:

1. The UCI and data to be transmitted on a PUCCH and a PUSCH may be deployed according to the transmission waveform for the PUSCH, therefore a higher frequency diversity gain may be obtained in the case that there are selectable transmission waveforms for the PUCCH and the PUSCH. In this way, signal distortion and spectral spread interference due to different peak to average power ratios (PAPRs) of the waveforms may be significantly reduced, and the overall transmission performance for UCI and system may be dramatically improved.

2. When a UE uses a CP-OFDM waveform for transmitting a PUSCH, more than one PUCCH may be used for simultaneously transmitting UCI and data owe to the fact that PAPR will not be increased when an OFDM waveform is used for transmitting more than one channel. In this way, transmission resource may be saved and system communication efficiency may be improved.

3. Data is transmitted on a PUCCH according to whether the PUCCH is an exclusive one or a shared one, which may improve communication resource utilization efficiency and satisfy high system security requirements.

4. UCI and data to be transmitted on a PUCCH and a PUSCH are deployed according to frequency band capacity of a UE, which not only makes full use of the frequency band capacity of the UE but also makes data transmission being less affected by UCI transmission. Therefore, better UCI transmission performance may be obtained.

It should be understood that the system, device and method disclosed in the embodiments of the present disclosure can be implemented through other ways. For example, the device described above is only illustrative. For example, units are defined only according to logical function, and they may also be implemented in other way of definition in practice. For example, more than one unit or element can be combined or integrated into another system, or some features may be ignored or not be implemented. In addition, coupling or direct coupling or communication connection illustrated or discussed may be indirect coupling or communication connection through some interface, device or unit, and may be electrical, mechanical, or in other format.

Units that are described individually may be physically separated or not. A component illustrated as a unit may be a physical unit or not, that is, it can be located at one place or distributed on a plurality of network units. Some or all of the units may be selected as required in order to achieve the objects of the embodiments.

In addition, each function unit in each embodiment of the present disclosure can be integrated into one processing unit or individually exist physically. Alternatively, two or more units may be integrated into one unit. The above integrated unit may be implemented through either hardware or a software functional unit.

It should be understood by those of ordinary skills in the art that some or all steps in the methods of the above embodiments can be performed through hardware instructed by a program. The program can be stored in a computer-readable storage medium, and the storage medium may comprise read only memory (ROM), random access memory (RAM), magnetic disk, CD or the like.

Methods and devices provided by the present disclosure have been introduced in detail above. Those of ordinary skills in the art may make changes when implementing or applying the embodiments according to the spirits of the embodiments of the present disclosure. In summary, the content of the description shall not be understood to limit the scope of the present disclosure.

Figure 31:
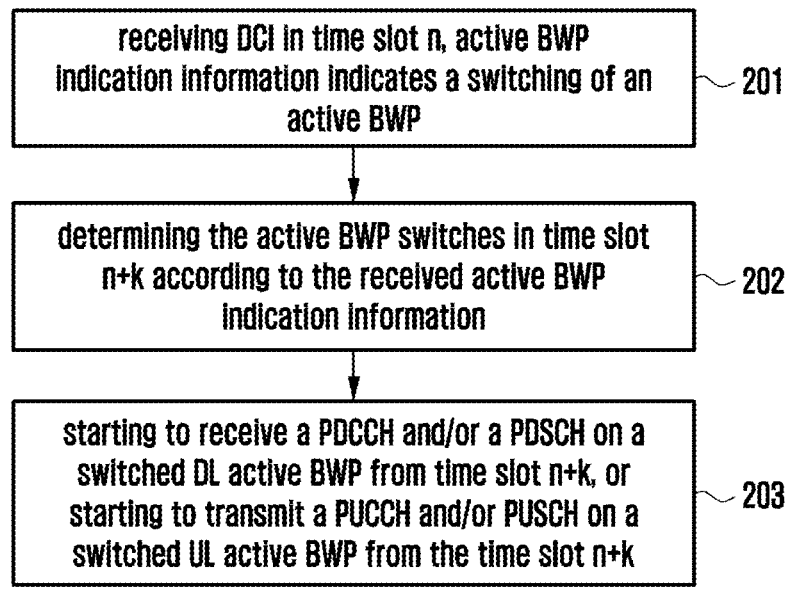
FIG. 31 is a flowchart illustrating a method of BWP switching according to the present invention.

Referring to FIG. 31, the method of BWP switching of the present invention includes the following procedures.

In step 201, DCI is received in a time unit n, and active BWP indication information in the DCI indicates a switching of an active BWP.

The active BWP indication information may indicate the active BWP is the current active BWP (i.e., the active BWP does not change), or may indicate the active BWP is a new BWP (i.e., the active BWP changes).

In step 202, a determination is made that the active BWP switches in a time unit n+k based on the received active BWP indication information (if there is a switching of the active BWP).

The k is a non-negative integer, and is a parameter to be determined in the present invention. The value of k can be determined according to the type of DCI indicating the active BWP switching and the type of spectrum. For example, the value of k of a DL DCI indicating an active BWP switching may be different to the value of k of an UL DCI indicating an active BWP switching, i.e., they should be determined respectively. In addition, the value of k of an active BWP switching in paired spectrum may be different to the value of k of an active BWP switching in unpaired spectrum, i.e., they should be determined respectively. The following embodiments will describe the method of determining the value of k in detail. In other embodiments, the value of k of a DL DCI indicating an active BWP switching may be identical to the value of k of an UL DCI indicating an active BWP switching, and the value of k of an active BWP switching in paired spectrum may be identical to the value of k of an active BWP switching in unpaired spectrum, e.g., k equals 1.

The value of k may be pre-defined in a protocol (e.g., k may be defined to be 1), or configured by higher layer signaling (e.g., configured by UE-specific higher layer signaling), or specified by physical layer signaling (e.g., specified by a bit in the DCI, the value of k may be the same with the value of k corresponding to a scheduled PDSCH or PUSCH).

For a DL active BWP, the active BWP for receiving a PDCCH and the active BWP for receiving a PDSCH may switch in the same time slot, or in different time slots. For an UL active BWP, the active BWP for transmitting a PUCCH and the active BWP for transmitting a PUSCH may switch in the same time slot, or in different time slots.

When a DCI indicates a switching of a BWP pair including an UL active BWP and a DL active BWP, the UL active BWP and the DL active BWP may switch in the same time unit, or in different time units.

In step 203, reception of a PDCCH and/or a PDSCH on a DL active BWP starts from the time unit n+k, and/or transmission of a PUCCH and/or a PUSCH on an UL active BWP starts from the time unit n+k.

The BWP switching method of the present invention is applicable to a wireless communication system where a UE is configured with at least two BWPs and at most one UL active BWP and at most one DL active BWP. The time unit of the present invention may be in unit of time slot, OFDM symbol, or OFDM symbol set, or the like. In the following embodiments of the present invention, scheduling is performed in unit of time slot as an example. The method can be easily modified to be applicable to situations where scheduling is not in unit of time slot (e.g., scheduling may be in unit of OFDM symbol or OFDM symbol set). The active BWP switching method of the present invention is illustrated with reference to the following embodiments.

Embodiment One

This embodiment provides a method in which a UE is informed of a switching of a DL active BWP by received DL DCI when paired spectrum is used (i.e., UL transmission and DL transmission use different frequency bands, e.g., FDD). That is, in a time slot n, a UE receives the DCI indicating the switching of the DL active BWP, and starts to receive a PDCCH or a PDSCH on a switched DL active BWP from a time unit n+k. There are methods of determining the time unit in which the UE starts to receive the PDCCH or the PDSCH on the switched DL active BWP, such as the following methods.

Method One

If the DL DCI indicating the switching of the DL active BWP schedules a PDSCH transmitted in one time slot, and BWP switching indication information in the DCI indicates there is a switching of the DL active BWP (i.e., the DL active BWP switches from the current BWP of the currently transmitted DCI to another DL BWP), and the PDSCH and the DCI which schedules the PDSCH are in the same time slot, the UE starts to receive the PDSCH on the switched DL active BWP from that time slot, and starts to receive the PDCCH on the switched DL active BWP from the first DL time slot subsequent to the time slot in which the PDSCH is received.

Figure 32:
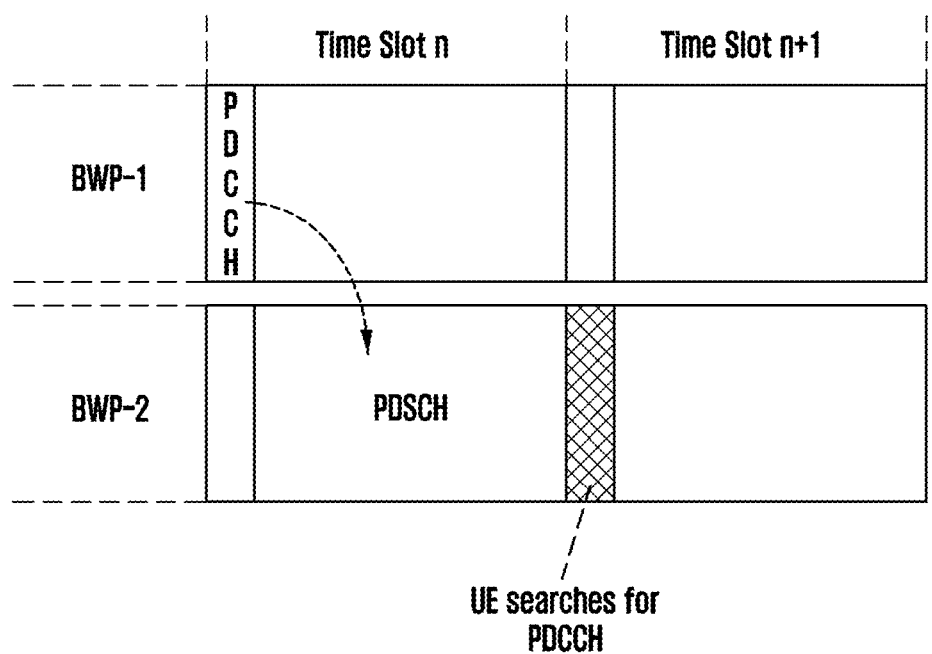
FIG. 32 is a schematic diagram illustrating BWPs on which a UE receives a PDCCH according to method one of embodiment one of the present invention.

As shown in FIG. 32, a UE is configured with two DL BWPs, denoted by BWP-1 and BWP-2. In time slot n, the UE detects a DCI indicating a switching of the DL active BWP on BWP-1 (the DCI is transmitted in a PDCCH), the DCI schedules a PDSCH transmitted on BWP-2 (indicating the active BWP switches from BWP-1 to BWP-2), and the PDSCH is transmitted also in time slot n. The UE starts to receive the PDSCH on BWP-2 from time slot n, and starts to receive a PDCCH on BWP-2 from time slot n+1. This method may expedite the enforcement of a BWP switching indication.

Method Two

If the DL DCI indicating the switching of the DL active BWP schedules a PDSCH transmitted in one time slot, and BWP switching indication information in the DCI indicates there is a switching of the DL active BWP (i.e., the DL active BWP switches from the current BWP of the currently transmitted DCI to another DL BWP), and the PDSCH and the DCI which schedules the PDSCH are in different time slots, the UE starts to receive the PDSCH on the switched DL active BWP from the time slot of the PDSCH, and starts to receive a PDCCH on the switched DL active BWP from the first DL time slot subsequent to the time slot of the PDSCH.

Figure 33:
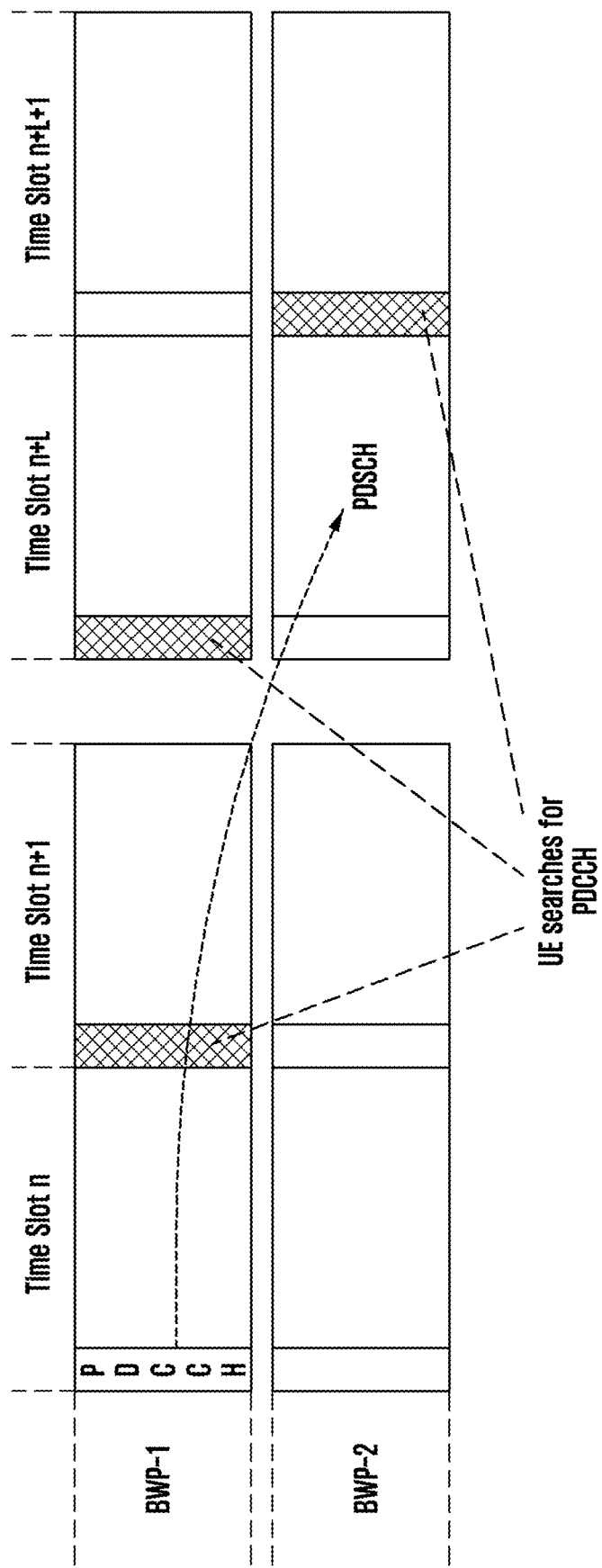
FIG. 33 is a schematic diagram illustrating BWPs on which a UE receives a PDCCH according to method two of embodiment one of the present invention.

As shown in FIG. 33, a UE is configured with two DL BWPs, denoted by BWP-1 and BWP-2. In time slot n, the UE detects a DCI indicating a switching of a DL active BWP on BWP-1 (the DCI is transmitted in a PDCCH), and the DCI schedules a PDSCH transmitted on BWP-2 in time slot n+L (L is a positive integer, e.g., indicated in physical layer signaling in the DCI or configured by higher layer signaling, or pre-defined in a protocol). The UE may start to receive the PDSCH on BWP-2 from time slot n+L, start to receive a PDCCH on BWP-2 from time slot n+L+1, and start to receive a PDCCH on BWP-1 from time slot n+1 to time slot n+L. This method can avoid resource consumption of multiple BWP switchings.

Method Three

If the DL DCI indicating the switching of the DL active BWP schedules a PDSCH in one time slot, BWP switching indication information in the DCI indicates there is a switching of the DL active BWP (i.e., the DL active BWP switches from the current BWP of the currently transmitted DCI to another DL BWP), and the PDSCH and the DCI which schedules the PDSCH are in different time slots, the UE starts to receive the PDSCH on the switched DL active BWP from the time slot of the PDSCH, and starts to receive a PDCCH on the switched DL active BWP from the time slot of the PDSCH.

Figure 34:
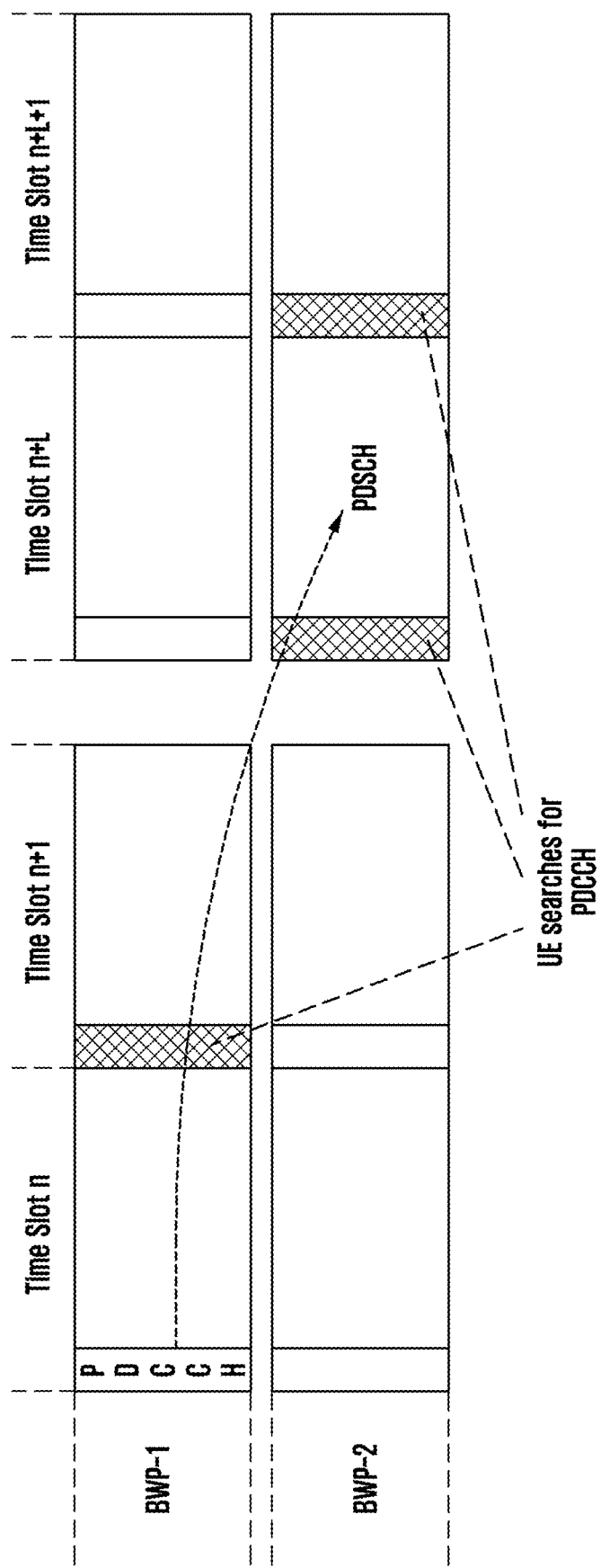
FIG. 34 is a schematic diagram illustrating BWPs on which a UE receives a PDCCH according to method three of embodiment one of the present invention.

As shown in FIG. 34, a UE is configured with two DL BWPs, denoted by BWP-1 and BWP-2. In time slot n, the UE detects a DCI indicating a switching of a DL active BWP on BWP-1 (the DCI is transmitted in a PDCCH), and the DCI schedules a PDSCH transmitted on BWP-2 in time slot n+L (L is a positive integer, e.g., indicated in physical layer signaling in the DCI or configured by higher layer signaling, or pre-defined in a protocol). The UE may start to receive the PDSCH on BWP-2 from time slot n+L, start to receive a PDCCH on BWP-2 from time slot n+L+1, and start to receive a PDCCH on BWP-1 from time slot n+1 to time slot n+L-1.

Method Four

If the DL DCI indicating the switching of the DL active BWP schedules a PDSCH in one time slot, BWP switching indication information in the DCI indicates there is a switching of the DL active BWP (i.e., the DL active BWP switches from the current BWP of the currently transmitted DCI to another DL BWP), and the PDSCH and the DCI which schedules the PDSCH are in different time slots or in the same time slot, the UE starts to receive a PDCCH on the switched DL active BWP from the m'th DL time slot subsequent to the time slot of the DCI which indicates the switching of the DL active BWP (m is a non-negative integer, may be pre-defined in a protocol, or configured by higher layer signaling, e.g., m may be 1), and starts to receive the PDSCH on the switched DL active BWP from the time slot of the PDSCH.

Figure 35:
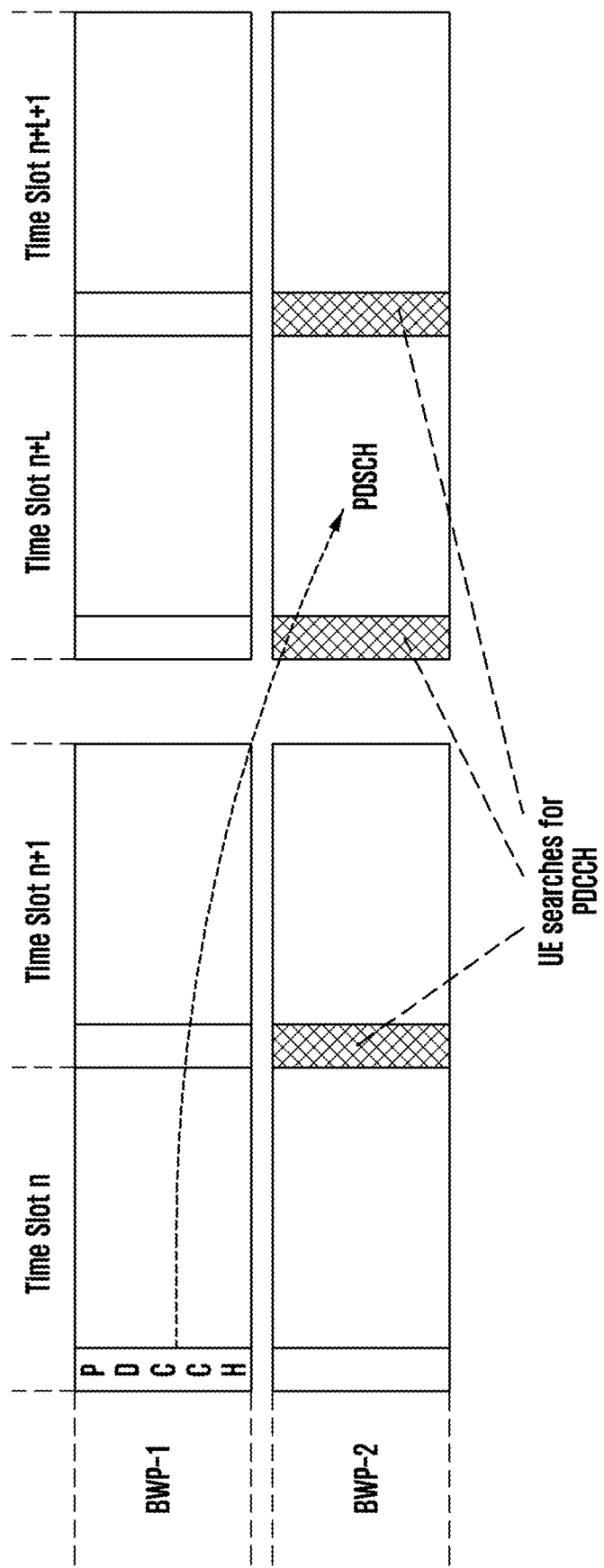
FIG. 35 is a schematic diagram illustrating BWPs on which a UE receives a PDCCH in an example according to method four of embodiment one of the present invention.
Figure 36:
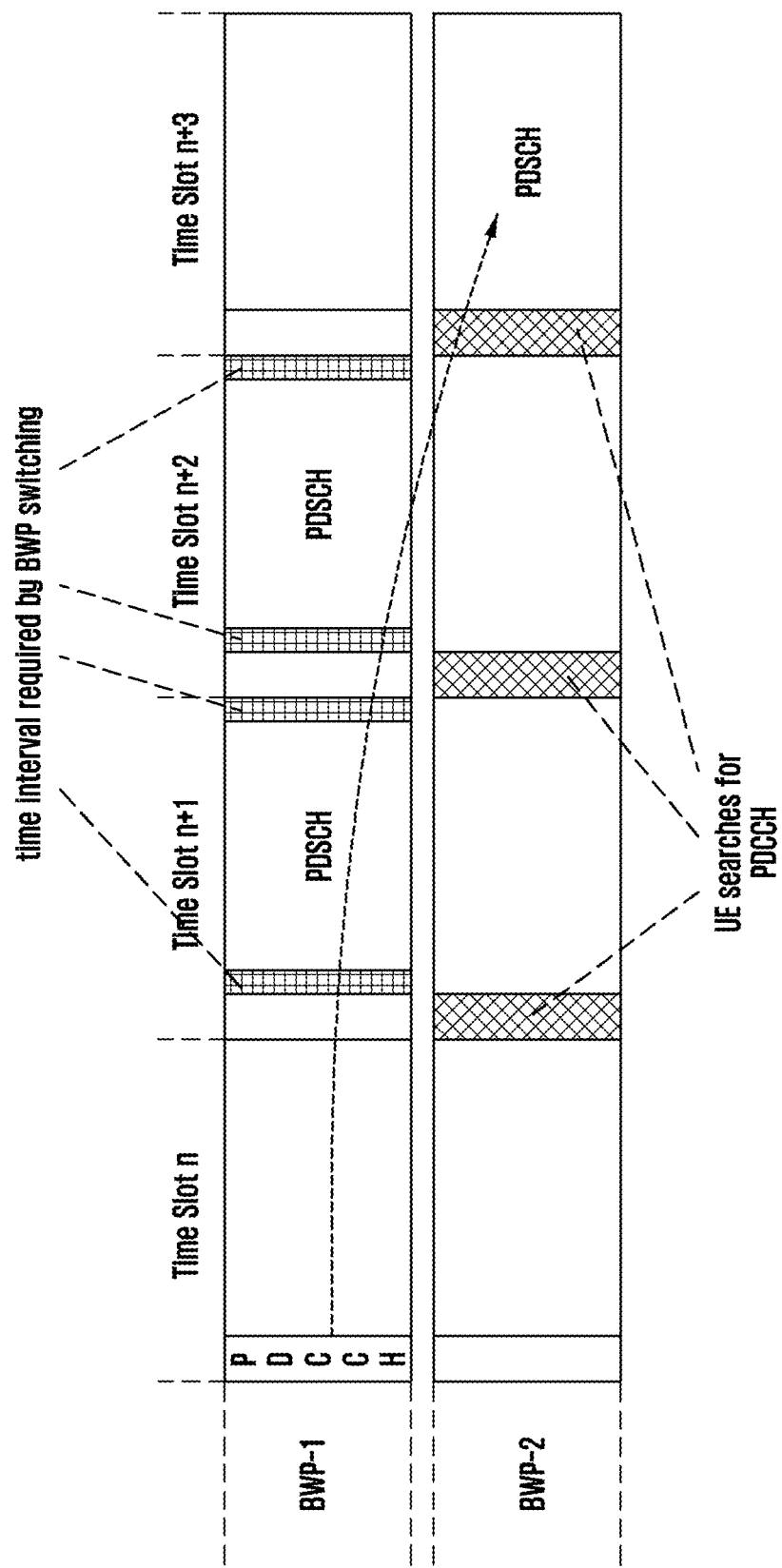
FIG. 36 is a schematic diagram illustrating BWPs on which a UE receives a PDCCH in another example according to method four of embodiment one of the present invention.

As shown in FIG. 35, a UE is configured with two DL BWPs, denoted by BWP-1 and BWP-2. In time slot n, the UE detects a DCI indicating a switching of a DL active BWP on BWP-1 (the DCI is transmitted in a PDCCH), and the DCI schedules a PDSCH transmitted on BWP-2 in time slot n+L (L is a positive integer, e.g., indicated in physical layer signaling in the DCI or configured by higher layer signaling, or pre-defined in a protocol). The UE may start to receive the PDSCH on BWP-2 from time slot n+L, and start to receive a PDCCH on BWP-2 from time slot n+1 (supposing the above m is 1). This method can enable reception of a PDCCH and a PDSCH on the switched DL active BWP as early as possible, but may consume some resources for multiple BWP switchings. For example, when a UE is configured with two DL BWPs, denoted by BWP-1 and BWP-2 and detects DCI indicating a switching of a DL active BWP on BWP-1 in time slot n (the DCI is transmitted in PDCCH), the DCI schedules a PDSCH transmitted on BWP-2 in time slot n+3, the UE may receive a PDSCH on BWP-2 in time slot n+3, and check BWP-2 for a PDCCH in time slots n+1 and n+2. When the UE detects in time slot n−2 that the PDSCH scheduled by the DCI is transmitted on BWP-1 in time slot n+1, and detects in time slot n−1 that the PDSCH scheduled by the DCI is transmitted on BWP-1 in time slot n+2, the UE may receive a PDCCH on BWP-1 in time slot n. In time slot n+1, the UE first switches to BWP-2 to receive a PDCCH, then switches to BWP-1 to receive a PDSCH. In time slot n+2, the UE first switches to BWP-2 to receive a PDCCH, then switches to BWP-1 to receive a PDSCH. In time slot n+3, the UE first switches to BWP-2 to receive a PDCCH, then receives a PDSCH on BWP-2, as shown in FIG. 36. According to the method, there are multiple switchings between BWP-1 and BWP-2. The method can enable reception of a PDCCH and a PDSCH on the switched DL active BWP as early as possible, but may cause multiple BWP switchings which consume extra resources.

Method Five

If the DL DCI indicating a switching of a DL active BWP schedules a PDSCH in one time slot, and BWP switching indication information in the DCI indicates a switching of the DL active BWP (i.e., the DL active BWP switches from a BWP of the currently transmitted DCI to another DL BWP), the UE may receive a PDSCH on a current active BWP, and starts to receive a PDCCH on the switched DL active BWP from the m'th time slot subsequent to the time slot of the DCI (m is a non-negative integer, may be pre-defined in a protocol, or configured by higher layer signaling, e.g., m may be 1).

Figure 37:
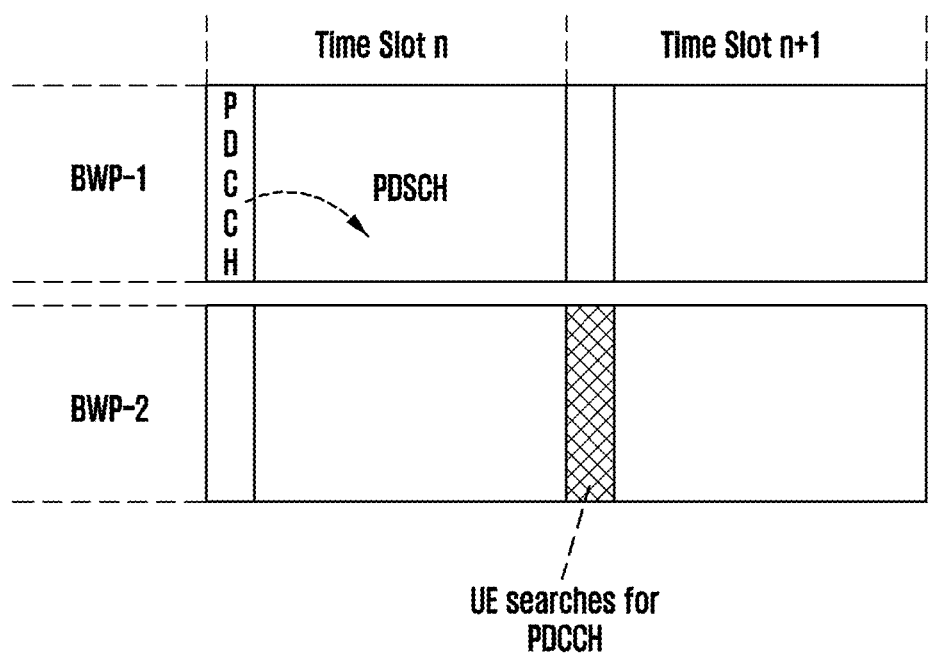
FIG. 37 is a schematic diagram illustrating BWPs on which a UE receives a PDCCH according to method five of embodiment one of the present invention.

As shown in FIG. 37, a UE is configured with two DL BWPs, denoted by BWP-1 and BWP-2. In time slot n, the UE detects DCI indicating a switching of a DL active BWP on BWP-1 (the DCI is transmitted in PDCCH), the DCI schedules a PDSCH transmitted in time slot n. The UE receives the PDSCH on BWP-1 in time slot n, and starts to receive a PDCCH on BWP-2 from time slot n+p (p is determined by a protocol, or configured by higher layer signaling, e.g., p may be 1). This method is also applicable to situations where scheduling is not in unit of time slot. If scheduling is not carried out in unit of time slot, e.g., in unit of two OFDM symbols, the PDCCH and the PDSCH scheduled by the PDCCH are transmitted in the same unit of 2 OFDM symbol, there is no sufficient time that can serve as the time interval for BWP switching, thus the BWP for transmitting the PDSCH should be the same BWP for transmitting the PDCCH which schedules the PDSCH, and a PDCCH in another time unit may be received on the switched DL active BWP.

Figure 38:
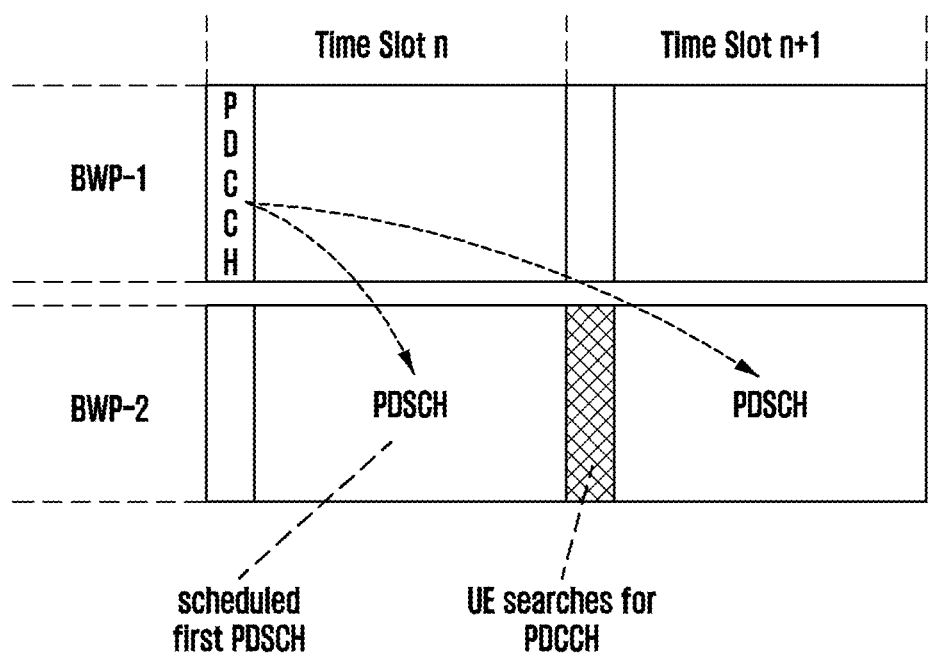
FIG. 38 is a schematic diagram illustrating BWPs on which a UE receives a PDCCH when the PDCCH schedules a PDSCH transmitted in at least two time slots according to embodiment one of the present invention.

When a PDCCH schedules a PDSCH transmitted in at least two time slots, the above five methods can be used, and the scheduled PDSCH is the first PDSCH of the PDSCH in the at least two time slots. For example, according to the above method one, when a PDCCH schedules a PDSCH transmitted in at least two time slots, the method may be modified to be: if the DCI indicating a switching of a DL active BWP schedules a PDSCH transmitted in at least two time slots, and BWP switching indication information in the DCI indicates a switching of the DL active BWP (i.e., the DL active BWP switches from the BWP of the currently transmitted DCI to another DL BWP), and the PDSCH in the first time slot of the two time slots is in the same time slot with the DCI which schedules the PDSCH, the UE starts to receive the PDSCH on the switched DL active BWP from that time slot, and starts to receive a PDCCH on the switched DL active BWP from the first DL time slot subsequent to the time slot in which the PDSCH is received. As shown in FIG. 38, a UE is configured with two DL BWPs, denoted by BWP-1 and BWP-2. In time slot n, the UE detects DCI indicating a switching of a DL active BWP on BWP-1 (the DCI is transmitted in a PDCCH), the DCI schedules a PDSCH transmitted on BWP-2, and the PDSCH is transmitted in time slot n and time slot n+1. The UE starts to receive the PDSCH on BWP-2 from time slots n and n+1, and starts to receive a PDCCH on BWP-2 from time slot n+1. Such modifications are also applicable to methods two to five.

Embodiment Two

This embodiment provides a method where a UE is informed of a switching of an UL active BWP by received DCI when paired spectrum is used. That is, a UE receives DCI in time slot n which indicates a switching of an UL active BWP, and starts to transmit a PUSCH or a PUCCH on a switched UL active BWP from a time slot n+k.

Figure 39:
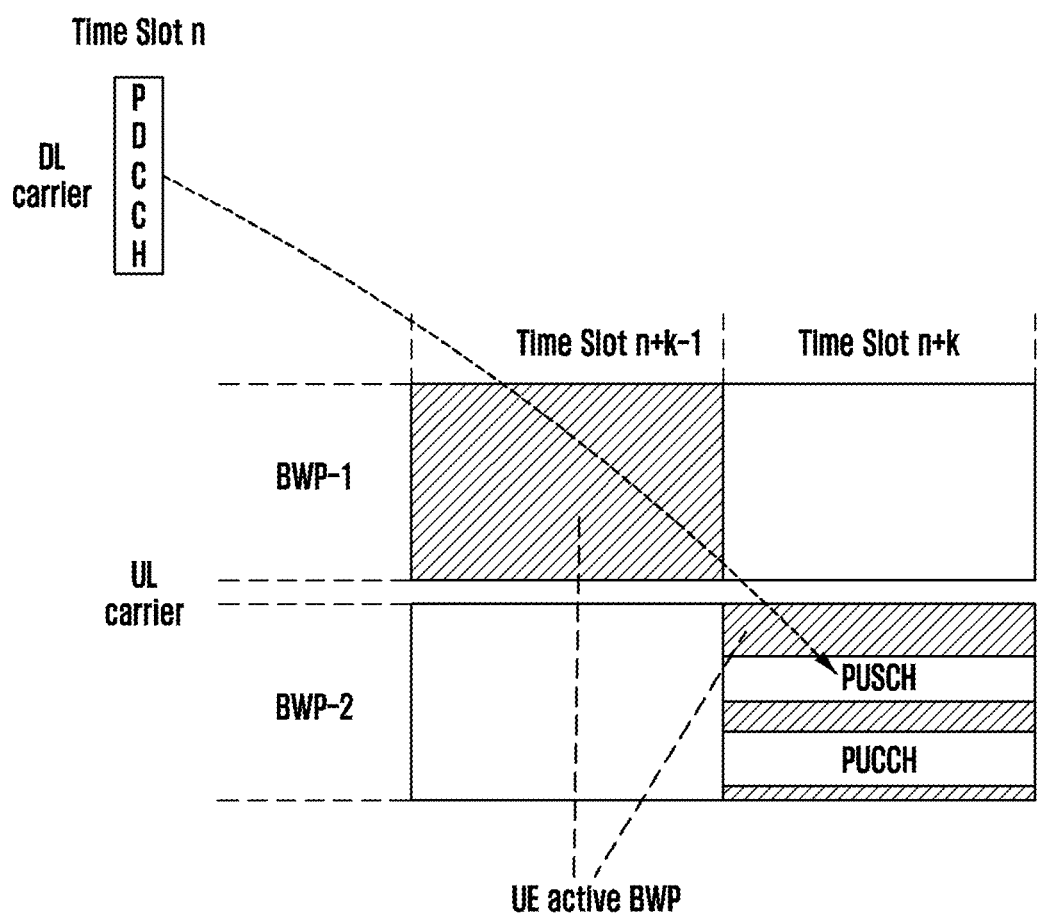
FIG. 39 is a schematic diagram illustrating BWPs on which a UE transmits a PUSCH and a PUCCH according to embodiment two of the present invention.

If the UL DCI indicating the switching of the UL active BWP schedules a PUSCH transmitted in one time slot, and the UL DCI indicates there is a change of the UL active BWP, the UE starts to transmit a PUSCH and a PUCCH on the switched UL active BWP from the time slot of the scheduled PUSCH. As shown in FIG. 39, a UE is configured with two UL BWPs, denoted by BWP-1 and BWP-2. In time slot n, the UE receives UL DCI which indicates a switching of a UL active BWP (the DCI is transmitted in PDCCH). A current UL active BWP is BWP-1 before time slot n. The DCI schedules a PUSCH transmitted on BWP-2 in time slot n+k and indicates the UL active BWP switches from BWP-1 to BWP-2. The UE starts to transmit the PUSCH on BWP-2 from time slot n+k, and starts to transmit a PUCCH on BWP-2 from time slot n+k. The UL active BWP switches to BWP-2 in time slot n+k, and the UE starts to transmit a PUSCH and a PUCCH on the switched UL active BWP-2 from time slot n+k.

Embodiment Three

This embodiment provides a method where a UE is informed of a switching of a BWP pair including a DL active BWP and an UL active BWP by received DL DCI when unpaired spectrum is used (i.e., the same frequency band is used both for UL and DL transmission, i.e., in TDD). That is, in time slot n, the UE receives DCI which indicates a switching of a BWP pair which includes a DL active BWP and an UL active BWP, starts to receive a PDCCH or a PDSCH on a switched DL active BWP from time slot n+k1, and starts to transmit a PUCCH or a PUSCH on a switched active BWP from time slot n+k2. The k1 may equal the k2, i.e., the DL active BWP and the UL active BWP in the BWP pair may start to switch in the same time unit. The k1 and the k2 may be determined respectively, and may be identical to each other, or may be different from to each other, i.e., the DL active BWP and the UL active BWP in the BWP pair may start to switch in different time units. This embodiment can use the following methods to determine the time unit in which the UE starts to receive a PDCCH or a PDSCH on the switched DL active BWP and the time unit in which the UE starts to transmit a PUCCH or a PUSCH on the switched UL active BWP.

Method One

According to this method, a UE is informed of a switching of a BWP pair including a DL active BWP and an UL active BWP by received DL DCI. That is, in time slot n, the UE receives DCI which indicates a switching of a BWP pair including a DL active BWP and an UL active BWP, starts to receive a PDCCH or a PDSCH on a switched DL active BWP from a time slot n+k1, and starts to transmit a PUCCH or a PUSCH on a switched UL active BWP from a time slot n+k2. In this method, the k1 may equal the k2, i.e., the DL active BWP and the UL active BWP in the BWP pair start to switch in the same time unit. That is, in time slot n, the UE receives DCI which indicates a switching of a BWP pair which includes a DL active BWP and an UL active BWP, starts to receive a PDCCH or a PDSCH on a switched DL active BWP from time slot n+k, and starts to transmit a PUCCH or a PUSCH on a switched active BWP from time slot n+k.

The time slot in which the UE starts to receive the PDCCH or the PDSCH on the switched DL active BWP may be determined according to any of the methods one to five described in embodiment one.

The time slot in which the UE starts to transmit the PUCCH or the PUSCH on the switched UL active BWP is the first time slot for UL transmission subsequent to the time slot in which the UE starts to receive the PDCCH or the PDSCH on the switched DL active BWP in various methods of the above embodiment one. The first time slot for UL transmission may be for PUCCH transmission or PUSCH transmission.

Figure 40:
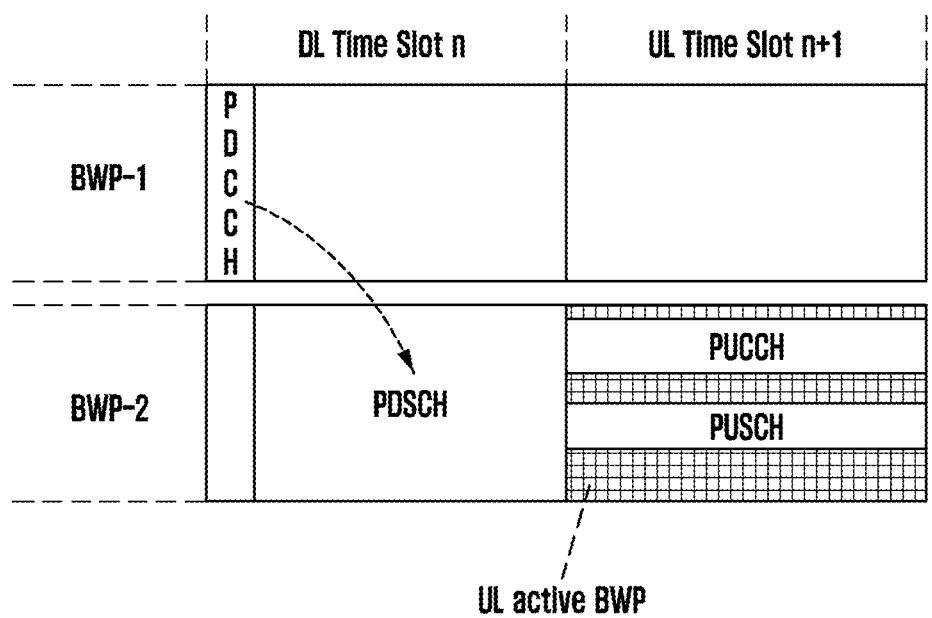
FIG. 40 is a schematic diagram illustrating BWPs on which a UE transmits a PUSCH and a PUCCH according to method one of embodiment three of the present invention.

For example, in time slot n, a UE receives DCI which indicates a switching of a BWP pair including a DL active BWP and an UL active BWP, the DCI is transmitted on DL BWP-1, and the BWP pair switching indication information in the DCI indicates the BWP pair changes. In time slot n, the DCI schedules a PDSCH transmitted in time slot n, the PDSCH is transmitted on a switched DL active BWP-2, time slot n does not include UL transmission, and time slot n+1 is an UL time slot. The UE may start to transmit the PUCCH and/or the PUSCH on a switched UL active BWP-2 from time slot n+1 (if the PUCCH and/or the PUSCH is required to be transmitted in the time slot), as shown in FIG. 40.

Method Two

According to this method, a UE is informed of a switching of a BWP pair including a DL active BWP and an UL active BWP by received DL DCI. That is, in time slot n, the UE receives DCI which indicates a switching of a BWP pair including a DL active BWP and an UL active BWP, starts to receive a PDCCH or a PDSCH on a switched DL active BWP from a time slot n+k1, and starts to transmit a PUCCH or a PUSCH on a switched UL active BWP from a time slot n+k2. In this method, the k1 and the k2 are determined respectively, and may be identical to or different from each other. For example, k1 may be smaller than or equal to k2, i.e., the DL active BWP and the UL active BWP in the BWP pair starts to switch in different time slots. That is, in time slot n, the UE receives DCI which indicates a switching of a BWP pair which includes a DL active BWP and an UL active BWP, starts to receive a PDCCH or a PDSCH on a switched DL active BWP from time slot n+k1, and starts to transmit a PUCCH or a PUSCH on a switched active BWP from time slot n+k2. This method can reduce collision between PUCCH resources and PUSCH resources.

The k1 of the time unit n+k1 in which the UE starts to receive the PDCCH or the PDSCH on the switched DL active BWP may be determined according to any of the methods one to five described in embodiment one.

The k2 of the time unit n+k2 in which the UE starts to transmit the PUCCH or the PUSCH on the switched UL active BWP may be determined according to a time unit in which HARQ-ACK corresponding to the DCI indicating the BWP pair switching is transmitted or a time unit in which HARQ-ACK corresponding to the PDSCH scheduled by the DCI is transmitted, the UL active BWP of the UE may switch in the time unit, and the UE transmits the PUCCH and/or the PUSCH on switched UL active BWP. For example, the DCI indicating the BWP pair switching is transmitted in time slot n, and the HAQR-ACK of the PDSCH scheduled by the DCI is transmitted in time slot n+m, the UL active BWP of the UE may switch in the time slot n+m, i.e., k2 equals m. In another example, the k2 may be pre-defined in a protocol, or configured by higher layer signaling, or indicated respectively in physical layer signaling, e.g., k2 is 4. In another example, the k2 may be determined according to a timing relation of the scheduled UL PUSCH. For example, the DL DCI indicating BWP pair switching is transmitted in time slot n, the timing relation of the scheduled PUSCH is: if the DCI which schedules the PUSCH is transmitted in time slot n and the UE transmits the PUSCH in time slot n+p, no matter whether there is a PUSCH scheduled in time slot n, the UL active BWP switches in time slot n+p as long as the DL DCI indicating the BWP pair switching received by the UE in time slot n is transmitted in time slot n, i.e., k2 equals p, and the UE starts to transmit a PUCCH and/or a PUSCH on the switched UL active BWP from time slot n+p.

Figure 41:
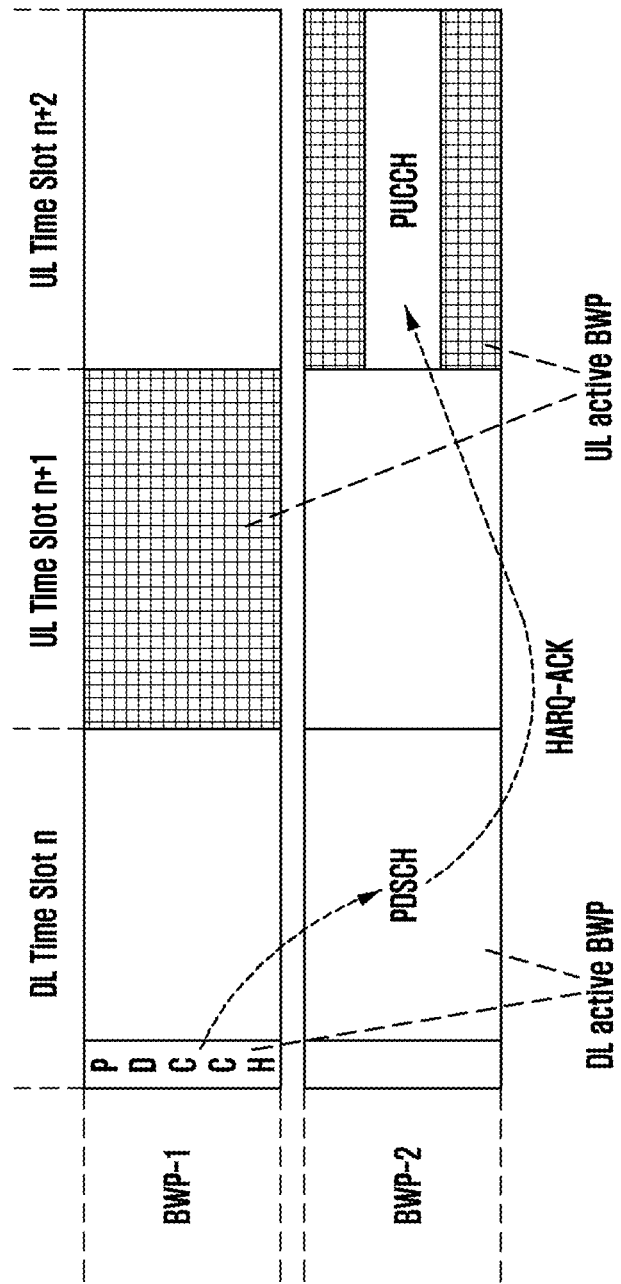
FIG. 41 is a schematic diagram illustrating BWPs on which a UE transmits a PUSCH and a PUCCH according to method two of embodiment three of the present invention.

For example, in time slot n, a UE receives DCI which indicates a switching of a BWP pair including a DL active BWP and an UL active BWP, the DCI is transmitted on DL BWP-1, and the BWP pair switching indication information in the DCI indicates there is a switching of the BWP pair. In time slot n, the DCI schedules a PDSCH transmitted in time slot n, the PDSCH is transmitted on a switched DL active BWP-2, HARQ-ACK of the PDSCH is transmitted in time slot n+2 according to HARQ timing relation, and time slots n+1 and n+2 are UL time slots. The UE may transmit a PUCCH and/or a PUSCH on a current UL active BWP-1 in time slot n+1 (if the PUCCH and/or the PUSCH is required to be transmitted in the time slot), and start to transmit a PUCCH and/or a PUSCH on a switched UL active BWP-2 from time slot n+2 (if the PUCCH and/or the PUSCH is required to be transmitted in the time slot), as shown in FIG. 41.

Figure 42:
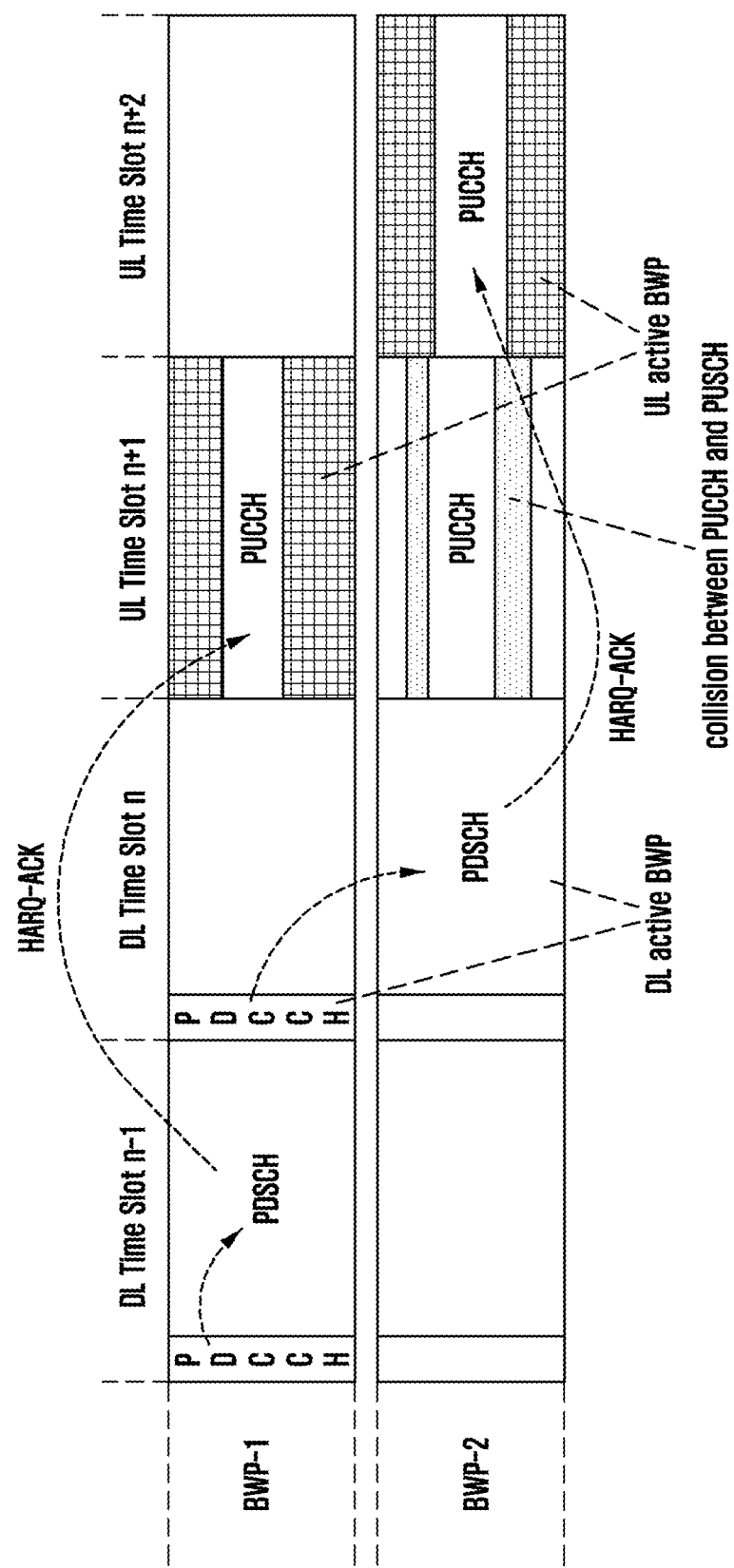
FIG. 42 is a schematic diagram illustrating avoiding collision between resources of a PUSCH and resources of a PUCCH according to method two of embodiment three of the present invention.

This method can try to avoid collision between PUCCH resources and PUSCH resources. For example, in time slot n, a UE receives DCI on DL active BWP-1, the DCI schedules transmission of a PDSCH in time slot n−1 on the DL active BWP-1, HARQ-ACK of the PDSCH in time slot n−1 is transmitted in time slot n+1 on UL active BWP-1 (because in time slot n−1, the base station does not know the switching of the UL active BWP, and allocates PUCCH resources assuming HARQ-ACK is transmitted on UL active BWP-1; if the HARQ-ACK of the PDSCH transmitted in time slot n−1 is transmitted in time slot n+1 on the switched UL active BWP-2 specified by the DCI transmitted in time slot n, the HARQ-ACK may be collided with a PUSCH scheduled in the time slot n+1 (the PUSCH is scheduled in a UL DCI in time slot n−1)). The UE receives the DCI indicating the BWP pair switching in time slot n, BWP pair switching indication information in the DCI indicates there is a switching of the UL/DL active BWP pair, and in time slot n, and the DCI schedules a PDSCH transmitted in time slot n. The PDSCH is transmitted on a switched DL active BWP-2, and HARQ-ACK of the PDSCH is transmitted in time slot n+2 according to HARQ timing relation. The time slot n+2 is an UL time slot. In time slot n+2 on a switched UL active BWP-2, the UE transmits the HARQ-ACK corresponding to the PDSCH transmitted in PUCCH time slot n, as shown in FIG. 42. As shown in FIG. 42, when this method is not used, a PUCCH and a PUSCH may collide with each other on BWP-2 in UL time slot n+1.

Embodiment Four

This embodiment describes a method where a UE is informed of a switching of a BWP pair including a DL active BWP and an UL active BWP by received UL DCI when unpaired spectrum is used. That is, in time slot n, the UE receives DCI which indicates a switching of a BWP pair which includes a DL active BWP and an UL active BWP, starts to receive a PDCCH or a PDSCH on a switched DL active BWP from time slot n+k1, and starts to transmit a PUCCH or a PUSCH on a switched active BWP from time slot n+k2. The k1 may equal the k2, i.e., the DL active BWP and the UL active BWP in the BWP pair start to switch in the same time unit.

The k1 and the k2 may be determined respectively, may be identical to each other, or may be different from each other, i.e., the DL active BWP and the UL active BWP in the BWP pair start to switch in different time units.

This embodiment can use various methods to determine the time unit in which the UE starts to receive a PDCCH or a PDSCH on the switched DL active BWP and the time unit in which the UE starts to transmit a PUCCH or a PUSCH on the switched UL active BWP.

Method One

According to this method, a UE is informed of a switching of a BWP pair including a DL active BWP and an UL active BWP by received UL DCI. That is, in time slot n, the UE receives DCI which indicates a switching of a BWP pair including a DL active BWP and an UL active BWP, starts to receive a PDCCH or a PDSCH on a switched DL active BWP from a time slot n+k1, and starts to transmit a PUCCH or a PUSCH on a switched UL active BWP from a time slot n+k2. In this method, the k1 may equal k2, i.e., the DL active BWP and the UL active BWP in the BWP pair start to switch in the same time unit. That is, in time slot n, the UE receives the UL DCI which indicates a switching of a BWP pair which includes a DL active BWP and an UL active BWP, starts to receive a PDCCH or a PDSCH on a switched DL active BWP from time slot n+k, and starts to transmit a PUCCH or a PUSCH on a switched active BWP from time slot n+k. If the UL DCI indicating the switching of the UL/DL BWP pair schedules a PUSCH in time slot m, the value of k can be obtained according to the value of m, e.g., k may be equal to m. In another example, the value of k may be pre-defined in a protocol, configured by higher layer signaling, or indicated by physical layer signaling.

Figure 43:
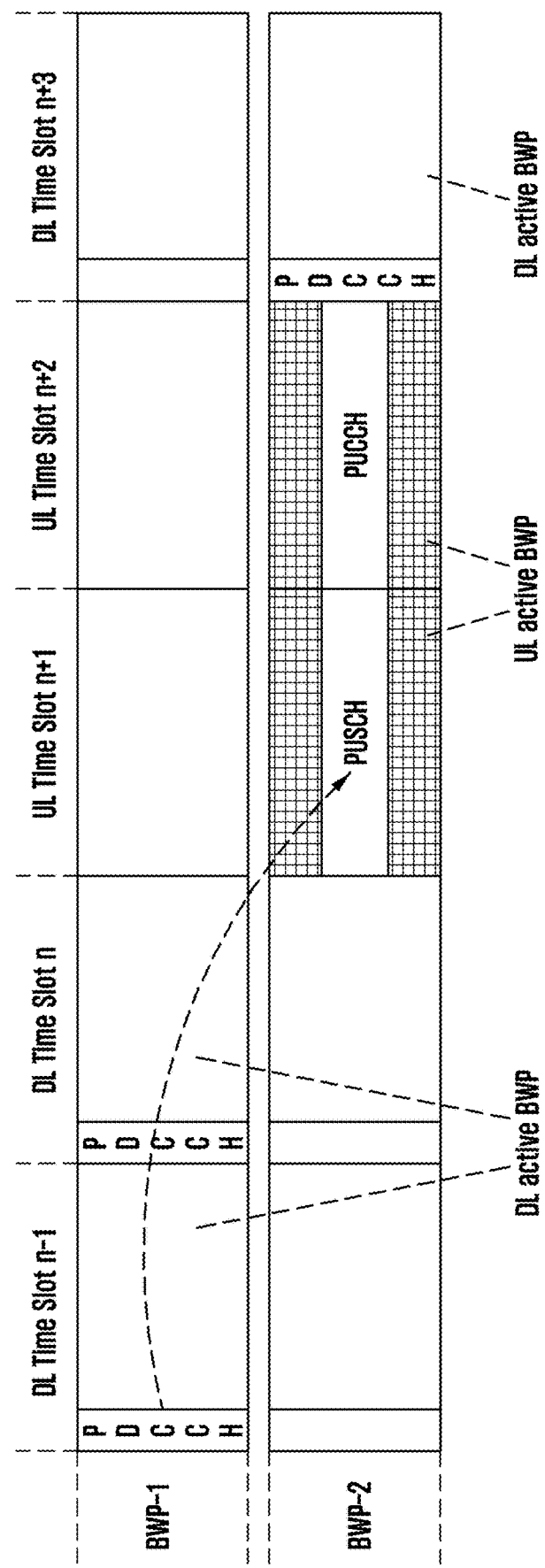
FIG. 43 is a schematic diagram illustrating BWPs on which a UE receives a PDCCH and a PDSCH and transmits a PUSCH and a PUCCH according to method one of embodiment four of the present invention.

For example, a UE is informed of a switching of a DL-UL active BWP pair by received UL DCI. That is, in time slot n−1, the UE receives the UL DCI indicating the switching of the DL-UL active BWP pair. The UL DCI indicates the DL active BWP and the UL active BWP switch from BWP-1 to BWP-2. The UL DCI schedules a PUSCH transmitted in time slot n+1. The UE starts to receive a PDCCH or a PDSCH from the switched DL active BWP from time slot n+1, and starts to transmit a PUCCH or a PUSCH on the switched UL active BWP from time slot n+1, as shown in FIG. 43.

Method Two

According to this method, a UE is informed of a switching of a BWP pair including a DL active BWP and an UL active BWP by received UL DCI. That is, in time slot n, the UE receives DCI which indicates a switching of a BWP pair including a DL active BWP and an UL active BWP, starts to receive a PDCCH or a PDSCH on a switched DL active BWP from a time slot n+k1, and starts to transmit a PUCCH or a PUSCH on a switched UL active BWP from a time slot n+k2. In this method, the k1 and the k2 are determined respectively, may be identical or different, e.g., k1 may be smaller than or equal to k2.

The k1 may be pre-defined in a protocol (e.g., k1 may be 1, i.e., the UE starts to receive a PDCCH or a PDSCH on the switched DL active BWP from time slot n+1 after in time slot n receiving a DCI in which BWP pair indication information indicates a switching of the DL-UL active BWP pair), or configured by higher layer signaling. The k2 may be determined according to the method one of this embodiment.

Figure 44:
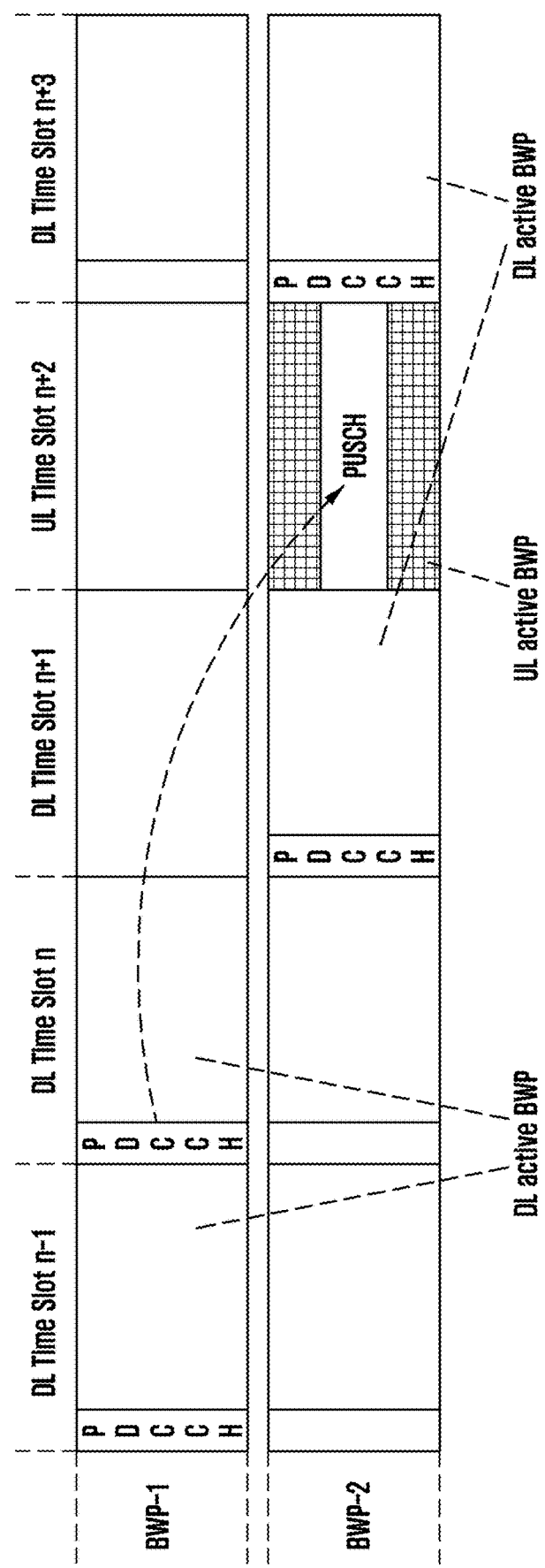
FIG. 44 is a schematic diagram illustrating BWPs on which a UE receives a PDCCH and a PDSCH and transmits a PUSCH and a PUCCH according to method two of embodiment four of the present invention.

For example, a UE is informed of a switching of a DL-UL active BWP pair by received UL DCI. That is, in time slot n−1, the UE receives the UL DCI indicating the switching of the DL-UL active BWP pair. The UL DCI indicates the DL active BWP and the UL active BWP switch from BWP-1 to BWP-2. The UL DCI schedules a PUSCH transmitted in time slot n+2. The UE starts to transmit a PUCCH or a PUSCH on the switched UL active BWP from time slot n+2, and starts to receive a PDCCH or a PDSCH from the switched DL active BWP from time slot n+1, as shown in FIG. 44.

Example Five

When time slot aggregation (i.e., multi-slot scheduling) is applied, for unpaired spectrum, the DL active BWP starts to switch from the first time slot of multiple time slots corresponding to a PDSCH scheduled by a slot aggregation PDCCH. For example, DL DCI in time slot n schedules PDSCH in time slots n+1, n+2, n+3, n+4, and UL DCI in time slot n+1 indicates the DL active BWP switches from DL BWP-1 to DL BWP-2 in time slot n+2. In time slot n+2, transmission of the PDSCH scheduled by the same PDCCH has not been finished, thus the DL active BWP switches from DL BWP-1 to DL BWP-2 in time slot n+5.

In another example, when slot aggregation is applied, for unpaired spectrum, the switching starts in the first time slot of multiple time slots that have the same precoding scheme. For example, DL DCI in time slot n schedules PDSCH in time slots n+1, n+2, n+3, n+4, time slots n+1 and n+2 have the same precoding scheme, and time slots n+3 and n+4 have the same precoding scheme. UL DCI in time slot n+1 indicates the DL active BWP switches from DL BWP-1 to DL BWP-2 in time slot n+2. In time slot n+2, transmission of the PDSCH having the same precoding scheme in time slots n+1 and n+2 has not been finished, thus the DL active BWP switches from DL BWP-1 to DL BWP-2 in time slot n+3.

For unpaired spectrum in slot aggregation, the UL active BWP starts to switch from the first time slot of multiple time slots corresponding to PUSCH scheduled by a slot aggregation PDCCH. For example, UL DCI in time slot n schedules a PUSCH transmitted in time slots n+1, n+2, n+3, n+4, and DL DCI in time slot n+1 indicates the UL active BWP switches from UL BWP-1 to UL BWP-2 in time slot n+2. In time slot n+2, transmission of the PUSCH scheduled by the same PDCCH has not been finished, thus the UL active BWP switches from UL BWP-1 to UL BWP-2 in time slot n+5.

In another example, for unpaired spectrum in slot aggregation, the switching starts in the first time slot of multiple time slots that have the same precoding scheme. For example, UL DCI in time slot n schedules a PUSCH transmitted in time slots n+1, n+2, n+3, n+4. Time slot n+1 uses the same precoding scheme with time slot n+2, and time slot n+3 uses the same precoding scheme with time slot n+4. DL DCI in time slot n+1 indicates the UL active BWP switches from UL BWP-1 to UL BWP-2 in time slot n+2. In time slot n+2, transmission of the PUSCH in time slots n+1 and n+2 using the same precoding scheme has not been finished, thus the UL active BWP switches from UL BWP-1 to UL BWP-2 in time slot n+3.

Embodiment Six

Figure 45:
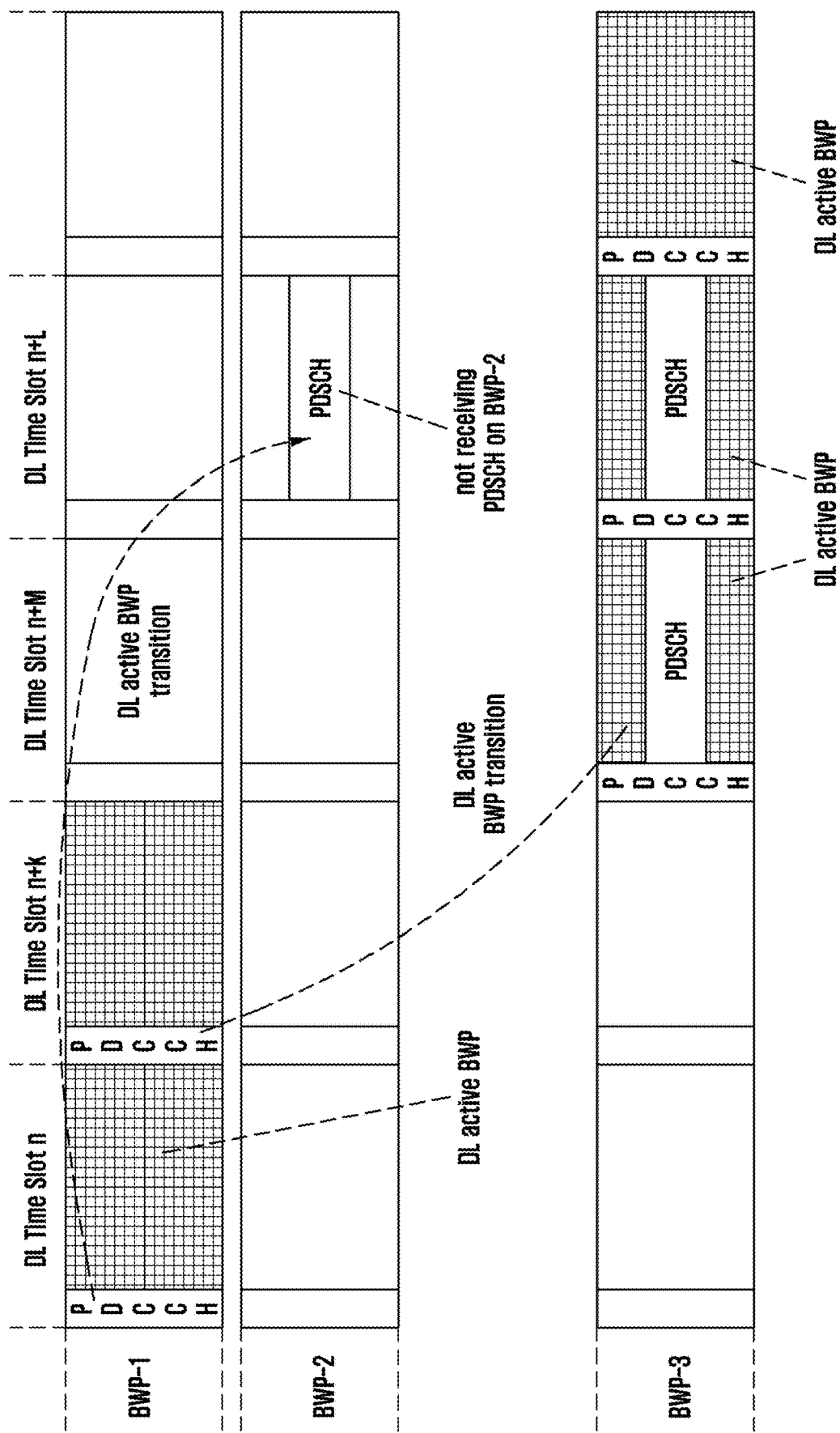
FIG. 45 is a schematic diagram illustrating BWPs on which a UE receives a PDCCH and a PDSCH and transmits a PUSCH and a PUCCH according to embodiment six of the present invention.

When DCI in time slot n indicates an active BWP switches from BWP-1 to BWP-2 from time slot n+L, PDSCH or PUSCH is scheduled in time slot n+L, DCI in time slot n+k indicates the active BWP switches from BWP-1 to BWP-3 from time slot n+M, and a PDSCH and a PUSCH is scheduled in time slot n+M, k<L, M<L, a processing method may include: a DL active BWP switches from BWP-1 to BWP-3 from time slot n+M, UE starts to receive a PDSCH and/or a PDCCH on BWP-3 from time slot n+M, or transmits a PUSCH and/or a PUCCH on BWP-3 from time slot n+M, as shown in FIG. 45.

Figure 46:
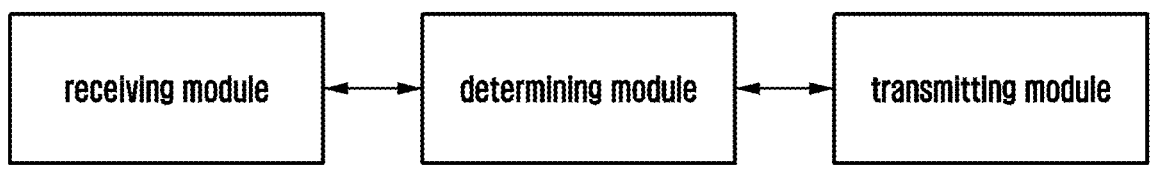
FIG. 46 is a schematic diagram illustrating a preferred structure of a UE in accordance of the present invention.

Corresponding to the above methods, the present application also provides user equipment (UE) which has a structure as shown in FIG. 46. The UE includes a receiving module, a determining module and a transmitting module.

The receiving module receives DCI in time unit n, and active BWP indication information in the DCI indicates a switching of an active BWP.

The determining module determines a time unit in which the switching of the active BWP occurs to be a time unit n+k according to the received active BWP indication information. The k is a non-negative integer, and the value of k is related with the type of the DCI.

The receiving module starts to receive a PDCCH and/or a PDSCH on a DL active BWP from the time unit n+k, and/or the transmitting module starts to transmit a PUCCH and/or a PUSCH on an UL active BWP from the time unit n+k.

Preferably, for paired spectrum, the receiving module may receive DL DCI in time slot n. The DL DCI indicates a switching of the DL active BWP. The receiving module starts to receive a PDCCH and/or a PDSCH on a switched DL active BWP from time unit n+k. In this situation, the determining module may determine the time unit in which the DL active BWP switches according to at least one of:
  if the DL DCI schedules a PDSCH, and the active BWP indication information in the DL DCI indicates a switching of the DL active BWP, and the PDSCH is within the same time unit with the DL DCI, the UE starts to receive the PDSCH on the switched DL active BWP from the time unit, and starts to receive a PDCCH on the switched DL active BWP from the first DL time unit subsequent to the time unit in which the PDSCH is received;

if the DL DCI schedules a PDSCH, and the active BWP indication information in the DL DCI indicates a switching of the DL active BWP, and the PDSCH and the DL DCI are in different time units, the UE starts to receive the PDSCH on the switched DL active BWP from the time unit of the PDSCH, and starts to receive a PDCCH on the switched DL active BWP from the first DL time unit subsequent to the time unit of the PDSCH;

if the DL DCI schedules a PDSCH, and the active BWP indication information in the DL DCI indicates a switching of the DL active BWP, and the PDSCH and the DL DCI are in different time units, the UE starts to receive the PDSCH on the switched DL active BWP from the time unit of the PDSCH, and starts to receive a PDCCH on the switched DL active BWP from the time unit of the PDSCH;

if the DL DCI schedules a PDSCH, and the active BWP indication information in the DL DCI indicates a switching of the DL active BWP, and the PDSCH and the DL DCI are in different time units or in the same time unit, the UE starts to receive a PDCCH on the switched DL active BWP from the k'th time unit subsequent to the time unit of the DL DCI, and starts to receive the PDSCH on the switched DL active BWP from the time unit of the PDSCH; in the above, k is a non-negative integer, and is defined in a protocol or configured by higher layer signaling;

if the DL DCI schedules a PDSCH, and the active BWP indication information in the DL DCI indicates a switching of the DL active BWP, the UE receives the PDSCH on a current BWP, and starts to receive a PDCCH on the switched BWP from the k'th time unit subsequent to the time unit of the DL DCI; in the above, k is a non-negative integer, and is defined in a protocol or configured by higher layer signaling.

When a PDCCH schedules PDSCH transmission in at least two time units, the PDSCH scheduled by the DL DCI is: the first PDSCH of the PDSCHs scheduled in the at least two time units by the PDCCH.

Preferably, for paired spectrum, the receiving module receives UL DCI indicating a switching of an UL active BWP in time slot n, and starts to transmit a PUSCH and/or a PUCCH on the UL active BWP from time slot n+k. In this situation, the determining module determines the time slot in which the UL active BWP switches according to the following: if the UL DCI schedules a PUSCH and active BWP indication information in the UL DCI indicates a switching of the UL active BWP, the UE starts to transmit a PUSCH and a PUCCH on a switched BWP in the time slot of the scheduled PUSCH.

Preferably, for unpaired spectrum, the receiving module receives DL DCI which indicates a switching of a BWP pair including a DL active BWP and an UL active BWP in time slot n, start to receive a PDCCH and/or a PDSCH on a switched DL active BWP from time slot n+k1, and starts to transmit a PUCCH and/or a PUSCH on a switched UL active BWP from time slot n+k2; k1 and k2 are identical to or different from each other.

The determining module may determine the time unit in which the DL active BWP switches according to at least one of:

if the DL DCI schedules a PDSCH, and the active BWP indication information in the DL DCI indicates a switching of the UL-DL active BWP pair, and the PDSCH is within the same time unit with the DL DCI, the UE starts to receive a PDSCH on a switched DL active BWP from the time unit of the DL DCI, and starts to receive a PDCCH on the switched DL active BWP from the first DL time unit subsequent to the time unit in which the PDSCH is received;

if the DL DCI schedules a PDSCH, and the active BWP indication information in the DL DCI indicates a switching of the UL-DL active BWP pair, and the PDSCH and the DL DCI are in different time units, the UE starts to receive a PDSCH on a switched DL active BWP from the time unit of the PDSCH, and starts to receive a PDCCH on the switched DL active BWP from the first DL time unit subsequent to the time unit of the PDSCH;

if the DL DCI schedules a PDSCH, and the active BWP indication information in the DL DCI indicates a switching of the UL-DL active BWP pair, and the PDSCH and the DL DCI are in different time units, the UE starts to receive the PDSCH on a switched DL active BWP from the time unit of the PDSCH;

if the DL DCI schedules a PDSCH, and the active BWP indication information in the DL DCI indicates a switching of the UL-DL active BWP pair, and the PDSCH and the DL DCI are in different time units or in the same time unit, the UE starts to receive a PDCCH on a switched DL active BWP from the k'th time unit subsequent to the time unit of the DL DCI, and starts to receive PDSCH from the switched DL active BWP from the time unit of the PDSCH; in the above, k is a non-negative integer, and is defined in a protocol or configured by higher layer signaling;

if the DL DCI schedules a PDSCH, and the active BWP indication information in the DL DCI indicates a switching of the DL-UL active BWP pair, the UE receives the PDSCH on a current DL active BWP, and starts to receive a PDCCH on the switched DL active BWP from the k'th time unit subsequent to the time unit of the DL DCI; in the above, k is a non-negative integer, and is defined in a protocol or configured by higher layer signaling;

when k1 equals k2, the determining module starts to transmit a PUCCH and/or a PUSCH on a switched UL active BWP from a time unit for the first UL transmission subsequent to the time unit in which the UE starts to receive a PDCCH or a PDSCH on the switched DL active BWP; the first UL transmission is PUCCH transmission or PUSCH transmission.

When k1 and k2 are determined respectively, the determining module determines a time unit for transmitting HARQ-ACK of the DL DCI or a time unit for transmitting HARQ-ACK of a PDSCH scheduled by the DL DCI to be the k2; or determining k2 as pre-defined in a protocol, configured by higher layer signaling or specified respectively by physical layer signaling; or determining k2 according to a time relation of the scheduled UL PUSCH.

Preferably, for unpaired spectrum, the receiving module receives UL DCI which indicates a switching of a DL-UL BWP pair including a DL active BWP and an UL active BWP in time slot n, starts to receive a PDCCH and/or a PDSCH on a switched DL active BWP from time slot n+k1, and starts to transmit a PUCCH and/or a PUSCH on a switched UL active BWP from time slot n+k2; k1 and k2 are identical to or different from each other.

When k1 equals k2, if the UL DCI schedules a PUSCH in time slot m, the determining module uses the value of m as k1 and k2, or determines k1 and k2 as pre-defined in a protocol, configured by higher layer signaling, or indicated by physical layer signaling.

When k1 and k2 are determined respectively, the determining module determines k1 as pre-defined in a protocol, configured by higher layer signaling; if the UL DCI schedules a PUSCH transmitted in time slot m, the determining module uses the value of m as k2, or determines k2 as pre-defined in a protocol, configured by higher layer signaling, or indicated by physical layer signaling.

Preferably, for unpaired spectrum in time slot aggregation, the determining module determines the time unit of the active BWP switching according to at least one of:
- a DL active BWP starts to switch in the first time slot of at least two time slots of a PDSCH scheduled by a time slot aggregated PDCCH;
- the DL active BWP starts to switch in the first time slot of at least two time slots using the same pre-coding scheme;
- the UL active BWP starts to switch in the first time slot of at least two time slots of a PUSCH scheduled by a time slot aggregated PDCCH;
- the UL active BWP starts to switch in the first time slot of at least two time slots using the same pre-coding scheme.

When the receiving module receives a first DCI in time unit n and a second DCI in time unit n+k, the first DCI indicates an active BWP switches from BWP-1 to BWP-2 starting from time unit n+L, a PDSCH or a PUSCH is scheduled in time unit n+L, the second DCI indicates the active BWP switches from BWP-1 to BWP-3 starting from time unit n+M, and a PDSCH or PUSCH is scheduled in time unit n+M, k<L, M<L, the DL active BWP switches from BWP-1 to BWP-3 from time unit n+M, and the receiving module starts to receive a PDSCH and/or a PDCCH on BWP-3 from time unit n+M, or the transmitting module starts to transmit a PUSCH and/or a PUCCH on BWP-3 from time unit n+M.

Figure 47:
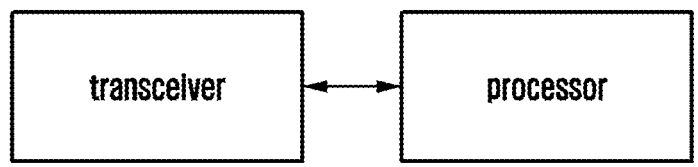
FIG. 47 is a schematic diagram illustrating a preferred structure of a UE in accordance with the present invention.
Figure 48:
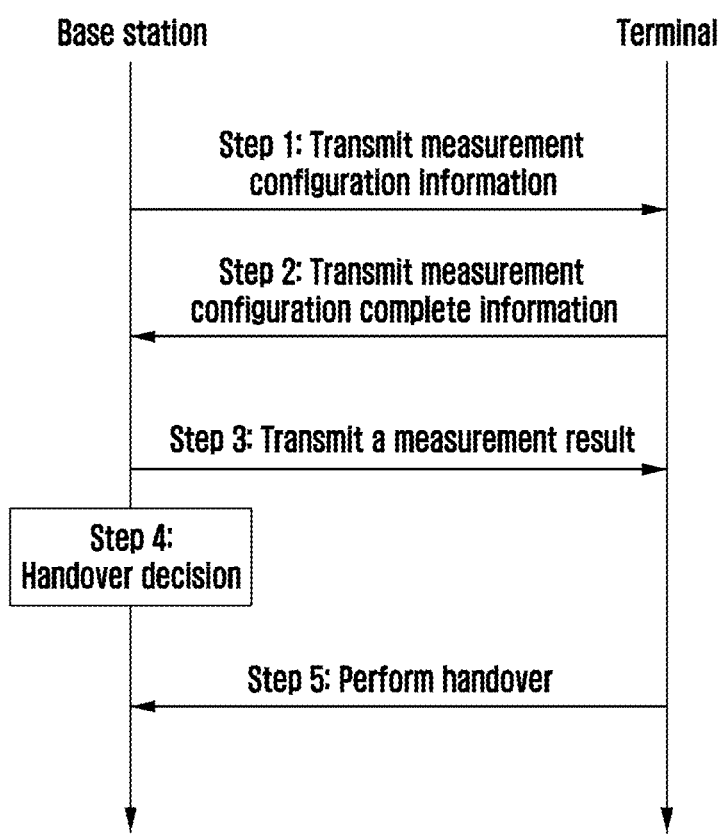
FIG. 48 is a flowchart of a method for measuring and handover cell in the prior art.

Corresponding to the above method, the present application provides a UE which has a structure as shown in FIG. 47. The UE includes a transceiver and a processor.

The transceiver receives DCI in time unit n, and active BWP indication information in the DCI indicates a switching of an active BWP;

the processor determines the active BWP switches in a time unit n+k according to the received active BWP indication information;

the transceiver starts to receive a PDCCH and/or a PDSCH on a DL active BWP from the time unit n+k, and/or starts to transmit a PUCCH and/or a PUSCH on an UL active BWP from the time unit n+k.

The scope of the claims should not be limited by the embodiments set forth in the examples, but should be given the broadest interpretation consistent with the description as a whole.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "UE" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "UE" as used herein may be portable, transportable, mountable in transportations (air, sea and/or land transportations), or suitable and/or configured to run locally and/or distributed in other places in the earth and/or space for running. The "UE" as used herein may be a communication UE, an internet UE, a music/video player UE. For example, it may be a PDA, a Mobile Internet Device (MID) and/or a mobile phone with a music/video playback function, or may be apparatuses such as a smart TV and a set-top box.

For the 5G radio communication system, the present invention provides a new method for measuring and handover cell. In this method, after transmitting the measurement configuration information, the base station then transmits UE-specific Channel State Information-Reference Signals (CSI-RS) resources used for measuring the neighboring cells (currently serving cell is optional), and the UE performs the measurement on the current serving cell and the neighboring cells according to the newly configured UE-specific CSI-RS resources (and the optional UE-specific CSI-RS resources that have been configured for the current serving cell). In addition, the UE can further measure the neighboring cells based on the synchronization signal blocks of the neighboring cells. The UE finally reports the measurement result to the base station. Based on the measurement result and the radio resource management information, the base station makes a corresponding decision, determines to hand over the cell, and performs a subsequent handover indication process.

A method and apparatus for measuring cell, a method and apparatus for handover provided in the present invention will be introduced one by one with reference to specific implementation.

Figure 49:
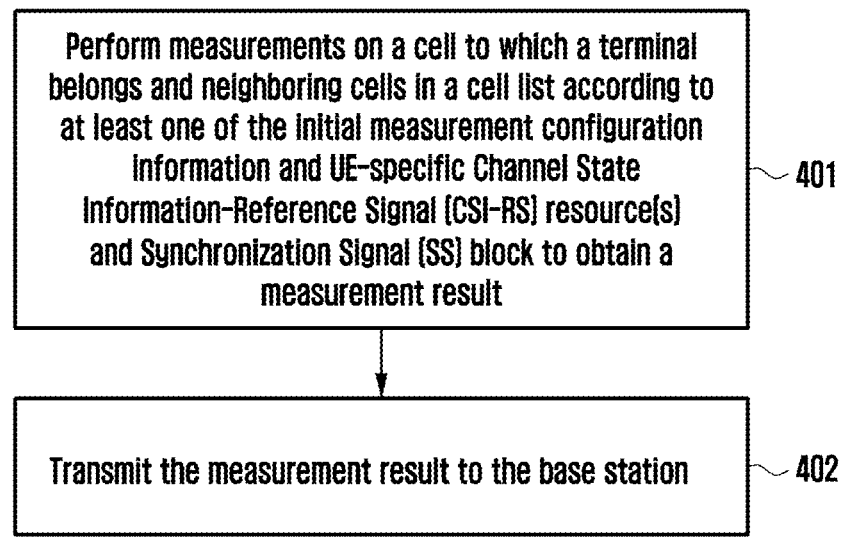
FIG. 49 is a flowchart of a method for measuring cell provided by the present invention.

In the present invention, a method for measuring cell is provided which is applied to a UE. As shown in FIG. 49, the method includes the following steps:

Step 401: a cell to which a UE belongs and neighboring cells in a cell list are measured according to at least one of an initial measurement configuration information and UE-specific Channel State Information-Reference Signal (CSI-RS) resource and a Synchronization Signal (SS) Block to obtain a measurement result.

The measurement in this step includes the following several cases.

In a first case, the UE-specific CSI-RS resource includes a common UE-specific CSI-RS resource, and the step of measuring the cell to which the UE belongs and the neighboring cells in the cell list respectively according to the initial measurement configuration information and the UE-specific CSI-RS resource to obtain the measurement result, includes:
   measuring the cell to which the UE belongs and the neighboring cells in the cell list respectively according to the initial measurement configuration information and the common UE-specific CSI-RS resource to obtain the measurement result.

In a second case, the UE-specific CSI-RS resource includes a specific UE-specific CSI-RS resource, and the step of measuring the cell to which the UE belongs and the neighboring cells in the cell list respectively according to the initial measurement configuration information and the UE-specific CSI-RS resource to obtain the measurement result, including:
   measuring the cell to which the UE belongs and the neighboring cells in the cell list respectively according to the initial measurement configuration information and the specific UE-specific CSI-RS resource to obtain the measurement result.

In a third case, the UE-specific CSI-RS resource further includes a common UE-specific CSI-RS resource and a pre-configured UE-specific CSI-RS resource, and the step of measuring the cell to which the UE belongs according to the initial measurement configuration information and the UE-specific CSI-RS resource to obtain the measurement result, further including:
   measuring the cell to which the UE belongs according to the initial measurement configuration information and the pre-configured UE-specific CSI-RS resource;
   measuring the neighboring cells in the cell list according to the initial measurement configuration information and the common UE-specific CSI-RS resource to obtain the measurement result.

In the fourth case, the UE-specific CSI-RS resource includes a specific UE-specific CSI-RS resource and a pre-configured UE-specific CSI-RS resource, and the step of measuring the cell to which the UE belongs according to the initial measurement configuration information and the UE-specific CSI-RS resource to obtain the measurement result, further including:
   measuring the cell to which the UE belongs according to the initial measurement configuration information and the pre-configured UE-specific CSI-RS resource to obtain the measurement result;
   measuring the neighboring cells in the cell list according to the initial measurement configuration information and the specific UE-specific CSI-RS resource to obtain the measurement result.

Based on the above, the processing of the UE further includes:
   receiving the initial measurement configuration information transmitted by a base station;
   performing initial measurement configuration according to the initial measurement configuration information, and returning an initial measurement configuration complete message to the base station;
   receiving the UE-specific CSI-RS resource transmitted by the base station;
   or,
   receiving the initial measurement configuration information and the UE-specific CSI-RS resource transmitted by the base station;
   performing an initial measurement configuration according to the initial measurement configuration information, and returning the initial measurement configuration complete message to the base station.

Wherein, the configuration way of the common UE-specific CSI-RS resource includes any one of the following:
   the common UE-specific CSI-RS resource is discrete in both the frequency domain and time domain, and the different time resources correspond to the same frequency resource;
   the common UE-specific CSI-RS resource is discrete in both the frequency domain and time domain, and the different time resources correspond to the different frequency resources;
   the common UE-specific CSI-RS resource is discrete in the time domain and is continuous in the frequency domain, and the different time resources correspond to the same frequency resource;
   the common UE-specific CSI-RS resource is discrete in the time domain and is continuous in the frequency domain, and the different time resources correspond to the different frequency resources;
   the common UE-specific CSI-RS resource is continuous in the time domain and is discrete in the frequency domain, and the different time resources correspond to the same frequency resource;
   the common UE-specific CSI-RS resource is continuous in the time domain and is discrete in the frequency domain, and the different time resources correspond to the different frequency resources;
   the common UE-specific CSI-RS resource is continuous in both the frequency domain and time domain, and the different time resources correspond to the same frequency resource;
   the common UE-specific CSI-RS resource is continuous in both the frequency domain and time domain, and the different time resources correspond to the different frequency resources.

In a fifth case, the UE-specific CSI-RS resource includes a pre-configured UE-specific CSI-RS resource, and the step of measuring the cell to which the UE belongs and the neighboring cells in the cell list respectively according to the initial measurement configuration information and the UE-specific CSI-RS resource to obtain the measurement result, including:
   measuring the cell to which the UE belongs according to the initial measurement configuration information and a pre-configured UE-specific CSI-RS resource to obtain the measurement result; and measuring each neighboring cell in the cell list according to the initial measurement configuration information and the SS Block of each neighboring cell to obtain the measurement result.

In a sixth case, the step of measuring the cell to which the UE belongs and the neighboring cells in the cell list according to the initial measurement configuration information and the SS Block to obtain the measurement result, including:

measuring the cell to which the UE belongs according to the initial measurement configuration information and the SS Block of the cell to which the UE belongs to obtain the measurement result;

measuring each neighboring cell in the cell list according to the initial measurement configuration information and the SS Block of each neighboring cell respectively to obtain the measurement result.

For the above case involving the specific UE-specific CSI-RS resource, the configuration way of the specific UE-specific CSI-RS resource includes any one of the following:

the specific UE-specific CSI-RS resource and the common UE-specific CSI-RS resource are discrete in both time domain and frequency domain, and are distinguished by a time division multiplexing (TDM) scheme;

the specific UE-specific CSI-RS resource and the common UE-specific CSI-RS resource are discrete in both time domain and frequency domain, and are distinguished by a frequency division multiplexing (FDM) scheme;

the specific UE-specific CSI-RS resource and the common UE-specific CSI-RS resource are discrete in both time domain and frequency domain, and are distinguished by the FDM scheme and the TDM scheme simultaneously;

the specific UE-specific CSI-RS resource and the common UE-specific CSI-RS resource are discrete in time domain and are continuous in frequency domain, and are distinguished by the TDM scheme simultaneously;

the specific UE-specific CSI-RS resource and the common UE-specific CSI-RS resource are discrete in time domain and are continuous in frequency domain, and are distinguished by the FDM scheme;

the specific UE-specific CSI-RS resource and the common UE-specific CSI-RS resource are discrete in time domain and are continuous in frequency domain, and are distinguished by the FDM scheme and the TDM scheme simultaneously;

the specific UE-specific CSI-RS resource and the common UE-specific CSI-RS resource are continuous in time domain and are discrete in frequency domain, and are distinguished by the TDM scheme simultaneously;

the specific UE-specific CSI-RS resource and the common UE-specific CSI-RS resource are continuous in time domain and are discrete in frequency domain, and are distinguished by the FDM scheme;

the specific UE-specific CSI-RS resource and the common UE-specific CSI-RS resource are continuous in time domain and are discrete in frequency domain, and are distinguished by the FDM scheme and the TDM scheme simultaneously;

the specific UE-specific CSI-RS resource and the common UE-specific CSI-RS resource are continuous both in time domain and frequency domain, and are distinguished by the TDM scheme simultaneously;

the specific UE-specific CSI-RS resource and the common UE-specific CSI-RS resource are continuous both in time domain and frequency domain, and are distinguished by the FDM scheme simultaneously;

the specific UE-specific CSI-RS resource and the common UE-specific CSI-RS resource are continuous both in time domain and frequency domain, and are distinguished by the FDM scheme and the TDM scheme simultaneously.

Further, the method further includes:

receiving any one of the following information to determine that the number of the UE-specific CSI-RS resource is one;

the time-domain index and frequency-domain index of the specific time-frequency resource;

the corresponding index of the Physical Resource Block (PRB) or Resource Element (RE) that is sorted according to the time index priority or the frequency index priority;

predefining the timing, and configuring the PRB index or the RE or bitmap information of the frequency resource simultaneously.

The method further includes:

receiving any one of the following information to determine that the number of the UE-specific CSI-RS resources is at least two;

the number of time-frequency resources in the time-frequency resource group for measurement, and the configuration information of each time-frequency resource for measurement;

pre-configured time domain index and/or frequency-domain index.

Step 402: the measurement result is transmitted to the base station.

By transmitting the measurement result to the base station, the base station determines whether to hand over the cell to which the UE currently belongs according to the measurement result.

Specifically, an instruction for handover carrying the target neighboring cell transmitted by the base station is received and the cell to which the UE belongs to is handed over to the target neighboring cell according to the instruction for handover, if it is determined by the base station that the cell to which the UE currently belongs needs to be handed over.

Figure 50:
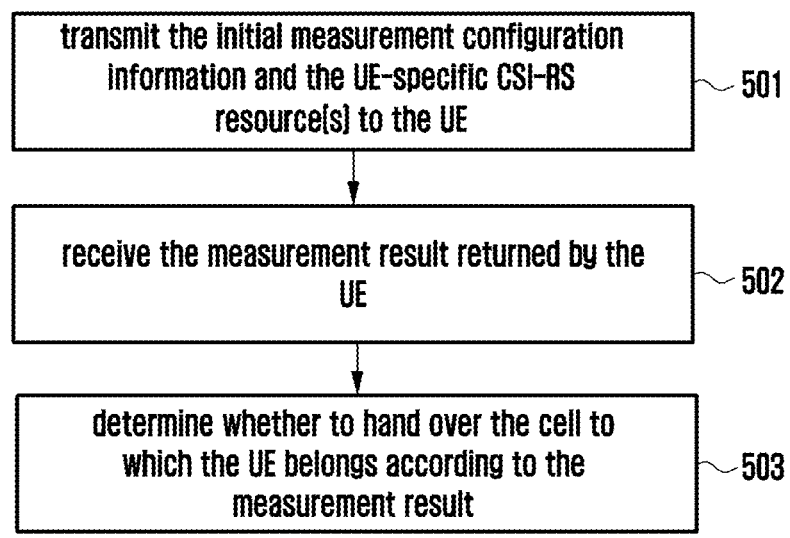
FIG. 50 is a flowchart of a method for handover provided by the present invention.
Figure 51:
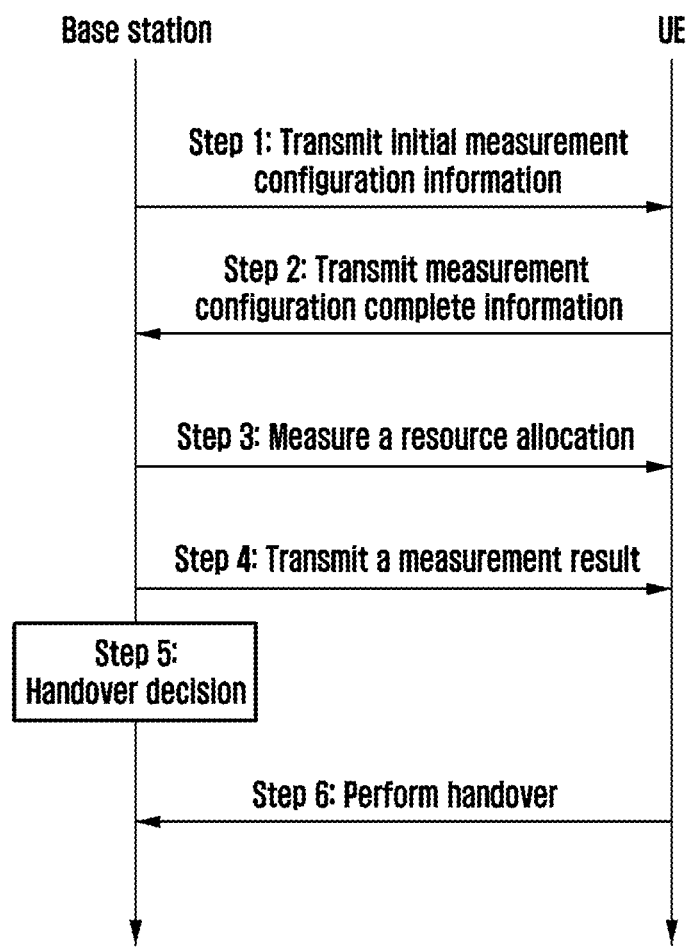
FIG. 51 is a flowchart of a method for measuring and handover cell provided by the present invention.

Based on the foregoing method for measuring cell, the present invention further discloses a method for handover, which is applied to a base station. As shown in FIG. 50, the method includes the following steps:

Step 501: the initial measurement configuration information and UE-specific CSI-RS resource are transmitted to the UE.

Step 502: a measurement result returned by the UE is received.

Step 503: whether to hand over a cell to which the UE belongs is determined according to the measurement result.

In this step, an instruction for handover carrying a target neighboring cell is transmitted, if it is determined to hand over the cell, so that the UE hands over from the cell to which the UE belongs to the target neighboring cell according to the instruction for handover; otherwise, the instruction for handover is not transmitted.

Based on the foregoing method for measuring cell and method for handover provided by the present invention, several specific embodiments will be described in detail below. The measurement resource configuration information in the following embodiments includes the UE-specific CSI-RS resource and/or SS Block, and the UE-specific CSI-RS resource includes the specific UE-specific CSI-RS resource and common UE-specific CSI-RS resource.

Embodiment 1

This embodiment introduces a method for performing measurement and handover based on UE-specific CSI-RS resource. In this embodiment, the initial measurement configuration information and the configuration information of the UE-specific CSI-RS resource in the neighboring cells are transmitted in different steps, and the cell is measured by using the configured UE-specific CSI-RS resource, and the neighboring cells are measured by using the newly configured UE-specific CSI-RS resource. In this embodiment, the system can adopt a multi-beam operation, for example, the system operates in a high frequency band and needs beamforming gain to compensate for large path loss. The system can also adopt a single-beam operation, for example using an omnidirectional antenna to provide coverage over a large angle.

The specific steps of this method are as follows:

Step 1: the base station transmits the initial measurement configuration information which includes the object to be measured by the UE, the neighboring cell list, the report way, the measurement identifier and the event parameters (excluding the measurement resource configuration information) to the UE.

Step 2: the UE performs the measurement configuration according to the measurement control issued by the base station, and transmits the measurement configuration complete message to the base station.

Step 3: the base station transmits the measurement resource configuration information which includes a time-frequency resource occupied by the UE-specific Channel State Information-Reference Signal (CSI-RS) resource for measuring neighboring cells, and the used sequence resource to the UE.

Wherein, the base station can reserve specific UE-specific CSI-RS resource for measurement so as to distinguish from the common UE-specific CSI-RS resource for other purposes. The specific UE-specific CSI-RS resource can be continuous or discrete, or can be a combination of the above two. Wherein, discrete and continuous distribution can be with respect to the frequency domain, but also with respect to the time domain. It should be noted that the resource refers to a time-frequency Resource Element (RE) or a resource block formed by multiple REs, and continuous distribution refers to occupying two or more continuous REs or RE blocks in time domain or frequency domain, and the above discrete and continuous distribution is with respect to the resource distribution of CSI-RS within a certain range (for example, one slot, one subframe, one radio frame, etc.).

The specific UE-specific CSI-RS resource and the common UE-specific CSI-RS resource can be distinguished by one of a Time Division Multiplexing (TDM) scheme, a Frequency Division Multiplexing (FDM) scheme, and a Code Division Multiplexing (CDM) or a combination of the above multiple schemes.

Figure 53:
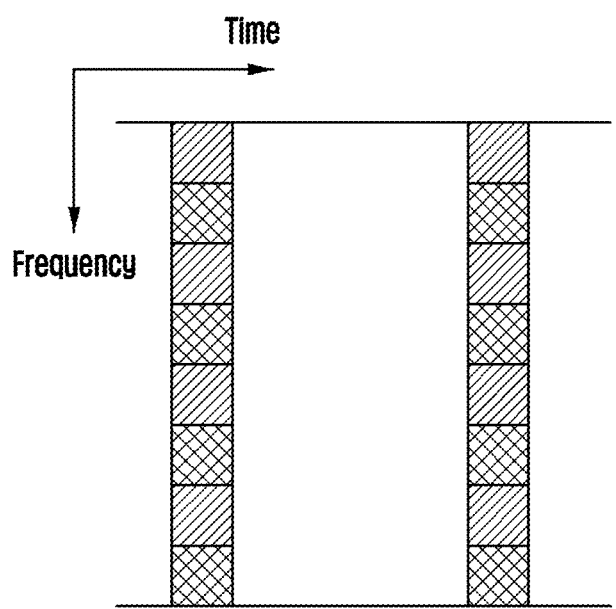
FIG. 53 is a schematic diagram 2*a* of a configuration of specific UE-specific CSI-RS resources provided by the present invention.

The specific configuration ways are as follows:

(1a) as shown in FIG. 52, the specific UE-specific CSI-RS resource and the common UE-specific CSI-RS resource are discrete in both time domain and frequency domain, and are distinguished by the TDM scheme;

(2a) as shown in FIG. 53, the specific UE-specific CSI-RS resource and the common UE-specific CSI-RS resource are discrete in both time domain and frequency domain, and are distinguished by the FDM scheme.

Figure 54:
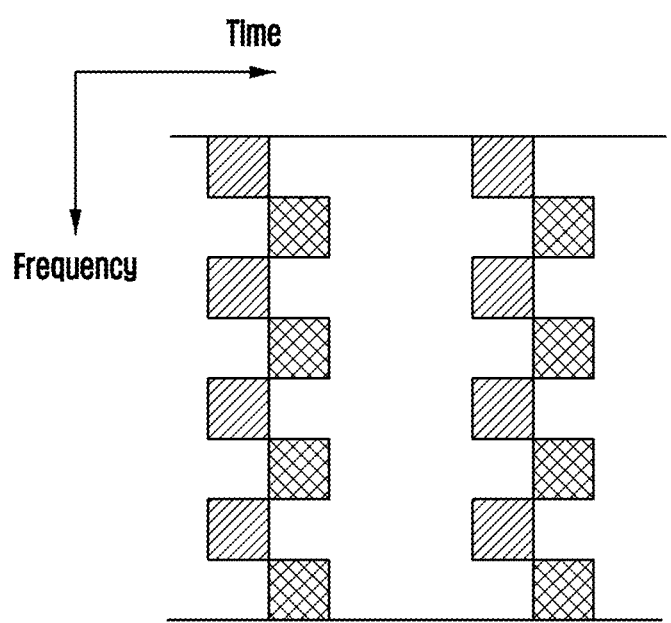
FIG. 54 is a schematic diagram 3*a* of a configuration of specific UE-specific CSI-RS resources provided by the present invention.

(3a) as shown in FIG. 54, the specific UE-specific CSI-RS resource and the common UE-specific CSI-RS resource are discrete in both time domain and frequency domain, and are distinguished by the FDM scheme and the TDM scheme simultaneously.

Figure 55:
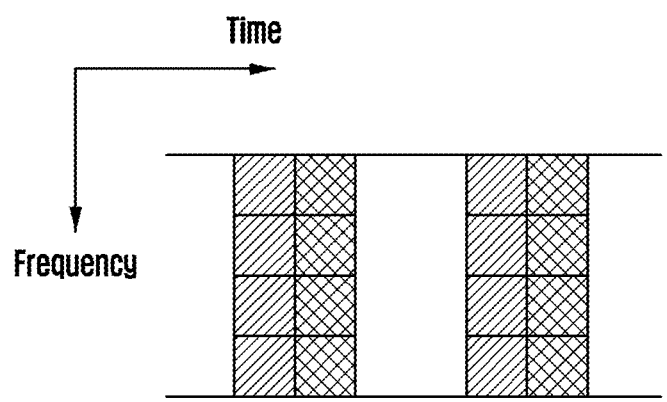
FIG. 55 is a schematic diagram 4*a* of a configuration of specific UE-specific CSI-RS resources provided by the present invention.

(4a) as shown in FIG. 55, the specific UE-specific CSI-RS resource and the common UE-specific CSI-RS resource are discrete in time domain and are continuous in frequency domain, and are distinguished by the TDM scheme simultaneously.

Figure 56:
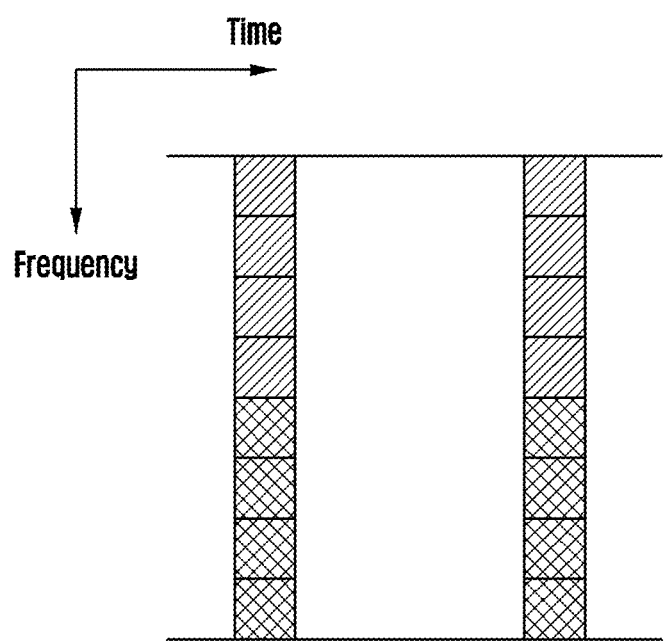
FIG. 56 is a schematic diagram 5*a* of a configuration of specific UE-specific CSI-RS resources provided by the present invention.

(5a) as shown in FIG. 56, the specific UE-specific CSI-RS resource and the common UE-specific CSI-RS resource are discrete in time domain and are continuous in frequency domain, and are distinguished by the FDM scheme.

Figure 57:
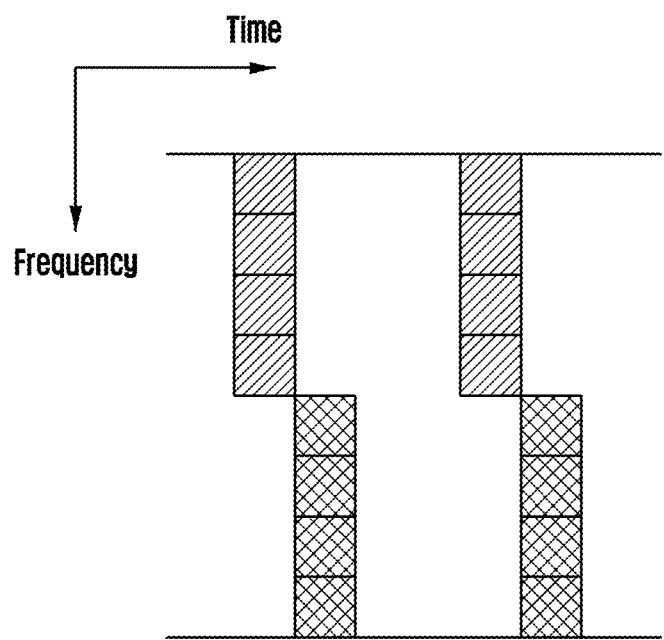
FIG. 57 is a schematic diagram 6*a* of a configuration of specific UE-specific CSI-RS resources provided by the present invention.

(6a) as shown in FIG. 57, the specific UE-specific CSI-RS resource and the common UE-specific CSI-RS resource are discrete in time domain and are continuous in frequency domain, and are distinguished by the FDM scheme and the TDM scheme simultaneously.

Figure 58:
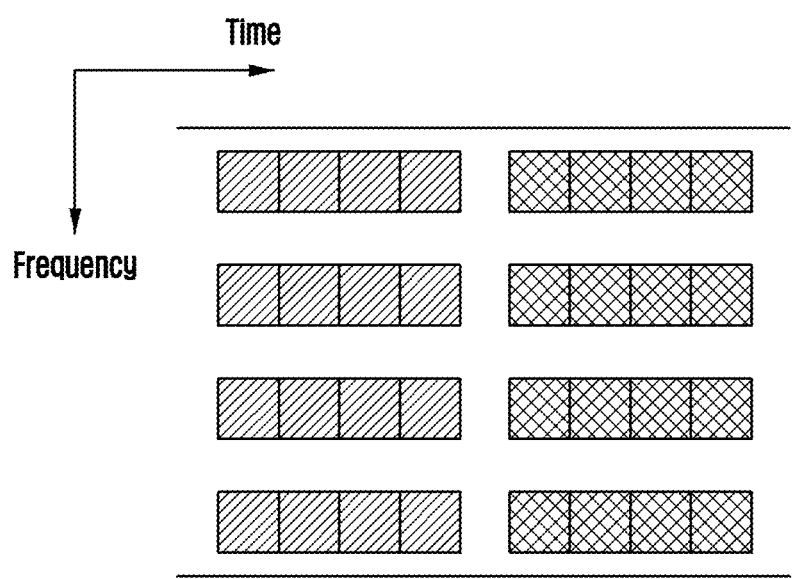
FIG. 58 is a schematic diagram 7*a* of a configuration of specific UE-specific CSI-RS resources provided by the present invention.

(7a) as shown in FIG. 58, the specific UE-specific CSI-RS resource and the common UE-specific CSI-RS resource are continuous in time domain and are discrete in frequency domain, and are distinguished by the TDM scheme simultaneously.

Figure 59:
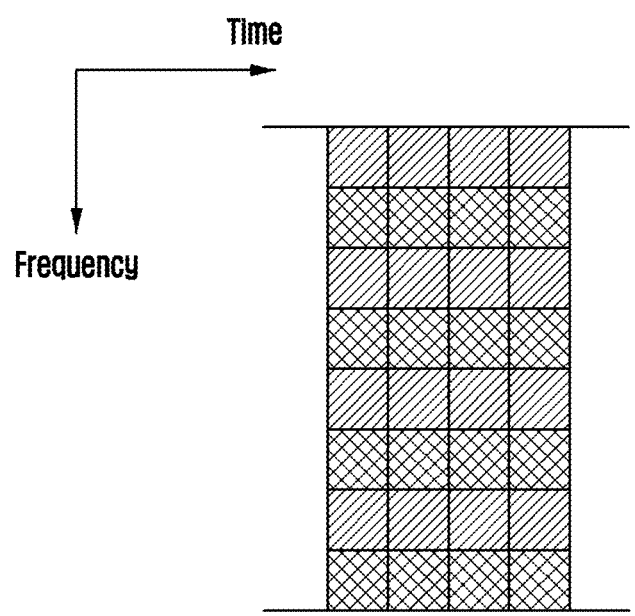
FIG. 59 is a schematic diagram 8*a* of a configuration of specific UE-specific CSI-RS resources provided by the present invention.

(8a) as shown in FIG. 59, the specific UE-specific CSI-RS resource and the common UE-specific CSI-RS resource are continuous in time domain and are discrete in frequency domain, and are distinguished by the FDM scheme.

Figure 60:
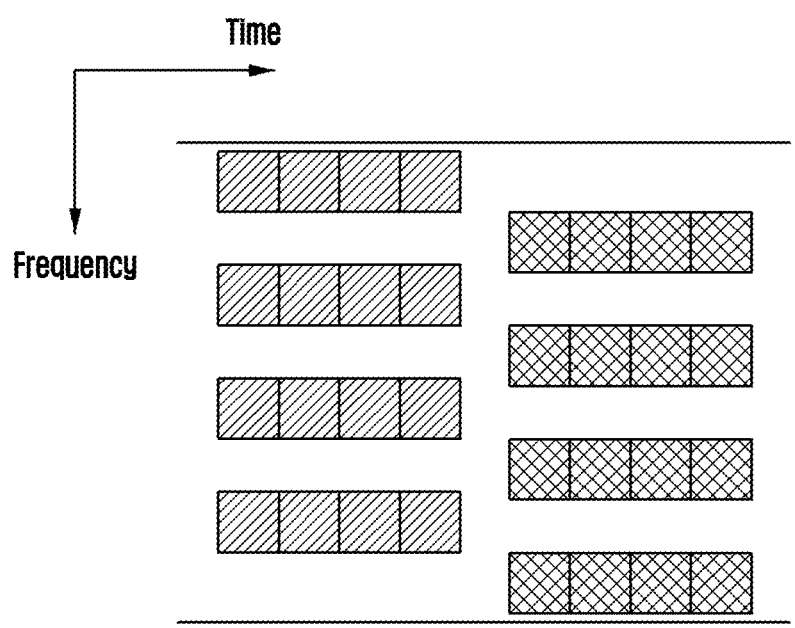
FIG. 60 is a schematic diagram 9*a* of a configuration of specific UE-specific CSI-RS resources provided by the present invention.

(9a) as shown in FIG. 60, the specific UE-specific CSI-RS resource and the common UE-specific CSI-RS resource are continuous in time domain and are discrete in frequency domain, and are distinguished by the FDM scheme and the TDM scheme simultaneously.

Figure 61:
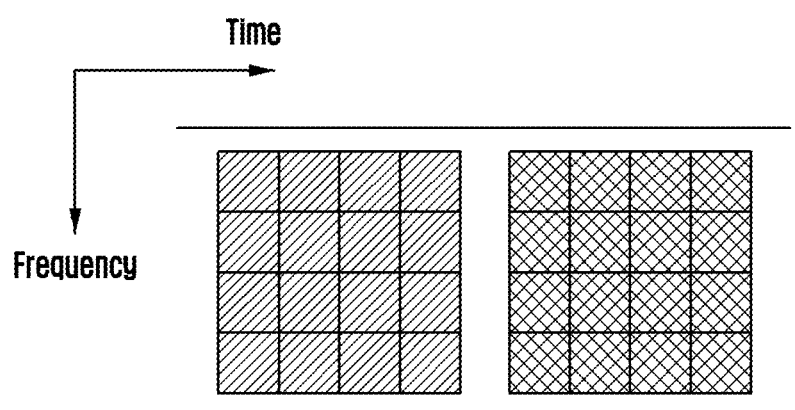
FIG. 61 is a schematic diagram 10*a* of a configuration of specific UE-specific CSI-RS resources provided by the present invention.

(10a) as shown in FIG. 61, the specific UE-specific CSI-RS resource and the common UE-specific CSI-RS resource are continuous both in time domain and frequency domain, and are distinguished by the TDM scheme simultaneously.

Figure 62:
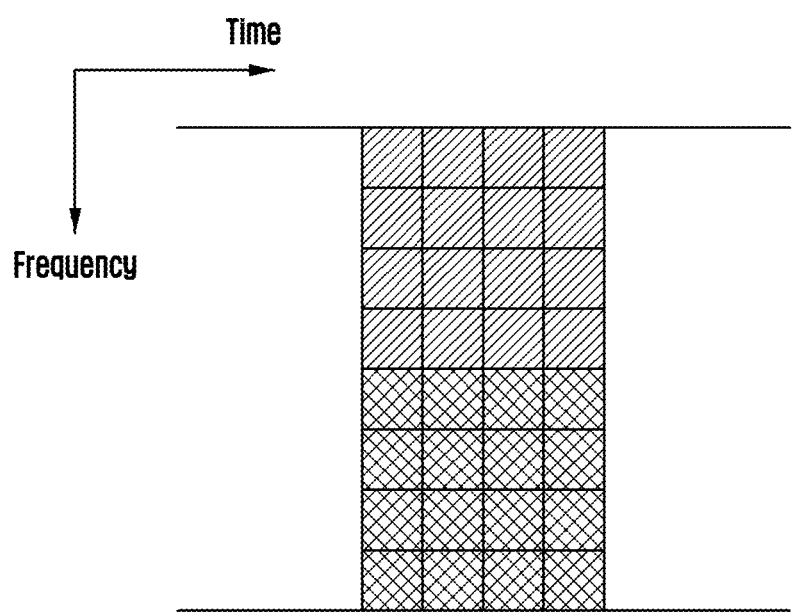
FIG. 62 is a schematic diagram 11*a* of a configuration of specific UE-specific CSI-RS resources provided by the present invention.

(11a) as shown in FIG. 62, the specific UE-specific CSI-RS resource and the common UE-specific CSI-RS resource are continuous both in time domain and frequency domain, and are distinguished by the FDM scheme.

Figure 63:
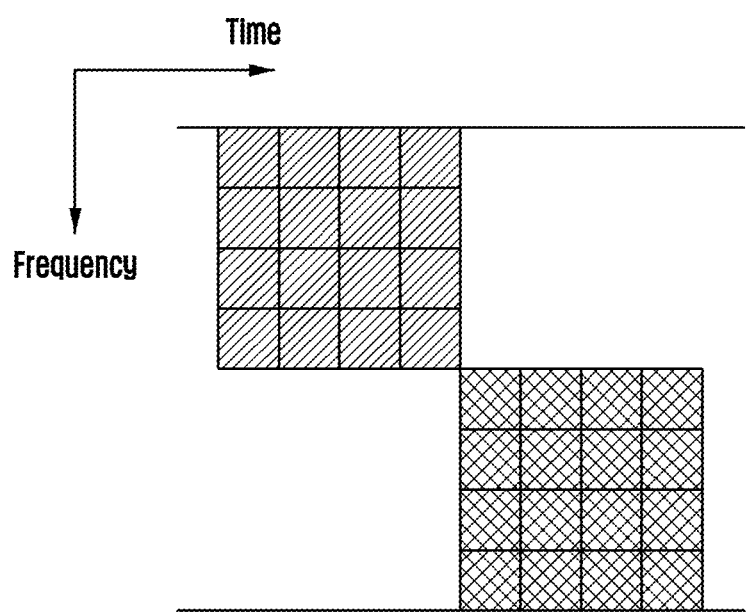
FIG. 63 is a schematic diagram 12*a* of a configuration of specific UE-specific CSI-RS resources provided by the present invention.

(12a) as shown in FIG. 63, the specific UE-specific CSI-RS resource and the common UE-specific CSI-RS resource are continuous both in time domain and frequency domain, and are distinguished by the FDM scheme and the TDM scheme simultaneously.

Of course, the base station can also not reserve the specific UE-specific CSI-RS resource for the measurement but use the common specific CSI-RS resource as the other scenarios. The common UE-specific CSI-RS resource can be continuous or discrete, or can be a combination of the above two. Wherein, discrete and continuous distribution can be with respect to the frequency domain, but also with respect to the time domain. It should be noted that continuous refers to occupying two or more continuous REs in the time domain or the frequency domain, and the discrete and continuous distribution is with respect to the resource distribution of CSI-RS within a certain range (for example, one slot, one subframe, one radio frame, etc.).

Figure 64:
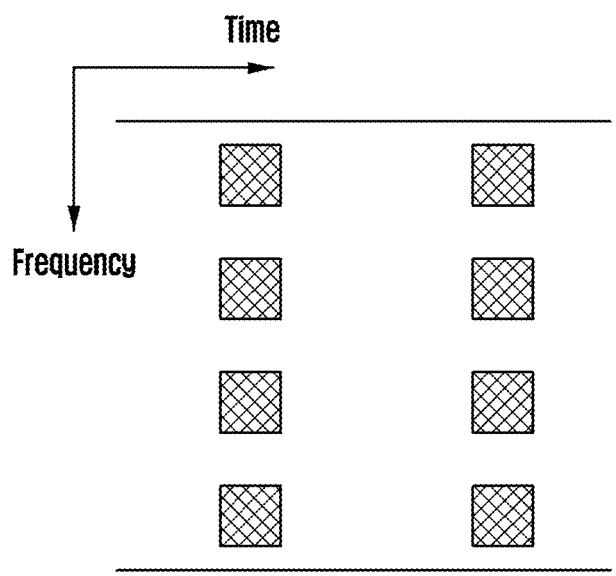
FIG. 64 is a schematic diagram 1*b* of a configuration of common UE-specific CSI-RS resource provided by the present invention.

The specific configuration ways are as follows:

(1b) as shown in FIG. 64, the common UE-specific CSI-RS resource is discrete in both the frequency domain and time domain, and the different time resources correspond to the same frequency resource.

Figure 65:
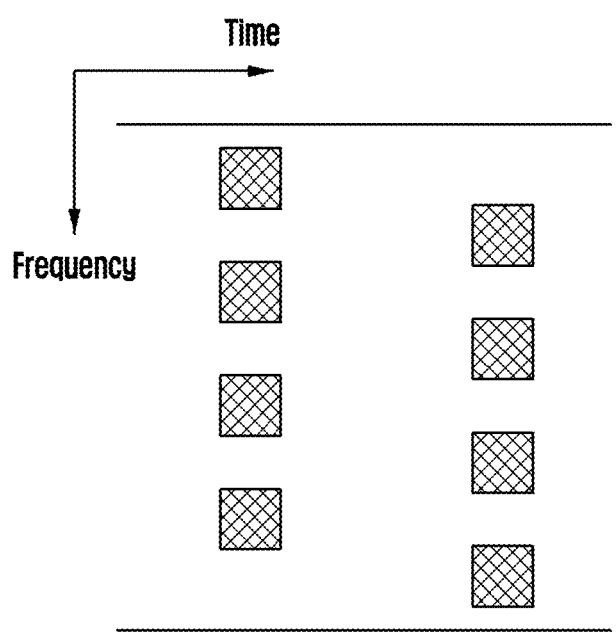
FIG. 65 a schematic diagram 2*b* of a configuration of common UE-specific CSI-RS resource provided by the present invention.

(2b) as shown in FIG. 65, the common UE-specific CSI-RS resource is discrete in both the frequency domain and time domain, and the different time resources correspond to the different frequency resources.

Figure 66:
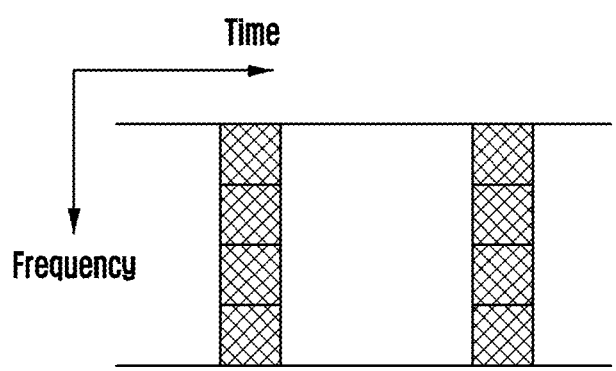
FIG. 66 is a schematic diagram 3*b* of a configuration of common UE-specific CSI-RS resource provided by the present invention.

(3b) as shown in FIG. 66, the common UE-specific CSI-RS resource is discrete in the time domain and is continuous in the frequency domain, and the different time resources correspond to the same frequency resource.

Figure 67:
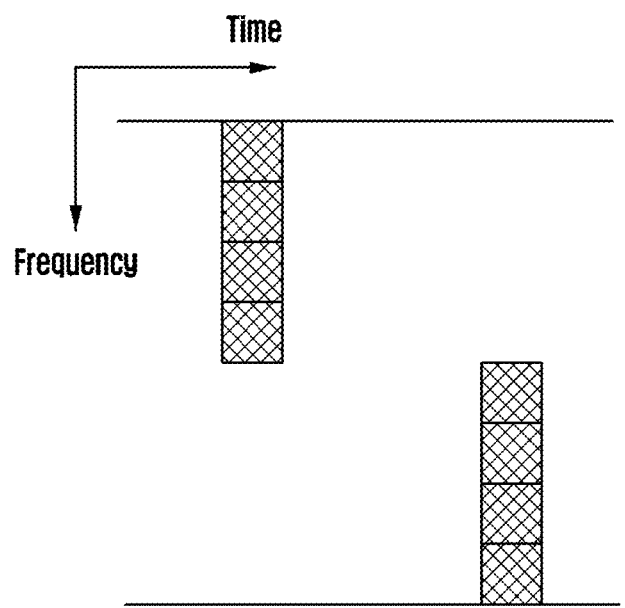
FIG. 67 is a schematic diagram 4*b* of a configuration of common UE-specific CSI-RS resource provided by the present invention.

(4b) as shown in FIG. 67, the common UE-specific CSI-RS resource is discrete in the time domain and is continuous in the frequency domain, and the different time resources correspond to the different frequency resources.

Figure 68:
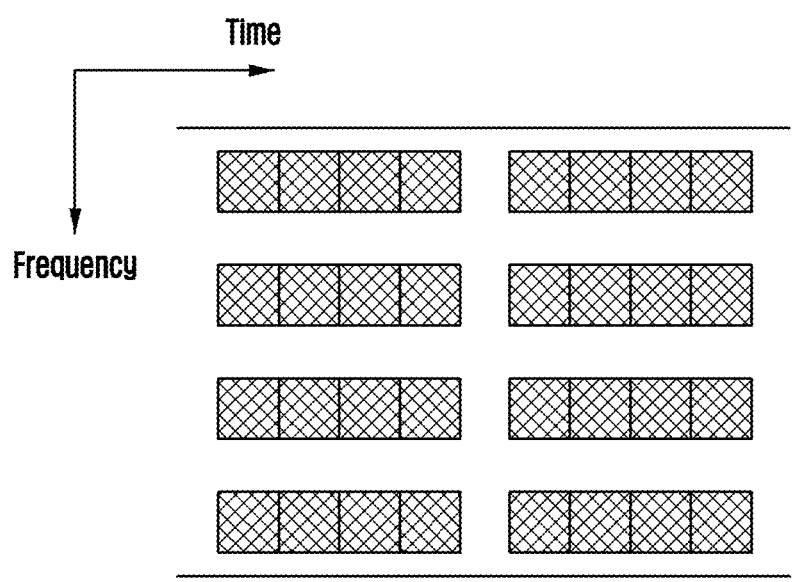
FIG. 68 is a schematic diagram 5*b* of a configuration of common UE-specific CSI-RS resource provided by the present invention.

(5b) as shown in FIG. 68, the common UE-specific CSI-RS resource is continuous in the time domain and is discrete in the frequency domain, and the different time resources correspond to the same frequency resource.

Figure 69:
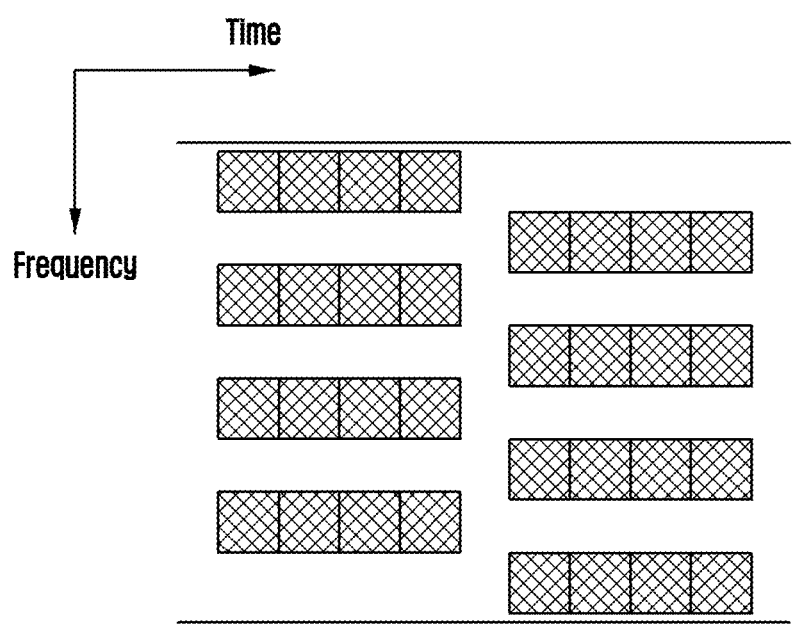
FIG. 69 is a schematic diagram 6*b* of a configuration of common UE-specific CSI-RS resource provided by the present invention.

(6b) as shown in FIG. 69, the common UE-specific CSI-RS resource is continuous in the time domain and is discrete in the frequency domain, and the different time resources correspond to the different frequency resources.

Figure 70:
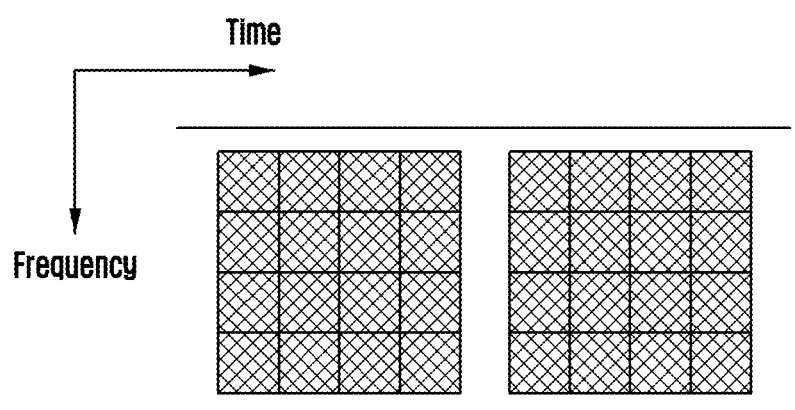
FIG. 70 is a schematic diagram 7*b* of a configuration of common UE-specific CSI-RS resource provided by the present invention.

(7b) as shown in FIG. 70, the common UE-specific CSI-RS resource is continuous in both the frequency domain and time domain, and the different time resources correspond to the same frequency resource.

Figure 71:
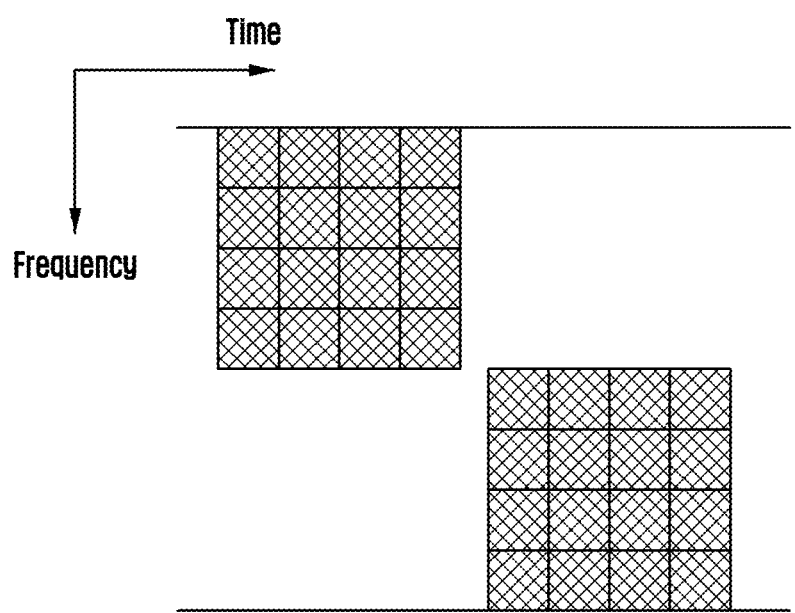
FIG. 71 is a schematic diagram 8*b* of a configuration of common UE-specific CSI-RS resource provided by the present invention.

(8b) as shown in FIG. 71, the common UE-specific CSI-RS resource is continuous in both the frequency domain and time domain, and the different time resources correspond to the different frequency resources.

For all of the foregoing UE-specific CSI-RS resource configurations, the base station allocates UE-specific CSI-RS resource for measuring the neighboring cells to UE from all the UE-specific CSI-RS resources available for measurement, wherein one or more UE-specific CSI-RS resources for measurement can be allocated for each neighboring cell. When allocating a plurality of UE-specific CSI-RS resources (resource groups) for measurement, each of the UE-specific CSI-RS resources can correspond to a different beam or a different SS Block of the base station in neighboring cells to measure the channel condition of different beam SS Blocks in the neighboring cells, which is advantageous to the selection of the optimal serving cell and beam (SS Block) after handover. When a plurality of UE-specific CSI-RS resources are selected, a plurality of UE-specific CSI-RS resources can be selected in a way of consecutively selecting a plurality of CSI-RS resources in the frequency domain, selecting a plurality of CSI-RS resources at equal intervals in the frequency domain, consecutively selecting a plurality of UE-specific CSI-RS resources in the time domain, or selecting a plurality of CSI-RS resources at equal intervals in time domain, or a combination of two or more of the above ways.

It should be noted that, under the condition that the base station configures and uses the above different UE-specific CSI-RS resources, the UE can further superpose different sequences or use different superposition codes (Code Division Multiplexing (CDM)) in the same sequence. In this case, the base station can inform the UE the sequence code used for the measurement by transmitting different sequence indexes, different cyclic shift indexes of the same sequence, different superposition code indexes or a combination of the above indexes.

It should also be noted that, when allocating a single UE-specific CSI-RS resource for measurement to a UE, the base station can inform the UE in the following ways:

(1a) the time domain index and the frequency domain index of the specific time-frequency resource are respectively informed. Wherein, the time domain index can use the subframe index of the radio frame to which the specific time-frequency resource belongs, or the slot index of the subframe to which the specific time-frequency resource belongs, or the symbol index of the slot to which the specific time-frequency resource belongs; another way of configuring the time-domain index can be: configuring the kth subframe after the current subframe as the starting position for measurement, and informing the parameter k to the UE; or configuring the kth symbol after the current symbol as the specific channel starting position for measurement, and informing the parameter k to the UE.

The frequency-domain index can be represented by the index of the PRB, or can be represented by using the number of PRBs or REs offsetting relative to the center of the uplink bandwidth or the edge of the bandwidth (for example, the first PRB or RE).

(2a) the PRBs or REs of the UE-specific CSI-RS resource available for measurement are sorted in a time index priority or frequency index priority way, and corresponding indexes are added. When configuring the UE-specific CSI-RS resource for measurement, the UE is informed of the indexes. The above way of sorting the PRBs or REs can be performed on all the available bandwidth or the bandwidth allocated to the corresponding UE.

(3a) the time sequence is predefined, while the frequency resource is configured simultaneously. For example, it is predefined that after receiving the resource allocation information of the time-frequency resource for measurement, the transmission of the UE-specific CSI-RS resource for measurement is performed on the corresponding time-frequency resource of the kth subframe after the current subframe, or on the corresponding time-frequency resource of the kth mini-subframe after the current mini-subframe, or on the corresponding time-frequency resource of the kth slot after the current slot, or on the corresponding time-frequency resource of the kth symbol after the current symbol. Wherein, the parameter k can be predefined, or can be transmitted to the UE together with the measurement configuration information.

When configuring a frequency resource, the notification can be performed by using PRB indexes or REs, or the notification can be performed by a bit-map.

When the base station allocates a plurality of UE-specific CSI-RS resources (resource groups) for measurement to the UE, the UE can be informed by the following ways:

(1b) the number of time-frequency resources in the time-frequency resource group for measurement and each time-frequency resource configuration for measurement are informed. For each configuration and notification of time-frequency resources for measurement, several ways of configuring only a single time-frequency resource as described above can be adopted.

(2b) the time domain index can be configured and determined in the predefined way, if each time-frequency resource in the time-frequency resource group for measurement are distinguished by FDM scheme. For example, predefining the first subframe after kth subframe after receiving the configuration information, or the first slot after the kth slot, or the first symbol after the kth symbol as the time-domain index of the access channel time-frequency resource for fast access; the above time-domain index which is represented by the delay (i.e, the parameter k) can be informed in a way of physical downlink control channel or in a way of transmitting to the UE along with the measurement configuration information.

Figure 72:
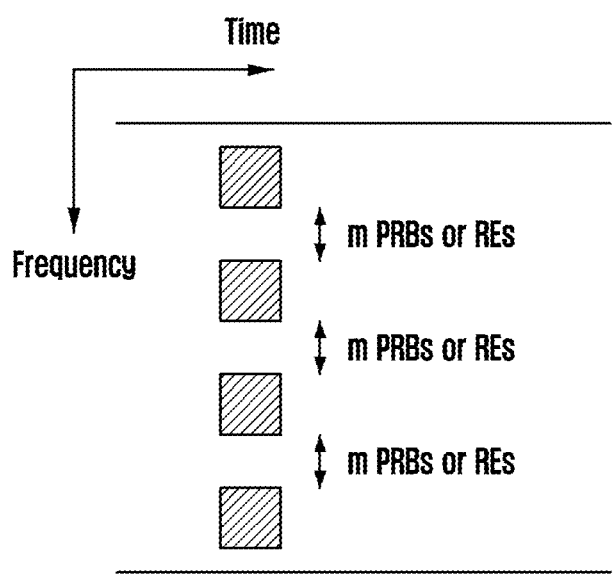
FIG. 72 is a schematic diagram of a configuration way of configuring UE-specific CSI-RS resources for measurement evenly spaced in a frequency domain according to an embodiment of the present invention.

For the frequency domain index, that is, the frequency domain position of the time-frequency resource for measurement, it can be configured and informed by the following ways:

(i) the position of the first time-frequency resource in the frequency domain (for example, the first PRB index of the first time-frequency resource), the frequency-domain interval of the two adjacent time-frequency resources (for example, using the number of the PRBs as the unit) and the number of the time-frequency resources in the frequency domain can be informed, if the allocated resources are arranged in the frequency domain according to certain rules, for example, distributed at fixed interval in the frequency domain. FIG. 72 is a schematic diagram of a way of configuring frequency-domain resource of the specific channel time-frequency resource by adopting this way.

In the above example, one configured UE-specific CSI-RS resource group for measurement consists of three UE-specific CSI-RS resources, which occupy the same time resource (for example, subframes, slots or symbols). The three specific access channels are spaced by the same number of PRBs (in the figure, m PRBs or REs). While informing the UE of the configuration of the UE-specific CSI-RS resource for measurement, the base station informs the first frequency domain position of the UE-specific CSI-RS resource for measurement, such as the first PRB or RE index, the interval m between the UE-specific CSI-RS resources for measurement and the number of the UE-specific CSI-RS resources for measurement. It is to be noted that, another configuration way is to determine the frequency-domain position of the first UE-specific CSI-RS resource for measurement, or the interval of the UE-specific CSI-RS resources for measurement, or the number of the UE-specific CSI-RS resources for measurement in a predefined way or a way of transmitting to the UE along with the measurement configuration information.

(ii) the bit-map is used to determine the frequency-domain index. The time-frequency resources available for measurement are divided into resource groups according to PRBs/REs or integer number of PRBs/REs, and an index is added to each resource group to define a bit group $b=[b_1, \ldots, b_M]$ in which the number of elements is the same as the number of the divided resource groups, and the value of the $i^{th}$ element $b_i$ in the bit group is 0 or 1, indicating whether the $i^{th}$ resource group is available for measurement, wherein 0 means that the $i^{th}$ resource group is not used for measurement and 1 means that $i^{th}$ resource group is used for measurement.

(iii) each of the frequency-domain positions of the UE-specific CSI-RS resources for the measurement is directly informed, for example, the index of the first PRB or RE of each UE-specific CSI-RS resource for measurement.

(3b) the frequency-domain index can be configured and determined in a predefined way, for example, predefining a frequency-domain resource for measurement, determining the frequency-domain position of the PRB or RE for measurement in a resource group; or determining the frequency-domain position of the PRB or RE for measurement by transmitting to the UE along with the measurement configuration information, if time-division multiplexing scheme is used to distinguish each time-frequency resource in a time-frequency resource group for measurement.

Figure 73:
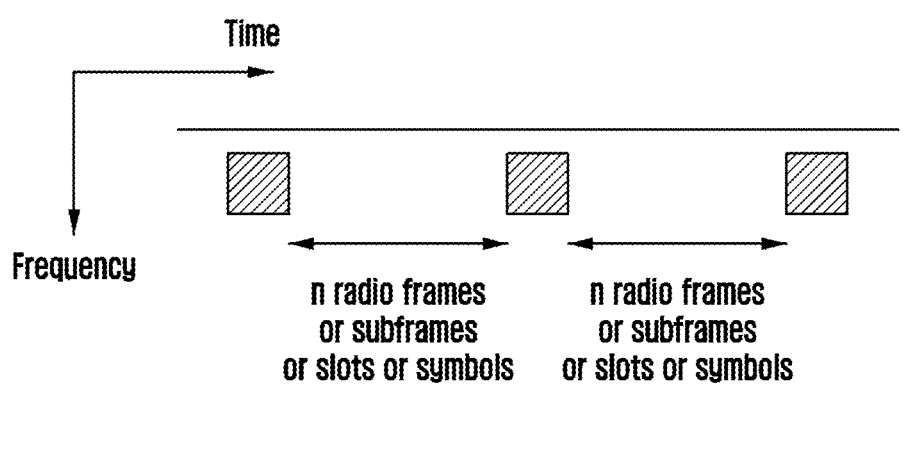
FIG. 73 is a schematic diagram of a configuration way of configuring UE-specific CSI-RS resources for measurement evenly spaced in a frequency domain according to an embodiment of the present invention.

For the frequency-domain index, that is, the frequency-domain position of the time-frequency resource for measurement, it can be configured and informed by the following ways:

(i) the time-domain position of each UE-specific CSI-RS resource for measurement is determined by informing the time-domain index of the first UE-specific CSI-RS resource for measurement, the time-domain interval of the adjacent UE-specific CSI-RS resources for measurement and the number of the UE-specific CSI-RS resources for measurement, if the allocated resources are arranged in the time domain according to certain rules, for example, distributed at a fixed interval in the time domain. Wherein, the time-domain interval of the adjacent UE-specific CSI-RS resources for measurement can also be represented by the density of the UE-specific CSI-RS resources for measurement. FIG. 73 is a schematic diagram of a way of configuring time-domain resource of the specific channel time-frequency resource by adopting this way.

(ii) each time-domain index of the UE-specific CSI-RS resource for measurement in the UE-specific CSI-RS resource group for measurement is directly informed, said time-domain index can be represented by using one of a radio frame index, a subframe index, a slot index or a symbol index or a combination of the above indexes.

Figure 74:
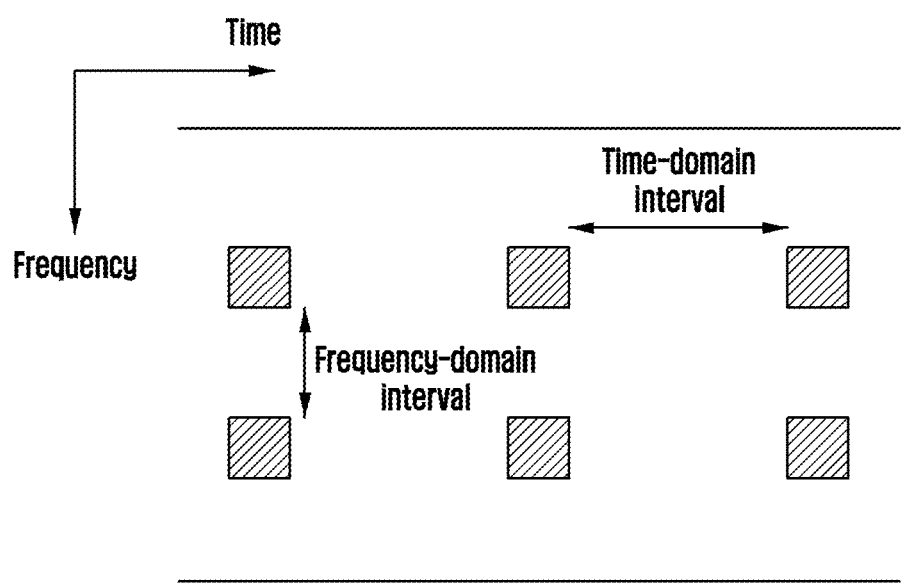
FIG. 74 is a schematic diagram of a configuration way of configuring UE-specific CSI-RS resources for measurement evenly spaced in a frequency domain and a time domain according to an embodiment of the present invention.

(4b) the configuration and notification of the UE-specific CSI-RS resources for measurement can be performed by using the combination of the ways (2b) and (3b), if the UE-specific CSI-RS resources for measurement in the UE-specific CSI-RS resource group for measurement are distinguished by adopting TDM and FDM simultaneously, and meanwhile, each UE-specific CSI-RS resource for measurement is configured according to certain rules in the time domain and the frequency domain. For example, the frequency-domain interval, the time-domain interval (or the time-domain density), the time-domain and frequency-domain positions of the first UE-specific CSI-RS resources for measurement (the time-domain index and frequency-domain index) and the number of the UE-specific CSI-RS resources for measurement in the time-domain and frequency-domain directions are as shown in FIG. 74, if the UE-specific CSI-RS resources for measurement are evenly spaced in the frequency domain and the time domain.

In addition, it should be noted that the measurement configuration information includes not only the initial measurement configuration information in step 1 but also the measurement resource configuration information in step 3. In addition, for different cells, the allocation way and the notification way of the UE-specific CSI-RS resources for measurement can be the same or different. However, the UE-specific CSI-RS resources for measurement can be simultaneously configured to one or more UEs.

Step 4: the UE measures the cell based on the initial measurement configuration information received in step 1 and the UE-specific CSI-RS resources configured for the cell, and optionally measures the neighboring cells based on the initial measurement configuration information received in step 1 and the configuration information of the UE-specific CSI-RS resources for measurement for the neighboring cells received in step 3 and reports the measurement results to the base station.

It should be noted that, for the same neighboring cell, the base station can configure one or more UE-specific CSI-RS resources for measurement. When configuring a plurality of UE-specific CSI-RS resources for measurement, each UE-specific CSI-RS resource can correspond to a different SS Blocks or a different beam of a base station in the neighboring cells.

Step 5: the base station makes a decision of UE handover based on the measurement result received in step 4 and radio resource management information.

Step 6: the base station determines a suitable target cell or a suitable target cell and a corresponding beam/SS Block thereof, and instructs the UE to perform a final handover, if the handover is decided in step 5.

It should be noted that step 1 and step 3 in the above method can be combined, and the base station can transmit the measurement configuration information to the UE in step 1, which includes measurement resource configuration information, a target to be measured by the UE, a neighboring cell list, a report scheme, measurement identification, event parameters and the like. The UE then transmits a measurement configuration complete message in step 2 and reports the measurement results in step 3. The base station makes a handover decision in step 4. If the handover is decided, the base station and the UE complete the handover process in step 5.

It should be further noted that, for the measurement of this cell (the cell to which the UE belongs), the UE-specific CSI-RS resource configured for the cell can be used, or the newly configured UE-specific CSI-RS resource for measurement can also be used.

In addition, it should be noted that in addition to configuring UE-specific CSI-RS resources, the UE can further measure the cell and the neighboring cells according to the synchronization signal blocks of the cell and the neighboring cells.

The method for measuring and handover cell is not only applicable to the intra-gNB handover for cell, but also applicable to the inter-gNB handover for cell (for example, an X2 handover and an S1 handover).

Embodiment 2

Based on Embodiment 1, this embodiment introduces an adjusted method for performing measurement and handover based on UE-specific CSI-RS resources. In this embodiment, the initial measurement configuration information and configuration information of UE-specific CSI-RS resources of the cell and the neighboring cells are transmitted in different steps, and for the cell and its neighboring cells, new UE-specific CSI-RS resources are all allocated for the cell and its neighboring cells for perform measurement. In addition, in this embodiment, the system can adopt a multi-beam operation, for example, the system operates in a high frequency band and needs beamforming gain to compensate for the large path loss. The system can also adopt a single-beam operation, for example adopting an omnidirectional antenna to provide coverage over a large angle.

Step 1: the base station transmits the initial measurement configuration information to the UE, including the object to be measured by the UE, a neighboring cell list, a report scheme, a measurement identification and event parameters, etc.

Step 2: the UE performs the measurement configuration according to the measurement control issued by the base station, and transmits the measurement configuration complete message to the base station.

Step 3: the base station transmits the measurement resource configuration information to the UE, including a time-frequency resource occupied by the UE-specific CSI-RS resource for measuring the cell and the neighboring cells, a used sequence resource, etc.

It should be noted that, the base station can reserve specific UE-specific CSI-RS resources for measurement which can be distinguished from the common UE-specific CSI-RS resources for other purpose, and can measure by using the common UE-specific CSI-RS resources for measurement. The UE-specific CSI-RS resources for measurement can be continuous, or can be discrete or a combination of the above two in the time domain and the frequency domain. Different UE-specific CSI-RS resources for measurement can be distinguished by one of the TDM, FDM or CDM or the combination of one or more of the TDM, FDM or CDM. For the same cell, the base station can allocate one or more UE-specific CSI-RS resources for measurement to the UE, and then inform the UE in different ways. The above specific resource allocation and notification ways are specifically described in Embodiment 1.

Step 4: the UE measures the cell based on the initial measurement configuration information received in step 1 and the UE-specific CSI-RS resource configuration information for measurement for the cell received in step 3, and optionally measures the neighboring cells based on the initial measurement configuration information received in step 1 and the configuration information of the UE-specific CSI-RS resource for measurement for the neighboring cells received in step 3 and reports the measurement results to the base station.

Step 5: the base station makes a decision of UE handover based on the measurement result received in step 4 and radio resource management information.

Step 6: the base station determines a suitable target cell or a suitable target cell and a corresponding beam/SS Block thereof, and instructs the UE to perform a final handover, if the handover is decided in step 5.

The method for measuring and handover cell is not only applicable to the intra-gNB handover for cell, but also applicable to the inter-gNB handover for cell (for example, the X2 handover and the S1 handover).

Embodiment 3

This embodiment introduces a method for performing measurement and handover based on UE-specific CSI-RS resource. In this embodiment, the initial measurement configuration information and the configuration information of the UE-specific CSI-RS resources for the neighboring cells are transmitted in the same steps, and the cell uses the configured UE-specific CSI-RS resources for measurement, and the neighboring cells are measured by using the newly configured CSI-RS for measurement. In this embodiment, the system can adopt a multi-beam operation, for example, the system operates in a high frequency band and needs beamforming gain to compensate for the large path loss. The system can also adopt a single-beam operation, for example adopting an omnidirectional antenna to provide coverage over a large angle.

Step 1: the base station transmits the initial measurement configuration information and the measurement resource configuration information to the UE, including the object to be measured by the UE, the neighboring cell list, the report scheme, the measurement identification, the event parameter, the time-frequency resources occupied by the UE-specific CSI-RS resources for measuring the neighboring cells, the used sequence resources, etc.

It should be noted that, the base station can reserve specific UE-specific CSI-RS resources for measurement which can be distinguished from the common UE-specific CSI-RS resources for other purpose, and can measure by using the common UE-specific CSI-RS resource for measurement. The UE-specific CSI-RS resources for measurement can be continuous, or can be discrete or a combination of the above two in the time domain and the frequency domain. Different UE-specific CSI-RS resources for measurement can be distinguished by one of the TDM, FDM or CDM or the combination of one or more of the TDM, FDM or CDM. For the same cell, the base station can allocate one or more UE-specific CSI-RS resources for measurement to the UE, and then inform the UE in different ways. The above specific resource allocation and notification ways are specifically described in Embodiment 1.

Step 2: the UE performs measurement configuration according to the measurement control issued by the base station, and transmits the measurement configuration complete message to the base station.

Step 3: the UE measures the cell based on the initial measurement configuration information received in step 1 and the UE-specific CSI-RS resources configured by the cell, and measures the neighboring cells optionally based on the initial measurement configuration information received in step 1 and the configuration information of the UE-specific CSI-RS resources for the measurement and reports the measurement results to the base station.

Step 4: the base station makes a decision of UE handover based on the measurement results received in step 3 and radio resource management information.

Step 5: the base station determines a suitable target cell or a suitable target cell and a corresponding beam/SS Block thereof, and instructs the UE to perform a final handover, if the handover is decided in step 4.

The method for measuring cell and handover cell is not only applicable to the intra-gNB handover for cell, but also applicable to the inter-gNB handover for cell (for example, the X2 handover and the S1 handover).

Embodiment 4

This embodiment introduces a method for performing measurement and handover based on UE-specific CSI-RS resources. In this embodiment, the initial measurement configuration information and the configuration information of the UE-specific CSI-RS resources for the cell and the neighboring cells are transmitted in the same steps, and both the cell and the neighboring cells are measured by using the newly configured UE-specific CSI-RS resources. In this embodiment, the system can adopt a multi-beam operation, for example, the system operates in a high frequency band and needs beamforming gain to compensate for the large path loss. The system can also adopt a single-beam operation, for example adopting an omnidirectional antenna to provide coverage over a large angle.

Step 1: the base station transmits the initial measurement configuration information and the measurement resource configuration information to the UE, including the object to be measured by the UE, the neighboring cell list, the report scheme, the measurement identification, the event parameter, the time-frequency resources occupied by the UE-specific CSI-RS resources for measuring the cell and the neighboring cells, the used sequence resources, etc.

It should be noted that, the base station can reserve specific UE-specific CSI-RS resources for measurement which can be distinguished from the common UE-specific CSI-RS resources for other purpose, and can measure by using the common UE-specific CSI-RS resource. The UE-specific CSI-RS resources for measurement can be continuous, or can be discrete or a combination of the above two in the time domain and the frequency domain. Different UE-specific CSI-RS resources for measurement can be distinguished by one of the TDM, FDM or CDM or the combination of one or more of the TDM, FDM or CDM. For the same cell, the base station can allocate one or more UE-specific CSI-RS resources for measurement to the UE, and then inform the UE in different ways. The above specific resource allocation and notification ways are specifically described in Embodiment 1.

Step 2: the UE performs measurement configuration according to the measurement control issued by the base station, and transmits the measurement configuration complete message to the base station.

Step 3: the UE measures the cell based on the initial measurement configuration information received in step 1 and the UE-specific CSI-RS resource configuration information for measurement in the cell, and measures the neighboring cells optionally based on the initial measurement configuration information received in step 1 and the configuration information of the UE-specific CSI-RS resources for measurement for the neighboring cells and reports the measurement result to the base station.

Step 4: the base station makes a decision of UE handover based on the measurement result received in step 3 and radio resource management information.

Step 5: the base station determines a suitable target cell or a suitable target cell and a corresponding beam/SS Block thereof, and instructs the UE to perform a final handover, if the handover is decided in step 4.

The method for measuring cell and handover cell is not only applicable to the intra-gNB handover for cell, but also applicable to the inter-gNB handover for cell (for example, the X2 handover and the S1 handover).

Embodiment 5

This embodiment describes a method for measuring and handover based on a Synchronization Signal (SS) Block. In this embodiment, the system can adopt a multi-beam operation, for example, the system operates in a high frequency band and needs beamforming gain to compensate for the large path loss. The system can also adopt a single-beam operation, for example, adopt an omnidirectional antenna to provide coverage over a large angle.

Step 1: the base station transmits the measurement configuration information to the UE, including the object to be measured by the UE, the neighboring cell list, the report scheme, the measurement identification, the event parameter, etc.

Step 2: the UE performs measurement configuration according to the measurement control issued by the base station, and transmits a measurement configuration complete message to the base station.

Step 3: the UE measures the cell based on the initial measurement configuration information received in step 1 and the UE-specific CSI-RS resources have been configured for cell or the SS Block of the cell, and measures the neighboring cells optionally based on the initial measurement configuration information received in step 1 and the SS Block of the neighboring cells, and reports the measurement results to the base station.

Step 4: the base station makes a decision of UE handover based on the measurement results received in step 3 and radio resource management information.

Step 5: the base station determines a suitable target cell or a suitable target cell and a corresponding beam/SS Block thereof, and instructs the UE to perform a final handover, if the handover is decided in step 4.

The method for measuring cell and handover cell is not only applicable to the intra-gNB handover for cell, but also applicable to the inter-gNB handover for cell (for example, the X2 handover and the S1 handover).

Figure 75:
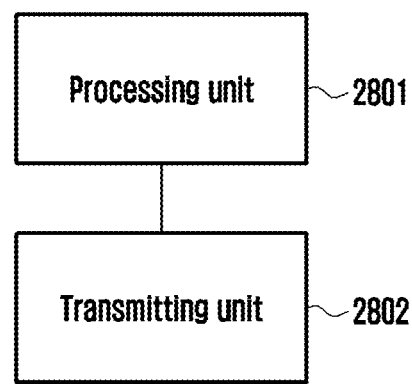
FIG. 75 is a structural diagram of an apparatus for measuring cell according to the present invention.

Based on the method for measuring cell provided by the present invention, the present invention further provides an apparatus for measuring cell, as shown in FIG. 75, including:

a processing unit 2801 is configured to measure a cell to which a UE belongs and neighboring cells in a cell list according to at least one of initial measurement configuration information, a UE-specific Channel State Information Reference Signal (CSI-RS) resource and a Synchronization Signal (SS) Block to obtain a measurement result;

a transmitting unit 2802 is configured to transmit the measurement result to a base station.

Figure 76:
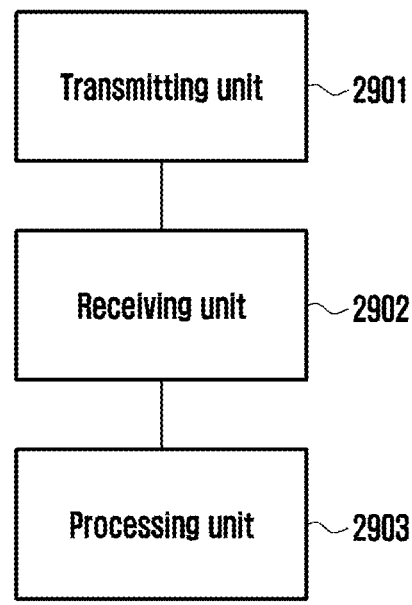
FIG. 76 is a structural diagram of an apparatus for handover according to the present invention.

Based on the above method for measuring cell provided by the present invention, the present invention further provides an apparatus for handover, as shown in FIG. 76, including:

a transmitting unit 2901 is configured to transmit initial measurement configuration information and a UE-specific CSI-RS resource to a UE;

a receiving unit 2902 is configured to receive a measurement result returned by the UE.

a processing unit 2903 is configured to determine, according to the measurement result, whether to hand over a cell to which the UE belongs currently; and when it is determined to hand over, transmit an instruction for handover carrying a target neighboring cell.

The method and apparatus for measuring cell and the method and apparatus for handover described in the present invention can be applied to a future 5G radio network without a common cell reference signal and flexibly configure a cell to be measured and its corresponding UE-specific CSI-RS resource for measurement according to information such as radio resource management information and cell load, to significantly improve the efficiency and performance of the measurement and handover process.

Figure 77:
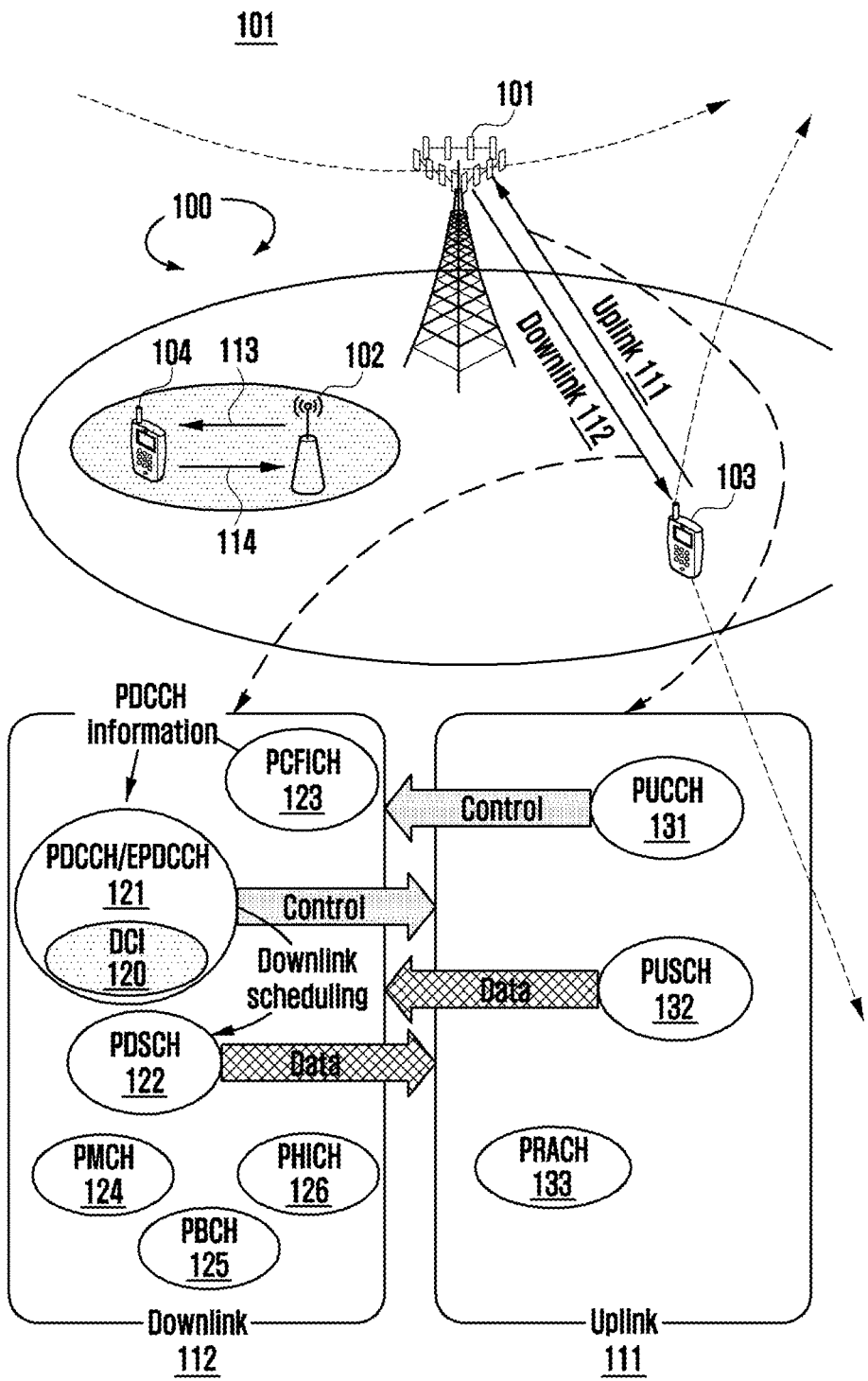
FIG. 77 is a schematic diagram of an example of a mobile communication network according to an embodiment of the present invention.

Based on the above embodiment of the present invention, as shown in FIG. 77, a radio communication system 100 according to an exemplary embodiment of the present invention is shown, in which the UE detects the indication information. The radio communication system 100 includes one or more fixed infrastructure units that form a network that is distributed over a geographic area. The base unit can also be referred to as an access point (AP), an access terminal (AT), a base station (BS), a Node-B, an evolved NodeB (NB), a Next-generation base station (gNB), or other terms used in the art. The AP in this embodiment of the present invention can be replaced by any one of the above terms. As shown in FIG. 77, one or more base stations 101 and 102 provide services for several mobile stations (MS) or UEs or terminal equipments or users 103 and 104 in a service area. For example, the serving area is a range within a cell or a sector of cell. In some systems, one or more BSs can be communicatively coupled to a controller forming an access network which can be communicatively coupled to one or more core networks. The disclosed examples are not limited to any particular radio communication system.

In the time domain and/or frequency domain, base stations 101 and 102 transmit downlink (DL) communication signals 112 and 113 to UEs 103 and 104, respectively. The UEs 103 and 104 communicate with one or more base units 101 and 102 through uplink (UL) communication signals 111 and 114, respectively. In one embodiment, the mobile communication system 100 is an Orthogonal Frequency Division Multiplexing (OFDM)/Orthogonal Frequency Division Multiple Access (OFDMA) system, which comprises a plurality of base stations and a plurality of UEs, wherein the plurality of base stations includes a base station 101 and a base station 102, and the plurality of UEs includes a UE 103 and a UE 104. The base station 101 communicates with the UE 103 through the UL communication signal 111 and the DL communication signal 112. When a base station has a DL packet to transmit to UEs, each UE obtains a DL allocation (resource) such as a Physical Downlink Shared Channel (PDSCH) or a narrowband Physical Downlink Shared Channel (NPDSCH). When a UE needs to transmit a packet to a base station in the UL, the UE obtains a grant from the base station, wherein, the grant allocates a Physical Uplink Shared Channel (PUSCH) containing a set of UL radio resources or Narrowband Physical Uplink Shared Channel (NPUSCH). The UE acquires DL or UL scheduling information from a Physical Downlink Control Channel (PDCCH), or an MTC PDDCH (MPDCCH) or an enhanced PDCCH (EPDCCH) or a narrowband PDCCH (NPDCCH) which are specific to themselves. The DL or UL scheduling information and other control information carried by the downlink control channel are called Downlink Control Information (DCI). FIG. 77 also shows different physical channels exemplified by DL 112 and UL 111. The DL 112 includes a PDCCH or EPDCCH or NPDCCH or MPDCCH 121, a PDSCH or NPDSCH 122, a Physical Control Formation Indicator Channel (PCFICH) 123, a Physical Multicast Channel (PMCH) 124, a Physical Broadcast Channel (PBCH) or a narrowband physical broadcast channel NPBCH 125, a Physical Hybrid Automatic Repeat Request Indicator Channel (PHICH) 126 and a Primary Synchronization Signal (PSS), a Secondary Synchronization Signal (SSS), or a Narrowband PSS (NPSS)/Narrowband SSS (NSSS). The downlink control channel 121 transmits a downlink control signal to the user. The DCI 120 is carried through the downlink control channel 121. The PDSCH 122 transmits data information to the UE. The PCFICH 123 transmits information used for decoding PDCCH, such as dynamically indicating the number of symbols used by PDCCH 121. The PMCH 124 carries broadcast multicast information. The PBCH or NPBCH 125 carries Master Information Block (MIB) for early detection of UEs and cell-wide coverage. The PHICH carries HARQ information, which indicates whether the base station correctly receives the transmitted signal of PUSCH. The UL 111 includes a Physical Uplink Control Channel (PUCCH) 131, a PUSCH 132, and a Physical Random Access Channel (PRACH) 133 that carries random access information.

In one embodiment, the radio communication network 100 uses an OFDMA or a multi-carrier architecture, including an Adaptive Modulation and Coding (AMC) on the DL and a next-generation single-carrier FDMA architecture or multi-carrier OFDMA architecture for UL transmission. The single-carrier architecture based on FDMA includes Interleaved FDMA (IFDMA), Localized FDMA (LFDMA), DFT-spread OFDM (DFT-SOFDM) of IFDMA or LFDMA. In addition, the single-carrier architecture based on FDMA also includes various enhanced Non-Orthogonal Multiple Access (NOMA) architectures of the OFDMA system, such as Pattern Division Multiple Access (PDMA), Sparse Code Multiple Access (SCMA), Multi-User Shared Access (MUSA), Low Code Rate Spreading Frequency Domain Spreading (LCRS FDS), Non-Orthogonal Coded Multiple Access (NCMA), Resource Spreading Multiple Access (RSMA), Interleave-Grid Multiple Access (IGMA), Low Density Spreading with Signature Vector Extension (LDS-SVE), Low Code Rate and Signature based Shared Access (LSSA), Non-Orthogonal Coded Access (NOCA), Interleave Division Multiple Access (IDMA), Repetition Division Multiple Access (RDMA), Group Orthogonal Coded Access (GOCA) and Welch-bound Equality based Spread MA (WSMA).

In OFDMA systems, the remote units are served by allocating DL or UL radio resources that typically contain a set of subcarriers on one or more OFDM symbols. An OFDMA protocol including the developed LTE of the 3GPP UMTS standards and IEEE 802.16 standards is illustrated. The architecture can also include the use of transmission technologies such as Multi-Carrier CDMA (MC-CDMA), Multi-Carrier Direct Sequence CDMA (MC-DS-CDMA), Orthogonal Frequency and Code Division Multiplexing (OFCDM) of one-dimensional or two-dimensional transmission, simpler time division and/or frequency division multiplexing/multiple access technologies, or a combination of these different technologies. In an alternative embodiment, the communication system can use other cellular communication system protocols, including but not limited to TDMA or direct sequence CDMA.

It should be understood by those skilled in the art that the present invention involves apparatuses for performing one or more of operations as described in the present invention. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already disclosed in the present invention may also be alternated, changed, rearranged, decomposed, combined or deleted.

The foregoing descriptions are merely preferred embodiments of the present invention. It should be noted that, for a person of ordinary skill in the art, various modifications and embellishments can be made without departing from the principle of the present invention. Such modifications and embellishments shall be regarded as falling into the protection scope of the present invention.

To enable objectives, technical solutions and advantages of the present disclosure more clear, detailed descriptions of the present disclosure are further provided in the following, accompanying with attached figures and embodiments.

When at least one BWP is configured for a UE, meanwhile there is only one active BWP, the UE may simultaneously receive data and a reference signal (RS) of one BWP.

FIG. 79 is a basic flow chart illustrating a method for reporting CSI, in accordance with an embodiment of the present disclosure. As shown in FIG. 79, the method includes the following blocks.

In block 701, a UE selects at least one BWP from at least one configured BWP.

In block 702, the UE calculates a CSI report, based on the BWP selected in block 201.

Here, a method for calculating the CSI report may be firstly determined, based on the type of the BWP. And then, the CSI report is calculated, based on the determined method. The type of the BWP refers to that whether the BWP is an active BWP, or an inactive BWP.

In block 703, the UE transmits the calculated CSI report to a Base Station (BS).

Descriptions about CSI measured with an inactive BWP, and CSI measured with an active BWP are provided in the following, by using some examples, where periodic CSI and aperiodic CSI are respectively adopted. In addition, an event driven method may be used to report CSI and Radio Resource Management (RRM), which are measured with the inactive BWP.

Detailed descriptions about the technical solutions of the present disclosure are further provided in the following, accompanying with several preferred embodiments. The present disclosure provides a method for reporting a CSI measurement, or reporting an RRM measurement, under the circumstances that a UE is configured with an active BWP and an inactive BWP. The CSI measurement, or RRM measurement performed on the active BWP or inactive BWP is independent. Since the BS needs to transmit a Physical Downlink Control Channel (PDCCH) and a Physical Downlink Shared Channel (PDSCH) on the active BWP, short period and high accuracy of CSI report are needed. However, the BS does not transmit the PDCCH and PDSCH on the inactive BWP, which are only candidate resources. Thus, period of the CSI report may be longer, thereby reducing influence on the active BWP. Descriptions for CSI measured on the inactive BWP and active BWP are provided in the following, by using some examples, where periodic CSI and aperiodic CSI are adopted. In addition, an event driven method may be used to report the CSI and RRM, which are measured on the inactive BWP.

A First Embodiment

The embodiment mainly describes a method for selecting a BWP for use in calculating CSI, and a method for calculating the CSI based on the selected BWP, in an aperiodic CSI report.

A First Method:

An aperiodic CSI report at a time only includes an aperiodic CSI report, which is calculated based on channels and interference situation within one BWP. For example, a UE has configured 4 downlink BWPs, which are respectively BWP-1, BWP-2, BWP-3 and BWP-4. The aperiodic CSI report at a time is calculated, based on channels and interference situation within BWP-2. On the basis of the first method, under the circumstances that a UE is configured with multiple downlink BWPs, there are the following modes for selecting BWP, on which the aperiodic CSI report is calculated each time.

A First Mode:

An active BWP of multiple BWPs configured by a UE is adopted to calculate the aperiodic CSI report. The aperiodic CSI report is driven by CSI request information of DCI, which schedules a Physical Uplink Shared Channel (PUSCH). The active BWP is in a time slot, where the DCI transmitting and driving the aperiodic report is located. And, it is required to report the active BWP within a serving cell of the aperiodic CSI report. For example, suppose that a UE has configured 2 serving cells, which are respectively serving cell 1 and serving cell 2. Within the serving cell 2, the UE has configured 4 downlink BWPs, which are respectively BWP-1, BWP-2, BWP-3 and BWP-4. In a time slot n, the aperiodic CSI report is driven by DCI, which schedules PUSCH of serving cell 1. The aperiodic CSI report needs to simultaneously include an aperiodic CSI report of serving cell 1, and an aperiodic CSI report of serving cell 2. Meanwhile, in the time slot n, BWP-2 is the active BWP in the serving cell 2. Subsequently, the aperiodic CSI report of serving cell 2 is calculated, based on channels and interference situation within BWP-2, as shown in FIG. 80. The aperiodic CSI report at least includes CQI. Optional, the aperiodic CSI report may further include RI, and/or, PMI. Besides, parameters in the CSI report are calculated, based on channels and interference situation within the active BWP. The active BWP is determined, based on channel quality and frequency-domain load. The CSI reporting the active BWP facilitates to provide an effective support for resource scheduling of the BS.

A Second Mode:

The aperiodic CSI report is calculated, based on a BWP with the best CQI. The BWP is selected by a UE from multiple BWPs, which are configured by the UE. The aperiodic CSI report at least includes CQI. Optional, the aperiodic CSI report may further include RI, and/or, PMI. Besides, parameters of the CSI report are calculated, based on channels and interference situation in the BWP with the best CQI. The foregoing BWP is selected by a UE. For example, the UE has configured 4 downlink BWPs, which are respectively BWP-1, BWP-2, BWP-3 and BWP-4. The aperiodic CSI report is calculated, based on channels and interference situation of a BWP with the best CQI, and the BWP is selected by the UE from BWP-1, BWP-2, BWP-3 and BWP-4. Suppose that BWP-3 is the BWP with the best CQI, which is selected by the UE, the aperiodic CSI report is calculated, based on channels and interference situation within BWP-3. In this way, when reporting the CSI of BWP, it is necessary to report the number of the BWP with the best CQI. For example, the UE configures 4 downlink BWPs, which are respectively BWP-1, BWP-2, BWP-3 and BWP-4. Subsequently, information of 2 bits is needed to indicate the BWP with the best CQI, which is selected by the UE from 4 BWPs. Table 9 is an example illustrating a specific mapping relationship, which is between an information indication value and BWP with the best CQI. The CSI, which reports the BWP with the best CQI, facilitates the BS to schedule resources with the best CQI for the UE, thereby improving spectrum efficiency.

TABLE 9 a mapping relationship between information indication value and the best BWP

| information indication value | BWP with the best CQI |
| --- | --- |
| 00 | BWP-1 |
| 01 | BWP-2 |
| 10 | BWP-3 |
| 11 | BWP-4 |

A Second Method

An aperiodic CSI report at a time includes aperiodic CSI reports of at least two BWPs, which are calculated based on channels and interference situations within the at least two BWPs. Besides, formats of the aperiodic CSI reports of the at least two BWPs may be different. For example, CSI report of one BWP only includes CQI. The CSI report of the other BWP includes CQI, and/or, RI, and/or, PMI. On the basis of the second method, when the UE configures at least two downlink BWPs, there are the following methods to select BWP, on which the aperiodic CSI report is calculated each time.

A First Mode:

The aperiodic CSI report includes aperiodic CSI reports of at least two BWPs, which are calculated based on channels and interference situations within the at least two BWPs. One is the aperiodic CSI report of an active BWP. The remaining aperiodic CSI reports are about some BWPs with the best CQI, which are selected from BWPs configured by the UE. Specific descriptions are provided in the following.

For an aperiodic CSI report, which is calculated based on an active BWP of at least two BWPs configured by the UE, the aperiodic CSI report is driven by CSI request information of DCI scheduling PUSCH. The active BWP is in a time slot, where DCI transmitting and driving the aperiodic CSI report is located, and the active BWP is in a serving cell, which requests the aperiodic CSI report. For example, suppose that the UE has configured 2 serving cells, which are respectively serving cell 1 and serving cell 2. Within the serving cell 2, the UE has configured 4 downlink BWPs, which are respectively BWP-1, BWP-2, BWP-3 and BWP-4. Within a time slot n, the aperiodic CSI report is driven by DCI, which schedules PUSCH of serving cell 1. The aperiodic CSI report needs to simultaneously report an aperiodic CSI report of serving cell 1, and an aperiodic CSI report of serving cell 2. Besides, within the time slot n, BWP-2 is the active BWP within serving cell 2. Subsequently, the aperiodic CSI report of serving cell 2 is calculated, based on channels and interference situation within BWP-2, as shown in FIG. 80. The aperiodic CSI report at least includes CQI, and may further include RI and/or PMI. Besides, parameters of the CSI report are calculated, based on channels and interference situation within the active BWP.

For the aperiodic CSI report calculated based on N (N is a positive integer greater than or equal to 1, the UE may obtain the value of N by receiving a high-layer signaling configuration or protocol presets) BWPs with the best CQI, which are selected by the UE from at least two configured BWPs, the aperiodic CSI report at least includes CQI, and may further include RI, and/or, PMI. Besides, parameters of the CSI report are calculated, based on channels and interference situation of N BWPs with the best CQI, and the N BWPs are selected by the UE. For example, the UE has configured 4 downlink BWPs, which are respectively BWP- 1, BWP-2, BWP-3 and BWP-4. The aperiodic CSI report is calculated, based on channels and interference situation of BWP with the best CQI, and the BWP is selected by the UE from BWP-1, BWP-2, BWP-3 and BWP-4. For example, BWP-3 is selected by the UE, and possesses the best CQI. Subsequently, the aperiodic CSI report is calculated, based on channels and interference situation within BWP-3. For example, at this time, the aperiodic CSI report may only include CQI. The aperiodic CSI report aims to select a BWP with the best CQI from multiple BWPs, and report the BWP to the BS. Subsequently, the BS activates the BWP, based on the information. In this way, when transmitting the CSI report, it is necessary to simultaneously report the number of the BWP with the best CQI.

A Second Mode:

The aperiodic CSI report includes aperiodic CSI reports of at least two BWPs, which are calculated based on channels and interference situations within the at least two BWPs. The BWP, which is used for calculating the aperiodic CSI report, is determined by a method combined with high-layer signaling configuration and physical-layer signaling indication. The physical-layer signaling indication may be dedicated BWP indication information, or the BWP for calculating the aperiodic CSI report, which is determined by re-explaining the CSI request information. For example, the high-layer signaling has configured 4 BWPs for the UE, which are respectively BWP-1, BWP-2, BWP-3 and BWP-4. And then, the high-layer signaling configures 2 BWP sets. BWP set 1 includes BWP-1 and BWP-2. BWP set 2 includes BWP-1, BWP-2, BWP-3 and BWP-4. The DCI, which drives the aperiodic CSI, includes BWP indication information of 1 bit. When value of the BWP indication information is "0", the aperiodic CSI report includes an aperiodic CSI report of BWP within BWP set 1. When the value of BWP indication information is "1", the aperiodic CSI report includes an aperiodic CSI report of BWP within BWP set 2.

Alternatively, after re-explaining the CSI request information, the following items corresponding to the aperiodic CSI report are jointly determined, including: the serving cell, the CSI process of the serving cell, a BWP reporting the aperiodic CSI, and the BWP is in the serving cell configured with multiple BWPs. For example, when the CSI request information includes 2 bits, on the basis of the mode shown in Table 10, the following items corresponding to the aperiodic CSI report are determined, and the items include the serving cell, the CSI process of the serving cell, and BWP of the serving cell.

TABLE 10 a corresponding relationship between value of CSI request information and BWP of CSI report

| value of CSI request information | serving cell, CSI process, and BWP of the serving cell corresponding to aperiodic CSI report |
| --- | --- |
| 00 | there is no aperiodic CSI report |
| 01 | serving cell, CSI process, and BWP set 1 of serving cell which are configured by high-layer signaling, |
| 10 | serving cell, CSI process, and BWP set 2 of serving cell which are configured by high-layer signaling, |
| 11 | serving cell, CSI process and BWP set 3 of serving cell which are configured by high-layer signaling. |

A Third Mode:

The aperiodic CSI report includes aperiodic CSI reports of at least two BWPs, which are calculated based on channels and interference situations within the at least two BWPs. The aperiodic CSI report is about some BWPs with the best CQI, which are selected from BWPs configured by the UE. The aperiodic CSI report is calculated based on N (N is a positive integer greater than or equal to 1, the UE may obtain the value of N by receiving high-layer signaling or protocol presets) BWPs with the best CQI, which are selected by the UE from multiple configured BWPs. The aperiodic CSI report at least includes CQI, and may further include RI, and/or, PMI. Besides, parameters of the CSI report are calculated, based on channels and interference situations of N BWPs with the best CQI, and the N BWPs are selected by the UE. For example, the UE has configured 4 downlink BWPs, which are respectively BWP-1, BWP-2, BWP-3 and BWP-4. The aperiodic CSI report is calculated, based on channels and interference situation of a BWP with the best CQI, in which the BWP is selected by the UE from BWP-1, BWP-2, BWP-3 and BWP-4. For example, BWP-2 and BWP-3 are BWPs with the best CQI, which are selected by the UE. Subsequently, the aperiodic CSI report includes 2 aperiodic CSI reports, which are calculated based on channels and interference situations within BWP-2 and BWP-3.

A Second Embodiment

The embodiment mainly describes a method for selecting a BWP for use in calculating CSI, and a method for calculating the CSI based on the selected BWP, in a periodic CSI report, A First Method:

The periodic CSI report only includes a periodic CSI report, which is calculated based on channels and interference situation within an active BWP. For example, a UE has configured 4 downlink BWPs, which are respectively BWP-1, BWP-2, BWP-3 and BWP-4. The periodic CSI report at a time is a periodic CSI report, which is calculated based on channels and interference situation within BWP-2. Since there is only one active BWP at the same time, the periodic CSI report is calculated, based on channels and interference situation within the active BWP. There is one configuration of period and time offset for the periodic CSI report. That is, no matter which is the active BWP, the period and time offset of the periodic CSI report are unchanged. For example, the period and time offset of the periodic CSI report are respectively T and t. Subsequently, the periodic CSI report is transmitted at the time moments of t, t+T, . . . , t+NT, . . . . However, the CSI may be calculated at a different time moment based on a different active BWP. For example, at the time moments of t and t+T, the CSI reported is a periodic CSI report, which is calculated based on channels and interference situation within the active BWP-1. At the time moments of t+2T and t+3T, the reported CSI is a periodic CSI report, which is calculated based on channels and interference situation within the active BWP-3, as shown in FIG. 81. The CSI report transmitted at the time moment of t is based on the BWP. And, the BWP is calculated by CSI-RS within the active BWP in a time slot of time moment t−k−1. The value k is configured by high-layer signaling, or is preset by protocol, which denotes processing delay of CSI measurement. 1 is the minimum value of k, and denotes that there is CSI-RS in the active BWP of time slot of time moment t−k−1, as shown in FIG. 82.

A Second Method:

Multiple sets of periodic CSI reports are configured to be transmitted. For example, 2 sets of periodic CSI reports are configured. One set of periodic CSI reports is calculated, based on channels and interference situation within the active BWP. The other set of periodic CSI reports is calculated, based on channels and interference situation within the inactive BWP. Alternatively, the other set of periodic CSI reports is calculated, based on channels and interference situation within all the BWPs. Periods and time offsets of these two sets of periodic CSI reports are respectively configured independently. For example, period and time offset of the first set of periodic CSI reports are respectively T1 and t1. The period and time offset of the second set of periodic CSI reports are respectively T2 and t2. T2 may be greater than T1, as shown in FIG. 83. Formats of CSI reports of the active BWP and inactive BWP may be different. For example, the CSI report of the active BWP includes CQI. Optional, the CSI report of the active BWP may further include RI, and/or, PMI. However, the CSI report of the inactive BWP includes CQI.

As mentioned above, one set of periodic CSI reports therein only includes periodic CSI reports, which are calculated based on channels and interference situation within active BWP. For example, a UE has configured 4 downlink BWPs, which are respectively BWP-1, BWP-2, BWP-3 and BWP-4. The periodic CSI report at a time is a periodic CSI report, which is calculated based on channels and interference situation within active BWP-2. Since there is only one active BWP at the same time moment, the periodic CSI report is calculated based on channels and interference situation within the active BWP. There is only one configuration of period and time offset for the periodic CSI report. That is, no matter which BWP is the active BWP, period and time offset of the periodic CSI report are unchanged. For example, period and time offset of the periodic CSI report are respectively T and t. Subsequently, the periodic CSI report is transmitted at the time moments of t, t+T, . . . , t+NT, . . . . However, the active BWP, depending on which the CSI is calculated at a different time moment, may be different. For example, the CSI respectively reported at the time moments of t and t+T is a periodic CSI report, which is calculated based on channels and interference situation within active BWP-1. The CSI respectively reported at the time moments of t+2T and t+3T is a periodic CSI report, which is calculated based on channels and interference situation within active BWP-3, as shown in FIG. 81. The CSI report transmitted at the time moment of t is based on a BWP. The BWP is calculated by CSI-RS of active BWP in a time slot of time moment t−k−1. Value k is configured by high-layer signaling, or is preset by protocol, which denotes processing delay of CSI measurement. 1 is the minimum value of k, and denotes that there is CSI-RS within active BWP of time slot of time moment t−k−1, as shown in FIG. 82. For a CSI report of active BWP reported by a UE, when the active BWP is changed, after the BWP is activated, the first periodic CSI report needs to report a self-contained CSI report (here, the self-contained CSI report refers to that, the CSI is determined based on the self-contained CSI report. Since a periodic CSI report may report RI sometimes, report CQI and/or PMI sometimes, at this time, CSI is jointly determined by parameters reported at multiple time moments, this kind of CSI report is referred to as a non-self-contained CSI report. That is, at each time moment of CSI report, only a part of CSI is included. However, the self-contained CSI report includes all the CSI components at the same time, e.g., the self-contained CSI report at least includes RI and CQI, and includes PMI optionally). As shown in FIG. 84, what is reported at the time moment of t is a self-contained CSI report of BWP-1. A non-self-contained CSI report of BWP-1 is reported at the time moment of t+T. A self-contained CSI report of BWP-2 is reported at the time moment of t+2T. A non-self-contained CSI report of BWP-2 is reported at the time moment of t+3T. Alternatively, some CSI reports in the periodic CSI report are shared by BWPs. Some CSI reports are unique to a BWP. For example, RI is shared by BWPs. That is, RI may be taken as the RI of BWP-2, in which the RI is obtained after measuring channels and interferences within BWP-1, so as to obtain CQI of BWP-2. Optional, the PMI may be further obtained. However, CQI/PMI is unique to BWP. That is, CQI/PMI of each BWP is obtained, based on each BWP.

As mentioned above, the other set of periodic CSI reports is calculated, based on channels and interference situation within inactive BWP. The periodic CSI report is calculated, based on some BWPs with the best CQI. The foregoing some BWPs are selected from BWPs configured by the UE. The periodic CSI report is calculated, based on N (N is a positive integer greater than or equal to 1, the UE may obtain the value of N, by receiving a high-layer signaling configuration or protocol presets) BWPs with the best CQI. And the N BWPs are selected by the UE from multiple configured BWPs. The periodic CSI report at least includes CQI, and may further include RI, and/or, PMI. Besides, parameters of the CSI report are calculated, based on channels and interference situation of the N BWPs with the best CQI selected by the UE. For example, the UE has configured 4 downlink BWPs, which are respectively BWP-1, BWP-2, BWP-3 and BWP-4. The periodic CSI report is calculated, based on channels and interference situation of a BWP with the best CQI, in which the BWP is selected by the UE from BWP-1, BWP-2, BWP-3 and BWP-4. Suppose that BWP-2 and BWP-3 are the best BWPs selected by the UE, the periodic CSI report includes 2 periodic CSI reports, which are calculated based on channels and interference situation of BWP-2 and BWP-3.

A Third Embodiment

The CSI-RS resources, on which the aperiodic CSI report is based, are different from configuration of existing aperiodic CSI-RS resources. Due to limited bandwidth capabilities of a UE, the UE only receives CSI-RS of one BWP within a time slot, and measures the CSI-RS. Subsequently, aperiodic CSI-RS of the aperiodic CSI report may be one CSI-RS pattern, which is switched by different BWPs according to a certain format. That is, when receiving an aperiodic CSI-RS drive, the UE may respectively receive CSI-RS of all the BWPs configured by the UE, in several different downlink time slots. For example, the UE has configured 4 downlink BWPs, which are respectively BWP-1, BWP-2, BWP-3 and BWP-4. The UE receives signaling (physical-layer signaling (DCI) or Media Access Control (MAC) layer signaling) driving the aperiodic CSI-RS in time slot n. In subsequent several determined downlink time slots, the UE respectively receives CSI-RS in different BWPs, according to time division. For example, in a downlink time slot n+k (k is a non-negative integer, e.g., k may be equal to 0, the value of k is configured by high-layer signaling, or is preset by protocol), the UE receives CSI-RS on BWP-1. In a downlink time slot n+k+1, the UE receives CSI-RS on BWP-2. In a downlink time slot n+k+2, the UE receives CSI-RS on BWP-3. In a downlink time slot n+k+3, the UE receives CSI-RS on BWP-4, as shown in FIG. 85.

The CSI-RS resources, on which the aperiodic CSI report is based, may be different from configuration of existing aperiodic CSI-RS resources. Due to limited bandwidth capabilities of a UE, the UE only receives and measures CSI-RS of one BWP in a time slot. Subsequently, aperiodic CSI-RS for use in aperiodic CSI report may be one CSI-RS pattern, which is switched by different BWPs according to a certain format. That is, when receiving an aperiodic CSI-RS drive, within several different downlink time slots, the UE may respectively receive CSI-RS of some designated BWPs configured by the UE. For example, the UE has configured 4 downlink BWPs, which are respectively BWP-1, BWP-2, BWP-3 and BWP-4. The UE receives signaling (physical layer signaling (DCI) or MAC layer signaling) driving the aperiodic CSI-RS in time slot n, it is indicated that the UE receives CSI-RS of BWP-1 and BWP-3. Subsequently, in a downlink time slot n+k, the UE receives CSI-RS on BWP-1. In a downlink time slot n+k+1, the UE receives CSI-RS on BWP-3, as shown in FIG. 86.

The CSI-RS resources, on which the aperiodic CSI report is based, may be periodic CSI-RS resources. Due to limited bandwidth capabilities of a UE, the UE only receives and measures CSI-RS of one BWP in a time slot. Subsequently, when the aperiodic CSI report of the UE at a time needs to be determined, based on channels and interference situations of multiple BWPs, the periodic CSI-RS resources of the UE should be within multiple time slots. Thus, the UE may respectively measure CSI of a different BWP at a different time moment. When the aperiodic CSI is reported in time slot n, CSI-RS resources of BWP-i are within time slot n−k−mi. K is determined, based on requirements of processing delay. A processing duration between CSI-RS measurement and CSI report is left. mi is greater than or equal to 0. In the time slot n−k−mi, there are CSI-RS resources for BWP-i. Besides, in the time slot n−k−mi, there is no CSI-RS resource for the remaining BWPs. For example, the UE has configured 4 downlink BWPs, which are respectively BWP-1, BWP-2, BWP-3 and BWP-4. An aperiodic CSI is reported at time slot n. The CSI-RS resources of BWP-1 are in time slot n−k−m1. The CSI-RS resources of BWP-2 are in time slot n−k−m2. The CSI-RS resources of BWP-3 are in time slot n−k−m3. The CSI-RS resources of BWP-4 are in time slot n−k−m4. Besides, n−k−m1, n−k−m2, n−k−m3, n−k−m4 are not overlapped, as shown in FIG. 87. Alternatively, there is CSI-RS on multiple BWPs in the same time slot. However, the UE cannot simultaneously receive CSI-RS of multiple BWPs within one time slot. Thus, when there is CSI-RS for multiple BWPs in one time slot, a priority sequence is determined to receive CSI-RS within different BWPs. For example, CSI-RS of a BWP most adjacent to an aperiodic CSI report is firstly received, according to a descending order of BWP number. For example, the UE has configured 4 downlink BWPs, which are respectively BWP-1, BWP-2, BWP-3 and BWP-4. The aperiodic CSI is reported at time slot n. In any time slot of time slots n−k−m1, n−k−m2, n−k−m3, n−k−m4, there is CSI-RS on BWP-1, BWP-2, BWP-3 and BWP-4. Besides, m1<m2<m3<m4. Subsequently, CSI-RS of BWP-4 is received in time slot n−k−m1. CSI-RS of BWP-3 is received in time slot n−k−m2. CSI-RS of BWP-2 is received in time slot n−k−m3. CSI-RS of BWP-1 is received in time slot n−k−m4, which is shown in FIG. 88.

A Fourth Embodiment

Determination of CSI-RS resources, on which the periodic CSI report is based, is different from determination of existing periodic CSI-RS resources. Due to limited bandwidth capabilities of a UE, the UE only receives and measures CSI-RS within one BWP in one time slot. The embodiment provides the following several configuration methods for determining the CSI-RS resources, on which the periodic CSI report is based.

A First Method:

A set of periodic CSI-RS is configured. Besides, the CSI-RS is only transmitted on an active BWP. For example, period and time offset of the periodic CSI-RS are respectively configured to be T and t. Subsequently, the CSI-RS is transmitted at time moments of t, t+T, . . . , t+NT, . . . . The CSI-RS is transmitted on an active BWP at the time moment of t+nT. Since there is only one active BWP at the same time moment, the CSI-RS is transmitted on one BWP at the same time moment, as shown in FIG. 89.

A Second Method:

At least two sets of periodic CSI-RS are configured. One set of periodic CSI-RS therein is only transmitted on an active BWP. The remaining CSI-RS is transmitted on the active BWP, or inactive BWP. For example, regarding one set of CSI-RS, period and time offset of periodic CSI-RS are respectively configured to be T and t. Subsequently, the CSI-RS is transmitted at the time moments of t, t+T, . . . , t+NT, . . . . At the time moment of t+nT, the CSI-RS is transmitted on the active BWP, as shown in FIG. 89. The period may be relatively smaller, which is for use in accurate measurements of channel information, so as to transmit data by using an appropriate transmission format, thereby improving transmission data throughput. The other set of CSI-RS is mainly adapted to determine which BWP(s) among the multiple BWPs configured by the UE possesses the best CQI. Subsequently, on the basis of such situation, the BS activates an appropriate BWP. This set of CSI-RS may be transmitted on multiple BWPs within a time window, according to time-division multiplexing. The period and time offset are configured for a CSI-RS window. For example, period and time offset of the CSI-RS window are respectively configured to be T1 and t2. The duration length of the CSI-RS time window is L. Within time windows from t2 to t2+L, . . . from t2+NT1 to t2+L+NT1, the UE transmits the CSI-RS on multiple determined BWPs. For example, CSI-RS needs to be transmitted on 3 BWPs of one time window. At the time moment of t2, CSI-RS is transmitted on BWP-1. At the time moment of t2+L/2, CSI-RS is transmitted on BWP-2. At the time moment of t2+L, CSI-RS is transmitted on BWP-3, as shown in FIG. 90.

A Fifth Embodiment

When a UE is only capable of receiving a downlink channel and signal on one BWP simultaneously, if the UE performs a measurement on an inactive BWP, the UE neither detect Control Resource Set (CORESET, PDCCH may be transmitted in a resource defined by CORESET) nor receive PDSCH on the active BWP. A period measured by the UE on the inactive BWP is referred to as a gap. A method for determining a gap for measuring an inactive BWP by a UE, and how to operate by the UE within the gap duration are described in the following.

A First Method:

A BS configures a set of gaps (or, this gap is a time slot or an Orthogonal Frequency Division Multiplexing (OFDM) symbol occupied by CSI-RS, which is configured by the BS for the UE on an inactive BWP) for the UE, by using unique high-layer signaling of the UE. For example, the configured gap is periodic. The period, time offset and time length of gap are configured by high-layer signaling. For example, as shown in FIG. 91, the period, time offset and time length of the periodic gap are respectively configured to be T, t and L. Subsequently, the gap starts from time moments of t, t+T, . . . , t+NT, and duration thereof is L. Besides, unit of T, t and L is configured by unique high-layer signaling of the UE, or are preset by protocol. For example, the UE receives a configuration of unique high-layer signaling of the UE. The unit of T, t and L is a time slot of 1 ms. Within a time slot, where an active BWP and gap are overlapped, or when the time interval between the active BWP and gap is less than t' (t' is a delay resulted from BWP switch), the UE does not detect CORESET or receive PDSCH on the active BWP, which is shown in FIG. 92.

A Second Method:

A BS configures a set of gaps (or, this gap is a time slot or an OFDM symbol occupied by CSI-RS, and the CSI-RS is configured by the BS for a UE on an inactive BWP) for the UE, by using unique high-layer signaling of the UE. For example, the configured gap is periodic. Period, time offset and time length of the gap are configured by high-layer signaling. For example, as shown in FIG. 91, period, time offset and time length of the periodic gap are respectively configured to be T, t and L. Subsequently, the gap starts from the time moments of t, t+T, . . . , t+NT, and duration of the gap is L. Besides, unit of T, t and L is configured by unique high-layer signaling of the UE, or is preset by protocol. For example, the UE receives a configuration of the unique high-layer signaling of the UE. Unit of T, t and L is a time slot of 1 ms. When CORESET of an active BWP is overlapped with gap (or time interval therebetween is less than t' (t' is a delay resulted from BWP switch)), the UE does not detect CORESET in the CORESET, where the active BWP and gap are overlapped (or time interval therebetween is less than t' (t' is a delay resulted from BWP switch)), as shown in FIG. 93; otherwise, the UE detects CORESET in the CORESET, where the active BWP and gap are not overlapped (or, time interval therebetween is greater than t' (t' is a delay resulted from BWP switch)), as shown in FIG. 94. Thus, compared with the first method, reception of an active BWP is less affected by gap.

A Third Method:

A BS configures a set of gaps (or, this gap is a time slot or an OFDM symbol occupied by CSI-RS, and the CSI-RS is configured by the BS for a UE on an inactive BWP) for the UE, by using unique high-layer signaling of the UE. For example, the configured gap is periodic. Period, time offset, and time length of the gap are configured by high-layer signaling. For example, as shown in FIG. 91, period, time offset and time length of the periodic gap are respectively configured to be T, t and L. Subsequently, the gap starts from the time moments of t, t+T, . . . , t+NT, and duration thereof is L. Besides, unit of T, t and L is configured by unique high-layer signaling of the UE, or is preset by protocol. For example, the UE receives a configuration of unique high-layer signaling of the UE. Unit of T, t and L is a time slot of 1 ms. When a PDSCH scheduled by an active BWP is overlapped with gap (or, a time interval therebetween is less than t' (t' is a delay resulted from BWP switch)), the UE does not receive PDSCH overlapped with gap (or, time interval therebetween is less than t' (t' is a delay resulted from BWP switch)) on the active BWP; otherwise, the UE receives PDSCH not overlapped with gap (or, time interval therebetween is greater than, or equal to t' (t' is a delay resulted from BWP switch)) on the active BWP.

A Fourth Method:

A BS configures a set of gaps (or, this gap is a time slot or an OFDM symbol occupied by CSI-RS, and the CSI-RS is configured by the BS for a UE on an inactive BWP) for the UE, by using unique high-layer signaling of the UE. For example, the configured gap is periodic. Period, time offset and time length of the gap are configured by high-layer signaling. For example, as shown in FIG. 91, period, time offset and time length of the periodic gap are respectively configured to be T, t and L. Subsequently, the gap starts from the time moments of t, t+T, . . . , t+NT, . . . , and duration thereof is L. Besides, unit of T, t and L is configured by unique high-layer signaling of the UE, or is preset by protocol. For example, the UE receives a configuration of unique high-layer signaling of the UE. Unit of T, t and L is a time slot of 1 ms. When a PDSCH scheduled by the active BWP is overlapped with gap (or, time interval therebetween is less than t' (t' is a delay resulted from BWP switch)), the UE receives the PDSCH (or, time interval therebetween is less than t' (t' is a delay resulted from BWP switch)) overlapped with gap on the active BWP, instead of performing a measurement on the inactive BWP. When the BS wants the UE to measure the inactive BWP within the gap, the BS may not schedule foregoing PDSCH. When the BS does not want the UE to measure the inactive BWP within the gap, the BS may schedule foregoing PDSCH, such that the BS possesses greater flexibility. When there is no PDSCH scheduled by the active BWP is overlapped with gap (or time interval therebetween is less than t' (t' is a delay resulted from BWP switch)), the UE measures the inactive BWP within the gap.

Corresponding to foregoing method, the present disclosure also provides a device for reporting CSI. The basic structure of the device is shown in FIG. 95, including a BWP selecting module, a CSI calculating module and a CSI reporting module.

The BWP selecting module is configured to select at least one BWP from at least one BWP, which is configured by the device.

The CSI calculating module is configured to calculate a CSI report, based on the selected BWP.

The CSI reporting module is configured to transmit the CSI report to a BS.

The foregoing is only preferred embodiments of the present disclosure, which is not for use in limiting the present disclosure. Any modifications, equivalent substitutions and improvements made within the spirit and principle of the present disclosure, should be covered by the present disclosure.

The invention claimed is:

1. A method performed by a terminal in a communication system, the method comprising:
   identifying a first slot for physical uplink control channel (PUCCH) transmission;
   identifying transmission power control (TPC) command values associated with the first slot that satisfy a delay requirement for the PUCCH transmission;
   identifying a transmission power of the PUCCH transmission based on a value of power control for the first slot, wherein the value of power control for the first slot is identified based on a value of power control of a last PUCCH transmission for a second slot plus a sum of the TPC command values, wherein the second slot is before the first slot; and
   performing the PUCCH transmission based on the transmission power of the PUCCH transmission on-in the first slot.

2. The method of claim 1, further comprising:
receiving, from a base station, configuration information including information on PUCCH resources,
wherein the first slot is identified based on the configuration information.

3. The method of claim 1, wherein each of the TPC command values is included in at least one of group common downlink control information (DCI) or DCI scheduling a physical downlink shared channel (PDSCH).

4. A method performed by a base station in a communication system, the method comprising:
identifying a first slot for physical uplink control channel (PUCCH) transmission; and
receiving the PUCCH transmission transmitted based on a transmission power in the first slot,
wherein the transmission power is determined by a terminal based on a value of power control for the first slot, wherein the value of power control for the first slot is identified based on a value of power control of a last PUCCH transmission for a second slot plus a sum of transmission power control (TPC) command values associated with the first slot that satisfy a delay requirement for the PUCCH transmission, and
wherein the second slot is before the first slot.

5. The method of claim 4, wherein each of the TPC command values is included in at least one of group common downlink control information (DCI) or DCI scheduling a physical downlink shared channel (PDSCH).

6. A terminal in a communication system, the terminal comprising:
a transceiver; and
a controller coupled with the transceiver and configured to:
identify a first slot for physical uplink control channel (PUCCH) transmission,
identify transmission power control (TPC) command values associated with the first slot that satisfy a delay requirement for the PUCCH transmission,
identify a transmission power of the PUCCH transmission based on a value of power control for the first slot, wherein the value of power control for the first slot is identified based on a value of power control of a last PUCCH transmission for a second slot plus a sum of the TPC command values, wherein the second slot is before the first slot, and
perform the PUCCH transmission based on the transmission power of the PUCCH transmission in the first slot.

7. The terminal of claim 6, wherein the controller is configured to:
receive, from a base station, configuration information including information on PUCCH resources,
wherein the first slot is identified based on the configuration information.

8. The terminal of claim 6, wherein each of the TPC command values is included in at least one of group common downlink control information (DCI) or DCI scheduling a physical downlink shared channel (PDSCH).

9. A base station in a communication system, the base station comprising:
a transceiver; and
a controller coupled with the transceiver and configured to:
identify a first slot for physical uplink control channel (PUCCH) transmission, and
receive the PUCCH transmission transmitted based on a transmission power in the first slot,
wherein the transmission power is determined by a terminal based on a value of power control for the first slot, wherein the value of power control for the first slot is identified based on a value of power control of a last PUCCH transmission for a second slot plus a sum of transmission power control (TPC) command values associated with the first slot that satisfy a delay requirement for the PUCCH transmission, and
wherein the second slot is before the first slot.

10. The base station of claim 9, wherein each of the TPC command values is included in at least one of group common downlink control information (DCI) or DCI scheduling a physical downlink shared channel (PDSCH).

* * * * *